(12) United States Patent
Chaudhri et al.

(10) Patent No.: US 11,720,861 B2
(45) Date of Patent: Aug. 8, 2023

(54) REDUCED SIZE USER INTERFACE

(71) Applicant: Apple Inc., Cupertino, CA (US)

(72) Inventors: Imran Chaudhri, San Francisco, CA (US); Stephen O. Lemay, Palo Alto, CA (US); Alan C. Dye, San Francisco, CA (US); Christopher Patrick Foss, San Francisco, CA (US); Christopher Wilson, Sonoma, CA (US); Eric Lance Wilson, San Jose, CA (US); Lawrence Y. Yang, Bellevue, CA (US); Jonathan P. Ive, San Jose, CA (US); Britt K. Nelson, San Francisco, CA (US); Dennis S. Park, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/572,117

(22) Filed: Jan. 10, 2022

(65) Prior Publication Data

US 2022/0129858 A1    Apr. 28, 2022

Related U.S. Application Data

(63) Continuation of application No. 17/103,436, filed on Nov. 24, 2020, now Pat. No. 11,250,385, which is a
(Continued)

(51) Int. Cl.
*G06Q 10/1093* (2023.01)
*G06F 3/0487* (2013.01)
(Continued)

(52) U.S. Cl.
CPC ......... *G06Q 10/1093* (2013.01); *G06F 1/163* (2013.01); *G06F 3/0362* (2013.01);
(Continued)

(58) Field of Classification Search
CPC .......... G06Q 10/1093; H04M 1/72451; G06F 1/163; G06F 3/0362; G06F 3/0416;
(Continued)

(56) References Cited

U.S. PATENT DOCUMENTS 3,148,500 A    9/1964 Thomas
4,358,837 A    11/1982 Yamazaki et al.
(Continued)

FOREIGN PATENT DOCUMENTS

AU    2012200689 A1    3/2012
AU    2010249319 A1    6/2012
(Continued)

OTHER PUBLICATIONS

Applicant-Initiated Interview Summary received for U.S. Appl. No. 17/212,850, dated Jul. 20, 2022, 5 pages.
(Continued)

*Primary Examiner* — Seth A Silverman
(74) *Attorney, Agent, or Firm* — DLA Piper LLP (US)

(57) ABSTRACT

Techniques for a displaying user interfaces screens of a calendar application include displaying different screens based on an input modality. The calendar application may respond differently to inputs from a touch-sensitive screen, inputs from a rotatable input mechanism, inputs having higher intensities, inputs having lower intensities, and so forth.

18 Claims, 67 Drawing Sheets

Related U.S. Application Data continuation of application No. 16/265,938, filed on Feb. 1, 2019, now Pat. No. 10,872,318, which is a continuation of application No. 14/752,776, filed on Jun. 26, 2015, now abandoned.

(60) Provisional application No. 62/129,848, filed on Mar. 8, 2015, provisional application No. 62/047,611, filed on Sep. 8, 2014, provisional application No. 62/018,529, filed on Jun. 27, 2014.

(51) Int. Cl.
*G06F 1/16* (2006.01)
*G06F 3/0482* (2013.01)
*G06F 3/04883* (2022.01)
*G06F 3/041* (2006.01)
*H04M 1/72451* (2021.01)
*G06F 3/0362* (2013.01)
*G06F 3/0488* (2022.01)

(52) U.S. Cl.
CPC .......... *G06F 3/0416* (2013.01); *G06F 3/0482* (2013.01); *G06F 3/0487* (2013.01); *G06F 3/0488* (2013.01); *G06F 3/04883* (2013.01); *H04M 1/72451* (2021.01); *G06F 2203/0383* (2013.01); *G06F 2203/04105* (2013.01)

(58) Field of Classification Search
CPC .... G06F 3/0482; G06F 3/0487; G06F 3/0488; G06F 3/04883
See application file for complete search history.

(56) References Cited

U.S. PATENT DOCUMENTS

| | | |
|---|---|---|
| 4,395,134 A | 7/1983 | Luce |
| 4,445,785 A | 5/1984 | Chambon et al. |
| 4,623,261 A | 11/1986 | Muto |
| 5,088,070 A | 2/1992 | Shiff et al. |
| 5,204,600 A | 4/1993 | Kahkoska |
| 5,208,790 A | 5/1993 | Sato et al. |
| 5,220,260 A | 6/1993 | Schuler |
| 5,220,541 A | 6/1993 | Vuilleumier |
| 5,305,435 A | 4/1994 | Bronson |
| 5,313,229 A | 5/1994 | Gilligan et al. |
| 5,323,363 A | 6/1994 | Hysek et al. |
| 5,329,501 A | 7/1994 | Meister et al. |
| 5,347,628 A | 9/1994 | Welch et al. |
| 5,430,496 A | 7/1995 | Silverbrook et al. |
| 5,455,808 A | 10/1995 | Grupp et al. |
| 5,477,508 A | 12/1995 | Will |
| 5,508,978 A | 4/1996 | Kalbermatter et al. |
| 5,508,979 A | 4/1996 | Eisenegger |
| 5,519,393 A | 5/1996 | Brandestini |
| 5,528,260 A | 6/1996 | Kent |
| 5,530,455 A | 6/1996 | Gillick et al. |
| 5,544,295 A | 8/1996 | Capps |
| 5,557,711 A | 9/1996 | Malzbender et al. |
| 5,563,631 A | 10/1996 | Masunaga |
| 5,563,996 A | 10/1996 | Tchao |
| 5,570,109 A | 10/1996 | Jenson |
| 5,572,649 A | 11/1996 | Elliott et al. |
| 5,592,195 A | 1/1997 | Misono et al. |
| 5,623,588 A | 4/1997 | Gould |
| 5,659,693 A | 8/1997 | Hansen et al. |
| 5,689,628 A | 11/1997 | Robertson |
| 5,691,747 A | 11/1997 | Amano |
| 5,692,213 A | 11/1997 | Harrison et al. |
| 5,739,775 A | 4/1998 | Brandestini |
| 5,745,096 A | 4/1998 | Ludolph et al. |
| 5,751,260 A | 5/1998 | Nappi et al. |
| 5,754,174 A | 5/1998 | Carpenter et al. |
| 5,825,308 A | 10/1998 | Rosenberg |
| 5,825,353 A | 10/1998 | Will |
| 5,825,355 A | 10/1998 | Palmer et al. |
| 5,841,971 A | 11/1998 | Longginou et al. |
| 5,845,257 A | 12/1998 | Fu et al. |
| 5,852,413 A | 12/1998 | Bacchi et al. |
| 5,872,922 A | 2/1999 | Hogan et al. |
| 5,873,108 A | 2/1999 | Goyal et al. |
| 5,874,961 A | 2/1999 | Bates et al. |
| 5,880,735 A | 3/1999 | Shinohara et al. |
| 5,892,507 A | 4/1999 | Moorby |
| 5,892,519 A | 4/1999 | Hirai et al. |
| 5,903,229 A | 5/1999 | Kishi |
| 5,936,625 A | 8/1999 | Kahl |
| 5,940,521 A | 8/1999 | East et al. |
| 5,943,052 A | 8/1999 | Allen et al. |
| 5,960,366 A | 9/1999 | Duwaer |
| 5,973,670 A | 10/1999 | Barber et al. |
| 5,973,702 A | 10/1999 | Orton et al. |
| 5,982,710 A | 11/1999 | Rawat et al. |
| 5,986,655 A | 11/1999 | Chiu et al. |
| 5,999,195 A | 12/1999 | Santangeli |
| 6,005,579 A | 12/1999 | Sugiyama et al. |
| 6,043,818 A | 3/2000 | Nakano et al. |
| 6,073,036 A | 6/2000 | Heikkinen et al. |
| 6,081,256 A | 6/2000 | Martin et al. |
| 6,097,371 A | 8/2000 | Siddiqui et al. |
| 6,128,006 A | 10/2000 | Rosenberg et al. |
| 6,157,381 A | 12/2000 | Bates et al. |
| 6,161,957 A | 12/2000 | Guanter |
| 6,192,258 B1 | 2/2001 | Kamada et al. |
| 6,202,096 B1 | 3/2001 | Arnold et al. |
| 6,203,190 B1 | 3/2001 | Stotz |
| 6,211,856 B1 | 4/2001 | Choi et al. |
| 6,215,490 B1 | 4/2001 | Kaply |
| 6,249,689 B1 | 6/2001 | Aizawa |
| 6,266,098 B1 | 7/2001 | Cove et al. |
| 6,275,173 B1 | 8/2001 | Wu |
| 6,278,443 B1 | 8/2001 | Amro et al. |
| 6,297,795 B1 | 10/2001 | Kato et al. |
| 6,300,939 B1 | 10/2001 | Decker et al. |
| 6,305,234 B1 | 10/2001 | Thies et al. |
| 6,310,648 B1 | 10/2001 | Miller et al. |
| 6,323,883 B1 | 11/2001 | Minoura et al. |
| 6,336,126 B1 | 1/2002 | Bjorklund et al. |
| 6,339,438 B1 | 1/2002 | Bates et al. |
| 6,351,657 B2 | 2/2002 | Yamada |
| 6,359,839 B1 | 3/2002 | Schenk et al. |
| 6,363,395 B1 | 3/2002 | Tanaka et al. |
| 6,369,794 B1 | 4/2002 | Sakurai et al. |
| 6,380,927 B1 | 4/2002 | Ostrum et al. |
| 6,388,877 B1 | 5/2002 | Canova et al. |
| 6,396,482 B1 | 5/2002 | Griffin et al. |
| 6,416,471 B1 | 7/2002 | Kumar et al. |
| 6,429,883 B1 | 8/2002 | Plow et al. |
| 6,430,574 B1 | 8/2002 | Stead |
| 6,449,219 B1 | 9/2002 | Hepp et al. |
| 6,456,285 B2 | 9/2002 | Hayhurst et al. |
| 6,462,757 B1 | 10/2002 | Kao et al. |
| 6,469,695 B1 | 10/2002 | White |
| 6,477,117 B1 | 11/2002 | Narayanaswami et al. |
| 6,483,519 B1 | 11/2002 | Long et al. |
| 6,489,950 B1 | 12/2002 | Griffin et al. |
| 6,496,780 B1 | 12/2002 | Harris et al. |
| 6,515,675 B1 | 2/2003 | Bourdev et al. |
| 6,522,347 B1 | 2/2003 | Sakai et al. |
| 6,525,997 B1 | 2/2003 | Narayanaswami et al. |
| 6,535,461 B1 | 3/2003 | Karhu et al. |
| 6,556,222 B1 | 4/2003 | Narayanaswami |
| 6,570,583 B1 | 5/2003 | Kung et al. |
| 6,597,374 B1 | 7/2003 | Baker et al. |
| 6,600,936 B1 | 7/2003 | Kärkkäinen et al. |
| 6,609,146 B1 | 8/2003 | Slotznick et al. |
| 6,636,197 B1 | 10/2003 | Goldenberg et al. |
| 6,636,245 B1 | 10/2003 | Estipona et al. |
| 6,636,246 B1 | 10/2003 | Gallo et al. |
| 6,647,338 B1 | 11/2003 | Remlinger et al. |
| 6,661,438 B1 | 12/2003 | Shiraishi et al. |
| 6,670,970 B1 | 12/2003 | Silverman et al. |
| 6,686,904 B1 | 2/2004 | Sherman et al. |
| 6,686,911 B1 | 2/2004 | Levin et al. |

(56) References Cited

U.S. PATENT DOCUMENTS

| | | |
|---|---|---|
| 6,690,365 B2 | 2/2004 | Hinckley et al. |
| 6,700,564 B2 | 3/2004 | Mcloone et al. |
| 6,720,860 B1 | 4/2004 | Narayanaswami |
| 6,728,533 B2 | 4/2004 | Ishii et al. |
| 6,763,226 B1 | 7/2004 | Mczeal, Jr. |
| 6,788,220 B2 | 9/2004 | Netzer et al. |
| 6,801,230 B2 | 10/2004 | Driskell et al. |
| 6,809,275 B1 | 10/2004 | Cheng et al. |
| 6,809,724 B1 | 10/2004 | Shiraishi et al. |
| 6,842,169 B2 | 1/2005 | Griffin et al. |
| 6,871,076 B2 | 3/2005 | Samn et al. |
| 6,900,793 B2 | 5/2005 | Goh et al. |
| 6,919,879 B2 | 7/2005 | Griffin et al. |
| 6,937,228 B2 | 8/2005 | Yu |
| 6,950,539 B2 | 9/2005 | Bjorn et al. |
| 6,957,395 B1 | 10/2005 | Jobs et al. |
| 6,966,037 B2 | 11/2005 | Fredriksson et al. |
| 6,967,642 B2 | 11/2005 | Sangiovanni et al. |
| 6,967,903 B2 | 11/2005 | Guanter et al. |
| 6,972,776 B2 | 12/2005 | Davis et al. |
| 6,977,868 B2 | 12/2005 | Brewer et al. |
| 7,002,558 B2 | 2/2006 | Keely et al. |
| 7,024,625 B2 | 4/2006 | Shalit |
| 7,030,861 B1 | 4/2006 | Westerman et al. |
| 7,036,090 B1 | 4/2006 | Nguyen |
| 7,046,230 B2 | 5/2006 | Zadesky et al. |
| 7,054,965 B2 | 5/2006 | Bell et al. |
| 7,058,904 B1 | 6/2006 | Khan et al. |
| 7,075,513 B2 | 7/2006 | Silfverberg et al. |
| 7,081,905 B1 | 7/2006 | Raghunath |
| 7,091,964 B2 | 8/2006 | Wong et al. |
| 7,116,317 B2 | 10/2006 | Gregorio et al. |
| 7,136,064 B2 | 11/2006 | Zuiderveld et al. |
| 7,143,355 B2 | 11/2006 | Yamaguchi et al. |
| 7,146,005 B1 | 12/2006 | Anft et al. |
| 7,168,047 B1 | 1/2007 | Huppi et al. |
| 7,203,380 B2 | 4/2007 | Chiu et al. |
| 7,227,963 B1 | 6/2007 | Yamada et al. |
| 7,256,770 B2 | 8/2007 | Hinckley et al. |
| 7,257,254 B2 | 8/2007 | Tunney et al. |
| 7,272,077 B2 | 9/2007 | Nobs et al. |
| 7,286,063 B2 | 10/2007 | Gauthey et al. |
| 7,286,119 B2 | 10/2007 | Miyashita et al. |
| 7,317,449 B2 | 1/2008 | Robbins et al. |
| 7,333,084 B2 | 2/2008 | Griffin et al. |
| 7,355,609 B1 | 4/2008 | Voas et al. |
| 7,362,312 B2 | 4/2008 | Nurmi |
| 7,385,615 B2 | 6/2008 | Vale et al. |
| 7,404,152 B2 | 7/2008 | Zinn et al. |
| 7,411,575 B2 | 8/2008 | Hill et al. |
| 7,463,239 B2 | 12/2008 | Ledbetter et al. |
| 7,469,381 B2 | 12/2008 | Ording |
| 7,469,386 B2 | 12/2008 | Bear et al. |
| 7,469,388 B1 | 12/2008 | Baudisch et al. |
| 7,477,890 B1 | 1/2009 | Narayanaswami et al. |
| 7,489,303 B1 | 2/2009 | Pryor |
| 7,489,306 B2 | 2/2009 | Kolmykov-zotov et al. |
| 7,499,040 B2 | 3/2009 | Zadesky et al. |
| 7,506,269 B2 | 3/2009 | Lang et al. |
| 7,515,509 B2 | 4/2009 | Klein et al. |
| 7,519,223 B2 | 4/2009 | Dehlin et al. |
| 7,519,468 B2 | 4/2009 | Orr et al. |
| 7,545,367 B2 | 6/2009 | Sunda et al. |
| 7,552,397 B2 | 6/2009 | Holecek et al. |
| 7,593,749 B2 | 9/2009 | Vallström et al. |
| 7,596,761 B2 | 9/2009 | Lemay et al. |
| 7,600,192 B1 | 10/2009 | Hashimoto et al. |
| 7,605,804 B2 | 10/2009 | Wilson |
| 7,637,204 B2 | 12/2009 | Sumser et al. |
| 7,656,393 B2 | 2/2010 | King et al. |
| 7,710,393 B2 | 5/2010 | Tsuk et al. |
| 7,710,409 B2 | 5/2010 | Robbin et al. |
| 7,720,552 B1 | 5/2010 | Lloyd |
| 7,751,285 B1 | 7/2010 | Cain et al. |
| 7,786,975 B2 | 8/2010 | Ording et al. |
| 7,794,138 B2 | 9/2010 | Hilfiker |
| 7,812,826 B2 | 10/2010 | Ording et al. |
| 7,814,055 B2 | 10/2010 | Hullot et al. |
| 7,843,769 B2 | 11/2010 | Ishida et al. |
| 7,844,915 B2 | 11/2010 | Platzer et al. |
| 7,856,255 B2 | 12/2010 | Tsuchiya et al. |
| 7,876,288 B1 | 1/2011 | Huang |
| 7,898,542 B1 | 3/2011 | Yu et al. |
| 7,903,115 B2 | 3/2011 | Platzer et al. |
| 7,916,157 B1 | 3/2011 | Kelley et al. |
| 7,922,096 B2 | 4/2011 | Eilersen |
| 7,956,847 B2 | 6/2011 | Christie |
| 7,965,276 B1 | 6/2011 | Martin et al. |
| 8,001,488 B1 | 8/2011 | Lam et al. |
| 8,009,144 B2 | 8/2011 | Yajima et al. |
| 8,040,331 B2 | 10/2011 | Hill et al. |
| 8,046,705 B2 | 10/2011 | Hunleth et al. |
| 8,051,380 B2 | 11/2011 | Knapp et al. |
| 8,105,208 B2 | 1/2012 | Oleson et al. |
| 8,130,205 B2 | 3/2012 | Forstall et al. |
| 8,140,996 B2 | 3/2012 | Tomkins et al. |
| 8,191,011 B2 | 5/2012 | Abanami et al. |
| 8,194,036 B1 | 6/2012 | Geiss et al. |
| 8,196,043 B2 | 6/2012 | Crow et al. |
| 8,201,102 B2 | 6/2012 | Lee et al. |
| 8,266,550 B1 | 9/2012 | Cleron et al. |
| 8,307,306 B2 | 11/2012 | Komatsu et al. |
| 8,311,727 B2 | 11/2012 | Eckstein et al. |
| 8,364,855 B2 | 1/2013 | James et al. |
| 8,375,326 B2 | 2/2013 | Bucher et al. |
| 8,405,663 B2 | 3/2013 | Wikkerink et al. |
| 8,427,432 B2 | 4/2013 | Kim et al. |
| 8,448,083 B1 | 5/2013 | Migos et al. |
| 8,487,882 B2 | 7/2013 | Inaba et al. |
| 8,496,563 B2 | 7/2013 | Komatsu et al. |
| 8,504,937 B2 | 8/2013 | Jobs et al. |
| 8,510,677 B2 | 8/2013 | Van Os |
| 8,533,623 B2 | 9/2013 | St. Jacques |
| 8,549,429 B2 | 10/2013 | Tsuruta et al. |
| 8,566,722 B2 | 10/2013 | Gordon et al. |
| 8,584,031 B2 | 11/2013 | Moore et al. |
| 8,595,649 B2 | 11/2013 | Sherrard et al. |
| 8,607,156 B1 | 12/2013 | Jania et al. |
| 8,613,070 B1 | 12/2013 | Borzycki et al. |
| 8,627,236 B2 | 1/2014 | Jung et al. |
| 8,656,311 B1 | 2/2014 | Harper et al. |
| 8,665,209 B2 | 3/2014 | Rimas-ribikauskas et al. |
| 8,669,944 B2 | 3/2014 | Klinghult et al. |
| 8,669,945 B2 | 3/2014 | Coddington |
| 8,677,283 B2 | 3/2014 | Fong |
| 8,686,944 B1 | 4/2014 | Dayer et al. |
| 8,686,961 B2 | 4/2014 | Yamano |
| 8,717,302 B1 | 5/2014 | Qin et al. |
| 8,732,609 B1 | 5/2014 | Bayersdorfer et al. |
| 8,739,040 B2 | 5/2014 | Graham |
| 8,743,151 B1 | 6/2014 | Fulcher et al. |
| 8,793,611 B2 | 7/2014 | Van Os |
| 8,799,816 B2 | 8/2014 | Wells et al. |
| 8,799,826 B2 | 8/2014 | Missig et al. |
| 8,811,951 B1 | 8/2014 | Faaborg et al. |
| 8,824,245 B2 | 9/2014 | Lau et al. |
| 8,825,445 B2 | 9/2014 | Hoffman et al. |
| 8,854,318 B2 | 10/2014 | Borovsky et al. |
| 8,860,674 B2 | 10/2014 | Lee et al. |
| 8,866,761 B2 | 10/2014 | Enami |
| 8,868,338 B1 | 10/2014 | Chau et al. |
| 8,884,874 B1 | 11/2014 | Chun et al. |
| 8,903,671 B2 | 12/2014 | Park et al. |
| 8,952,886 B2 | 2/2015 | Tsuk et al. |
| 8,954,887 B1 | 2/2015 | Mendis et al. |
| 8,963,894 B2 | 2/2015 | Klassen et al. |
| 8,996,639 B2 | 3/2015 | Faaborg et al. |
| 9,001,625 B2 | 4/2015 | Essery et al. |
| 9,007,057 B2 | 4/2015 | Villaret |
| 9,007,302 B1 | 4/2015 | Bandt-horn |
| 9,007,323 B2 | 4/2015 | Araki |
| 9,011,292 B2 | 4/2015 | Weast et al. |
| 9,070,092 B2 | 6/2015 | Shieh et al. |
| 9,100,944 B2 | 8/2015 | Sauhta et al. |

(56) References Cited

U.S. PATENT DOCUMENTS

| | | |
|---|---|---|
| 9,104,705 B2 | 8/2015 | Fujinaga |
| 9,141,270 B1 | 9/2015 | Stuart et al. |
| 9,158,440 B1 | 10/2015 | Lider et al. |
| 9,164,663 B1 | 10/2015 | Berard |
| 9,173,052 B2 | 10/2015 | Hauser et al. |
| 9,176,652 B1 | 11/2015 | Patel et al. |
| 9,182,876 B2 | 11/2015 | Kim et al. |
| 9,189,089 B1 | 11/2015 | Sutton et al. |
| 9,191,988 B2 | 11/2015 | Newham |
| 9,195,219 B2 | 11/2015 | Hong et al. |
| 9,229,624 B2 | 1/2016 | Wei et al. |
| 9,244,562 B1 | 1/2016 | Moscovich et al. |
| 9,268,400 B2 | 2/2016 | Gomez Sainz-garcia |
| 9,395,867 B2 | 7/2016 | Yach et al. |
| 9,395,905 B2 | 7/2016 | Wherry |
| 9,400,489 B2 | 7/2016 | Kim et al. |
| 9,423,938 B1 | 8/2016 | Morris |
| 9,442,649 B2 | 9/2016 | Davis et al. |
| 9,448,691 B2 | 9/2016 | Suda |
| 9,459,781 B2 | 10/2016 | Kocienda et al. |
| 9,477,208 B2 | 10/2016 | Park et al. |
| 9,489,074 B2 | 11/2016 | Oonishi |
| 9,503,402 B2 | 11/2016 | Cue et al. |
| 9,547,425 B2 | 1/2017 | Kocienda et al. |
| D778,912 S | 2/2017 | Akana et al. |
| 9,582,165 B2 | 2/2017 | Wilson et al. |
| 9,582,187 B2 | 2/2017 | Gil et al. |
| 9,620,312 B2 | 4/2017 | Ely et al. |
| 9,651,922 B2 | 5/2017 | Hysek et al. |
| 9,666,178 B2 | 5/2017 | Loubiere et al. |
| 9,678,571 B1 | 6/2017 | Robert et al. |
| 9,684,398 B1 | 6/2017 | Samuel et al. |
| 9,696,809 B2 | 7/2017 | Temple |
| 9,729,730 B2 | 8/2017 | Levesque et al. |
| 9,772,769 B2 | 9/2017 | Shimazu |
| 9,798,443 B1 | 10/2017 | Gray |
| 9,800,525 B1 | 10/2017 | Lerner et al. |
| 9,823,828 B2 | 11/2017 | Zambetti et al. |
| 9,860,200 B1 | 1/2018 | Braun et al. |
| 9,870,114 B1 | 1/2018 | Jones et al. |
| D813,239 S | 3/2018 | Akana et al. |
| 9,921,711 B2 | 3/2018 | Oh et al. |
| 9,965,144 B2 | 5/2018 | Nakamura et al. |
| 9,971,495 B2 | 5/2018 | Shetty et al. |
| 9,984,539 B2 | 5/2018 | Moussette et al. |
| 10,019,097 B2 | 7/2018 | Ely et al. |
| 10,025,458 B2 | 7/2018 | Chaudhri et al. |
| 10,048,802 B2 | 8/2018 | Shedletsky et al. |
| 10,055,121 B2 | 8/2018 | Chaudhri et al. |
| 10,057,470 B2 | 8/2018 | Kim et al. |
| 10,097,496 B2 | 10/2018 | Dye et al. |
| 10,133,439 B1 | 11/2018 | Brichter et al. |
| 10,135,905 B2 | 11/2018 | Chaudhri et al. |
| 10,152,196 B2 | 12/2018 | Jeong et al. |
| 10,175,652 B2 | 1/2019 | Ely et al. |
| 10,216,147 B2 | 2/2019 | Ely et al. |
| 10,216,352 B2 | 2/2019 | Liang et al. |
| 10,216,392 B2 | 2/2019 | Zhao |
| 10,222,909 B2 | 3/2019 | Shedletsky et al. |
| 10,275,117 B2 | 4/2019 | Zambetti et al. |
| D849,749 S | 5/2019 | Akana et al. |
| 10,289,218 B1 | 5/2019 | Young |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,339,721 B1 | 7/2019 | Dascola et al. |
| 10,389,675 B2 | 8/2019 | Grandhi |
| 10,417,879 B2 | 9/2019 | Moussette et al. |
| 10,466,881 B2 | 11/2019 | Sasaki et al. |
| 10,504,340 B2 | 12/2019 | Moussette et al. |
| 10,642,467 B2 | 5/2020 | Merminod et al. |
| 10,664,074 B2 | 5/2020 | Moussette et al. |
| 10,664,120 B1 | 5/2020 | Jones et al. |
| 10,852,700 B2 | 12/2020 | Abramov |
| 10,977,911 B2 | 4/2021 | Moussette et al. |
| 11,068,128 B2 | 7/2021 | Zambetti et al. |
| 11,322,553 B2 | 5/2022 | Song et al. |
| 2001/0004337 A1 | 6/2001 | Paratte et al. |
| 2001/0011991 A1 | 8/2001 | Wang et al. |
| 2001/0012018 A1 | 8/2001 | Hayhurst et al. |
| 2001/0041596 A1 | 11/2001 | Forlenzo et al. |
| 2001/0043514 A1 | 11/2001 | Kita et al. |
| 2002/0019296 A1 | 2/2002 | Freeman et al. |
| 2002/0027547 A1 | 3/2002 | Kamijo et al. |
| 2002/0030665 A1 | 3/2002 | Ano |
| 2002/0030668 A1 | 3/2002 | Hoshino et al. |
| 2002/0030699 A1 | 3/2002 | Van Ee |
| 2002/0036623 A1 | 3/2002 | Kano et al. |
| 2002/0047860 A1 | 4/2002 | Ceulaer et al. |
| 2002/0054066 A1 | 5/2002 | Kikinis et al. |
| 2002/0054164 A1 | 5/2002 | Uemura |
| 2002/0054541 A1 | 5/2002 | Hall et al. |
| 2002/0063684 A1 | 5/2002 | Tran |
| 2002/0069071 A1 | 6/2002 | Knockeart et al. |
| 2002/0070935 A1 | 6/2002 | Suzuki et al. |
| 2002/0081976 A1 | 6/2002 | Fujisawa et al. |
| 2002/0101457 A1 | 8/2002 | Lang |
| 2002/0101458 A1 | 8/2002 | Sangiovanni |
| 2002/0115478 A1 | 8/2002 | Fujisawa et al. |
| 2002/0118169 A1 | 8/2002 | Hinckley et al. |
| 2002/0126099 A1 | 9/2002 | Engholm |
| 2002/0131331 A1 | 9/2002 | Molander et al. |
| 2002/0140633 A1* | 10/2002 | Rafii .................. G06F 3/04847 345/8 |
| 2002/0154150 A1 | 10/2002 | Ogaki et al. |
| 2002/0154175 A1 | 10/2002 | Abello et al. |
| 2002/0171689 A1 | 11/2002 | Fox et al. |
| 2002/0180797 A1 | 12/2002 | Bachmann |
| 2002/0186252 A1 | 12/2002 | Himmel et al. |
| 2002/0186621 A1 | 12/2002 | Lai et al. |
| 2003/0020671 A1 | 1/2003 | Santoro et al. |
| 2003/0025673 A1 | 2/2003 | Ledbetter et al. |
| 2003/0027621 A1 | 2/2003 | Libby et al. |
| 2003/0052901 A1 | 3/2003 | Fukuchi |
| 2003/0067497 A1 | 4/2003 | Pichon et al. |
| 2003/0074647 A1 | 4/2003 | Andrew et al. |
| 2003/0076301 A1 | 4/2003 | Tsuk et al. |
| 2003/0079057 A1 | 4/2003 | Ruskin et al. |
| 2003/0081506 A1 | 5/2003 | Karhu et al. |
| 2003/0095149 A1 | 5/2003 | Fredriksson et al. |
| 2003/0098891 A1 | 5/2003 | Molander et al. |
| 2003/0103044 A1 | 6/2003 | Sunda et al. |
| 2003/0112279 A1 | 6/2003 | Irimajiri |
| 2003/0115384 A1 | 6/2003 | Sonehara et al. |
| 2003/0117440 A1 | 6/2003 | Hellyar et al. |
| 2003/0122787 A1 | 7/2003 | Zimmerman et al. |
| 2003/0123329 A1 | 7/2003 | Guanter et al. |
| 2003/0128192 A1 | 7/2003 | Van Os |
| 2003/0137540 A1 | 7/2003 | Klevenz et al. |
| 2003/0142081 A1 | 7/2003 | Iizuka et al. |
| 2003/0142288 A1 | 7/2003 | Kinrot et al. |
| 2003/0164847 A1 | 9/2003 | Zaima et al. |
| 2003/0182628 A1 | 9/2003 | Lira |
| 2003/0189598 A1 | 10/2003 | Lipstein et al. |
| 2003/0210259 A1 | 11/2003 | Liu et al. |
| 2003/0210286 A1 | 11/2003 | Gerpheide et al. |
| 2003/0214885 A1 | 11/2003 | Powell et al. |
| 2003/0226152 A1 | 12/2003 | Billmaier et al. |
| 2004/0001105 A1 | 1/2004 | Chew et al. |
| 2004/0013042 A1 | 1/2004 | Farine et al. |
| 2004/0017733 A1 | 1/2004 | Sullivan |
| 2004/0021699 A1 | 2/2004 | Fildebrandt et al. |
| 2004/0027793 A1 | 2/2004 | Haraguchi et al. |
| 2004/0038667 A1 | 2/2004 | Vance |
| 2004/0047244 A1 | 3/2004 | Iino et al. |
| 2004/0061678 A1 | 4/2004 | Goh et al. |
| 2004/0073935 A1 | 4/2004 | Kang |
| 2004/0077462 A1 | 4/2004 | Brown et al. |
| 2004/0085328 A1 | 5/2004 | Maruyama et al. |
| 2004/0100479 A1 | 5/2004 | Nakano et al. |
| 2004/0113819 A1 | 6/2004 | Gauthey et al. |
| 2004/0128286 A1 | 7/2004 | Yasushi et al. |
| 2004/0130580 A1 | 7/2004 | Howard et al. |

(56) References Cited

U.S. PATENT DOCUMENTS

| | | |
|---|---|---|
| 2004/0130581 A1 | 7/2004 | Howard et al. |
| 2004/0145595 A1 | 7/2004 | Bennett |
| 2004/0150621 A1 | 8/2004 | Bohn |
| 2004/0155907 A1 | 8/2004 | Yamaguchi et al. |
| 2004/0164973 A1 | 8/2004 | Nakano et al. |
| 2004/0170270 A1 | 9/2004 | Takashima et al. |
| 2004/0192332 A1 | 9/2004 | Samn |
| 2004/0207653 A1 | 10/2004 | Stavely et al. |
| 2004/0218472 A1 | 11/2004 | Narayanaswami et al. |
| 2004/0225613 A1 | 11/2004 | Narayanaswami et al. |
| 2004/0230599 A1 | 11/2004 | Moore et al. |
| 2004/0233162 A1 | 11/2004 | Kobayashi |
| 2004/0239649 A1 | 12/2004 | Ludtke et al. |
| 2004/0239692 A1 | 12/2004 | Balle et al. |
| 2004/0252109 A1 | 12/2004 | Trent, Jr. et al. |
| 2004/0252119 A1 | 12/2004 | Hunleth et al. |
| 2004/0257384 A1 | 12/2004 | Park et al. |
| 2004/0264301 A1 | 12/2004 | Howard et al. |
| 2005/0007884 A1 | 1/2005 | Lorenzato et al. |
| 2005/0012723 A1 | 1/2005 | Pallakoff |
| 2005/0015803 A1 | 1/2005 | Macrae et al. |
| 2005/0030279 A1 | 2/2005 | Fu |
| 2005/0039142 A1 | 2/2005 | Jalon et al. |
| 2005/0041667 A1 | 2/2005 | Miller et al. |
| 2005/0057524 A1 | 3/2005 | Hill et al. |
| 2005/0057584 A1 | 3/2005 | Gruen et al. |
| 2005/0071761 A1 | 3/2005 | Kontio |
| 2005/0081164 A1 | 4/2005 | Hama et al. |
| 2005/0097466 A1 | 5/2005 | Levi et al. |
| 2005/0108253 A1 | 5/2005 | Metsatahti et al. |
| 2005/0116941 A1 | 6/2005 | Wallington et al. |
| 2005/0119031 A1 | 6/2005 | Spalink et al. |
| 2005/0125744 A1 | 6/2005 | Hubbard et al. |
| 2005/0132291 A1 | 6/2005 | Wagner et al. |
| 2005/0136955 A1 | 6/2005 | Mumick et al. |
| 2005/0164623 A1 | 7/2005 | Huynh |
| 2005/0168566 A1 | 8/2005 | Tada et al. |
| 2005/0183012 A1 | 8/2005 | Petro et al. |
| 2005/0188856 A1 | 9/2005 | Sumser et al. |
| 2005/0191994 A1 | 9/2005 | May et al. |
| 2005/0195157 A1 | 9/2005 | Kramer et al. |
| 2005/0195216 A1 | 9/2005 | Kramer et al. |
| 2005/0197063 A1 | 9/2005 | White et al. |
| 2005/0200611 A1 | 9/2005 | Goto et al. |
| 2005/0209051 A1 | 9/2005 | Santomassimo et al. |
| 2005/0210403 A1 | 9/2005 | Satanek |
| 2005/0215848 A1 | 9/2005 | Lorenzato et al. |
| 2005/0231489 A1 | 10/2005 | Ladouceur et al. |
| 2005/0259077 A1 | 11/2005 | Adams et al. |
| 2005/0278757 A1 | 12/2005 | Grossman et al. |
| 2006/0007129 A1 | 1/2006 | Pletikosa et al. |
| 2006/0019649 A1 | 1/2006 | Feinleib et al. |
| 2006/0020904 A1 | 1/2006 | Aaltonen et al. |
| 2006/0022956 A1 | 2/2006 | Lengeling et al. |
| 2006/0025091 A1 | 2/2006 | Buford |
| 2006/0026356 A1 | 2/2006 | Okawa et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0028444 A1 | 2/2006 | Hinckley et al. |
| 2006/0028446 A1 | 2/2006 | Liberty et al. |
| 2006/0028917 A1 | 2/2006 | Wigginton et al. |
| 2006/0031786 A1 | 2/2006 | Hillis et al. |
| 2006/0035632 A1 | 2/2006 | Sorvari et al. |
| 2006/0038796 A1 | 2/2006 | Hinckley et al. |
| 2006/0054427 A1 | 3/2006 | Jasso et al. |
| 2006/0055700 A1 | 3/2006 | Niles et al. |
| 2006/0064716 A1 | 3/2006 | Sull et al. |
| 2006/0069604 A1 | 3/2006 | Leukart et al. |
| 2006/0082554 A1 | 4/2006 | Caine et al. |
| 2006/0085751 A1 | 4/2006 | O'brien et al. |
| 2006/0085765 A1 | 4/2006 | Peterson et al. |
| 2006/0090090 A1 | 4/2006 | Perng et al. |
| 2006/0090141 A1 | 4/2006 | Loui et al. |
| 2006/0092177 A1 | 5/2006 | Blasko et al. |
| 2006/0092770 A1 | 5/2006 | Demas |
| 2006/0095846 A1 | 5/2006 | Nurmi |
| 2006/0098634 A1 | 5/2006 | Umemoto et al. |
| 2006/0112350 A1 | 5/2006 | Kato |
| 2006/0132456 A1 | 6/2006 | Anson |
| 2006/0143574 A1 | 6/2006 | Ito et al. |
| 2006/0152480 A1 | 7/2006 | Senn |
| 2006/0161861 A1 | 7/2006 | Holecek et al. |
| 2006/0161870 A1 | 7/2006 | Hotelling et al. |
| 2006/0161871 A1 | 7/2006 | Hotelling et al. |
| 2006/0174213 A1 | 8/2006 | Kato |
| 2006/0181506 A1 | 8/2006 | Fyke et al. |
| 2006/0181519 A1 | 8/2006 | Vernier et al. |
| 2006/0197753 A1 | 9/2006 | Hotelling |
| 2006/0210092 A1 | 9/2006 | Navid |
| 2006/0212905 A1 | 9/2006 | Matsuda et al. |
| 2006/0214935 A1 | 9/2006 | Boyd et al. |
| 2006/0224945 A1 | 10/2006 | Khan et al. |
| 2006/0242607 A1 | 10/2006 | Hudson |
| 2006/0244735 A1 | 11/2006 | Wilson |
| 2006/0255683 A1 | 11/2006 | Suzuki et al. |
| 2006/0265263 A1 | 11/2006 | Burns |
| 2006/0268019 A1 | 11/2006 | Wang et al. |
| 2006/0268020 A1 | 11/2006 | Han |
| 2006/0274046 A1 | 12/2006 | Hillis et al. |
| 2006/0277486 A1 | 12/2006 | Skinner |
| 2006/0290671 A1 | 12/2006 | Bohn et al. |
| 2007/0002019 A1 | 1/2007 | Lane et al. |
| 2007/0006096 A1 | 1/2007 | Kim et al. |
| 2007/0011614 A1 | 1/2007 | Crow et al. |
| 2007/0027682 A1 | 2/2007 | Bennett |
| 2007/0030256 A1 | 2/2007 | Akaike et al. |
| 2007/0031119 A1 | 2/2007 | Iwanaga |
| 2007/0036346 A1 | 2/2007 | Kwon |
| 2007/0046635 A1 | 3/2007 | Nishiyama et al. |
| 2007/0061126 A1 | 3/2007 | Russo et al. |
| 2007/0063995 A1 | 3/2007 | Bailey et al. |
| 2007/0070090 A1 | 3/2007 | Debettencourt et al. |
| 2007/0073917 A1 | 3/2007 | Larson et al. |
| 2007/0082707 A1 | 4/2007 | Flynt et al. |
| 2007/0085841 A1 | 4/2007 | Tsuk et al. |
| 2007/0094330 A1 | 4/2007 | Russell et al. |
| 2007/0097113 A1 | 5/2007 | Lee et al. |
| 2007/0097151 A1 | 5/2007 | Rosenberg |
| 2007/0098395 A1 | 5/2007 | Battles et al. |
| 2007/0106949 A1 | 5/2007 | Narita et al. |
| 2007/0120819 A1 | 5/2007 | Young et al. |
| 2007/0132733 A1 | 6/2007 | Ram |
| 2007/0132789 A1 | 6/2007 | Ording et al. |
| 2007/0136093 A1 | 6/2007 | Rankin et al. |
| 2007/0136679 A1 | 6/2007 | Yang |
| 2007/0146336 A1 | 6/2007 | Ording et al. |
| 2007/0146337 A1 | 6/2007 | Ording et al. |
| 2007/0150826 A1 | 6/2007 | Anzures et al. |
| 2007/0150830 A1 | 6/2007 | Ording et al. |
| 2007/0150842 A1 | 6/2007 | Chaudhri et al. |
| 2007/0157094 A1 | 7/2007 | Lemay et al. |
| 2007/0162872 A1 | 7/2007 | Hong et al. |
| 2007/0168369 A1 | 7/2007 | Bruns |
| 2007/0176910 A1 | 8/2007 | Simek et al. |
| 2007/0180375 A1 | 8/2007 | Gittelman et al. |
| 2007/0180379 A1 | 8/2007 | Osato et al. |
| 2007/0182595 A1 | 8/2007 | Ghasabian |
| 2007/0182999 A1 | 8/2007 | Anthony et al. |
| 2007/0198942 A1 | 8/2007 | Morris |
| 2007/0209017 A1 | 9/2007 | Gupta et al. |
| 2007/0211042 A1 | 9/2007 | Kim et al. |
| 2007/0213955 A1 | 9/2007 | Ishida et al. |
| 2007/0216661 A1 | 9/2007 | Chen et al. |
| 2007/0226646 A1 | 9/2007 | Nagiyama et al. |
| 2007/0229458 A1 | 10/2007 | Moon |
| 2007/0236475 A1 | 10/2007 | Wherry |
| 2007/0236479 A1 | 10/2007 | Wang et al. |
| 2007/0237493 A1 | 10/2007 | Hall et al. |
| 2007/0239754 A1 | 10/2007 | Schnitman et al. |
| 2007/0239837 A1 | 10/2007 | Jablokov et al. |
| 2007/0242569 A1 | 10/2007 | Inoue et al. |
| 2007/0247435 A1 | 10/2007 | Benko et al. |
| 2007/0271532 A1 | 11/2007 | Nguyen et al. |

(56) References Cited

U.S. PATENT DOCUMENTS

| | | |
|---|---|---|
| 2007/0279190 A1 | 12/2007 | Lugt et al. |
| 2007/0279401 A1 | 12/2007 | Ramstein et al. |
| 2007/0290045 A1 | 12/2007 | Cisar |
| 2007/0291018 A1 | 12/2007 | Park et al. |
| 2007/0296711 A1 | 12/2007 | Yee et al. |
| 2008/0001915 A1 | 1/2008 | Pihlaja et al. |
| 2008/0004084 A1 | 1/2008 | Park et al. |
| 2008/0005087 A1 | 1/2008 | Sato et al. |
| 2008/0019494 A1 | 1/2008 | Toda |
| 2008/0020810 A1 | 1/2008 | Park |
| 2008/0024459 A1 | 1/2008 | Poupyrev et al. |
| 2008/0033779 A1 | 2/2008 | Coffman et al. |
| 2008/0040692 A1 | 2/2008 | Sunday et al. |
| 2008/0043028 A1 | 2/2008 | Tanaka |
| 2008/0046839 A1 | 2/2008 | Mehra et al. |
| 2008/0052643 A1 | 2/2008 | Ike et al. |
| 2008/0052945 A1 | 3/2008 | Matas et al. |
| 2008/0055241 A1 | 3/2008 | Goldenberg et al. |
| 2008/0055273 A1 | 3/2008 | Forstall |
| 2008/0057926 A1 | 3/2008 | Forstall et al. |
| 2008/0062127 A1 | 3/2008 | Brodersen et al. |
| 2008/0062141 A1 | 3/2008 | Chaudhri |
| 2008/0066135 A1 | 3/2008 | Brodersen et al. |
| 2008/0071663 A1 | 3/2008 | Busby |
| 2008/0076637 A1 | 3/2008 | Gilley et al. |
| 2008/0082934 A1 | 4/2008 | Kocienda et al. |
| 2008/0096593 A1 | 4/2008 | Park |
| 2008/0098313 A1 | 4/2008 | Pollack |
| 2008/0100693 A1 | 5/2008 | Jobs et al. |
| 2008/0109764 A1 | 5/2008 | Linnamaki |
| 2008/0122796 A1 | 5/2008 | Jobs et al. |
| 2008/0123473 A1 | 5/2008 | Ozawa et al. |
| 2008/0125196 A1 | 5/2008 | Ryu |
| 2008/0127268 A1 | 5/2008 | Bergeron et al. |
| 2008/0129520 A1 | 6/2008 | Lee |
| 2008/0148177 A1 | 6/2008 | Lang et al. |
| 2008/0148181 A1 | 6/2008 | Reyes et al. |
| 2008/0150901 A1 | 6/2008 | Lowles et al. |
| 2008/0155428 A1 | 6/2008 | Lee |
| 2008/0155461 A1 | 6/2008 | Ozaki et al. |
| 2008/0155475 A1 | 6/2008 | Duhig et al. |
| 2008/0158149 A1 | 7/2008 | Levin |
| 2008/0163116 A1 | 7/2008 | Lee et al. |
| 2008/0163119 A1 | 7/2008 | Kim et al. |
| 2008/0163121 A1 | 7/2008 | Lee et al. |
| 2008/0165124 A1 | 7/2008 | Kim |
| 2008/0165140 A1 | 7/2008 | Christie et al. |
| 2008/0165151 A1 | 7/2008 | Lemay et al. |
| 2008/0165152 A1 | 7/2008 | Forstall et al. |
| 2008/0165153 A1 | 7/2008 | Platzer et al. |
| 2008/0165161 A1 | 7/2008 | Platzer et al. |
| 2008/0165210 A1 | 7/2008 | Platzer et al. |
| 2008/0168349 A1 | 7/2008 | Lamiraux et al. |
| 2008/0168364 A1 | 7/2008 | Miller et al. |
| 2008/0168382 A1 | 7/2008 | Louch et al. |
| 2008/0168384 A1 | 7/2008 | Platzer et al. |
| 2008/0168396 A1 | 7/2008 | Matas et al. |
| 2008/0168404 A1 | 7/2008 | Ording |
| 2008/0168478 A1 | 7/2008 | Platzer et al. |
| 2008/0172287 A1 | 7/2008 | Tien et al. |
| 2008/0172634 A1 | 7/2008 | Choi et al. |
| 2008/0174570 A1 | 7/2008 | Jobs et al. |
| 2008/0186808 A1 | 8/2008 | Lee |
| 2008/0192021 A1 | 8/2008 | Lim et al. |
| 2008/0201649 A1 | 8/2008 | Mattila et al. |
| 2008/0204478 A1 | 8/2008 | Hung |
| 2008/0207281 A1 | 8/2008 | Tsuchiya et al. |
| 2008/0216001 A1 | 9/2008 | Ording et al. |
| 2008/0224995 A1 | 9/2008 | Perkunder |
| 2008/0225014 A1 | 9/2008 | Kim |
| 2008/0246778 A1 | 10/2008 | Ham et al. |
| 2008/0257701 A1 | 10/2008 | Wlotzka et al. |
| 2008/0259025 A1 | 10/2008 | Eom |
| 2008/0270886 A1 | 10/2008 | Gossweiler et al. |
| 2008/0279475 A1 | 11/2008 | Lee et al. |
| 2008/0288880 A1 | 11/2008 | Reponen et al. |
| 2008/0318635 A1 | 12/2008 | Yoon et al. |
| 2008/0320391 A1 | 12/2008 | Lemay et al. |
| 2009/0002396 A1 | 1/2009 | Andrews et al. |
| 2009/0007019 A1 | 1/2009 | Kobayashi et al. |
| 2009/0015550 A1 | 1/2009 | Koski et al. |
| 2009/0030800 A1 | 1/2009 | Grois |
| 2009/0046110 A1 | 2/2009 | Sadler et al. |
| 2009/0050465 A1 | 2/2009 | Asada et al. |
| 2009/0051649 A1 | 2/2009 | Rondel |
| 2009/0059730 A1 | 3/2009 | Lyons et al. |
| 2009/0064031 A1 | 3/2009 | Bull et al. |
| 2009/0070675 A1 | 3/2009 | Li |
| 2009/0070705 A1 | 3/2009 | Ording |
| 2009/0070711 A1 | 3/2009 | Kwak et al. |
| 2009/0073194 A1 | 3/2009 | Ording |
| 2009/0079695 A1 | 3/2009 | Tatehata et al. |
| 2009/0079698 A1 | 3/2009 | Takashima et al. |
| 2009/0098912 A1 | 4/2009 | Kim et al. |
| 2009/0100342 A1 | 4/2009 | Jakobsen et al. |
| 2009/0100373 A1 | 4/2009 | Pixley et al. |
| 2009/0102817 A1 | 4/2009 | Bathiche et al. |
| 2009/0109069 A1 | 4/2009 | Takasaki et al. |
| 2009/0118100 A1 | 5/2009 | Oliver et al. |
| 2009/0119678 A1 | 5/2009 | Shih et al. |
| 2009/0125811 A1 | 5/2009 | Bethurum |
| 2009/0141046 A1 | 6/2009 | Rathnam et al. |
| 2009/0143117 A1 | 6/2009 | Shin et al. |
| 2009/0144642 A1 | 6/2009 | Crystal |
| 2009/0144654 A1 | 6/2009 | Brouwer et al. |
| 2009/0152452 A1 | 6/2009 | Lee et al. |
| 2009/0153288 A1 | 6/2009 | Hope et al. |
| 2009/0156255 A1 | 6/2009 | Shin et al. |
| 2009/0164567 A1 | 6/2009 | Hara |
| 2009/0164923 A1 | 6/2009 | Ovi et al. |
| 2009/0164937 A1 | 6/2009 | Alviar et al. |
| 2009/0172606 A1 | 7/2009 | Dunn et al. |
| 2009/0177538 A1 | 7/2009 | Brewer et al. |
| 2009/0177966 A1 | 7/2009 | Chaudhri |
| 2009/0178007 A1 | 7/2009 | Matas et al. |
| 2009/0189915 A1 | 7/2009 | Mercer et al. |
| 2009/0193359 A1 | 7/2009 | Anthony et al. |
| 2009/0196124 A1 | 8/2009 | Mooring et al. |
| 2009/0199130 A1 | 8/2009 | Tsern et al. |
| 2009/0204920 A1 | 8/2009 | Beverley et al. |
| 2009/0204929 A1 | 8/2009 | Baurmann et al. |
| 2009/0216556 A1 | 8/2009 | Martin et al. |
| 2009/0228825 A1 | 9/2009 | Van Os et al. |
| 2009/0231271 A1 | 9/2009 | Heubel et al. |
| 2009/0231356 A1 | 9/2009 | Barnes et al. |
| 2009/0237372 A1 | 9/2009 | Kim et al. |
| 2009/0239587 A1 | 9/2009 | Negron et al. |
| 2009/0241048 A1 | 9/2009 | Augustine et al. |
| 2009/0241150 A1 | 9/2009 | White et al. |
| 2009/0244015 A1 | 10/2009 | Sengupta et al. |
| 2009/0249247 A1 | 10/2009 | Tseng et al. |
| 2009/0254624 A1 | 10/2009 | Baudin et al. |
| 2009/0256780 A1 | 10/2009 | Small et al. |
| 2009/0259958 A1 | 10/2009 | Ban |
| 2009/0280907 A1 | 11/2009 | Larsen et al. |
| 2009/0288035 A1 | 11/2009 | Tunning et al. |
| 2009/0288039 A1 | 11/2009 | Mail et al. |
| 2009/0289905 A1 | 11/2009 | Ahn |
| 2009/0305732 A1 | 12/2009 | Marcellino et al. |
| 2009/0313299 A1 | 12/2009 | Bonev et al. |
| 2009/0315867 A1 | 12/2009 | Sakamoto et al. |
| 2009/0319928 A1 | 12/2009 | Alphin et al. |
| 2009/0322692 A1 | 12/2009 | Kim et al. |
| 2009/0325563 A1 | 12/2009 | Horodezky et al. |
| 2009/0327886 A1 | 12/2009 | Whytock et al. |
| 2010/0001967 A1 | 1/2010 | Yoo |
| 2010/0004031 A1 | 1/2010 | Kim |
| 2010/0004033 A1 | 1/2010 | Choe et al. |
| 2010/0017748 A1 | 1/2010 | Taylor et al. |
| 2010/0017872 A1 | 1/2010 | Goertz et al. |
| 2010/0026640 A1* | 2/2010 | Kim ............... G06F 3/04886 345/173 |
| 2010/0029327 A1 | 2/2010 | Jee |
| 2010/0048358 A1 | 2/2010 | Tchao et al. |

(56) References Cited

U.S. PATENT DOCUMENTS

| | | |
|---|---|---|
| 2010/0058223 A1 | 3/2010 | Price et al. |
| 2010/0058226 A1 | 3/2010 | Flake et al. |
| 2010/0058240 A1 | 3/2010 | Bull et al. |
| 2010/0064255 A1 | 3/2010 | Rottler et al. |
| 2010/0070926 A1 | 3/2010 | Abanami et al. |
| 2010/0073692 A1 | 3/2010 | Waltman et al. |
| 2010/0079500 A1 | 4/2010 | Osullivan et al. |
| 2010/0085203 A1 | 4/2010 | Kahn et al. |
| 2010/0088634 A1 | 4/2010 | Tsuruta et al. |
| 2010/0093400 A1 | 4/2010 | Ju et al. |
| 2010/0099462 A1 * | 4/2010 | Baek ............... H04M 1/72451 345/173 |
| 2010/0100137 A1 | 4/2010 | Justis et al. |
| 2010/0110044 A1 | 5/2010 | Englund |
| 2010/0110082 A1 | 5/2010 | Myrick et al. |
| 2010/0113101 A1 | 5/2010 | Tanada |
| 2010/0114974 A1 | 5/2010 | Jung et al. |
| 2010/0123724 A1 | 5/2010 | Moore et al. |
| 2010/0128570 A1 | 5/2010 | Smith et al. |
| 2010/0138764 A1 | 6/2010 | Hatambeiki et al. |
| 2010/0141606 A1 | 6/2010 | Bae et al. |
| 2010/0141609 A1 | 6/2010 | Frisbee |
| 2010/0146387 A1 | 6/2010 | Hoover |
| 2010/0148945 A1 | 6/2010 | Yun et al. |
| 2010/0156807 A1 | 6/2010 | Stallings et al. |
| 2010/0156833 A1 | 6/2010 | Kim et al. |
| 2010/0157742 A1 | 6/2010 | Relyea et al. |
| 2010/0162105 A1 | 6/2010 | Beebe et al. |
| 2010/0164908 A1 | 7/2010 | Hill et al. |
| 2010/0169097 A1 | 7/2010 | Nachman et al. |
| 2010/0173678 A1 | 7/2010 | Kim et al. |
| 2010/0175006 A1 * | 7/2010 | Li ............... G16H 50/80 715/764 |
| 2010/0178873 A1 | 7/2010 | Lee et al. |
| 2010/0187074 A1 | 7/2010 | Manni |
| 2010/0188268 A1 | 7/2010 | Grignani et al. |
| 2010/0194692 A1 | 8/2010 | Orr et al. |
| 2010/0198453 A1 | 8/2010 | Dorogusker et al. |
| 2010/0199232 A1 | 8/2010 | Mistry et al. |
| 2010/0205563 A1 | 8/2010 | Haapsaari et al. |
| 2010/0211498 A1 | 8/2010 | Aabye et al. |
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0220562 A1 | 9/2010 | Hozumi et al. |
| 2010/0223055 A1 | 9/2010 | Mclean |
| 2010/0226213 A1 | 9/2010 | Drugge |
| 2010/0235726 A1 | 9/2010 | Ording et al. |
| 2010/0235742 A1 | 9/2010 | Hsu et al. |
| 2010/0243516 A1 | 9/2010 | Martin et al. |
| 2010/0248778 A1 | 9/2010 | Biswas |
| 2010/0251168 A1 | 9/2010 | Fujita et al. |
| 2010/0251176 A1 | 9/2010 | Fong et al. |
| 2010/0259481 A1 | 10/2010 | Oh et al. |
| 2010/0267424 A1 | 10/2010 | Kim et al. |
| 2010/0269038 A1 | 10/2010 | Tsuda |
| 2010/0269108 A1 | 10/2010 | Boudreau et al. |
| 2010/0271312 A1 | 10/2010 | Alameh et al. |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0271401 A1 | 10/2010 | Fong |
| 2010/0277126 A1 | 11/2010 | Naeimi et al. |
| 2010/0281374 A1 | 11/2010 | Schulz et al. |
| 2010/0283743 A1 | 11/2010 | Coddington |
| 2010/0292600 A1 | 11/2010 | Dibenedetto et al. |
| 2010/0295789 A1 | 11/2010 | Shin et al. |
| 2010/0299436 A1 | 11/2010 | Khalid et al. |
| 2010/0302172 A1 | 12/2010 | Wilairat et al. |
| 2010/0315417 A1 | 12/2010 | Cho et al. |
| 2010/0325575 A1 | 12/2010 | Platzer et al. |
| 2010/0331145 A1 | 12/2010 | Lakovic et al. |
| 2011/0003587 A1 | 1/2011 | Belz et al. |
| 2011/0006980 A1 | 1/2011 | Taniguchi et al. |
| 2011/0014956 A1 | 1/2011 | Lee et al. |
| 2011/0016425 A1 | 1/2011 | Homburg et al. |
| 2011/0018695 A1 | 1/2011 | Bells et al. |
| 2011/0022472 A1 | 1/2011 | Zon |
| 2011/0025311 A1 | 2/2011 | Chauvin et al. |
| 2011/0025624 A1 | 2/2011 | Goto |
| 2011/0029870 A1 | 2/2011 | May et al. |
| 2011/0032105 A1 | 2/2011 | Hoffman et al. |
| 2011/0047014 A1 | 2/2011 | De |
| 2011/0047491 A1 | 2/2011 | Hwang et al. |
| 2011/0055752 A1 | 3/2011 | Rubinstein et al. |
| 2011/0057877 A1 | 3/2011 | Nagashima et al. |
| 2011/0057886 A1 | 3/2011 | Ng et al. |
| 2011/0059769 A1 | 3/2011 | Brunolli |
| 2011/0061017 A1 | 3/2011 | Ullrich et al. |
| 2011/0071818 A1 | 3/2011 | Jiang |
| 2011/0072345 A1 | 3/2011 | Lim |
| 2011/0074699 A1 | 3/2011 | Marr et al. |
| 2011/0074719 A1 | 3/2011 | Yeh et al. |
| 2011/0074828 A1 | 3/2011 | Capela et al. |
| 2011/0078560 A1 | 3/2011 | Weeldreyer et al. |
| 2011/0078622 A1 | 3/2011 | Missig et al. |
| 2011/0080411 A1 | 4/2011 | Wikkerink et al. |
| 2011/0081923 A1 | 4/2011 | Bednar et al. |
| 2011/0086613 A1 | 4/2011 | Doudkine et al. |
| 2011/0087982 A1 | 4/2011 | Mccann et al. |
| 2011/0090255 A1 | 4/2011 | Wilson et al. |
| 2011/0093812 A1 | 4/2011 | Fong |
| 2011/0095993 A1 | 4/2011 | Zuverink |
| 2011/0098928 A1 | 4/2011 | Hoffman et al. |
| 2011/0099509 A1 | 4/2011 | Horagai et al. |
| 2011/0102455 A1 | 5/2011 | Temple |
| 2011/0107264 A1 | 5/2011 | Akella |
| 2011/0119578 A1 | 5/2011 | Schwartz |
| 2011/0126139 A1 | 5/2011 | Jeong et al. |
| 2011/0126155 A1 | 5/2011 | Krishnaraj et al. |
| 2011/0128226 A1 | 6/2011 | Jensen |
| 2011/0131494 A1 | 6/2011 | Ono et al. |
| 2011/0131531 A1 | 6/2011 | Russell et al. |
| 2011/0138329 A1 | 6/2011 | Wells et al. |
| 2011/0145759 A1 | 6/2011 | Leffert et al. |
| 2011/0151415 A1 | 6/2011 | Darling et al. |
| 2011/0157046 A1 | 6/2011 | Lee et al. |
| 2011/0159469 A1 | 6/2011 | Hwang et al. |
| 2011/0164042 A1 | 7/2011 | Chaudhri |
| 2011/0167262 A1 | 7/2011 | Ross et al. |
| 2011/0167369 A1 | 7/2011 | Van Os |
| 2011/0167382 A1 | 7/2011 | Van Os |
| 2011/0175832 A1 | 7/2011 | Miyazawa et al. |
| 2011/0181521 A1 | 7/2011 | Reid et al. |
| 2011/0183650 A1 | 7/2011 | Mckee |
| 2011/0187355 A1 | 8/2011 | Dixon et al. |
| 2011/0197160 A1 | 8/2011 | Kim et al. |
| 2011/0197165 A1 | 8/2011 | Filippov et al. |
| 2011/0199342 A1 | 8/2011 | Vartanian et al. |
| 2011/0202834 A1 | 8/2011 | Mandryk et al. |
| 2011/0202859 A1 | 8/2011 | Fong |
| 2011/0202861 A1 | 8/2011 | Fritzley et al. |
| 2011/0202866 A1 | 8/2011 | Huang et al. |
| 2011/0202883 A1 | 8/2011 | Oh et al. |
| 2011/0205182 A1 | 8/2011 | Miyazawa et al. |
| 2011/0205851 A1 | 8/2011 | Harris |
| 2011/0209104 A1 | 8/2011 | Hinckley et al. |
| 2011/0224967 A1 | 9/2011 | Van Schaik |
| 2011/0225543 A1 | 9/2011 | Arnold et al. |
| 2011/0227872 A1 | 9/2011 | Huska et al. |
| 2011/0234633 A1 | 9/2011 | Ogura et al. |
| 2011/0248948 A1 | 10/2011 | Griffin et al. |
| 2011/0252146 A1 | 10/2011 | Santamaria et al. |
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0265002 A1 | 10/2011 | Hong et al. |
| 2011/0271183 A1 | 11/2011 | Bose et al. |
| 2011/0271233 A1 | 11/2011 | Radakovitz et al. |
| 2011/0279384 A1 | 11/2011 | Miller et al. |
| 2011/0279852 A1 | 11/2011 | Oda et al. |
| 2011/0285656 A1 | 11/2011 | Yaksick et al. |
| 2011/0291945 A1 | 12/2011 | Ewing et al. |
| 2011/0296312 A1 | 12/2011 | Boyer et al. |

(56) References Cited

U.S. PATENT DOCUMENTS

| | | |
|---|---|---|
| 2011/0298830 A1 | 12/2011 | Lam |
| 2011/0302493 A1 | 12/2011 | Runstedler et al. |
| 2011/0302518 A1 | 12/2011 | Zhang |
| 2011/0306393 A1 | 12/2011 | Goldman et al. |
| 2011/0306421 A1 | 12/2011 | Nishimoto et al. |
| 2011/0307842 A1 | 12/2011 | Chiang et al. |
| 2011/0316858 A1 | 12/2011 | Shen et al. |
| 2011/0316888 A1 | 12/2011 | Sachs et al. |
| 2012/0011437 A1 | 1/2012 | James et al. |
| 2012/0011449 A1 | 1/2012 | Sasson et al. |
| 2012/0015779 A1 | 1/2012 | Powch et al. |
| 2012/0019400 A1 | 1/2012 | Patel et al. |
| 2012/0019513 A1 | 1/2012 | Fong et al. |
| 2012/0019610 A1 | 1/2012 | Hornyak et al. |
| 2012/0026110 A1 | 2/2012 | Yamano et al. |
| 2012/0026198 A1 | 2/2012 | Maesaka |
| 2012/0028707 A1 | 2/2012 | Raitt et al. |
| 2012/0030627 A1 | 2/2012 | Nurmi et al. |
| 2012/0032988 A1 | 2/2012 | Katayama et al. |
| 2012/0038582 A1 | 2/2012 | Grant |
| 2012/0040719 A1 | 2/2012 | Lee et al. |
| 2012/0044267 A1 | 2/2012 | Fino et al. |
| 2012/0050185 A1 | 3/2012 | Davydov et al. |
| 2012/0052921 A1 | 3/2012 | Lim et al. |
| 2012/0054670 A1 | 3/2012 | Rainisto |
| 2012/0056848 A1 | 3/2012 | Yamano et al. |
| 2012/0059664 A1 | 3/2012 | Georgiev et al. |
| 2012/0059787 A1 | 3/2012 | Brown et al. |
| 2012/0062398 A1 | 3/2012 | Durand |
| 2012/0066621 A1 | 3/2012 | Matsubara |
| 2012/0066629 A1 | 3/2012 | Lee et al. |
| 2012/0066638 A1 | 3/2012 | Ohri et al. |
| 2012/0068925 A1 | 3/2012 | Wong et al. |
| 2012/0071770 A1 | 3/2012 | Grey et al. |
| 2012/0083260 A1 | 4/2012 | Arriola et al. |
| 2012/0084689 A1 | 4/2012 | Ledet et al. |
| 2012/0084729 A1 | 4/2012 | Lin et al. |
| 2012/0089951 A1 | 4/2012 | Cassidy |
| 2012/0092383 A1 | 4/2012 | Hysek et al. |
| 2012/0099406 A1 | 4/2012 | Lau et al. |
| 2012/0102399 A1 | 4/2012 | Nicholson |
| 2012/0105225 A1 | 5/2012 | Valtonen |
| 2012/0105358 A1 | 5/2012 | Momeyer et al. |
| 2012/0105484 A1 | 5/2012 | Cui |
| 2012/0112859 A1 | 5/2012 | Park et al. |
| 2012/0113008 A1 | 5/2012 | Makinen et al. |
| 2012/0115608 A1 | 5/2012 | Pfeifer et al. |
| 2012/0117507 A1 | 5/2012 | Tseng et al. |
| 2012/0124499 A1 | 5/2012 | Tsai et al. |
| 2012/0127071 A1 | 5/2012 | Jitkoff et al. |
| 2012/0131495 A1 | 5/2012 | Goossens et al. |
| 2012/0131504 A1 | 5/2012 | Fadell et al. |
| 2012/0133604 A1 | 5/2012 | Ishizuka et al. |
| 2012/0133677 A1 | 5/2012 | Suzuki et al. |
| 2012/0142414 A1 | 6/2012 | Murakami |
| 2012/0147052 A1 | 6/2012 | Homma et al. |
| 2012/0154293 A1 | 6/2012 | Hinckley et al. |
| 2012/0155223 A1 | 6/2012 | Hoover |
| 2012/0159380 A1 | 6/2012 | Kocienda et al. |
| 2012/0162261 A1 | 6/2012 | Kim et al. |
| 2012/0162350 A1 | 6/2012 | Lee et al. |
| 2012/0167008 A1 | 6/2012 | Zaman et al. |
| 2012/0169776 A1 | 7/2012 | Rissa et al. |
| 2012/0174005 A1 | 7/2012 | Deutsch et al. |
| 2012/0174033 A1 | 7/2012 | Joo |
| 2012/0179998 A1 | 7/2012 | Nesladek et al. |
| 2012/0185781 A1 | 7/2012 | Guzman et al. |
| 2012/0186951 A1 | 7/2012 | Wu et al. |
| 2012/0192110 A1 | 7/2012 | Wu et al. |
| 2012/0197743 A1 | 8/2012 | Grigg et al. |
| 2012/0204123 A1 | 8/2012 | Bauer et al. |
| 2012/0206497 A1 | 8/2012 | Sarjanoja |
| 2012/0214458 A1 | 8/2012 | Levien et al. |
| 2012/0218177 A1 | 8/2012 | Pang et al. |
| 2012/0218201 A1 | 8/2012 | Tamas et al. |
| 2012/0223935 A1 | 9/2012 | Renwick et al. |
| 2012/0226977 A1 | 9/2012 | Lengeling et al. |
| 2012/0229521 A1 | 9/2012 | Hales et al. |
| 2012/0236037 A1 | 9/2012 | Lessing et al. |
| 2012/0254318 A1 | 10/2012 | Poniatowskl |
| 2012/0254804 A1 | 10/2012 | Sheha et al. |
| 2012/0256863 A1 | 10/2012 | Zhang et al. |
| 2012/0272145 A1 | 10/2012 | Ryan et al. |
| 2012/0272181 A1 | 10/2012 | Rogers et al. |
| 2012/0278725 A1 | 11/2012 | Gordon et al. |
| 2012/0278755 A1 | 11/2012 | Lehmann et al. |
| 2012/0284674 A1 | 11/2012 | Geng et al. |
| 2012/0289290 A1 | 11/2012 | Chae et al. |
| 2012/0290109 A1 | 11/2012 | Berg et al. |
| 2012/0290472 A1 | 11/2012 | Mullen et al. |
| 2012/0297324 A1 | 11/2012 | Dollar et al. |
| 2012/0297342 A1 | 11/2012 | Jang et al. |
| 2012/0304084 A1 | 11/2012 | Kim et al. |
| 2012/0304111 A1 | 11/2012 | Queru et al. |
| 2012/0304113 A1 | 11/2012 | Patten et al. |
| 2012/0306765 A1 | 12/2012 | Moore et al. |
| 2012/0306930 A1 | 12/2012 | Decker et al. |
| 2012/0311055 A1 | 12/2012 | Adams et al. |
| 2012/0322508 A1 | 12/2012 | Forstall et al. |
| 2012/0324357 A1 | 12/2012 | Viegers et al. |
| 2012/0324390 A1 | 12/2012 | Tao et al. |
| 2012/0327006 A1 | 12/2012 | Israr et al. |
| 2012/0327009 A1 | 12/2012 | Fleizach |
| 2013/0014019 A1 | 1/2013 | Kim et al. |
| 2013/0019175 A1 | 1/2013 | Kotler et al. |
| 2013/0019182 A1 | 1/2013 | Gil et al. |
| 2013/0021362 A1 | 1/2013 | Sakurada et al. |
| 2013/0024780 A1 | 1/2013 | Sutedja et al. |
| 2013/0024781 A1 | 1/2013 | Douillet et al. |
| 2013/0024802 A1 | 1/2013 | Zeng et al. |
| 2013/0024808 A1 | 1/2013 | Rainisto |
| 2013/0024811 A1 | 1/2013 | Gleadall et al. |
| 2013/0026293 A1 | 1/2013 | Schneider et al. |
| 2013/0027412 A1 | 1/2013 | Roddy |
| 2013/0031507 A1 | 1/2013 | George |
| 2013/0031514 A1 | 1/2013 | Gabbert |
| 2013/0036005 A1 | 2/2013 | Rappe |
| 2013/0038636 A1 | 2/2013 | Fujiwaka |
| 2013/0046397 A1 | 2/2013 | Fadell et al. |
| 2013/0050263 A1 | 2/2013 | Khoe et al. |
| 2013/0055160 A1 | 2/2013 | Yamada et al. |
| 2013/0057566 A1 | 3/2013 | Kriese et al. |
| 2013/0063364 A1 | 3/2013 | Moore |
| 2013/0063383 A1 | 3/2013 | Anderssonreimer et al. |
| 2013/0067390 A1 | 3/2013 | Kwiatkowski et al. |
| 2013/0067391 A1 | 3/2013 | Pittappilly et al. |
| 2013/0069893 A1 | 3/2013 | Brinda et al. |
| 2013/0070573 A1 | 3/2013 | Oshio |
| 2013/0073932 A1 | 3/2013 | Migos et al. |
| 2013/0076757 A1 | 3/2013 | Pritting |
| 2013/0082965 A1 | 4/2013 | Wada et al. |
| 2013/0093715 A1 | 4/2013 | Marsden et al. |
| 2013/0097526 A1 | 4/2013 | Stovicek et al. |
| 2013/0097556 A1 | 4/2013 | Louch et al. |
| 2013/0097566 A1 | 4/2013 | Berglund |
| 2013/0104039 A1 | 4/2013 | Ormin et al. |
| 2013/0107674 A1 | 5/2013 | Gossweiler et al. |
| 2013/0111342 A1 | 5/2013 | Alameh et al. |
| 2013/0111384 A1 | 5/2013 | Kim et al. |
| 2013/0111396 A1 | 5/2013 | Brid |
| 2013/0111407 A1 | 5/2013 | Mullen |
| 2013/0116967 A1 | 5/2013 | Akcasu et al. |
| 2013/0117383 A1 | 5/2013 | Hymel et al. |
| 2013/0117689 A1 | 5/2013 | Lessing et al. |
| 2013/0117698 A1 | 5/2013 | Park et al. |
| 2013/0120106 A1 | 5/2013 | Cauwels et al. |
| 2013/0120295 A1 | 5/2013 | Kim et al. |
| 2013/0132883 A1 | 5/2013 | Vayrynen |
| 2013/0135228 A1 | 5/2013 | Won et al. |
| 2013/0135234 A1 | 5/2013 | Hisano et al. |
| 2013/0135236 A1 | 5/2013 | Yano |
| 2013/0137073 A1 | 5/2013 | Nacey et al. |
| 2013/0138272 A1 | 5/2013 | Louise-babando et al. |
| 2013/0139102 A1 | 5/2013 | Miura et al. |

(56) References Cited

U.S. PATENT DOCUMENTS

| | | |
|---|---|---|
| 2013/0141342 A1 | 6/2013 | Bokma et al. |
| 2013/0141365 A1 | 6/2013 | Lynn et al. |
| 2013/0141371 A1 | 6/2013 | Hallford et al. |
| 2013/0142016 A1 | 6/2013 | Pozzo Di Borgo et al. |
| 2013/0145292 A1 | 6/2013 | Cohen et al. |
| 2013/0145316 A1 | 6/2013 | Heo |
| 2013/0147747 A1 | 6/2013 | Takagi |
| 2013/0152017 A1 | 6/2013 | Song et al. |
| 2013/0154933 A1 | 6/2013 | Sheik-nainar |
| 2013/0159941 A1 | 6/2013 | Langlois et al. |
| 2013/0169579 A1 | 7/2013 | Havnor |
| 2013/0169870 A1 | 7/2013 | Lee et al. |
| 2013/0173699 A1 | 7/2013 | Parks et al. |
| 2013/0174031 A1 | 7/2013 | Constantinou |
| 2013/0174044 A1 | 7/2013 | Hill |
| 2013/0176020 A1 | 7/2013 | Chauvin et al. |
| 2013/0191220 A1 | 7/2013 | Dent et al. |
| 2013/0191785 A1 | 7/2013 | Wu et al. |
| 2013/0201098 A1 | 8/2013 | Schilit et al. |
| 2013/0205194 A1 | 8/2013 | Decker et al. |
| 2013/0205210 A1* | 8/2013 | Jeon .................. G06F 3/04883 715/765 |
| 2013/0205244 A1 | 8/2013 | Decker et al. |
| 2013/0205939 A1 | 8/2013 | Meerovitsch et al. |
| 2013/0208013 A1 | 8/2013 | Yuu et al. |
| 2013/0215044 A1 | 8/2013 | Ahn et al. |
| 2013/0218517 A1 | 8/2013 | Ausserlechner et al. |
| 2013/0222301 A1 | 8/2013 | Lee et al. |
| 2013/0226444 A1 | 8/2013 | Johansson et al. |
| 2013/0227412 A1 | 8/2013 | Ornstein et al. |
| 2013/0227419 A1 | 8/2013 | Lee et al. |
| 2013/0233097 A1 | 9/2013 | Hayner et al. |
| 2013/0234924 A1 | 9/2013 | Janefalkar et al. |
| 2013/0234929 A1 | 9/2013 | Libin |
| 2013/0234969 A1 | 9/2013 | Yeh et al. |
| 2013/0243924 A1 | 9/2013 | Bhandari et al. |
| 2013/0254705 A1 | 9/2013 | Mooring et al. |
| 2013/0254708 A1 | 9/2013 | Dorcey |
| 2013/0258819 A1 | 10/2013 | Hoover |
| 2013/0262298 A1 | 10/2013 | Morley et al. |
| 2013/0262564 A1 | 10/2013 | Wall et al. |
| 2013/0263043 A1 | 10/2013 | Sarbin et al. |
| 2013/0275875 A1 | 10/2013 | Gruber et al. |
| 2013/0275899 A1 | 10/2013 | Schubert et al. |
| 2013/0282360 A1 | 10/2013 | Shimota et al. |
| 2013/0282459 A1 | 10/2013 | Smets et al. |
| 2013/0283204 A1 | 10/2013 | Pasquero et al. |
| 2013/0290116 A1 | 10/2013 | Hepworth et al. |
| 2013/0303087 A1 | 11/2013 | Hauser et al. |
| 2013/0305184 A1 | 11/2013 | Kim et al. |
| 2013/0305187 A1 | 11/2013 | Phillips et al. |
| 2013/0318158 A1 | 11/2013 | Teng et al. |
| 2013/0318437 A1 | 11/2013 | Jung et al. |
| 2013/0324093 A1 | 12/2013 | Santamaria et al. |
| 2013/0326401 A1 | 12/2013 | Van et al. |
| 2013/0326418 A1 | 12/2013 | Utsuki et al. |
| 2013/0328786 A1 | 12/2013 | Hinckley |
| 2013/0331130 A1 | 12/2013 | Lee |
| 2013/0332886 A1 | 12/2013 | Cranfill et al. |
| 2013/0339343 A1 | 12/2013 | Hierons et al. |
| 2013/0339345 A1 | 12/2013 | Soto Matamala et al. |
| 2013/0342457 A1 | 12/2013 | Cox et al. |
| 2013/0345978 A1 | 12/2013 | Lush et al. |
| 2014/0002502 A1 | 1/2014 | Han |
| 2014/0013414 A1 | 1/2014 | Bruck et al. |
| 2014/0015784 A1 | 1/2014 | Oonishi |
| 2014/0028554 A1 | 1/2014 | De Los Reyes et al. |
| 2014/0028688 A1 | 1/2014 | Houjou et al. |
| 2014/0028735 A1 | 1/2014 | Williams et al. |
| 2014/0032706 A1 | 1/2014 | Kuscher et al. |
| 2014/0036639 A1* | 2/2014 | Boni .................. G06Q 10/1093 368/29 |
| 2014/0040742 A1 | 2/2014 | Park et al. |
| 2014/0040831 A1 | 2/2014 | Akasaka et al. |
| 2014/0043367 A1 | 2/2014 | Sakaino et al. |
| 2014/0047525 A1 | 2/2014 | Bonhoff |
| 2014/0055388 A1 | 2/2014 | Yook et al. |
| 2014/0059493 A1 | 2/2014 | Kim |
| 2014/0073256 A1 | 3/2014 | Newham et al. |
| 2014/0074570 A1 | 3/2014 | Hope et al. |
| 2014/0075003 A1 | 3/2014 | Tanaka et al. |
| 2014/0075311 A1 | 3/2014 | Boettcher et al. |
| 2014/0075368 A1 | 3/2014 | Kim et al. |
| 2014/0082533 A1 | 3/2014 | Kelley et al. |
| 2014/0092037 A1 | 4/2014 | Kim |
| 2014/0092143 A1 | 4/2014 | Vanblon et al. |
| 2014/0101169 A1 | 4/2014 | Kurata et al. |
| 2014/0105278 A1 | 4/2014 | Bivolarsky |
| 2014/0106734 A1 | 4/2014 | Lee |
| 2014/0108936 A1 | 4/2014 | Khosropour et al. |
| 2014/0109002 A1 | 4/2014 | Kimball et al. |
| 2014/0123005 A1 | 5/2014 | Forstall et al. |
| 2014/0123043 A1 | 5/2014 | Schmidt et al. |
| 2014/0126336 A1 | 5/2014 | Goeller et al. |
| 2014/0129959 A1 | 5/2014 | Battles et al. |
| 2014/0132640 A1 | 5/2014 | Sharma et al. |
| 2014/0136443 A1 | 5/2014 | Kinsey et al. |
| 2014/0136981 A1 | 5/2014 | Xiang et al. |
| 2014/0136986 A1 | 5/2014 | Martin et al. |
| 2014/0137020 A1 | 5/2014 | Sharma et al. |
| 2014/0139422 A1 | 5/2014 | Mistry et al. |
| 2014/0139637 A1 | 5/2014 | Mistry et al. |
| 2014/0143678 A1 | 5/2014 | Mistry et al. |
| 2014/0143682 A1 | 5/2014 | Druck et al. |
| 2014/0143683 A1 | 5/2014 | Underwood et al. |
| 2014/0143737 A1 | 5/2014 | Mistry et al. |
| 2014/0149878 A1 | 5/2014 | Mischari et al. |
| 2014/0149921 A1 | 5/2014 | Hauser et al. |
| 2014/0152585 A1 | 6/2014 | Andersson Reimer |
| 2014/0157160 A1 | 6/2014 | Cudak et al. |
| 2014/0157167 A1 | 6/2014 | Zhu |
| 2014/0160078 A1 | 6/2014 | Seo et al. |
| 2014/0164945 A1* | 6/2014 | Junqua .................. G16H 20/70 715/747 |
| 2014/0164955 A1 | 6/2014 | Thiruvidam et al. |
| 2014/0164966 A1 | 6/2014 | Kim et al. |
| 2014/0171156 A1 | 6/2014 | Pattikonda et al. |
| 2014/0173439 A1 | 6/2014 | Gutierrez et al. |
| 2014/0176475 A1 | 6/2014 | Myers et al. |
| 2014/0181183 A1 | 6/2014 | Yamamoto et al. |
| 2014/0181219 A1 | 6/2014 | Wang et al. |
| 2014/0189577 A1 | 7/2014 | Haslam et al. |
| 2014/0189584 A1 | 7/2014 | Weng et al. |
| 2014/0189589 A1 | 7/2014 | Kim et al. |
| 2014/0189608 A1 | 7/2014 | Shuttleworth et al. |
| 2014/0195972 A1 | 7/2014 | Lee et al. |
| 2014/0197946 A1 | 7/2014 | Park et al. |
| 2014/0197965 A1 | 7/2014 | Park et al. |
| 2014/0204229 A1 | 7/2014 | Leung et al. |
| 2014/0215340 A1 | 7/2014 | Shetty et al. |
| 2014/0215457 A1 | 7/2014 | Gava et al. |
| 2014/0222916 A1 | 8/2014 | Foley et al. |
| 2014/0223490 A1 | 8/2014 | Pan et al. |
| 2014/0237382 A1 | 8/2014 | Grandhi |
| 2014/0240122 A1 | 8/2014 | Roberts et al. |
| 2014/0244165 A1 | 8/2014 | Bells et al. |
| 2014/0245177 A1 | 8/2014 | Maklouf et al. |
| 2014/0245221 A1 | 8/2014 | Dougherty et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0260776 A1 | 9/2014 | Burleson et al. |
| 2014/0267303 A1 | 9/2014 | Larkin et al. |
| 2014/0267441 A1 | 9/2014 | Matas et al. |
| 2014/0269614 A1 | 9/2014 | Maguire et al. |
| 2014/0282005 A1 | 9/2014 | Gutowitz |
| 2014/0282016 A1 | 9/2014 | Hosier, Jr. |
| 2014/0282142 A1 | 9/2014 | Lin |
| 2014/0282214 A1 | 9/2014 | Shirzadi et al. |
| 2014/0282254 A1 | 9/2014 | Feiereisen et al. |
| 2014/0289659 A1 | 9/2014 | Harrison et al. |
| 2014/0289660 A1 | 9/2014 | Min |
| 2014/0292668 A1 | 10/2014 | Fricklas et al. |
| 2014/0298233 A1 | 10/2014 | Pettey et al. |

(56) References Cited

U.S. PATENT DOCUMENTS

| | | |
|---|---|---|
| 2014/0304389 A1 | 10/2014 | Reavis |
| 2014/0304664 A1 | 10/2014 | Lee et al. |
| 2014/0306898 A1 | 10/2014 | Cueto |
| 2014/0306989 A1 | 10/2014 | Doubleday et al. |
| 2014/0310348 A1 | 10/2014 | Keskitalo et al. |
| 2014/0328147 A1 | 11/2014 | Yang et al. |
| 2014/0330435 A1 | 11/2014 | Stoner et al. |
| 2014/0333670 A1 | 11/2014 | Balivada et al. |
| 2014/0337450 A1 | 11/2014 | Choudhary et al. |
| 2014/0337791 A1 | 11/2014 | Agnetta et al. |
| 2014/0347289 A1 | 11/2014 | Lee et al. |
| 2014/0359637 A1 | 12/2014 | Yan |
| 2014/0362024 A1 | 12/2014 | Hicks |
| 2014/0363024 A1 | 12/2014 | Apodaca |
| 2014/0365126 A1 | 12/2014 | Vulcano et al. |
| 2014/0372115 A1 | 12/2014 | Lebeau et al. |
| 2014/0380229 A1 | 12/2014 | Volodin et al. |
| 2015/0007025 A1 | 1/2015 | Sassi et al. |
| 2015/0007048 A1 | 1/2015 | Dumans |
| 2015/0007052 A1 | 1/2015 | Dumans |
| 2015/0009784 A1 | 1/2015 | Cho et al. |
| 2015/0022438 A1 | 1/2015 | Hong |
| 2015/0033136 A1 | 1/2015 | Sasaki et al. |
| 2015/0036555 A1 | 2/2015 | Shin et al. |
| 2015/0046871 A1 | 2/2015 | Lewis |
| 2015/0049591 A1 | 2/2015 | Adams et al. |
| 2015/0052461 A1 | 2/2015 | Sullivan et al. |
| 2015/0055197 A1 | 2/2015 | Romanoff et al. |
| 2015/0057945 A1 | 2/2015 | White et al. |
| 2015/0058723 A1 | 2/2015 | Cieplinski et al. |
| 2015/0058744 A1 | 2/2015 | Dhingra et al. |
| 2015/0065821 A1 | 3/2015 | Conrad |
| 2015/0067495 A1 | 3/2015 | Bernstein et al. |
| 2015/0067497 A1 | 3/2015 | Cieplinski et al. |
| 2015/0067513 A1 | 3/2015 | Zambetti et al. |
| 2015/0067555 A1 | 3/2015 | Joo et al. |
| 2015/0074615 A1 | 3/2015 | Han et al. |
| 2015/0077398 A1 | 3/2015 | Stokes et al. |
| 2015/0085621 A1 | 3/2015 | Hong et al. |
| 2015/0098309 A1 | 4/2015 | Adams et al. |
| 2015/0100537 A1 | 4/2015 | Grieves et al. |
| 2015/0100621 A1 | 4/2015 | Pan |
| 2015/0112990 A1 | 4/2015 | Van Os et al. |
| 2015/0113435 A1 | 4/2015 | Phillips |
| 2015/0113468 A1 | 4/2015 | Clark |
| 2015/0117162 A1 | 4/2015 | Tsai et al. |
| 2015/0121224 A1 | 4/2015 | Krasnahill, Jr. |
| 2015/0121311 A1 | 4/2015 | Lou et al. |
| 2015/0130830 A1 | 5/2015 | Nagasaki et al. |
| 2015/0131121 A1 | 5/2015 | Kang |
| 2015/0138101 A1 | 5/2015 | Park et al. |
| 2015/0148927 A1 | 5/2015 | Georges et al. |
| 2015/0149899 A1 | 5/2015 | Bernstein et al. |
| 2015/0149956 A1 | 5/2015 | Kempinski et al. |
| 2015/0153952 A1 | 6/2015 | Grossman et al. |
| 2015/0160806 A1 | 6/2015 | Fey et al. |
| 2015/0160856 A1 | 6/2015 | Jang et al. |
| 2015/0178041 A1 | 6/2015 | Uskoreit |
| 2015/0185703 A1 | 7/2015 | Tanaka |
| 2015/0185845 A1 | 7/2015 | Nagara et al. |
| 2015/0193099 A1 | 7/2015 | Murphy |
| 2015/0193951 A1 | 7/2015 | Lee et al. |
| 2015/0194050 A1 | 7/2015 | Lee |
| 2015/0195179 A1 | 7/2015 | Skare et al. |
| 2015/0199012 A1 | 7/2015 | Palmer |
| 2015/0199082 A1 | 7/2015 | Scholler et al. |
| 2015/0199110 A1 | 7/2015 | Nakazato |
| 2015/0205476 A1 | 7/2015 | Kuscher et al. |
| 2015/0205511 A1 | 7/2015 | Vinna et al. |
| 2015/0217163 A1 | 8/2015 | Amis et al. |
| 2015/0234518 A1 | 8/2015 | Teller et al. |
| 2015/0234562 A1 | 8/2015 | Ording |
| 2015/0248200 A1 | 9/2015 | Cho et al. |
| 2015/0248235 A1 | 9/2015 | Offenberg et al. |
| 2015/0261310 A1 | 9/2015 | Walmsley et al. |
| 2015/0269848 A1 | 9/2015 | Yuen et al. |
| 2015/0269944 A1 | 9/2015 | Wang |
| 2015/0271120 A1 | 9/2015 | Langholz |
| 2015/0277559 A1 | 10/2015 | Vescovi et al. |
| 2015/0277563 A1 | 10/2015 | Huang et al. |
| 2015/0281945 A1 | 10/2015 | Seo et al. |
| 2015/0286372 A1 | 10/2015 | Swindell et al. |
| 2015/0286391 A1 | 10/2015 | Jacobs et al. |
| 2015/0301608 A1 | 10/2015 | Nagaraju et al. |
| 2015/0302301 A1 | 10/2015 | Petersen |
| 2015/0302774 A1 | 10/2015 | Dagar |
| 2015/0312175 A1 | 10/2015 | Langholz |
| 2015/0324751 A1 | 11/2015 | Orenstein et al. |
| 2015/0363048 A1 | 12/2015 | Brown et al. |
| 2015/0370425 A1 | 12/2015 | Chen et al. |
| 2015/0370469 A1 | 12/2015 | Leong et al. |
| 2015/0370529 A1 | 12/2015 | Zambetti et al. |
| 2015/0378447 A1 | 12/2015 | Nagano et al. |
| 2015/0378555 A1 | 12/2015 | Ramanathan et al. |
| 2015/0379476 A1 | 12/2015 | Chaudhri et al. |
| 2016/0004393 A1 | 1/2016 | Faaborg et al. |
| 2016/0011758 A1 | 1/2016 | Meggs et al. |
| 2016/0012018 A1 | 1/2016 | Do Ba |
| 2016/0018981 A1 | 1/2016 | Amerige et al. |
| 2016/0021168 A1 | 1/2016 | Chaudhri et al. |
| 2016/0028875 A1 | 1/2016 | Brown et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034153 A1 | 2/2016 | Lejeune et al. |
| 2016/0034166 A1 | 2/2016 | Wilson et al. |
| 2016/0034167 A1 | 2/2016 | Wilson et al. |
| 2016/0036996 A1 | 2/2016 | Midholt et al. |
| 2016/0041702 A1 | 2/2016 | Wang |
| 2016/0054710 A1 | 2/2016 | Jo et al. |
| 2016/0058336 A1 | 3/2016 | Blahnik et al. |
| 2016/0062466 A1 | 3/2016 | Verweij et al. |
| 2016/0062487 A1 | 3/2016 | Foss et al. |
| 2016/0062567 A1 | 3/2016 | Yang et al. |
| 2016/0062571 A1 | 3/2016 | Dascola et al. |
| 2016/0062573 A1 | 3/2016 | Dascola et al. |
| 2016/0062589 A1 | 3/2016 | Wan et al. |
| 2016/0062608 A1 | 3/2016 | Foss et al. |
| 2016/0063828 A1 | 3/2016 | Verweij et al. |
| 2016/0063850 A1 | 3/2016 | Yang et al. |
| 2016/0065505 A1 | 3/2016 | Iskander |
| 2016/0065509 A1 | 3/2016 | Butcher et al. |
| 2016/0065525 A1 | 3/2016 | Dye et al. |
| 2016/0065707 A1 | 3/2016 | Yang et al. |
| 2016/0065708 A1 | 3/2016 | Yang et al. |
| 2016/0066277 A1 | 3/2016 | Yang et al. |
| 2016/0071241 A1 | 3/2016 | Res et al. |
| 2016/0091971 A1 | 3/2016 | Burr |
| 2016/0097651 A1 | 4/2016 | Jung et al. |
| 2016/0098016 A1 | 4/2016 | Shedletsky et al. |
| 2016/0117147 A1 | 4/2016 | Zambetti et al. |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0170625 A1 | 6/2016 | Zambetti et al. |
| 2016/0180820 A1 | 6/2016 | Pascucci et al. |
| 2016/0188181 A1 | 6/2016 | Smith |
| 2016/0193502 A1 | 7/2016 | Kang et al. |
| 2016/0198319 A1 | 7/2016 | Huang et al. |
| 2016/0202866 A1 | 7/2016 | Zambetti |
| 2016/0209939 A1 | 7/2016 | Zambetti et al. |
| 2016/0210568 A1 | 7/2016 | Krupa et al. |
| 2016/0210983 A1 | 7/2016 | Amada et al. |
| 2016/0212374 A1 | 7/2016 | Usbergo et al. |
| 2016/0231883 A1 | 8/2016 | Zambetti |
| 2016/0259499 A1 | 9/2016 | Kocienda et al. |
| 2016/0259530 A1 | 9/2016 | Everitt et al. |
| 2016/0259535 A1 | 9/2016 | Seymour et al. |
| 2016/0259542 A1 | 9/2016 | Chaudhri et al. |
| 2016/0269540 A1 | 9/2016 | Butcher et al. |
| 2016/0299912 A1 | 10/2016 | Acuna et al. |
| 2016/0327911 A1 | 11/2016 | Eim et al. |

(56) References Cited

U.S. PATENT DOCUMENTS

| | | |
|---|---|---|
| 2016/0342141 A1 | 11/2016 | Koumaiha et al. |
| 2016/0357368 A1 | 12/2016 | Federighi et al. |
| 2017/0010677 A1 | 1/2017 | Roh et al. |
| 2017/0010678 A1 | 1/2017 | Tuli |
| 2017/0010751 A1 | 1/2017 | Shedletsky et al. |
| 2017/0019517 A1 | 1/2017 | Wilder et al. |
| 2017/0045958 A1 | 2/2017 | Battlogg |
| 2017/0053542 A1 | 2/2017 | Wilson et al. |
| 2017/0068407 A1 | 3/2017 | Wilson et al. |
| 2017/0068439 A1 | 3/2017 | Mohseni |
| 2017/0087469 A1 | 3/2017 | Hardee et al. |
| 2017/0089735 A1 | 3/2017 | Ruh |
| 2017/0104902 A1 | 4/2017 | Kim et al. |
| 2017/0123640 A1 | 5/2017 | Wilson et al. |
| 2017/0192730 A1 | 7/2017 | Yang et al. |
| 2017/0208466 A1 | 7/2017 | Seo et al. |
| 2017/0239524 A1 | 8/2017 | Lee et al. |
| 2017/0242933 A1 | 8/2017 | Liu |
| 2017/0243508 A1 | 8/2017 | Cheng et al. |
| 2017/0255169 A1 | 9/2017 | Lee et al. |
| 2017/0269692 A1 | 9/2017 | Eck et al. |
| 2017/0269792 A1 | 9/2017 | Xu et al. |
| 2017/0315716 A1 | 11/2017 | Zambetti et al. |
| 2017/0354845 A1 | 12/2017 | Williams et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0357426 A1 | 12/2017 | Wilson et al. |
| 2017/0357427 A1 | 12/2017 | Wilson et al. |
| 2017/0357520 A1 | 12/2017 | De Vries et al. |
| 2017/0358181 A1 | 12/2017 | Moussette et al. |
| 2018/0024683 A1 | 1/2018 | Ely et al. |
| 2018/0067557 A1 | 3/2018 | Robert et al. |
| 2018/0067633 A1 | 3/2018 | Wilson et al. |
| 2018/0074690 A1 | 3/2018 | Zambetti et al. |
| 2018/0074693 A1 | 3/2018 | Jones et al. |
| 2018/0081453 A1 | 3/2018 | Ely |
| 2018/0088532 A1 | 3/2018 | Ely et al. |
| 2018/0088797 A1 | 3/2018 | Mcatee et al. |
| 2018/0126248 A1 | 5/2018 | Dion et al. |
| 2018/0204425 A1 | 7/2018 | Moussette et al. |
| 2018/0210516 A1 | 7/2018 | Zambetti et al. |
| 2018/0307363 A1 | 10/2018 | Ely et al. |
| 2018/0329585 A1 | 11/2018 | Carrigan et al. |
| 2018/0329587 A1 | 11/2018 | Ko et al. |
| 2018/0335891 A1 | 11/2018 | Shedletsky et al. |
| 2018/0335901 A1 | 11/2018 | Manzari et al. |
| 2018/0336866 A1 | 11/2018 | Triverio et al. |
| 2018/0341344 A1 | 11/2018 | Foss et al. |
| 2018/0349022 A1 | 12/2018 | Chaudhri et al. |
| 2018/0349583 A1 | 12/2018 | Turgeman et al. |
| 2018/0364815 A1 | 12/2018 | Moussette et al. |
| 2018/0367489 A1 | 12/2018 | Dye et al. |
| 2018/0369691 A1 | 12/2018 | Rihn et al. |
| 2019/0012073 A1 | 1/2019 | Hwang |
| 2019/0026011 A1 | 1/2019 | Wang et al. |
| 2019/0033862 A1 | 1/2019 | Groden et al. |
| 2019/0037004 A1 | 1/2019 | Chaudhri et al. |
| 2019/0050055 A1 | 2/2019 | Chaudhri et al. |
| 2019/0056700 A1 | 2/2019 | Matsuno et al. |
| 2019/0057593 A1 | 2/2019 | Park et al. |
| 2019/0072912 A1 | 3/2019 | Pandya et al. |
| 2019/0080066 A1 | 3/2019 | Van Os et al. |
| 2019/0080072 A1 | 3/2019 | Van Os et al. |
| 2019/0101870 A1 | 4/2019 | Pandya et al. |
| 2019/0158645 A1 | 5/2019 | Yang et al. |
| 2019/0163324 A1 | 5/2019 | Shedletsky et al. |
| 2019/0163329 A1 | 5/2019 | Yang et al. |
| 2019/0172016 A1 | 6/2019 | Chaudhri et al. |
| 2019/0212885 A1 | 7/2019 | Zambetti et al. |
| 2019/0232110 A1 | 8/2019 | Williams et al. |
| 2019/0232111 A1 | 8/2019 | Williams et al. |
| 2019/0243471 A1 | 8/2019 | Foss et al. |
| 2019/0268771 A1 | 8/2019 | Seo et al. |
| 2019/0272036 A1 | 9/2019 | Grant et al. |
| 2019/0274565 A1 | 9/2019 | Soli et al. |
| 2019/0279520 A1 | 9/2019 | Wilson et al. |
| 2019/0342622 A1 | 11/2019 | Carrigan et al. |
| 2019/0354268 A1 | 11/2019 | Everitt et al. |
| 2019/0369755 A1 | 12/2019 | Roper et al. |
| 2019/0369838 A1 | 12/2019 | Josephson et al. |
| 2020/0050332 A1 | 2/2020 | Yang et al. |
| 2020/0081538 A1 | 3/2020 | Moussette et al. |
| 2020/0081539 A1 | 3/2020 | Moussette et al. |
| 2020/0110522 A1 | 4/2020 | Zambetti et al. |
| 2020/0125037 A1 | 4/2020 | Jo et al. |
| 2020/0133206 A1 | 4/2020 | Jo et al. |
| 2020/0145361 A1 | 5/2020 | Dye et al. |
| 2020/0149921 A1 | 5/2020 | Hoffman et al. |
| 2020/0167047 A1 | 5/2020 | Dascola et al. |
| 2020/0192473 A1 | 6/2020 | Wang et al. |
| 2020/0201540 A1 | 6/2020 | Zambetti et al. |
| 2020/0272287 A1 | 8/2020 | Yang et al. |
| 2020/0272293 A1 | 8/2020 | Zambetti et al. |
| 2020/0333940 A1 | 10/2020 | Lee et al. |
| 2020/0341553 A1 | 10/2020 | Moussette et al. |
| 2020/0344439 A1 | 10/2020 | Choi et al. |
| 2020/0348827 A1 | 11/2020 | Wilson et al. |
| 2020/0356242 A1 | 11/2020 | Wilson et al. |
| 2020/0368616 A1 | 11/2020 | Delamont |
| 2020/0379716 A1 | 12/2020 | Carrigan et al. |
| 2020/0393957 A1 | 12/2020 | Wilson et al. |
| 2021/0011588 A1 | 1/2021 | Coffman et al. |
| 2021/0055697 A1 | 2/2021 | Abramov |
| 2021/0073741 A1 | 3/2021 | Chaudhri et al. |
| 2021/0110014 A1 | 4/2021 | Turgeman et al. |
| 2021/0173431 A1 | 6/2021 | Yang et al. |
| 2021/0203765 A1 | 7/2021 | Yang et al. |
| 2021/0208750 A1 | 7/2021 | Zambetti et al. |
| 2021/0342017 A1 | 11/2021 | Foss et al. |
| 2022/0047918 A1 | 2/2022 | Williams et al. |
| 2022/0121299 A1 | 4/2022 | De Vries et al. |
| 2022/0137759 A1 | 5/2022 | Yang et al. |
| 2022/0291793 A1 | 9/2022 | Zambetti et al. |
| 2022/0391056 A1 | 12/2022 | Dalonzo et al. |
| 2022/0413632 A1 | 12/2022 | Foss et al. |
| 2023/0004227 A1 | 1/2023 | Moussette et al. |
| 2023/0024225 A1 | 1/2023 | Zambetti et al. |
| 2023/0049771 A1 | 2/2023 | Dascola et al. |
| 2023/0052490 A1 | 2/2023 | Chaudhri et al. |
| 2023/0066552 A1 | 3/2023 | Van Os et al. |

FOREIGN PATENT DOCUMENTS

| | | |
|---|---|---|
| AU | 2014100584 A4 | 7/2014 |
| AU | 2015101019 A4 | 9/2015 |
| AU | 2016231505 A1 | 10/2016 |
| AU | 2018100429 A4 | 5/2018 |
| AU | 2018100429 B4 | 8/2018 |
| CA | 2781636 A1 | 7/2010 |
| CA | 2792987 A1 | 10/2011 |
| CH | 707412 A2 | 6/2014 |
| CN | 1263425 A | 8/2000 |
| CN | 1330310 A | 1/2002 |
| CN | 1341889 A | 3/2002 |
| CN | 1398366 A | 2/2003 |
| CN | 1549998 A | 11/2004 |
| CN | 1650251 A | 8/2005 |
| CN | 1757011 A | 4/2006 |
| CN | 1797295 A | 7/2006 |
| CN | 1811899 A | 8/2006 |
| CN | 1863281 A | 11/2006 |
| CN | 1997957 A | 7/2007 |
| CN | 101042300 A | 9/2007 |
| CN | 101059730 A | 10/2007 |
| CN | 101098535 A | 1/2008 |
| CN | 101101595 A | 1/2008 |
| CN | 101118469 A | 2/2008 |
| CN | 101203821 A | 6/2008 |
| CN | 101382438 A | 3/2009 |
| CN | 101398741 A | 4/2009 |
| CN | 101431545 A | 5/2009 |
| CN | 101446802 A | 6/2009 |

(56) References Cited

FOREIGN PATENT DOCUMENTS

| | | |
|---|---|---|
| CN | 101477558 A | 7/2009 |
| CN | 101529368 A | 9/2009 |
| CN | 101611374 A | 12/2009 |
| CN | 101625620 A | 1/2010 |
| CN | 101627349 A | 1/2010 |
| CN | 101634659 A | 1/2010 |
| CN | 101702112 A | 5/2010 |
| CN | 101776968 A | 7/2010 |
| CN | 101819486 A | 9/2010 |
| CN | 101873386 A | 10/2010 |
| CN | 101876877 A | 11/2010 |
| CN | 101893992 A | 11/2010 |
| CN | 101976171 A | 2/2011 |
| CN | 101978374 A | 2/2011 |
| CN | 101981987 A | 2/2011 |
| CN | 102033710 A | 4/2011 |
| CN | 101241407 B | 7/2011 |
| CN | 102144213 A | 8/2011 |
| CN | 201928419 U | 8/2011 |
| CN | 102252126 A | 11/2011 |
| CN | 102301415 A | 12/2011 |
| CN | 102402328 A | 4/2012 |
| CN | 102426490 A | 4/2012 |
| CN | 102438092 A | 5/2012 |
| CN | 102479053 A | 5/2012 |
| CN | 102508707 A | 6/2012 |
| CN | 102591579 A | 7/2012 |
| CN | 102612679 A | 7/2012 |
| CN | 102687176 A | 9/2012 |
| CN | 102695302 A | 9/2012 |
| CN | 102725724 A | 10/2012 |
| CN | 102750066 A | 10/2012 |
| CN | 102754071 A | 10/2012 |
| CN | 102763066 A | 10/2012 |
| CN | 102772211 A | 11/2012 |
| CN | 102790826 A | 11/2012 |
| CN | 102812426 A | 12/2012 |
| CN | 102859482 A | 1/2013 |
| CN | 102902453 A | 1/2013 |
| CN | 102902454 A | 1/2013 |
| CN | 102905181 A | 1/2013 |
| CN | 101034328 B | 2/2013 |
| CN | 102981770 A | 3/2013 |
| CN | 102989159 A | 3/2013 |
| CN | 103019083 A | 4/2013 |
| CN | 103034399 A | 4/2013 |
| CN | 103069378 A | 4/2013 |
| CN | 103154878 A | 6/2013 |
| CN | 103212197 A | 7/2013 |
| CN | 103270486 A | 8/2013 |
| CN | 103399480 A | 11/2013 |
| CN | 103460164 A | 12/2013 |
| CN | 103558916 A | 2/2014 |
| CN | 103562832 A | 2/2014 |
| CN | 103576902 A | 2/2014 |
| CN | 103607660 A | 2/2014 |
| CN | 103703437 A | 4/2014 |
| CN | 103713843 A | 4/2014 |
| CN | 103744671 A | 4/2014 |
| CN | 103782252 A | 5/2014 |
| CN | 103793075 A | 5/2014 |
| CN | 103793138 A | 5/2014 |
| CN | 103858088 A | 6/2014 |
| CN | 103870255 A | 6/2014 |
| CN | 103902165 A | 7/2014 |
| CN | 103914261 A | 7/2014 |
| CN | 103970413 A | 8/2014 |
| CN | 104102388 A | 10/2014 |
| CN | 104160362 A | 11/2014 |
| CN | 104166458 A | 11/2014 |
| CN | 104205785 A | 12/2014 |
| CN | 104281257 A | 1/2015 |
| CN | 104288983 A | 1/2015 |
| CN | 104360735 A | 2/2015 |
| CN | 104434314 A | 3/2015 |
| CN | 104508426 A | 4/2015 |
| CN | 105955591 A | 9/2016 |
| CN | 205608658 U | 9/2016 |
| CN | 107710135 A | 2/2018 |
| CN | 107797657 A | 3/2018 |
| CN | 108139863 A | 6/2018 |
| CN | 108304106 A | 7/2018 |
| CN | 108334190 A | 7/2018 |
| CN | 108369455 A | 8/2018 |
| DE | 19621593 A1 | 12/1997 |
| DE | 29824936 U1 | 7/2003 |
| EP | 713187 A2 | 5/1996 |
| EP | 0831629 A2 | 3/1998 |
| EP | 0880091 A2 | 11/1998 |
| EP | 994409 A2 | 4/2000 |
| EP | 1052566 A1 | 11/2000 |
| EP | 1079371 A1 | 2/2001 |
| EP | 1168149 A2 | 1/2002 |
| EP | 1406158 A2 | 4/2004 |
| EP | 1486860 A2 | 12/2004 |
| EP | 1505484 A1 | 2/2005 |
| EP | 1531411 A1 | 5/2005 |
| EP | 1571538 A1 | 9/2005 |
| EP | 1659504 A2 | 5/2006 |
| EP | 1674977 A2 | 6/2006 |
| EP | 1679879 A2 | 7/2006 |
| EP | 1777611 A1 | 4/2007 |
| EP | 1832969 A2 | 9/2007 |
| EP | 1847920 A2 | 10/2007 |
| EP | 1850213 A2 | 10/2007 |
| EP | 1885109 A2 | 2/2008 |
| EP | 1942401 A1 | 7/2008 |
| EP | 1944677 A2 | 7/2008 |
| EP | 1956433 A1 | 8/2008 |
| EP | 1956446 A2 | 8/2008 |
| EP | 1959337 A2 | 8/2008 |
| EP | 2040146 A2 | 3/2009 |
| EP | 2124131 A2 | 11/2009 |
| EP | 2194508 A1 | 6/2010 |
| EP | 2194698 A1 | 6/2010 |
| EP | 2204702 A1 | 7/2010 |
| EP | 2207084 A2 | 7/2010 |
| EP | 2224317 A1 | 9/2010 |
| EP | 2237140 A2 | 10/2010 |
| EP | 2284646 A1 | 2/2011 |
| EP | 2302492 A2 | 3/2011 |
| EP | 2302493 A2 | 3/2011 |
| EP | 2312512 A1 | 4/2011 |
| EP | 2360902 A2 | 8/2011 |
| EP | 2367098 A2 | 9/2011 |
| EP | 2385451 A1 | 11/2011 |
| EP | 2413577 A2 | 2/2012 |
| EP | 2423810 A1 | 2/2012 |
| EP | 2437148 A2 | 4/2012 |
| EP | 2547117 A1 | 1/2013 |
| EP | 2551784 A1 | 1/2013 |
| EP | 2602759 A2 | 6/2013 |
| EP | 2610738 A2 | 7/2013 |
| EP | 2615607 A2 | 7/2013 |
| EP | 2653961 A1 | 10/2013 |
| EP | 2677775 A1 | 12/2013 |
| EP | 2693382 A2 | 2/2014 |
| EP | 2720126 A1 | 4/2014 |
| EP | 2733579 A2 | 5/2014 |
| EP | 2733598 A2 | 5/2014 |
| EP | 2738640 A2 | 6/2014 |
| EP | 2741176 A2 | 6/2014 |
| EP | 2821912 A1 | 1/2015 |
| EP | 2998822 A2 | 3/2016 |
| EP | 3401770 A1 | 11/2018 |
| GB | 2370208 A | 6/2002 |
| GB | 2392773 A | 3/2004 |
| GB | 2475669 A | 6/2011 |
| GB | 2489580 A | 10/2012 |
| JP | 55-080084 A | 6/1980 |
| JP | 5-88812 A | 4/1993 |
| JP | 6-348408 A | 12/1994 |
| JP | 7-152478 A | 6/1995 |
| JP | 8-110955 A | 4/1996 |

(56) References Cited

FOREIGN PATENT DOCUMENTS

| | | |
|---|---|---|
| JP | 9-251084 A | 9/1997 |
| JP | 11-110106 A | 4/1999 |
| JP | 11-160470 A | 6/1999 |
| JP | 11-232013 A | 8/1999 |
| JP | 2000-503153 A | 3/2000 |
| JP | 2000-122957 A | 4/2000 |
| JP | 2000-305760 A | 11/2000 |
| JP | 2001-100905 A | 4/2001 |
| JP | 2001-202170 A | 7/2001 |
| JP | 2001-202178 A | 7/2001 |
| JP | 2001-202181 A | 7/2001 |
| JP | 2001-318852 A | 11/2001 |
| JP | 2002-507718 A | 3/2002 |
| JP | 2002-175139 A | 6/2002 |
| JP | 2002-271451 A | 9/2002 |
| JP | 2002-288690 A | 10/2002 |
| JP | 2002-342356 A | 11/2002 |
| JP | 2002-351768 A | 12/2002 |
| JP | 2003-030245 A | 1/2003 |
| JP | 2003-248544 A | 9/2003 |
| JP | 2003-330586 A | 11/2003 |
| JP | 2003-330856 A | 11/2003 |
| JP | 2004-021522 A | 1/2004 |
| JP | 2004-178584 A | 6/2004 |
| JP | 2004-519033 A | 6/2004 |
| JP | 2004-184396 A | 7/2004 |
| JP | 2004-259063 A | 9/2004 |
| JP | 2005-004891 A | 1/2005 |
| JP | 2005-196077 A | 7/2005 |
| JP | 2005-532607 A | 10/2005 |
| JP | 2006-011690 A | 1/2006 |
| JP | 2006-101505 A | 4/2006 |
| JP | 2006-140990 A | 6/2006 |
| JP | 2006-185273 A | 7/2006 |
| JP | 2007-512635 A | 5/2007 |
| JP | 2007-170995 A | 7/2007 |
| JP | 2007-179544 A | 7/2007 |
| JP | 2008-097057 A | 4/2008 |
| JP | 2008-097202 A | 4/2008 |
| JP | 2008-518539 A | 5/2008 |
| JP | 2008-157974 A | 7/2008 |
| JP | 2008-539513 A | 11/2008 |
| JP | 2009-059382 A | 3/2009 |
| JP | 2009-510404 A | 3/2009 |
| JP | 2009-128296 A | 6/2009 |
| JP | 2009-239867 A | 10/2009 |
| JP | 2009-246553 A | 10/2009 |
| JP | 2009-265793 A | 11/2009 |
| JP | 2009-294526 A | 12/2009 |
| JP | 2010-515978 A | 5/2010 |
| JP | 2010-124181 A | 6/2010 |
| JP | 2010-245940 A | 10/2010 |
| JP | 2010-257051 A | 11/2010 |
| JP | 2011008540 A | 1/2011 |
| JP | 2011-096043 A | 5/2011 |
| JP | 2011090640 A | 5/2011 |
| JP | 3168099 U | 6/2011 |
| JP | 2011-209786 A | 10/2011 |
| JP | 2011-530101 A | 12/2011 |
| JP | 2011-530738 A | 12/2011 |
| JP | 2012-027797 A | 2/2012 |
| JP | 2012-058979 A | 3/2012 |
| JP | 2012-505478 A | 3/2012 |
| JP | 2012-115519 A | 6/2012 |
| JP | 2012-123475 A | 6/2012 |
| JP | 2012-147432 A | 8/2012 |
| JP | 2012-155698 A | 8/2012 |
| JP | 2012-517630 A | 8/2012 |
| JP | 2012-203832 A | 10/2012 |
| JP | 2012-252384 A | 12/2012 |
| JP | 2012-531607 A | 12/2012 |
| JP | 2013-3718 A | 1/2013 |
| JP | 2013-506225 A | 2/2013 |
| JP | 2013-114844 A | 6/2013 |
| JP | 2013-122738 A | 6/2013 |
| JP | 2013-137750 A | 7/2013 |
| JP | 2013-530458 A | 7/2013 |
| JP | 2013-164700 A | 8/2013 |
| JP | 2013-175188 A | 9/2013 |
| JP | 2014-503861 A | 2/2014 |
| JP | 2014-042164 A | 3/2014 |
| JP | 2014123197 A | 7/2014 |
| JP | 2015210587 A | 11/2015 |
| JP | 2016538653 A | 12/2016 |
| JP | 2017500656 A | 1/2017 |
| JP | 2017516163 A | 6/2017 |
| JP | 2018508076 A | 3/2018 |
| JP | 2018508900 A | 3/2018 |
| KR | 10-2004-0107472 A | 12/2004 |
| KR | 10-2004-25314 Y1 | 9/2006 |
| KR | 10-0630154 B1 | 9/2006 |
| KR | 10-2007-0024702 A | 3/2007 |
| KR | 10-2008-0095085 A | 10/2008 |
| KR | 10-2010-0003589 A | 1/2010 |
| KR | 10-0971452 B1 | 7/2010 |
| KR | 10-2010-0109277 A | 10/2010 |
| KR | 10-2011-0093090 A | 8/2011 |
| KR | 10-2011-0114294 A | 10/2011 |
| KR | 10-2012-0071468 A | 7/2012 |
| KR | 10-2012-0079707 A | 7/2012 |
| KR | 10-2013-0027017 A | 3/2013 |
| KR | 10-2013-0052751 A | 5/2013 |
| KR | 10-2014-0064687 A | 5/2014 |
| KR | 20140074824 A | 6/2014 |
| KR | 10-2015-0001287 A | 1/2015 |
| TW | I269202 B | 12/2006 |
| TW | D122820 S | 5/2008 |
| TW | 200843452 A | 11/2008 |
| TW | 201119339 A | 6/2011 |
| TW | I349212 B | 9/2011 |
| TW | M435665 U1 | 8/2012 |
| TW | I381305 B | 1/2013 |
| TW | I384394 B | 2/2013 |
| TW | I394410 B1 | 4/2013 |
| TW | I395498 B | 5/2013 |
| TW | I405106 B | 8/2013 |
| TW | 201403363 A | 1/2014 |
| TW | I426416 B | 2/2014 |
| TW | 201419115 A | 5/2014 |
| TW | 201421340 A | 6/2014 |
| TW | 1443547 B | 7/2014 |
| WO | 93/08517 A1 | 4/1993 |
| WO | 96/19872 A1 | 6/1996 |
| WO | 99/15982 A1 | 4/1999 |
| WO | 99/66394 A1 | 12/1999 |
| WO | 99/66395 A2 | 12/1999 |
| WO | 00/36496 A1 | 6/2000 |
| WO | 01/69369 A1 | 9/2001 |
| WO | 01/71433 A1 | 9/2001 |
| WO | 02/054157 A1 | 7/2002 |
| WO | 03/021568 A1 | 3/2003 |
| WO | 03/036457 A2 | 5/2003 |
| WO | 2004/056107 A1 | 7/2004 |
| WO | 2004/095414 A1 | 11/2004 |
| WO | 2005/055034 A1 | 6/2005 |
| WO | 2005/067511 A2 | 7/2005 |
| WO | 2005/109829 A1 | 11/2005 |
| WO | 2006/012343 A2 | 2/2006 |
| WO | 2006/020305 A2 | 2/2006 |
| WO | 2006/037545 A2 | 4/2006 |
| WO | 2006/042309 A1 | 4/2006 |
| WO | 2006/094308 A2 | 9/2006 |
| WO | 2006/112641 A1 | 10/2006 |
| WO | 2006/094308 A3 | 12/2006 |
| WO | 2007/018881 A2 | 2/2007 |
| WO | 2007/102110 A2 | 9/2007 |
| WO | 2008/030779 A2 | 3/2008 |
| WO | 2008/030880 A1 | 3/2008 |
| WO | 2008/033853 A2 | 3/2008 |
| WO | 2008/085742 A2 | 7/2008 |
| WO | 2008/086218 A2 | 7/2008 |
| WO | 2008/099251 A1 | 8/2008 |
| WO | 2008/106777 A1 | 9/2008 |
| WO | 2009/026508 A1 | 2/2009 |

(56) References Cited

FOREIGN PATENT DOCUMENTS

| | | |
|---|---|---|
| WO | 2009/084368 A1 | 7/2009 |
| WO | 2009/085378 A1 | 7/2009 |
| WO | 2009/097592 A1 | 8/2009 |
| WO | 2010/017627 A1 | 2/2010 |
| WO | 2010/024969 A1 | 3/2010 |
| WO | 2010/150768 A1 | 12/2010 |
| WO | 2011/000893 A1 | 1/2011 |
| WO | 2011/041427 A2 | 4/2011 |
| WO | 2011/062871 A2 | 5/2011 |
| WO | 2011/084857 A1 | 7/2011 |
| WO | 2011/084859 A1 | 7/2011 |
| WO | 2011/126502 A1 | 10/2011 |
| WO | 2011/149231 A2 | 12/2011 |
| WO | 2012/004288 A1 | 1/2012 |
| WO | 2012/006494 A1 | 1/2012 |
| WO | 2011/130849 A8 | 5/2012 |
| WO | 2012/080020 A1 | 6/2012 |
| WO | 2012/128361 A1 | 9/2012 |
| WO | 2012/129359 A1 | 9/2012 |
| WO | 2012/161434 A2 | 11/2012 |
| WO | 2013/051048 A1 | 4/2013 |
| WO | 2013/085580 A1 | 6/2013 |
| WO | 2013/097895 A1 | 7/2013 |
| WO | 2013/105664 A1 | 7/2013 |
| WO | 2013/111239 A1 | 8/2013 |
| WO | 2013/114844 A1 | 8/2013 |
| WO | 2013/133901 A2 | 9/2013 |
| WO | 2013/135270 A1 | 9/2013 |
| WO | 2013/169842 A2 | 11/2013 |
| WO | 2013/169849 A2 | 11/2013 |
| WO | 2013/169851 A2 | 11/2013 |
| WO | 2013/169854 A2 | 11/2013 |
| WO | 2013/169870 A1 | 11/2013 |
| WO | 2013/169875 A2 | 11/2013 |
| WO | 2013/169877 A2 | 11/2013 |
| WO | 2013/169882 A2 | 11/2013 |
| WO | 2013169846 A1 | 11/2013 |
| WO | 2014/024000 A1 | 2/2014 |
| WO | 2014/078114 A1 | 5/2014 |
| WO | 2014/081181 A1 | 5/2014 |
| WO | 2014/105276 A1 | 7/2014 |
| WO | 2014/105278 A1 | 7/2014 |
| WO | 2014/105279 A1 | 7/2014 |
| WO | 2014/143776 A2 | 9/2014 |
| WO | 2015/034969 A2 | 3/2015 |
| WO | 2015/057320 A1 | 4/2015 |
| WO | 2016/022203 A1 | 2/2016 |
| WO | 2016/036522 A2 | 3/2016 |
| WO | 2016/141057 A1 | 9/2016 |
| WO | 2016/144385 A1 | 9/2016 |
| WO | 2016/144563 A1 | 9/2016 |
| WO | 2016/144696 A2 | 9/2016 |
| WO | 2016/144975 A2 | 9/2016 |
| WO | 2017/027625 A2 | 2/2017 |
| WO | 2018/048518 A1 | 3/2018 |
| WO | 2018/048632 A1 | 3/2018 |

OTHER PUBLICATIONS

Decision of Appeal received for Korean Patent Application No. 10-2021-7017259, dated Jun. 29, 2022, 28 pages (04 pages of English Translation and 24 pages of Official Copy).
Notice of Allowance received for Chinese Patent Application No. 201910446753.8, dated Jun. 29, 2022, 2 pages (1 page of English Translation and 1 page of Official Copy).
Notice of Allowance received for U.S. Appl. No. 14/913,349, dated Jul. 15, 2022, 6 pages.
Notice of Allowance received for U.S. Appl. No. 17/378,451, dated Jul. 7, 2022, 8 pages.
Office Action received for European Patent Application No. 20217518.8, dated Jul. 6, 2022, 5 pages.
Corrected Notice of Allowance received for U.S. Appl. No. 17/378,451, dated Aug. 12, 2022, 2 pages.
Decision to Grant received for European Patent Application No. 15760008.1, dated Aug. 11, 2022, 2 pages.
Notice of Acceptance received for Australian Patent Application No. 2021201780, dated Aug. 2, 2022, 3 pages.
Notice of Acceptance received for Australian Patent Application No. 2022202044, dated Aug. 4, 2022, 3 pages.
Notice of Allowance received for U.S. Appl. No. 16/147,523, dated Aug. 4, 2022, 9 pages.
Office Action received for Japanese Patent Application No. 2021-111630, dated Aug. 5, 2022, 8 pages (4 pages of English Translation and 4 pages of Official Copy).
Supplemental Notice of Allowance received for U.S. Appl. No. 16/926,512, dated Aug. 8, 2022, 3 pages.
Corrected Notice of Allowance received for U.S. Appl. No. 14/913,349, dated Sep. 1, 2022, 2 pages.
Decision of Appeal received for Korean Patent Application No. 10-2021-7001918, dated Aug. 23, 2022, 14 pages (2 pages of English Translation and 12 pages of Official Copy).
Decision to Grant received for European Patent Application No. 20185974.1, dated Aug. 19, 2022, 3 pages.
Final Office Action received for U.S. Appl. No. 16/703,486, dated Aug. 26, 2022, 14 pages.
Office Action received for Japanese Patent Application No. 2021-126843, dated Aug. 29, 2022, 6 pages (3 pages of English Translation and 3 pages of Official Copy).
Supplemental Notice of Allowance received for U.S. Appl. No. 16/147,523, dated Aug. 23, 2022, 2 pages.
Applicant-Initiated Interview Summary received for U.S. Appl. No. 16/926,512, dated Apr. 21, 2022, 4 pages.
Applicant-Initiated Interview Summary received for U.S. Appl. No. 16/943,737, dated Apr. 29, 2022, 6 pages.
Corrected Notice of Allowance received for U.S. Appl. No. 17/378,451, dated May 4, 2022, 2 pages.
Decision on Appeal received for U.S. Appl. No. 14/913,349, dated Apr. 20, 2022, 13 pages.
Intention to Grant received for European Patent Application No. 20185974.1, dated Apr. 28, 2022, 8 pages.
Non-Final Office Action received for U.S. Appl. No. 16/147,523, dated Apr. 26, 2022, 22 pages.
Notice of Acceptance received for Australian Patent Application No. 2021203636, dated Apr. 14, 2022, 3 pages.
Office Action received for Chinese Patent Application No. 201910447678.7, dated Mar. 21, 2022, 14 pages (6 pages of English Translation and 8 pages of Official Copy).
Advisory Action received for U.S. Appl. No. 16/943,737, dated Jun. 1, 2022, 6 pages.
Brief Communication Regarding Oral Proceedings received for European Patent Application No. 20176616.9, dated May 27, 2022, 1 page.
Final Office Action received for U.S. Appl. No. 17/212,850, dated Jun. 1, 2022, 14 pages.
Office Action received for Japanese Patent Application No. 2020-124605, dated May 13, 2022, 6 pages (3 pages of English Translation and 3 pages of Official Copy).
3C Blogger Kisplay Share,, Samsung Galaxy Tab S Hands-on SideSync 3.0 Is Amazing, http://www.samsung.com/tw/article/galaxy-tab-s-blogger-kisplay., Jul. 4, 2014, 4 pages.
Accepted Outlook Meetings Move to Deleted Folder, Available online at:—https://social.technet.microsoft.com/Forums/office/en-US/f3301c9a-a93f-49f7-be13-c642e285f150/accepted-outlook-meetings-move-to-deleted-folder?forum=outlook, Jan. 12, 2011, 4 pages.
Advisory Action received for U.S. Appl. No. 11/069,977, dated Aug. 6, 2012, 3 pages.
Advisory Action received for U.S. Appl. No. 11/069,977, dated May 13, 2009, 2 Pages.
Advisory Action received for U.S. Appl. No. 11/069,977, dated May 26, 2011, 3 Pages.
Advisory Action received for U.S. Appl. No. 10/213,929, dated Sep. 22, 2006, 3 pages.
Advisory Action received for U.S. Appl. No. 14/641,308, dated Nov. 14, 2019, 4 pages.

(56) References Cited

OTHER PUBLICATIONS

Advisory Action received for U.S. Appl. No. 14/752,776, dated Aug. 31, 2018, 3 pages.
Advisory Action received for U.S. Appl. No. 14/815,898, dated Aug. 30, 2016, 3 pages.
Advisory Action received for U.S. Appl. No. 14/822,769, dated Apr. 30, 2018, 4 pages.
Advisory Action received for U.S. Appl. No. 14/833,014, dated Jan. 27, 2017, 3 pages.
Advisory Action received for U.S. Appl. No. 14/839,912, dated Nov. 14, 2019, 6 pages.
Advisory Action received for U.S. Appl. No. 14/841,646, dated Nov. 21, 2018, 5 pages.
Advisory Action received for U.S. Appl. No. 14/913,349, dated Oct. 29, 2019, 4 pages.
Advisory Action received for U.S. Appl. No. 15/049,052, dated Sep. 11, 2017, 2 pages.
Advisory Action received for U.S. Appl. No. 15/049,058, dated Oct. 18, 2017, 3 pages.
Advisory Action received for U.S. Appl. No. 15/049,064, dated May 10, 2017., 3 Pages.
Advisory Action received for U.S. Appl. No. 15/655,253, dated May 11, 2021, 6 pages.
Advisory Action received for U.S. Appl. No. 16/144,950, dated Feb. 20, 2020, 5 pages.
Advisory Action received for U.S. Appl. No. 16/147,413, dated Nov. 25, 2019, 2019, 6 pages.
Advisory Action received for U.S. Appl. No. 16/377,892, dated Apr. 9, 2021, 4 pages.
Advisory Action received for U.S. Appl. No. 16/378,136, dated Apr. 12, 2021, 4 pages.
Advisory Action received for U.S. Appl. No. 16/734,173, dated Oct. 14, 2021, 3 pages.
Advisory Action received for U.S. Appl. No. 16/806,981, dated Jun. 14, 2021, 6 pages.
Agarwal Deepesh, "DexClock—Live Clock And Date Blended Into Beautiful Artwork As Your Desktop Wall paper", available at: https://www.megaleecher.net/DexClock_Wallpaper_Designs, Jul. 6, 2013, 4 pages.
Ahlberg et al., "The Alphaslider: A Compact and Rapid Selector", CHI '94 Proceedings of the SIGCHI Conference on Human Factors in Computing Systems, Apr. 24-28, 1994, pp. 365-371.
Airshow,"Airshow App for Mobile Devices", 2012, 4 pages.
Al-Baker Asri, "AquaCalendar, a Review by i-Symbian.Com", available at <http://www.i-symbian.com/forum/articles.php?action=viewarticle&artid=40>, 2005, 11 pages.
Android 2.3.4 User's Guide, Online available at:https://static.googleusercontent.com/media/www.google.com/en//help/hc/pdrs/mobile/AndroidUsersGuide-2.3-4.pdf, May 20, 2011, 384 pages.
Android Central,"BeWeather weather app for Android", Available online at: <https://www.youtube.com/watch?v=G2EY2K-XkSI>, Sep. 1, 2011, 1 page.
Android Central,"Changing the watchface on your Android Wear device", Retrieved from: https://www.youtube.com/watch?v=YYwFe2K_qil, Jul. 2, 2014, 4 pages.
Android Central,"Gmail on iOS versus Android", Online Available at: https://www.youtube.com/watch?v=w2aVeZLxU5Q&t=80s, Nov. 2, 2011, 3 pages.
Androidika,"Butterfly 3D Live Wallpaper 1.0 APK", Available at: <http://net-suckga-ilauncher2.apk-dl.com/butterfly-3d-live-wallpaper>, Feb. 26, 2013, 7 pages.
Appeal Brief received for U.S. Appl. No. 11/522,167 dated Nov. 23, 2010, 65 pages.
Apple,"iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant Initiated Interview Summary received for U.S. Appl. No. 14/913,345, dated Nov. 4, 2019, 5 pages.
Applicant Initiated Interview Summary received for U.S. Appl. No. 14/913,349, dated Oct. 7, 2019, 4 pages.
Applicant Initiated Interview Summary received for U.S. Appl. No. 15/608,848, dated Apr. 13, 2021, 4 pages.
Applicant Initiated Interview Summary received for U.S. Appl. No. 15/608,848, dated May 12, 2020, 5 pages.
Applicant Initiated Interview Summary received for U.S. Appl. No. 15/608,848, dated Oct. 26, 2020, 3 pages.
Applicant Initiated Interview Summary received for U.S. Appl. No. 15/655,253, dated Mar. 31, 2020, 5 pages.
Applicant Initiated Interview Summary received for U.S. Appl. No. 15/655,253, dated Nov. 12, 2019, 3 pages.
Applicant Initiated Interview Summary received for U.S. Appl. No. 16/144,950, dated Jan. 29, 2020, 5 pages.
Applicant Initiated Interview Summary received for U.S. Appl. No. 16/147,413, dated Oct. 28, 2019, 5 pages.
Applicant Initiated Interview Summary received for U.S. Appl. No. 16/265,938, dated Mar. 11, 2020, 5 pages.
Applicant Initiated Interview Summary received for U.S. Appl. No. 16/384,726, dated Nov. 5, 2020, 3 pages.
Applicant Initiated Interview Summary received for U.S. Appl. No. 16/871,995, dated Jul. 16, 2021, 4 pages.
Applicant Initiated Interview Summary received for U.S. Appl. No. 14/839,912, dated Nov. 5, 2019, 5 pages.
Applicant-Initiated Interview Summary received for U.S. Appl. No. 14/641,308, dated Oct. 10, 2019, 5 pages.
Applicant-Initiated Interview Summary received for U.S. Appl. No. 15/405,122, dated Dec. 22, 2020, 5 pages.
Applicant-Initiated Interview Summary received for U.S. Appl. No. 15/405,122, dated Jul. 7, 2021, 4 pages.
Applicant-Initiated Interview Summary received for U.S. Appl. No. 15/405,122, dated May 21, 2020, 5 pages.
Applicant-Initiated Interview Summary received for U.S. Appl. No. 15/418,537, dated Dec. 23, 2019, 6 pages.
Applicant-Initiated Interview Summary received for U.S. Appl. No. 15/608,848, dated Nov. 1, 2019, 3 pages.
Applicant-Initiated Interview Summary received for U.S. Appl. No. 15/655,253, dated Mar. 29, 2021, 4 pages.
Applicant-Initiated Interview Summary received for U.S. Appl. No. 15/655,253, dated Nov. 30, 2020, 5 pages.
Applicant-Initiated Interview Summary received for U.S. Appl. No. 15/818,500, dated Aug. 9, 2021, 6 pages.
Applicant-Initiated Interview Summary received for U.S. Appl. No. 15/818,500, dated Jan. 30, 2020, 5 pages.
Applicant-Initiated Interview Summary received for U.S. Appl. No. 15/818,500, dated Oct. 13, 2020, 4 pages.
Applicant-Initiated Interview Summary received for U.S. Appl. No. 15/930,300, dated Oct. 27, 2020, 3 pages.
Applicant-Initiated Interview Summary received for U.S. Appl. No. 16/147,413, dated Jun. 2, 2020, 4 pages.
Applicant-Initiated Interview Summary received for U.S. Appl. No. 16/147,523, dated Apr. 27, 2020, 3 pages.
Applicant-Initiated Interview Summary received for U.S. Appl. No. 16/147,523, dated Oct. 26, 2020, 3 pages.
Applicant-Initiated Interview Summary received for U.S. Appl. No. 16/147,523, dated Sep. 14, 2021, 3 pages.
Applicant-Initiated Interview Summary received for U.S. Appl. No. 16/259,954, dated Mar. 23, 2020, 3 pages.
Applicant-Initiated Interview Summary received for U.S. Appl. No. 16/263,280, dated Apr. 26, 2021, 2 pages.
Applicant-Initiated Interview Summary received for U.S. Appl. No. 16/263,280, dated Nov. 25, 2020, 3 pages.
Applicant-Initiated Interview Summary received for U.S. Appl. No. 16/265,938, dated May 28, 2020, 5 pages.
Applicant-Initiated Interview Summary received for U.S. Appl. No. 16/358,483, dated Sep. 28, 2020, 6 pages.
Applicant-Initiated Interview Summary received for U.S. Appl. No. 16/377,892, dated Mar. 26, 2021, 2 pages.
Applicant-Initiated Interview Summary received for U.S. Appl. No. 16/377,892, dated Oct. 13, 2020, 5 pages.
Applicant-Initiated Interview Summary received for U.S. Appl. No. 16/378,136, dated Mar. 26, 2021, 2 pages.
Applicant-Initiated Interview Summary received for U.S. Appl. No. 16/378,136, dated Oct. 13, 2020, 4 pages.

(56) References Cited

OTHER PUBLICATIONS

Applicant-Initiated Interview Summary received for U.S. Appl. No. 16/525,082, dated Jul. 28, 2020, 4 pages.
Applicant-Initiated Interview Summary received for U.S. Appl. No. 16/723,583, dated Dec. 28, 2020, 6 pages.
Applicant-Initiated Interview Summary received for U.S. Appl. No. 16/734,173, dated Feb. 25, 2021, 3 pages.
Applicant-Initiated Interview Summary received for U.S. Appl. No. 16/734,173, dated Sep. 9, 2021, 2 pages.
Applicant-Initiated Interview Summary received for U.S. Appl. No. 16/734,173, dated Sep. 27, 2021, 2 pages.
Applicant-Initiated Interview Summary received for U.S. Appl. No. 16/775,528, dated Aug. 30, 2021, 4 pages.
Applicant-Initiated Interview Summary received for U.S. Appl. No. 16/775,528, dated Feb. 23, 2021, 4 pages.
Applicant-Initiated Interview Summary received for U.S. Appl. No. 16/935,002, dated Sep. 21, 2021, 4 pages.
Applicant-Initiated Interview Summary received for U.S. Appl. No. 16/943,737, dated Sep. 7, 2021, 4 pages.
Applicant-Initiated Interview Summary received for U.S. Appl. No. 17/031,833, dated Dec. 21, 2020, 5 pages.
Applicant-Initiated Interview Summary received for U.S. Appl. No. 17/031,833, dated May 24, 2021, 6 pages.
Applicant-Initiated Interview Summary received for U.S. Appl. No. 17/103,436, dated Sep. 22, 2021, 2 pages.
Arar Yardena, "Microsoft Reveals Office 2003 Prices, Release", PC World, http://www.pcworld.com/article/112077/microsoft_reveals_office_2003_prices_release.html, Aug. 19, 2003, 3 pages.
Askabouttech,"How to Change Android Smartwatch Wallpaper", also online available at:—https://www.youtube.com/watch?v=SBYrsyuHqBA (Year: 2014), Jul. 12, 2014, 5 pages.
Avdonin Nikita, "Astroviewer 3D", Available at <:https:jjwww.youtube.comjwatch?v=zY0tslx3JHY/>, Nov. 5, 2013, 2 pages.
Axiang's Network Notebook, Deep Analysis on Samsung's 2013 New Flagship: tell you what kind of mobile phone Galaxy S4 is!, available at: https://axiang.ee/archives/6115, Apr. 22, 2013, 4 pages.
Board Decision received for Chinese Patent Application No. 201580046339.8, mailed on Jun. 22, 2021, 12 pages.
Board Decision received for Chinese Patent Application No. 201680012936.3, mailed on Jun. 16, 2021, 2 pages.
Board Opinion received for Chinese Patent Application No. 201580046339.8, mailed on Mar. 19, 2021, 11 pages.
Board Opinion received for Chinese Patent Application No. 201910164962.3, mailed on Sep. 16, 2021, 16 pages.
Bogdanov Alexei, "SKMEI 1016", XP054977588, Available online at <URL:https://www.youtube.com/watch?v=E4q4Fug05Fw>, Jun. 21, 2014, 2 pages.
Brief Communication regarding Oral Proceedings received for European Patent Application No. 15730925.3, dated Feb. 18, 2020, 7 pages.
Brief Communication Regarding Oral Proceedings received for European Patent Application No. 15760008.1, dated Sep. 13, 2021, 8 pages.
Brinkmann Martin, "How To Zoom In Firefox", Ghacks, Available at <https://web.archive.org/web/20130804034728/https://www.ghacks.net/2009/02/23/how-to-zoom-in-firefox/>, Feb. 23, 2009, 11 pages.
Castellini Rick, "Google Earth", Retrieved from <https://www.youtube.com/watch?v=bgjMSBXsFZQ>, How to Use Google Earth for Beginners, Feb. 12, 2013, 3 pages.
Certificate of Examination received for Australian Patent Application No. 2018101855, dated Aug. 6, 2019, 2 pages.
Certification of Examination received for Australian Patent Application No. 2018100158, dated Oct. 23, 2018, 2 pages.
Chan Christine, "Handoff Your Browser to Your iPhone or iPad! Plus A Chance To Win A Copy!", Apr. 12, 2011, 2 pages.
Chester et al., "Mastering Excel 97", Sybex Inc., Fourth Edition, pp. 6, 35, and 44-45.
Clark Josh, "Designing Great iPhone Apps", O'Reilly Japan Co., O'Reilly Tim, vol. 1, May 24, 2012, 5 pages.
Clock & Calendar for SmartWatch 2, https://www.youtube.com/watch?v=Uj-K2vMnrj8, Nov. 20, 2013, 2 pages.
Codrington Simon, "Intuitive Scrolling Interfaces with CSS Scroll Snap Points", Online Available at: https://www.sitepoint.com/intuitive-scrolling-interfaces-with-css-scroll-snap-points/,, Dec. 8, 2015, 14 pages.
Colt Sam, "Here's One Way Apple's Smartwatch Could Be Better Than Anything Else", Business Insider, Aug. 21, 2014, pp. 1-4.
Communication Prior to Oral Proceedings received for European Patent Application No. 06846397.5, dated Apr. 18, 2018, 16 pages.
Corrected Notice of Allowance received for U.S. Appl. No. 14/641,252, dated Aug. 28, 2018, 2 pages.
Corrected Notice of Allowance received for U.S. Appl. No. 14/641,252, dated Jul. 9, 2018, 25 Pages.
Corrected Notice of Allowance received for U.S. Appl. No. 14/641,252, dated May 10, 2018, 10 pages.
Corrected Notice of Allowance received for U.S. Appl. No. 14/641,308, dated Mar. 10, 2020, 4 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Corrected Notice of Allowance received for U.S. Appl. No. 14/822,769, dated Jan. 17, 2019, 8 pages.
Corrected Notice of Allowance received for U.S. Appl. No. 14/829,573, dated Aug. 9, 2018, 3 pages.
Corrected Notice of Allowance received for U.S. Appl. No. 14/829,573, dated Sep. 11, 2018, 3 pages.
Corrected Notice of Allowance received for U.S. Appl. No. 14/830,629, dated Feb. 13, 2019, 3 pages.
Corrected Notice of Allowance received for U.S. Appl. No. 14/841,402, dated May 4, 2018, 2 pages.
Corrected Notice of Allowance received for U.S. Appl. No. 14/841,614, dated Jan. 8, 2019, 3 pages.
Corrected Notice of Allowance received for U.S. Appl. No. 14/841,656, dated Apr. 11, 2018, 2 pages.
Corrected Notice of Allowance received for U.S. Appl. No. 14/841,656, dated May 7, 2018, 14 pages.
Corrected Notice of Allowance received for U.S. Appl. No. 14/913,345, dated Apr. 13, 2020, 4 pages.
Corrected Notice of Allowance received for U.S. Appl. No. 15/355,956, dated Jan. 3, 2020, 2 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Corrected Notice of Allowance received for U.S. Appl. No. 15/798,257, dated Jun. 12, 2019, 2 pages.
Corrected Notice of Allowance received for U.S. Appl. No. 15/927,768, dated Aug. 7, 2019, 2 pages.
Corrected Notice of Allowance received for U.S. Appl. No. 15/927,768, dated Jul. 9, 2019, 2 pages.
Corrected Notice of Allowance received for U.S. Appl. No. 15/930,300, dated Dec. 24, 2020, 3 pages.
Corrected Notice of Allowance received for U.S. Appl. No. 16/055,489, dated Feb. 26, 2019, 2 pages.
Corrected Notice of Allowance received for U.S. Appl. No. 16/103,699, dated May 29, 2019, 2 pages.
Corrected Notice of Allowance received for U.S. Appl. No. 16/109,120, dated Nov. 12, 2019, 2 pages.
Corrected Notice of Allowance received for U.S. Appl. No. 16/147,413, dated Jan. 8, 2021, 7 pages.
Corrected Notice of Allowance received for U.S. Appl. No. 16/147,413, dated Nov. 25, 2020, 7 pages.
Corrected Notice of Allowance received for U.S. Appl. No. 16/147,413, dated Sep. 17, 2020, 7 pages.
Corrected Notice of Allowance received for U.S. Appl. No. 16/263,280, dated Aug. 5, 2021, 4 pages.
Corrected Notice of Allowance received for U.S. Appl. No. 16/358,483, dated Feb. 12, 2021, 4 pages.

(56) References Cited

OTHER PUBLICATIONS

Corrected Notice of Allowance received for U.S. Appl. No. 16/377,892, dated Aug. 11, 2021, 3 pages.
Corrected Notice of Allowance received for U.S. Appl. No. 16/378,136, dated Aug. 11, 2021, 2 pages.
Corrected Notice of Allowance received for U.S. Appl. No. 16/378,136, dated Jun. 11, 2021, 2 pages.
Corrected Notice of Allowance received for U.S. Appl. No. 16/384,726, dated Apr. 2, 2021, 2 pages.
Corrected Notice of Allowance received for U.S. Appl. No. 17/031,833, dated Aug. 2, 2021, 3 pages.
Corrected Notice of Allowance received for U.S. Appl. No. 17/103,436, dated Dec. 22, 2021, 2 pages.
Cowart Robert, "Mastering Windows 3.1", Sybex, Special Edition, 1993, pp. 66-67.
Decision of Appeal received for Korean Patent Application No. 10-2019-7028736, dated May 24, 2021, 16 pages.
Decision on Acceptance received for Australian Patent Application No. 2015298710, dated Jul. 19, 2019, 18 pages.
Decision on Acceptance received for Australian Patent Application No. 2018201089, dated Apr. 20, 2021, 28 pages.
Decision on Appeal received for Korean Patent Application No. 10-2016-7008449, dated Jul. 30, 2019, 29 pages.
Decision on Appeal received for Korean Patent Application No. 10-2016-7008474, dated Jan. 29, 2020, 21 pages.
Decision on Appeal received for Korean Patent Application No. 10-2016-7008488, dated Oct. 18, 2019, 33 pages.
Decision on Appeal received for Korean Patent Application No. 10-2018-7010872, dated Jan. 20, 2020, 20 pages.
Decision on Appeal received for Korean Patent Application No. 10-2018-7033888, dated Oct. 27, 2021, 34 pages.
Decision on Appeal received for U.S. Appl. No. 14/833,014, dated Oct. 30, 2019, 10 pages.
Decision on Appeal received for U.S. Appl. No. 14/815,890, dated Nov. 24, 2020, 13 pages.
Decision on Appeal received for U.S. Appl. No. 15/128,952, dated Dec. 28, 2020, 23 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant received for Chinese Patent Application No. 201080064146.2, dated Apr. 2, 2015, 4 pages.
Decision to Grant received for Danish Patent Application No. PA201570781, dated Jul. 17, 2017, 2 pages.
Decision to Grant received for Danish Patent Application No. PA201670117, dated Nov. 20, 2017, 2 pages.
Decision to Grant received for Danish Patent Application No. PA201670320, dated Oct. 18, 2018, 2 pages.
Decision to Grant received for Danish Patent Application No. PA201770181, dated Mar. 7, 2018, 2 pages.
Decision to Grant received for Danish Patent Application No. PA201770794, dated Nov. 11, 2019, 2 pages.
Decision to Grant received for Danish Patent Application No. PA201870631, dated May 15, 2019, 2 pages.
Decision to Grant received for Danish Patent Application No. PA201870632, dated May 14, 2019, 2 pages.
Decision to Grant received for Danish Patent Application No. PA201970259, dated Sep. 17, 2021, 2 pages.
Decision to Grant received for European Patent Application No. 06846397.5, dated Jan. 24, 2019, 2 pages.
Decision to Grant received for European Patent Application No. 09162953.5, dated Aug. 1, 2019, 2 pages.
Decision to Grant received for European Patent Application No. 14772001.5, dated Dec. 5, 2019, 2 pages.
Decision to Grant received for European Patent Application No. 14772002.3, dated Feb. 20, 2020, 2 pages.
Decision to Grant received for European Patent Application No. 14772494.2, dated Jul. 23, 2020, 2 pages.
Decision to Grant received for European Patent Application No. 15711969.4, dated Sep. 26, 2019, 2 pages.
Decision to Grant received for European Patent Application No. 15739110.3, dated Sep. 19, 2019, 2 pages.
Decision to Grant received for European Patent Application No. 15747595.5, dated Jul. 16, 2020, 2 pages.
Decision to Grant received for European Patent Application No. 15759998.6, dated Jun. 18, 2020, 2 pages.
Decision to Grant received for European Patent Application No. 15782209.9, dated Feb. 14, 2019, 2 pages.
Decision to Grant received for European Patent Application No. 18157131.6, dated May 16, 2019, 2 pages.
Decision to Grant received for European Patent Application No. 19199004.3, dated Jan. 21, 2021, 2 pages.
Decision to Refuse received for European Patent Application No. 15730924.6, dated Mar. 15, 2019, 12 pages.
Decision to Refuse received for European Patent Application No. 17810749.6, dated Jan. 29, 2021, 24 pages.
Deluxe Moon—Guide, available online at:—https://web.archive.org/web/20130520161057/http://www.lifewaresolutions.com/deluxe_moon_guide_ip.html, May 20, 2013, 5 pages.
Dewsbery Victor, "Designing for Small Screens", AVA Publishing, 2005, 27 pages.
Ebpman Tech Reviews,"LG G3 Tips: Howto customize the clock face", Available online at: https://www.youtube.com/watch?v=evraMWFb1fY, Jul. 25, 2014, 1 page.
Ellis Benus, "Use a Phone Number in the Google Calendar Where Line for One Click Calling", Available online at: https://ellisbenus.com/ellis-benus/use-a-phone-number-in-the-google-calender-where-line-for-one-click-calling, Ellis Benus-Small Business Web Guru, Oct. 3, 2012, 2 pages.
Ergonomic requirements for office work with visual display terminals (VDTs), Part 13: User guidance, International Standard ISO, Zuerich, CH, vol. 9241-13,, Jul. 15, 1998, 40 pages.
European Search Report received for European Patent Application No. 19173371.6, dated Oct. 30, 2019, 7 pages.
European Search Report received for European Patent Application No. 19173886.3, dated Oct. 30, 2019, 8 pages.
European Search Report received for European Patent Application No. 19199004.3, dated Nov. 12, 2019, 6 pages.
European Search Report received for European Patent Application No. 19206249.5, dated Dec. 19, 2019, 4 pages.
European Search Report received for European Patent Application No. 20217518.8, dated Apr. 16, 2021, 4 pages.
European Search Report received for European Patent Application No. 21165295.3, dated Jun. 18, 2021, 4 pages.
Evgenyevich Sergey, "Earth & Moon in HD Gyro 3D", Available at <https://www.youtube.com/watch?v=IRwNcaSYrls/>, Dec. 1, 2013, 2 pages.
Examiner Interview Summary received for U.S. Appl. No. 16/806,981, dated Mar. 26, 2021, 2 pages.
Examiner-Initiated Interview Summary received for U.S. Appl. No. 14/913,349, dated Oct. 27, 2020, 3 pages.
Examiner-Initiated Interview Summary received for U.S. Appl. No. 14/913,349, dated Sep. 22, 2021, 2 pages.
Examiner-Initiated Interview Summary received for U.S. Appl. No. 16/806,981, dated May 24, 2021, 4 pages.
Examiner's Answer to Appeal Brief received for U.S. Appl. No. 11/522,167 dated Feb. 15, 2011, 13 pages.
Examiner's Answer to Appeal Brief received for U.S. Appl. No. 14/815,890, dated Mar. 20, 2020, 16 pages.
Examiner's Answer to Appeal Brief received for U.S. Appl. No. 14/833,014, dated Nov. 2, 2017, 48 pages.
Examiner's Answer to Appeal Brief received for U.S. Appl. No. 14/913,349, dated Sep. 30, 2021, 23 pages.
Examiner's Answer to Appeal Brief received for U.S. Appl. No. 15/128,952, dated Jan. 8, 2020, 9 pages.
Examiner's Pre-Review Report received for Japanese Patent Application No. 2018-080122, dated Feb. 25, 2020, 6 pages.
Extended European Search Report (includes Partial European Search Report and European Search Opinion) received for European Patent Application No. 16190252.3, dated Mar. 1, 2017, 10 pages.

(56) References Cited

OTHER PUBLICATIONS

Extended European Search Report for European Application No. 19185318.3, dated Nov. 20, 2019, 8 pages.
Extended European Search Report received for European Patent Application No. 09162953.5, dated Sep. 2, 2009, 6 pages.
Extended European Search Report received for European Patent Application No. 19156614.0, dated May 28, 2019, 9 pages.
Extended European Search Report received for European Patent Application No. 19195247.2, dated Mar. 9, 2020, 7 pages.
Extended European Search Report received for European Patent Application No. 19203942.8, dated Apr. 1, 2020, 10 pages.
Extended European Search Report received for European Patent Application No. 19217240.1, dated May 25, 2020, 7 pages.
Extended European Search Report received for European Patent Application No. 20176616.9, dated Sep. 8, 2020, 7 Pages.
Extended European Search Report received for European Patent Application No. 20185974.1, dated Oct. 28, 2020, 7 pages.
Extended European Search Report received for European Patent Application No. 20190670.8, dated Nov. 2, 2020, 10 pages.
Feldman Ari, "Excerpts from: Designing Arcade Computer Game Graphics", Available online at: http://www.phatcode.net/res/269/files/dacgg.pdf, Jan. 1, 2001, 35 pages.
Feng Lipeng, "Bound for computer lovers", Dec. 31, 2009, 2 pages.
Final Office Action received for U.S. Appl. No. 11/069,977, dated Feb. 3, 2009, 12 Pages.
Final Office Action received for U.S. Appl. No. 11/069,977, dated Mar. 10, 2011, 18 pages.
Final Office Action received for U.S. Appl. No. 11/069,977, dated Mar. 11, 2010, 17 pages.
Final Office Action received for U.S. Appl. No. 11/069,977, dated Mar. 29, 2012, 19 pages.
Final Office Action received for U.S. Appl. No. 13/038,276, dated Mar. 27, 2014, 24 pages.
Final Office Action received for U.S. Appl. No. 13/038,276, dated Mar. 11, 2016, 36 pages.
Final Office Action received for U.S. Appl. No. 10/213,929, dated Dec. 14, 2004, 13 pages.
Final Office Action received for U.S. Appl. No. 10/213,929, dated Jul. 25, 2007, 25 pages.
Final Office Action received for U.S. Appl. No. 10/213,929, dated Mar. 22, 2006, 22 pages.
Final Office Action received for U.S. Appl. No. 11/322,553, dated Aug. 5, 2008, 25 pages.
Final Office Action received for U.S. Appl. No. 11/522,167, dated Aug. 5, 2009, 9 pages.
Final Office Action received for U.S. Appl. No. 11/522,167, dated Jul. 23, 2010, 11 pages.
Final Office Action received for U.S. Appl. No. 11/522,167, dated Jun. 3, 2013, 18 pages.
Final Office Action received for U.S. Appl. No. 11/522,167, dated Oct. 15, 2008, 10 pages.
Final Office Action received for U.S. Appl. No. 11/969,786 dated May 9, 2012., 39 pages.
Final Office Action received for U.S. Appl. No. 11/969,786, dated Jun. 15, 2011., 22 pages.
Final Office Action received for U.S. Appl. No. 12/567,171, dated Jan. 3, 2013, 12 pages.
Final Office Action received for U.S. Appl. No. 12/788,280, dated Apr. 26, 2013, 14 pages.
Final Office Action received for U.S. Appl. No. 14/641,308, dated Jul. 1, 2019, 46 pages.
Final Office Action received for U.S. Appl. No. 14/641,308, dated Mar. 14, 2018, 42 pages.
Final Office Action received for U.S. Appl. No. 14/752,776, dated May 29, 2018, 36 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/822,769, dated Jan. 4, 2018, 25 pages.
Final Office Action received for U.S. Appl. No. 14/830,629, dated Apr. 16, 2018, 27 pages.
Final Office Action received for U.S. Appl. No. 14/833,014, dated Oct. 26, 2016, 32 pages.
Final Office Action received for U.S. Appl. No. 14/841,402, dated Aug. 25, 2017, 17 pages.
Final Office Action received for U.S. Appl. No. 14/841,614, dated May 10, 2018, 13 pages.
Final Office Action received for U.S. Appl. No. 14/841,623, dated Sep. 5, 2017, 16 pages.
Final Office Action received for U.S. Appl. No. 14/841,646, dated Aug. 2, 2018, 22 pages.
Final Office Action received for U.S. Appl. No. 14/913,345, dated Oct. 26, 2018, 20 pages.
Final Office Action received for U.S. Appl. No. 14/913,349, dated Jul. 22, 2019, 20 pages.
Final Office Action received for U.S. Appl. No. 14/913,349, dated Jul. 30, 2018, 18 pages.
Final Office Action received for U.S. Appl. No. 14/913,349, dated Oct. 30, 2020, 33 pages.
Final Office Action received for U.S. Appl. No. 15/049,049 dated Jul. 12, 2018, 24 pages.
Final Office Action received for U.S. Appl. No. 15/049,049, dated May 23, 2017, 23 pages.
Final Office Action received for U.S. Appl. No. 15/049,052, dated Mar. 1, 2018., 15 pages.
Final Office Action received for U.S. Appl. No. 15/049,052, dated May 17, 2017, 13 pages.
Final Office Action received for U.S. Appl. No. 15/049,052, dated Oct. 2, 2018, 16 pages.
Final Office Action received for U.S. Appl. No. 15/049,058, dated Aug. 8, 2018, 23 pages.
Final Office Action received for U.S. Appl. No. 15/049,058, dated May 8, 2017, 21 pages.
Final Office Action received for U.S. Appl. No. 15/049,064, dated Feb. 27, 2017, 13 Pages.
Final Office Action received for U.S. Appl. No. 15/128,952, dated Jul. 18, 2018, 19 pages.
Final Office Action received for U.S. Appl. No. 15/352,215, dated Mar. 7, 2019, 22 pages.
Final Office Action received for U.S. Appl. No. 15/405,122, dated Jan. 21, 2020, 36 pages.
Final Office Action received for U.S. Appl. No. 15/405,122, dated Nov. 5, 2021, 45 pages.
Final Office Action received for U.S. Appl. No. 15/418,537, dated Sep. 23, 2019, 53 pages.
Final Office Action received for U.S. Appl. No. 15/608,848, dated Aug. 21, 2020, 15 pages.
Final Office Action received for U.S. Appl. No. 15/608,848, dated Jun. 26, 2019, 27 pages.
Final Office Action received for U.S. Appl. No. 15/655,253, dated Feb. 4, 2020, 20 pages.
Final Office Action received for U.S. Appl. No. 15/655,253, dated Feb. 9, 2021, 16 pages.
Final Office Action received for U.S. Appl. No. 15/818,500, dated Apr. 6, 2020, 15 pages.
Final Office Action received for U.S. Appl. No. 15/818,500, dated Nov. 30, 2021, 14 pages.
Final Office Action received for U.S. Appl. No. 16/144,950, dated Nov. 25, 2019, 24 pages.
Final Office Action received for U.S. Appl. No. 16/147,413, dated Sep. 3, 2019, 19 pages.
Final Office Action received for U.S. Appl. No. 16/147,523, dated Aug. 4, 2020, 15 pages.
Final Office Action received for U.S. Appl. No. 16/147,523, dated Oct. 14, 2021, 22 pages.

(56) References Cited

OTHER PUBLICATIONS

Final Office Action received for U.S. Appl. No. 16/263,280, dated Mar. 4, 2021, 13 pages.
Final Office Action received for U.S. Appl. No. 16/265,938, dated Apr. 7, 2020, 45 pages.
Final Office Action received for U.S. Appl. No. 16/377,892, dated Jan. 28, 2021, 11 pages.
Final Office Action received for U.S. Appl. No. 16/378,136, dated Jan. 28, 2021, 9 pages.
Final Office Action received for U.S. Appl. No. 16/723,583, dated Feb. 5, 2021, 15 pages.
Final Office Action received for U.S. Appl. No. 16/734,173, dated Jul. 13, 2021, 12 pages.
Final Office Action received for U.S. Appl. No. 16/775,528, dated May 25, 2021, 15 pages.
Final Office Action received for U.S. Appl. No. 16/806,981, dated Apr. 14, 2021, 24 pages.
Final Office Action received for U.S. Appl. No. 16/871,995, dated Aug. 20, 2021, 25 pages.
Final Office Action received for U.S. Appl. No. 17/031,833, dated Jan. 26, 2021, 17 pages.
Final Office Action received for U.S. Appl. No. 14/815,879, dated Mar. 24, 2016, 46 pages.
Final Office Action received for U.S. Appl. No. 14/839,912, dated Jul. 30, 2019, 42 pages.
Final Office Action received for U.S. Appl. No. 14/839,912, dated Sep. 13, 2018, 31 pages.
Final Office Action received for U.S. Appl. No. 14/822,769, dated Nov. 9, 2016, 18 pages.
First Action Interview received for U.S. Appl. No. 14/815,890, dated Aug. 12, 2016, 3 pages.
Frakes Dan, "How to Get Started with Airplay", availble at: https://www.macworld.com/article/2039770/how-to-get-started-with-airplay.html, Macworld, May 27, 2013, 8 pages.
FTScroller v0.2.2, Online available at https://github.eom/ftlabs/ftscroller/tree/v0.2.2, Mar. 18, 2013, 9 pages.
Fuchphone Extras,"LG G Watch—Designs | Watch Faces", Available online at: https://www.youtube.com/watch?v=yqxzqdi_MSE, Jul. 27, 2014, 1 page.
Fuchphone Extras,"Samsung Gear Live—Designs | Watch Faces", Available online at: https://www.youtube.com/watch?v=fFjtVAxyimE, Jul. 26, 2014, 1 page.
Fukuda Kazuhiro, "Xperia Z1 Perfect Manual", Sotec Co., Ltd., No. 1,, Nov. 15, 2013, pp. 217-218.
Gazer,"iPhone 4S Super Manual", Shuwa System Co., Saito Kazukuni, vol. 1, Jun. 6, 2013, 7 pages.
Geary David, "Programming HTML5 Canvas", O'Reilly Japan, Inc., No. 1, Jul. 23, 2014, pp. 327-330.
Google Earth 7.0.1.8244, retrieved from the Internet: http://dl.google.com/dl/earth/client/ge7/release_7_0_1/googleearth-win-bundle-7.0.1.8244.exe, Oct. 29, 2012, 1 page.
Google Earth on Android—AndroidCentral.com, Available online at:—https://www.youtube.com/watch?v=1WxN1RunrE4, Feb. 22, 2010, 1 page.
Gottabemobile,"How to Change Watch Faces on Android Wear", available online at URL:https://www.youtube.com/watch?v=B8iRGkGq6a8, Jul. 9, 2014, 4 pages.
Gsmarena Team,"Sony Ericsson P990 Review: A Coveted Smartphone", available at <http://web.archive.org/web/20061227185520/http://www.gsmarena.com/sony_ericsson_P990-review-101p8.php>, Aug. 4, 2006, 3 pages.
GT-I9500(Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&ModelType=N&ModelName=GTI9500 & VPath=UM/201305/20130520173017063/GTI9500_UM_Open_Taiwan_Jellybean_Chi_Rev.1.1_130520.pdf., May 2013, 14 pages.
Gym Book—Strength Training Planner, Logger and Analyzer, GymBookApp, Available Online at : https://web.archive.org/web/20160401104508/https://gymbookapp.com/, Apr. 1, 2016, 10 pages.
Handbook for Palm™ m500 Series Handhelds, User Manual. Available at: http://www.palm.com:80/us/support/handbooks/tungstent/tu ngstent_ ug .pdf, 2002, 286 pages.
Handbook for Palm™ Tungsten™ T Handhelds, 2002, 290 pages.
Headset Button Controller v7.3 APK Full APP Download for Andriod, Blackberry, iPhone, Available online at: http://fullappdownload.com/headset-button-controller-v7-3-apk/,, Jan. 27, 2014, 11 pages.
Horowitz Paul, "Always Show Scroll Bars in Mac OS X", OS X Daily, available online at:URL:http:jjosxdaily.com/2011/08/03/show-scroll-bars-mac-os-x-lion/, Aug. 3, 2011, 7 pages.
Instruction Manual, Detailed version, KDDI Corporation, No. 1, vol. 1,, Jun. 2014, 4 pages.
Intention to Grant received for Danish Patent Application No. PA201570496 , dated Feb. 17, 2016, 6 pages.
Intention To Grant received for Danish Patent Application No. PA201570563, dated Mar. 17, 2016, 7 pages.
Intention To Grant received for Danish Patent Application No. PA201570781, dated Dec. 8, 2016, 2 pages.
Intention to Grant received for Danish Patent Application No. PA201670117, dated Apr. 21, 2017., 2 pages.
Intention to Grant received for Danish Patent Application No. PA201670320, dated May 17, 2018, 2 pages.
Intention to Grant received for Danish Patent Application No. PA201770794, dated Aug. 15, 2019, 2 pages.
Intention to Grant received for Danish Patent Application No. PA201870631, dated Apr. 5, 2019, 2 pages.
Intention to Grant received for Danish Patent Application No. PA201870632, dated Apr. 5, 2019, 2 pages.
Intention to Grant received for Danish Patent Application No. PA201970259, dated Mar. 23, 2021, 2 pages.
Intention to Grant received for European Patent Application No. 06846397.5, dated Sep. 5, 2018, 7 pages.
Intention to Grant received for European Patent Application No. 09162953.5, dated Mar. 19, 2019, 7 pages.
Intention to Grant received for European Patent Application No. 14772001.5, dated Jul. 18, 2019, 16 pages.
Intention to Grant received for European Patent Application No. 14772001.5, dated Mar. 22, 2019, 17 pages.
Intention to Grant received for European Patent Application No. 14772002.3, dated Jun. 24, 2019, 9 pages.
Intention to Grant received for European Patent Application No. 14772002.3, dated Nov. 6, 2019, 9 pages.
Intention to Grant received for European Patent Application No. 14772494.2, dated Mar. 16, 2020, 10 pages.
Intention to Grant received for European Patent Application No. 15711969.4, dated May 29, 2019, 11 pages.
Intention to Grant received for European Patent Application No. 15730925.3, dated Aug. 16, 2021, 10 pages.
Intention to Grant received for European Patent Application No. 15730925.3, dated May 28, 2020, 10 pages.
Intention to Grant received for European Patent Application No. 15739110.3, dated Mar. 7, 2019, 8 pages.
Intention to Grant received for European Patent Application No. 15739110.3, dated Sep. 11, 2019, 6 pages.
Intention to Grant received for European Patent Application No. 15747595.5, dated Feb. 17, 2020, 8 pages.
Intention to Grant received for European Patent Application No. 15759998.6, dated Apr. 17, 2020, 10 pages.
Intention to Grant received for European Patent Application No. 15759998.6, dated Nov. 21, 2019, 12 pages.
Intention to Grant received for European Patent Application No. 15760008.1, dated Oct. 5, 2021, 11 pages.
Intention to Grant received for European Patent Application No. 15782209.9, dated Sep. 28, 2018, 8 pages.
Intention to Grant received for European Patent Application No. 18157131.6, dated Jan. 9, 2019, 9 pages.
Intention to Grant received for European Patent Application No. 19185318.3, dated Dec. 10, 2021, 12 pages.
Intention to Grant received for European Patent Application No. 19199004.3, dated Sep. 14, 2020, 9 pages.
Intention to Grant received for Indian Patent Application No. 201617009216, dated Aug. 27, 2020, 2 pages.

(56) References Cited

OTHER PUBLICATIONS

International Preliminary Report on Patentability received for PCT Patent Application No. PCT/US2006/061337, dated Jun. 11, 2008, 6 pages.
International Preliminary Report on Patentability received for PCT Patent Application No. PCT/US2008/050423, dated Jul. 7, 2009, 11 pages.
International Preliminary Report on Patentability received for PCT Patent Application No. PCT/US2010/062313 dated Jul. 19, 2012, 10 pages.
International Preliminary Report on Patentability received for PCT Patent Application No. PCT/US2012/025519, dated Sep. 12, 2013, 6 pages.
International Preliminary Report on Patentability received for PCT Patent Application No. PCT/US2014/053951, dated Mar. 17, 2016, 9 pages.
International Preliminary Report on Patentability received for PCT Patent Application No. PCT/US2014/053957, dated Mar. 17, 2016, 8 pages.
International Preliminary Report on Patentability received for PCT Patent Application No. PCT/US2014/053958, dated Mar. 17, 2016, 8 pages.
International Preliminary Report on Patentability received for PCT Patent Application No. PCT/US2014/053961, dated Jul. 21, 2016, 24 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2015/019322, dated Mar. 16, 2017, 11 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/038173, dated Jan. 5, 2017, 10 pages.
International Preliminary Report on Patentability received for PCT Patent Application No. PCT/US2015/038174, dated Jan. 5, 2017, 27 pages.
International Preliminary Report on Patentability received for PCT Patent Application No. PCT/US2015/041424, dated Feb. 2, 2017, 13 Pages.
International Preliminary Report on Patentability received for PCT Patent Application No. PCT/US2015/044517, dated Mar. 16, 2017, 10 pages.
International Preliminary Report on Patentability received for PCT Patent Application No. PCT/US2015/045936, dated Mar. 16, 2017, 9 Pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2015/046262, dated Mar. 16, 2017, 26 pages.
International Preliminary Report on Patentability received for PCT Patent Application No. PCT/US2015/047704, dated Mar. 16, 2017, 19 pages.
International Preliminary Report on Patentability received for PCT Patent Application No. PCT/US2015/054310, dated Sep. 14, 2017, 7 pages.
International Preliminary Report on Patentability received for PCT Patent Application No. PCT/US2016/017271, dated Sep. 21, 2017, 13 pages.
International Preliminary Report on Patentability received for PCT Patent Application No. PCT/US2016/019637, dated Sep. 21, 2017, 12 pages.
International Preliminary Report on Patentability received for PCT Patent Application No. PCT/US2017/035554, dated Dec. 20, 2018, 39 pages.
International Preliminary Report on Patentability received for PCT Patent Application No. PCT/US2019/049237, dated Mar. 25, 2021, 15 pages.
International Preliminary Report on Patentability received for PCT Patent Application No. PCT/US2015/019320, dated Mar. 16, 2017, 10 pages.
International Preliminary Report on Patentability received for PCT Patent Application No. PCT/US2015/019321, dated Mar. 16, 2017, 8 Pages.
International Preliminary Report on Patentability received for PCT Patent Application No. PCT/US2015/046787, dated Mar. 16, 2017, 19 pages.
International Search Report and Written Opinion received for PCT Application No. PCT/US2015/034604, dated Nov. 9, 2015, 30 pages.
International Search Report and Written Opinion received for PCT Patent Application No. PCT/US2006/061337, dated Feb. 15, 2008, 7 pages.
International Search Report and Written Opinion received for PCT Patent Application No. PCT/US2008/050423, dated Sep. 1, 2008, 15 pages.
International Search Report and Written Opinion received for PCT Patent Application No. PCT/US2012/025519, dated Jun. 11, 2012, 7 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019317, dated Aug. 25, 2015, 24 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/038173 dated Sep. 25, 2015, 13 pages.
International Search Report and Written Opinion received for PCT Patent Application No. PCT/US2015/038174, dated Jan. 18, 2016, 38 pages.
International Search Report and Written Opinion received for PCT Patent Application No. PCT/US2015/041424, dated Mar. 31, 2016, 18 pages.
International Search Report and Written Opinion received for PCT Patent Application No. PCT/US2015/044517, dated Oct. 28, 2015, 13 pages.
International Search Report and Written Opinion received for PCT Patent Application No. PCT/US2015/045936, dated Nov. 4, 2015, 12 pages, 12 pages.
International Search Report and Written Opinion received for PCT Patent Application No. PCT/US2015/045965, dated Feb. 1, 2016, 20 pages.

(56) References Cited

OTHER PUBLICATIONS

International Search Report and Written Opinion received for PCT Patent Application No. PCT/US2015/046262, dated Mar. 15, 2016, 34 pages.
International Search Report and Written Opinion received for PCT Patent Application No. PCT/US2015/046787, dated Apr. 1, 2016, 26 pages.
International Search Report and Written Opinion received for PCT Patent Application No. PCT/US2015/047704, dated Feb. 22, 2016, 25 pages.
International Search Report and Written Opinion received for PCT Patent Application No. PCT/US2015/054310, dated Jan. 20, 2016, 10 pages.
International Search Report and Written Opinion received for PCT Patent Application No. PCT/US2016/017271, dated Sep. 1, 2016, 18 pages.
International Search Report and Written Opinion received for PCT Patent Application No. PCT/US2016/019637, dated Aug. 18, 2016, 18 pages.
International Search Report and Written Opinion received for PCT Patent Application No. PCT/US2017/035554, dated Sep. 22, 2017, 42 pages.
International Search Report and Written Opinion received for PCT Patent Application No. PCT/US2019/049237, dated Jan. 8, 2020, 21 pages.
International Search Report and Written Opinion received for PCT Patent Application No. PCT/US2010/062313, dated Apr. 15, 2011, 12 pages.
International Search Report and Written Opinion received for PCT Patent Application No. PCT/US2015/034607, dated Dec. 1, 2015, 23 pages.
International Search Report received for PCT Patent Application No. PCT/US2014/053961, dated Jul. 11, 2016, 10 pages.
International Written Opinion received for PCT Patent Application No. PCT/US2014/053961, dated Jul. 11, 2016, 22 pages.
Inventerium,"Tropical Fish 14", Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604 dated Sep. 4, 2015, 6 pages.
Invitation to Additional Fees and Partial International Search Report received for PCT Patent Application No. PCT/US2015/034606 dated Sep. 9, 2015, 6 pages.
Invitation to Pay Additional Fee received for European Patent Application No. 15747595.5, dated Feb. 9, 2018, 6 pages.
Invitation to Pay Additional Fees received for PCT Patent Application No. PCT/US2014/053961, dated Aug. 3, 2015, 6 pages.
Invitation to Pay Additional Fees received for PCT Patent Application No. PCT/US2015/019317, dated May 22, 2015, 7 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/038174, dated Oct. 5, 2015, 5 pages.
Invitation to Pay Additional Fees received for PCT Patent Application No. PCT/US2015/041424, dated Nov. 12, 2015, 6 pages.
Invitation to Pay Additional Fees received for PCT Patent Application No. PCT/US2015/046262, dated Nov. 23, 2015, 7 pages.
Invitation to Pay Additional Fees received for PCT Patent Application No. PCT/US2015/046787, dated Dec. 15, 2015, 8 pages.
Invitation to Pay Additional Fees received for PCT Patent Application No. PCT/US2015/047704, dated Dec. 16, 2015, 10 pages.
Invitation to Pay Additional Fees received for PCT Patent Application No. PCT/US2016/017271, dated May 25, 2016, 7 pages.
Invitation to Pay Additional Fees received for PCT Patent Application No. PCT/US2016/019637, dated Jun. 1, 2016, 6 pages.
Invitation to Pay Additional Fees received for PCT Patent Application No. PCT/US2017/035554, dated Jul. 20, 2017, 2 pages.
Invitation to Pay Additional Fees received for PCT Patent Application No. PCT/US2019/049237, dated Oct. 31, 2019, 18 pages.
Invitation to Pay Search Fees received for European Patent Application No. 15753796.0, dated Mar. 24, 2020, 3 pages.
Iphone,"User Guide for iOS 7.1 Software", Mar. 2014, 162 pages.
Jepson Tom, "How to auto-forward specific emails in gmail?", Available online at <http://www.tomjepson.co.uk/how-to-auto-forward-specific-emails-in-gmail/>, May 19, 2013, 7 pages.
Kenney Briley, "How To Customize a Smartwatch and other Personalization Questions", Available online at: <https://smartwatches.org/learn/customize-smartwatch/>, Jan. 23, 2014, 3 pages.
Kidizoom Smartwatch, Available online at <URL:https://www.vtechnl.com/media/downloads/Kidizoom-Smart-Watch.pdf>, Jun. 24, 2014, 23 pages.
Kinect Gesture Commands—Kinect Voice Commands, Xbox Wire, Available Online At: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
Link to Wayback Machine with link to Google Play showing different layouts of complications associated with a clock face, available online at: https://play.google.com/store/apps/details?id=com.levelup.beautifulwidgets.free&hl=da >, Sep. 9, 2013, 6 pages.
Living Earth, available at : http;//www.livingearthapp.com/, 2014, 6 pages.
Lyons et al., "Facet: A Multi-Segment Wrist Worn System", Online available at: <http://fetlab.io/publications/2012-Facet-a%20multi-segment%20wrist%20worn%20system.pdf>, Oct. 7-10, 2012, pp. 123-129.
Microsoft Outlook 2003 Basic Guide, available at<http://it.med.miami.edu/documents/outlook_2003_guide.pdf>, Aug. 15, 2005, 32 pages.
Microsoft Outlook 2010(TM) A Beginners Guide, Available online at:—http://www.reading.ac.uk/web/files/its/outlook2010.pdf, Apr. 1, 2012, 24 pages.
Microsoft,"Microsoft Outlook Calendar", Available at <http://emedia.leeward.hawaii.edu/teachtech/documents/Personal_Manage/MSOutlook_Cal.pdf>, May 3, 2012, 9 pages.
Minutes of Oral Proceedings received for European Patent Application No. 06846397.5, mailed on Aug. 31, 2018, 12 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
Minutes of the Oral Proceedings received for European Application No. 15711969.4, mailed on May 16, 2019, 7 pages.
Minutes of the Oral Proceedings received for European Patent Application No. 15760008.1, mailed on Sep. 21, 2021, 6 pages.
Minutes of the Oral Proceedings received for European Patent Application No. 17810749.6, mailed on Jan. 26, 2021, 8 pages.
Mugs, Online Available at: https://web.archive.org/web/20151029034349/http://le-mugs.com/, Oct. 29, 2015, 14 pages.
Narayanaswami et al., "Challenges and considerations for the design and production of a purpose-optimized body-worn wristwatch computer", Online available at https://www.spiedigitallibrary.org/conference-proceedings-of-spie/5443/0000/Challenges-and-considerations-for-the-design-and-production-of-a/10.1117/12.561263.short?SSO=1, Defense and Security, Florida, United States, Sep. 15, 2004, 13 pages.
NBC News, "NBC News—YouTube Democratic Debate (full)", Online available at:—https://www.youtube.com/watch?v=ti2Nokoq1J4, Jan. 17, 2016, 1 page.
Nerdtalk,"The Best Android Clock Widgets", available at: https://www.youtube.com/watch?v=E1bAprWByfU, Apr. 25, 2011, 1 page.
Netsapiens,"Click to Call in MS Outlook", Available online at <https://netsapiens.com/click-to-call-in-ms-outlook-windows-apps/>, May 4, 2012, 8 pages.
New, but unsigned—Easy Stopwatch for Symbian, XP55393563, Available online at <http://www.allaboutsymbian.com/flow/item/19490_New_but_unsigned-Easy_StopWatc.php>, Mar. 15, 2014, 15 pages.
Non Final Office Action received for U.S. Appl. No. 12/788,280, dated Oct. 15, 2012, 11 pages.
Non Final Office Action received for U.S. Appl. No. 11/069,977, dated Aug. 9, 2011, 18 pages.

(56) References Cited

OTHER PUBLICATIONS

Non Final Office Action received for U.S. Appl. No. 11/069,977, dated Jul. 31, 2009, 13 pages.
Non Final Office Action received for U.S. Appl. No. 11/069,977, dated Sep. 19, 2008, 12 pages.
Non Final Office Action received for U.S. Appl. No. 12/789,433, dated Sep. 13, 2012, dated Sep. 13, 2012, 11 pages.
Non Final Office Action received for U.S. Appl. No. 11/069,977, dated Oct. 4, 2010, 15 pages.
Non Final Office Action received for U.S. Appl. No. 14/815,890, dated Jun. 6, 2017, 19 pages.
Non Final Office Action received for U.S. Appl. No. 14/815,890, dated Oct. 19, 2015, 5 pages.
Non Final Office Action received for U.S. Appl. No. 14/822,769, dated Feb. 5, 2016, 14 pages.
Non Final Office Action received for U.S. Appl. No. 14/833,014, dated Mar. 21, 2016, 26 pages.
Non-Final Office Action received for U.S. Appl. No. 17/013,778, dated Aug. 20, 2021, 9 pages.
Non-Final Office Action received for U.S. Appl. No. 14/805,403, dated Nov. 16, 2017, 21 pages.
Non-Final Office Action received for U.S. Appl. No. 11/322,553, dated Apr. 5, 2010, 18 pages.
Non-Final Office Action received for U.S. Appl. No. 11/322,553, dated Dec. 26, 2008, 26 pages.
Non-Final Office Action received for U.S. Appl. No. 11/322,553, dated Feb. 5, 2008, 11 pages.
Non-Final Office Action received for U.S. Appl. No. 11/322,553, dated Jun. 15, 2007, 16 pages.
Non-Final Office Action received for U.S. Appl. No. 11/322,553, dated Jun. 17, 2009, 27 pages.
Non-Final Office Action received for U.S. Appl. No. 11/522,167, dated Dec. 6, 2012, 15 pages.
Non-Final Office Action received for U.S. Appl. No. 11/522,167, dated Feb. 5, 2009, 9 pages.
Non-Final Office Action received for U.S. Appl. No. 11/522,167, dated Jan. 20, 2010, 10 pages.
Non-Final Office Action received for U.S. Appl. No. 11/522,167, dated May 2, 2007, 8 pages.
Non-Final Office Action received for U.S. Appl. No. 11/522,167, dated Oct. 19, 2007, 10 pages.
Non-Final Office Action received for U.S. Appl. No. 11/618,633, dated Jan. 20, 2010, 19 pages.
Non-Final Office Action received for U.S. Appl. No. 11/969,786, dated Dec. 8, 2011, 21 pages.
Non-Final Office Action received for U.S. Appl. No. 11/969,786, dated Feb. 11, 2011, 27 pages.
Non-Final Office Action received for U.S. Appl. No. 12/567,171, dated Jul. 6, 2012, 13 pages.
Non-Final Office Action received for U.S. Appl. No. 13/038,276, dated Jul. 29, 2015, 31 pages.
Non-Final Office Action received for U.S. Appl. No. 13/038,276, dated Sep. 12, 2013, dated Sep. 12, 2013, 24 pages.
Non-Final Office Action received for U.S. Appl. No. 14/641,308, dated Dec. 20, 2018, 43 pages.
Non-Final Office Action received for U.S. Appl. No. 14/641,308, dated Jun. 23, 2017, 53 pages.
Non-Final Office Action received for U.S. Appl. No. 14/752,776, dated Jan. 2, 2018, 30 pages.
Non-Final Office Action received for U.S. Appl. No. 14/752,776, dated Nov. 5, 2018, 48 pages.
Non-Final Office Action received for U.S. Appl. No. 14/815,879, dated Dec. 15, 2016, 33 pages.
Non-Final Office Action received for U.S. Appl. No. 14/815,890, dated Dec. 18, 2018, 21 pages.
Non-Final Office Action received for U.S. Appl. No. 14/822,769, dated Jun. 29, 2016, 14 pages.
Non-Final Office Action received for U.S. Appl. No. 14/822,769, dated May 4, 2017, 21 pages.
Non-Final Office Action received for U.S. Appl. No. 14/822,769, dated May 24, 2018, 30 pages.
Non-Final Office Action received for U.S. Appl. No. 14/829,573, dated Jan. 22, 2018, 26 Pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017., 24 pages.
Non-Final Office Action received for U.S. Appl. No. 14/839,912, dated Feb. 26, 2019, 36 pages.
Non-Final Office Action received for U.S. Appl. No. 14/839,914, dated Oct. 19, 2017, 46 pages.
Non-Final Office Action received for U.S. Appl. No. 14/841,402, dated Jan. 25, 2017, 18 pages.
Non-Final Office Action received for U.S. Appl. No. 14/841,608, dated Apr. 12, 2017, 9 Pages.
Non-Final Office Action received for U.S. Appl. No. 14/841,614, dated Jul. 27, 2017, 13 pages.
Non-Final Office Action received for U.S. Appl. No. 14/841,623, dated Feb. 2, 2017, 17 pages.
Non-Final Office Action received for U.S. Appl. No. 14/841,646, dated Dec. 1, 2017, 23 pages.
Non-Final Office Action received for U.S. Appl. No. 14/841,656, dated Jul. 26, 2017, 20 pages.
Non-Final Office Action received for U.S. Appl. No. 14/913,345, dated Apr. 5, 2018, 15 pages.
Non-Final Office Action received for U.S. Appl. No. 14/913,349, dated Apr. 2, 2019, 15 pages.
Non-Final Office Action received for U.S. Appl. No. 14/913,349, dated Apr. 22, 2020, 20 pages.
Non-Final Office Action received for U.S. Appl. No. 14/913,349, dated Jan. 2, 2020, 25 pages.
Non-Final Office Action received for U.S. Appl. No. 14/913,349, dated Jan. 11, 2018, 6 pages.
Non-Final Office Action received for U.S. Appl. No. 14/913,350, dated May 14, 2018, 30 pages.
Non-Final Office Action received for U.S. Appl. No. 15/049,049 dated Dec. 15, 2017, 23 pages.
Non-Final Office Action received for U.S. Appl. No. 15/049,049, dated Feb. 6, 2019, 21 pages.
Non-Final Office Action received for U.S. Appl. No. 15/049,049, dated Nov. 9, 2016, 21 pages.
Non-Final Office Action received for U.S. Appl. No. 15/049,052, dated May 31, 2018, 15 pages.
Non-Final Office Action received for U.S. Appl. No. 15/049,052, dated Nov. 29, 2016, 13 pages.
Non-Final Office Action received for U.S. Appl. No. 15/049,052, dated Sep. 21, 2017., 14 pages.
Non-Final Office Action received for U.S. Appl. No. 15/049,058, dated Feb. 20, 2018, 21 pages.
Non-Final Office Action received for U.S. Appl. No. 15/049,058, dated Jun. 5, 2019, 25 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.
Non-Final Office Action received for U.S. Appl. No. 15/128,952, dated Apr. 1, 2019, 20 pages.
Non-Final Office Action received for U.S. Appl. No. 15/128,952, dated Dec. 29, 2017, 13 pages.
Non-Final Office Action received for U.S. Appl. No. 15/352,215, dated Sep. 20, 2018, 31 pages.
Non-Final Office Action received for U.S. Appl. No. 15/355,956, dated May 31, 2019, 32 pages.
Non-Final Office Action received for U.S. Appl. No. 15/405,122, dated Apr. 2, 2021, 35 pages.
Non-Final Office Action received for U.S. Appl. No. 15/405,122, dated May 31, 2019, 43 pages.
Non-Final Office Action received for U.S. Appl. No. 15/405,122, dated Sep. 24, 2020, 30 pages.
Non-Final Office Action received for U.S. Appl. No. 15/418,537, dated Dec. 13, 2018, 53 pages.

(56) References Cited

OTHER PUBLICATIONS

Non-Final Office Action received for U.S. Appl. No. 15/608,848, dated Feb. 6, 2020, 12 pages.
Non-Final Office Action received for U.S. Appl. No. 15/608,848, dated Feb. 12, 2021, 14 pages.
Non-Final Office Action received for U.S. Appl. No. 15/608,848, dated Nov. 2, 2018, 21 pages.
Non-Final Office Action received for U.S. Appl. No. 15/655,253, dated Jul. 10, 2019, 16 pages.
Non-Final Office Action received for U.S. Appl. No. 15/655,253, dated Sep. 10, 2020, 17 pages.
Non-Final Office Action received for U.S. Appl. No. 15/818,500, dated Aug. 30, 2019, 17 pages.
Non-Final Office Action received for U.S. Appl. No. 15/818,500, dated Jul. 12, 2021, 18 pages.
Non-Final Office Action received for U.S. Appl. No. 16/103,699, dated Nov. 30, 2018, 14 pages.
Non-Final Office Action received for U.S. Appl. No. 16/144,950, dated Mar. 6, 2019, 24 pages.
Non-Final Office Action received for U.S. Appl. No. 16/147,413, dated Mar. 11, 2020, 22 pages.
Non-Final Office Action received for U.S. Appl. No. 16/147,413, dated Feb. 7, 2019, 18 pages.
Non-Final Office Action received for U.S. Appl. No. 16/147,523, dated Dec. 27, 2019, 11 pages.
Non-Final Office Action received for U.S. Appl. No. 16/147,523, dated Jul. 21, 2021, 20 pages.
Non-Final Office Action received for U.S. Appl. No. 16/259,954, dated Feb. 5, 2020, 10 pages.
Non-Final Office Action received for U.S. Appl. No. 16/263,280, dated Jul. 27, 2020, 11 pages.
Non-Final Office Action received for U.S. Appl. No. 16/265,938, dated Nov. 4, 2019, 28 pages.
Non-Final Office Action received for U.S. Appl. No. 16/358,483, dated May 1, 2020, 37 pages.
Non-Final Office Action received for U.S. Appl. No. 16/377,892, dated May 21, 2020, 9 pages.
Non-Final Office Action received for U.S. Appl. No. 16/378,136, dated Jun. 2, 2020, 8 pages.
Non-Final Office Action received for U.S. Appl. No. 16/384,726, dated May 14, 2020, 16 pages.
Non-Final Office Action received for U.S. Appl. No. 16/525,082, dated Jul. 9, 2020, 20 pages.
Non-Final Office Action received for U.S. Appl. No. 16/723,583, dated Aug. 13, 2020, 13 pages.
Non-Final Office Action received for U.S. Appl. No. 16/734,173, dated Jan. 6, 2021, 14 pages.
Non-Final Office Action received for U.S. Appl. No. 16/734,173, dated Jul. 23, 2020, 16 pages.
Non-Final Office Action received for U.S. Appl. No. 16/734,173, dated Nov. 2, 2021, 13 pages.
Non-Final Office Action received for U.S. Appl. No. 16/775,528, dated Nov. 20, 2020, 15 pages.
Non-Final Office Action received for U.S. Appl. No. 16/775,528, dated Sep. 13, 2021, 14 pages.
Non-Final Office Action received for U.S. Appl. No. 16/806,981, dated Nov. 13, 2020, 22 pages.
Non-Final Office Action received for U.S. Appl. No. 16/806,981, dated Sep. 1, 2021, 27 pages.
Non-Final Office Action received for U.S. Appl. No. 16/871,995, dated Apr. 26, 2021, 14 pages.
Non-Final Office Action received for U.S. Appl. No. 16/935,002, dated Jun. 25, 2021, 20 pages.
Non-Final Office Action received for U.S. Appl. No. 16/943,737, dated Jun. 25, 2021, 18 pages.
Non-Final Office Action received for U.S. Appl. No. 17/031,833, dated Dec. 7, 2020, 13 pages.
Non-Final Office Action received for U.S. Appl. No. 17/103,436, dated Aug. 18, 2021, 16 pages.
Non-Final Office Action received for U.S. Appl. No. 17/212,850, dated Oct. 8, 2021, 14 pages.
Non-Final Office Action received for U.S. Appl. No. 10/213,929, dated Aug. 24, 2005, 12 pages.
Non-Final Office Action received for U.S. Appl. No. 10/213,929, dated Feb. 12, 2007, 27 pages.
Non-Final Office Action received for U.S. Appl. No. 10/213,929, dated May 5, 2004, 11 pages.
Non-Final Office Action received for U.S. Appl. No. 14/839,912, dated Feb. 12, 2018., 30 pages.
Non-Final Office Action received for U.S. Appl. No. 14/913,345, dated Jun. 26, 2019, 23 pages.
Non-Final Office Action received for U.S. Appl. No. 13/963,455, dated Dec. 21, 2015, 17 pages.
Non-Final office Action Received for U.S. Appl. No. 14/839,912, dated Jun. 8, 2017, 26 pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Notice of Acceptance received for Australian Patent Application No. 2014315319, dated Oct. 12, 2017, 3 pages.
Notice of Acceptance received for Australian Patent Application No. 2014315324, dated Sep. 28, 2017, 3 pages.
Notice of Acceptance received for Australian Patent Application No. 2014315325, dated Apr. 19, 2017, 3 Pages.
Notice of Acceptance received for Australian Patent Application No. 2015267671, dated Apr. 4, 2018, 3 pages.
Notice of Acceptance received for Australian Patent Application No. 2015279544, dated Mar. 1, 2018, 3 pages.
Notice of Acceptance received for Australian Patent Application No. 2015298710, dated Oct. 8, 2019, 3 pages.
Notice of Acceptance received for Australian Patent Application No. 2016231598, dated Mar. 1, 2018, 3 pages.
Notice of Acceptance received for Australian Patent Application No. 2017276285, dated Apr. 3, 2019, 3 pages.
Notice of Acceptance received for Australian Patent Application No. 2017277971, dated Feb. 17, 2021, 3 pages.
Notice of Acceptance received for Australian Patent Application No. 2018200289, dated Jul. 23, 2019, 3 pages.
Notice of Acceptance received for Australian Patent Application No. 2018201089, dated May 28, 2021, 3 pages.
Notice of Acceptance received for Australian Patent Application No. 2018202751, dated Sep. 4, 2019, 3 pages.
Notice of Acceptance received for Australian Patent Application No. 2018204286, dated Feb. 27, 2020, 3 pages.
Notice of Acceptance received for Australian Patent Application No. 2019201628, dated Sep. 10, 2019, 3 pages.
Notice of Acceptance received for Australian Patent Application No. 2019206101, dated Dec. 11, 2020, 3 pages.
Notice of Acceptance received for Australian Patent Application No. 2019272034, dated Dec. 14, 2020, 3 pages.
Notice of Acceptance received for Australian Patent Application No. 2020203919, dated Sep. 3, 2021, 3 pages.
Notice of Acceptance received for Australian Patent Application No. 2015279545, dated Feb. 9, 2018, 3 pages.
Notice of Allowance and Search Report received for Taiwanese Patent Application No. 104128687, dated Jun. 7, 2016, 4 pages.
Notice of Allowance received for Chinese Patent Application No. 201480059543.9, dated Sep. 4, 2019, 2 pages.
Notice of Allowance received for Chinese Patent Application No. 201480060044.1, dated Mar. 29, 2019, 3 pages.
Notice of Allowance received for Chinese Patent Application No. 201480060082.7, dated Mar. 12, 2019, 2 pages.
Notice of Allowance received for Chinese Patent Application No. 201510335314.1, dated Feb. 28, 2019, 3 pages.
Notice of Allowance received for Chinese Patent Application No. 201510479088.4, dated Jan. 21, 2021, 2 pages.

(56) References Cited

OTHER PUBLICATIONS

Notice of Allowance received for Chinese Patent Application No. 201510481525.6, dated May 27, 2019, 2 pages.
Notice of Allowance received for Chinese Patent Application No. 201510483268.X, dated Nov. 6, 2019, 2 pages.
Notice of Allowance received for Chinese Patent Application No. 201510483305.7, dated Jan. 8, 2019, 3 pages.
Notice of Allowance received for Chinese Patent Application No. 201510484514.3, dated Jun. 6, 2019, 2 pages.
Notice of Allowance received for Chinese Patent Application No. 201510557356.X, dated Mar. 5, 2020, 2 pages.
Notice of Allowance received for Chinese Patent Application No. 201520594249.X, dated Jul. 12, 2016, 4 pages.
Notice of Allowance received for Chinese Patent Application No. 201580028505.1, dated Sep. 19, 2019, 2 pages.
Notice of Allowance received for Chinese Patent Application No. 201580029054.3, dated Jul. 19, 2019, 2 pages.
Notice of Allowance received for Chinese Patent Application No. 201580077206.7, dated Feb. 3, 2021, 2 pages.
Notice of Allowance received for Chinese Patent Application No. 201680012936.3, dated Jul. 13, 2021, 4 pages.
Notice of Allowance received for Chinese Patent Application No. 201710439448.7, dated Jan. 26, 2021, 2 pages.
Notice of Allowance received for Chinese Patent Application No. 201810074876.9, dated Jan. 12, 2021, 2 pages.
Notice of Allowance received for Chinese Patent Application No. 201910454069.4, dated Nov. 2, 2020, 7 pages.
Notice of Allowance received for Chinese Patent Application No. 201910454076.4, dated Feb. 4, 2021, 2 pages.
Notice of Allowance received for Chinese Patent Application No. 201911127193.6, dated May 8, 2021, 4 pages.
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Danish Patent Application No. PA201570563, dated May 24, 2016, 2 pages.
Notice of Allowance received for Danish Patent Application No. PA201570667, dated Nov. 11, 2016, 2 pages.
Notice of Allowance received for Danish Patent Application No. PA201570776, dated Feb. 8, 2017, 2 pages.
Notice of Allowance received for Danish Patent Application No. PA201670118, dated Mar. 30, 2017., 2 pages.
Notice of Allowance received for Japanese Patent Application No. 2016-537945, dated Aug. 3, 2018, 4 pages.
Notice of Allowance received for Japanese Patent Application No. 2016-537946, dated Mar. 26, 2018, 4 pages.
Notice of Allowance received for Japanese Patent Application No. 2016-537947, dated Jun. 5, 2017, 6 pages.
Notice of Allowance received for Japanese Patent Application No. 2016-537948, dated Nov. 11, 2019, 3 pages.
Notice of Allowance received for Japanese Patent Application No. 2016-569669, dated Mar. 19, 2018, 4 pages.
Notice of Allowance received for Japanese Patent Application No. 2017-505450, dated Mar. 9, 2018, 10 pages.
Notice of Allowance received for Japanese Patent Application No. 2017-505842, dated Mar. 16, 2020, 4 pages.
Notice of Allowance received for Japanese Patent Application No. 2017-505847, dated May 20, 2019, 4 pages.
Notice of Allowance received for Japanese Patent Application No. 2017-545561, dated Jul. 12, 2019, 4 pages.
Notice of Allowance received for Japanese Patent Application No. 2018-074971, dated Apr. 23, 2019, 4 pages.
Notice of Allowance received for Japanese Patent Application No. 2018-080122, dated May 7, 2021, 28 pages.
Notice of Allowance received for Japanese Patent Application No. 2018-083313, dated Jul. 1, 2019, 4 pages.
Notice of Allowance received for Japanese Patent Application No. 2018-090084, dated May 24, 2019, 4 pages.
Notice of Allowance received for Japanese Patent Application No. 2018-107114, dated Mar. 22, 2019, 4 pages.
Notice of Allowance received for Japanese Patent Application No. 2018-143982, dated Apr. 8, 2019, 4 pages.
Notice of Allowance received for Japanese Patent Application No. 2019-096219, dated Jun. 26, 2020, 4 pages.
Notice of Allowance received for Japanese Patent Application No. 2019-138053, dated Jul. 2, 2021, 4 pages.
Notice of Allowance received for Korean Patent Application No. 10-2016-7008449, dated Aug. 9, 2019, 6 pages.
Notice of Allowance received for Korean Patent Application No. 10-2016-7008488, dated Oct. 25, 2019, 4 pages.
Notice of Allowance received for Korean Patent Application No. 10-2016-7032902, dated Sep. 7, 2018, 3 pages.
Notice of Allowance received for Korean Patent Application No. 10-2017-7005939, dated Mar. 30, 2018, 5 pages.
Notice of Allowance received for Korean Patent Application No. 10-2018-7002695, dated Oct. 8, 2018, 5 pages.
Notice of Allowance received for Korean Patent Application No. 10-2018-7010872, dated Feb. 10, 2020, 6 pages.
Notice of Allowance received for Korean Patent Application No. 10-2018-7013265, dated Apr. 1, 2020, 4 pages.
Notice of Allowance received for Korean Patent Application No. 10-2018-7018904, dated Jun. 26, 2020, 4 pages.
Notice of Allowance received for Korean Patent Application No. 10-2018-7032106, dated Jun. 28, 2019, 5 pages.
Notice of Allowance received for Korean Patent Application No. 10-2018-7035747, dated Dec. 9, 2020, 5 pages.
Notice of Allowance received for Korean Patent Application No. 10-2019-7007748, dated May 6, 2020, 5 pages.
Notice of Allowance received for Korean Patent Application No. 10-2020-7019035, dated Jun. 18, 2021, 4 pages.
Notice of Allowance received for Korean Patent Application No. 10-2020-7022802, dated Mar. 4, 2021, 6 pages.
Notice of Allowance received for Korean Patent Application No. 10-2020-7026036, dated Jul. 26, 2021, 4 pages.
Notice of Allowance received for Korean Patent Application No. 10-2021-7005523, dated Aug. 26, 2021, 4 pages.
Notice of Allowance received for Netherland Patent Application No. 2019753, dated Jul. 6, 2018, 6 pages.
Notice of Allowance received for Taiwanese Patent Application No. 103130517, dated May 14, 2018, 5 pages.
Notice of Allowance received for Taiwanese Patent Application No. 103130518, dated May 19, 2016, 6 pages.
Notice of Allowance received for Taiwanese Patent Application No. 103130519, dated Oct. 27, 2016, 3 pages.
Notice of Allowance received for Taiwanese Patent Application No. 103130520, dated Apr. 25, 2018, 4 pages.
Notice of Allowance received for Taiwanese Patent Application No. 104107318, dated Oct. 19, 2021, 5 pages.
Notice of Allowance received for Taiwanese Patent Application No. 104107327, dated Jul. 19, 2019, 5 pages.
Notice of Allowance received for Taiwanese Patent Application No. 104107333, dated Nov. 8, 2016, 2 pages.
Notice Of Allowance received for Taiwanese Patent Application No. 104107334, dated Jan. 26, 2017., 3 pages.
Notice of Allowance received for Taiwanese Patent Application No. 104108223, dated Jan. 10, 2017, 3 pages.
Notice of Allowance received for Taiwanese Patent Application No. 104123593, dated Oct. 1, 2018, 4 pages.
Notice of Allowance received for Taiwanese Patent Application No. 104124962, dated Jul. 27, 2017, 3 pages.
Notice of Allowance received for Taiwanese Patent Application No. 104124963, dated Sep. 28, 2017, 5 pages.
Notice of Allowance received for Taiwanese Patent Application No. 104124995, dated Jul. 27, 2017, 3 pages.
Notice of Allowance received for Taiwanese Patent Application No. 104124997, dated Jun. 16, 2017, 5 pages.
Notice of Allowance received for Taiwanese Patent Application No. 104124998, dated Mar. 31, 2017, 3 pages.
Notice of Allowance received for Taiwanese Patent Application No. 104128519, dated Nov. 20, 2017, 5 pages.

(56) References Cited

OTHER PUBLICATIONS

Notice of Allowance received for Taiwanese Patent Application No. 104128684, dated Feb. 23, 2017, 3 pages.
Notice of Allowance received for Taiwanese Patent Application No. 104133281, dated Mar. 29, 2018, 4 pages.
Notice of Allowance received for U.S. Appl. No. 11/069,977, dated Apr. 8, 2013, 16 pages.
Notice of Allowance received for U.S. Appl. No. 11/069,977, dated May 15, 2013, 13 pages.
Notice of Allowance received for U.S. Appl. No. 14/841,608, dated Nov. 14, 2017, 5 pages.
Notice of Allowance received for U.S. Appl. No. 12/789,433, dated Apr. 4, 2013, dated Apr. 4, 2013, 26 pages.
Notice of Allowance received for U.S. Appl. No. 10/213,929, dated Nov. 15, 2007, 9 pages.
Notice of Allowance received for U.S. Appl. No. 11/618,633, dated Aug. 9, 2010, 8 pages.
Notice of Allowance received for U.S. Appl. No. 12/567,171, dated Apr. 1, 2014, 8 pages.
Notice of Allowance received for U.S. Appl. No. 12/567,171, dated Oct. 4, 2013, 9 pages.
Notice of Allowance received for U.S. Appl. No. 12/788,280, dated Mar. 12, 2014, 8 pages.
Notice of Allowance received for U.S. Appl. No. 13/038,276, dated Nov. 3, 2016, 10 pages.
Notice of Allowance received for U.S. Appl. No. 13/038,276, dated Nov. 30, 2016, 2 pages.
Notice of Allowance received for U.S. Appl. No. 13/963,455, dated Jun. 24, 2016, 6 pages.
Notice of Allowance received for U.S. Appl. No. 14/641,241, dated Apr. 13, 2017, 2 pages.
Notice of Allowance received for U.S. Appl. No. 14/641,241, dated Jan. 31, 2017, 13 pages.
Notice of Allowance received for U.S. Appl. No. 14/641,241, dated Mar. 24, 2017, 3 Pages.
Notice of Allowance received for U.S. Appl. No. 14/641,252, dated Apr. 11, 2018, 14 pages.
Notice of Allowance received for U.S. Appl. No. 14/641,252, dated Jul. 18, 2018, 9 pages.
Notice of Allowance received for U.S. Appl. No. 14/641,308, dated Jan. 15, 2020, 7 pages.
Notice of Allowance received for U.S. Appl. No. 14/805,403, dated Jul. 11, 2018, 15 pages.
Notice of Allowance received for U.S. Appl. No. 14/815,879, dated Jun. 26, 2017, 8 pages.
Notice of Allowance received for U.S. Appl. No. 14/815,890, dated Feb. 12, 2021, 8 pages.
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/822,769, dated Nov. 29, 2018, 12 pages.
Notice of Allowance received for U.S. Appl. No. 14/829,573, dated Apr. 25, 2018, 6 pages.
Notice of Allowance received for U.S. Appl. No. 14/830,629, dated Oct. 17, 2018, 8 pages.
Notice of Allowance received for U.S. Appl. No. 14/833,014, dated Nov. 20, 2019, 5 pages.
Notice of Allowance received for U.S. Appl. No. 14/839,914, dated Jun. 22, 2018., 12 pages.
Notice of Allowance received for U.S. Appl. No. 14/841,402, dated Apr. 26, 2018, 16 pages.
Notice of Allowance received for U.S. Appl. No. 14/841,614, dated Oct. 24, 2018, 10 pages.
Notice of Allowance received for U.S. Appl. No. 14/841,623, dated Feb. 23, 2018, 8 pages.
Notice of Allowance received for U.S. Appl. No. 14/841,646, dated Apr. 18, 2019, 7 pages.
Notice of Allowance received for U.S. Appl. No. 14/841,656, dated Feb. 12, 2018, 9 pages.
Notice of Allowance received for U.S. Appl. No. 14/841,656, dated Mar. 5, 2018, 3 pages.
Notice of Allowance received for U.S. Appl. No. 14/913,345, dated Feb. 10, 2020, 10 pages.
Notice of Allowance received for U.S. Appl. No. 14/913,350, dated Dec. 19, 2018, 27 pages.
Notice of Allowance received for U.S. Appl. No. 15/049,049, dated Jul. 25, 2019, 8 pages.
Notice of Allowance received for U.S. Appl. No. 15/049,052, dated Sep. 16, 2019, 5 pages.
Notice of Allowance received for U.S. Appl. No. 15/049,064, dated Jul. 18, 2017, 24 pages.
Notice of Allowance received for U.S. Appl. No. 15/352,215, dated Nov. 27, 2019, 20 pages.
Notice of Allowance received for U.S. Appl. No. 15/355,956, dated Nov. 22, 2019, 29 pages.
Notice of Allowance received for U.S. Appl. No. 15/418,537, dated Apr. 6, 2020, 9 pages.
Notice of Allowance received for U.S. Appl. No. 15/608,848, dated Aug. 25, 2021, 9 pages.
Notice of Allowance received for U.S. Appl. No. 15/608,848, dated Oct. 29, 2021, 7 pages.
Notice of Allowance received for U.S. Appl. No. 15/616,480, dated Jan. 3, 2019, 8 pages.
Notice of Allowance received for U.S. Appl. No. 15/798,257, dated May 22, 2019, 14 pages.
Notice of Allowance received for U.S. Appl. No. 15/818,500, dated Feb. 22, 2021, 11 pages.
Notice of Allowance received for U.S. Appl. No. 15/927,768, dated May 31, 2019, 13 pages.
Notice of Allowance received for U.S. Appl. No. 15/930,300, dated Aug. 5, 2020, 14 pages.
Notice of Allowance received for U.S. Appl. No. 16/055,489, dated Jan. 9, 2019, 24 pages.
Notice of Allowance received for U.S. Appl. No. 16/055,489, dated Jan. 25, 2019, 8 pages.
Notice of Allowance received for U.S. Appl. No. 16/055,489, dated Nov. 8, 2018, 28 pages.
Notice of Allowance received for U.S. Appl. No. 16/103,699, dated Apr. 11, 2019, 8 pages.
Notice of Allowance received for U.S. Appl. No. 16/109,120, dated Sep. 11, 2019, 12 pages.
Notice of Allowance received for U.S. Appl. No. 16/144,950, dated Mar. 19, 2020, 14 pages.
Notice of Allowance received for U.S. Appl. No. 16/147,413, dated Jul. 20, 2020, 11 pages.
Notice of Allowance received for U.S. Appl. No. 16/147,413, dated Nov. 5, 2020, 10 pages.
Notice of Allowance received for U.S. Appl. No. 16/259,954, dated May 7, 2020, 9 pages.
Notice of Allowance received for U.S. Appl. No. 16/263,280, dated Jun. 8, 2021, 8 pages.
Notice of Allowance received for U.S. Appl. No. 16/263,280, dated Sep. 17, 2021, 8 pages.
Notice of Allowance received for U.S. Appl. No. 16/265,938, dated Oct. 15, 2020, 8 pages.
Notice of Allowance received for U.S. Appl. No. 16/358,483, dated Jan. 19, 2021, 9 pages.

(56) References Cited

OTHER PUBLICATIONS

Notice of Allowance received for U.S. Appl. No. 16/358,483, dated May 17, 2021, 5 pages.
Notice of Allowance received for U.S. Appl. No. 16/377,892, dated May 24, 2021, 9 pages.
Notice of Allowance received for U.S. Appl. No. 16/377,892, dated Sep. 9, 2021, 9 pages.
Notice of Allowance received for U.S. Appl. No. 16/378,136, dated Jun. 3, 2021, 7 pages.
Notice of Allowance received for U.S. Appl. No. 16/378,136, dated Sep. 22, 2021, 7 pages.
Notice of Allowance received for U.S. Appl. No. 16/384,726, dated Mar. 17, 2021, 9 pages.
Notice of Allowance received for U.S. Appl. No. 16/525,082, dated Aug. 20, 2020, 5 pages.
Notice of Allowance received for U.S. Appl. No. 16/525,082, dated Nov. 17, 2020, 7 pages.
Notice of Allowance received for U.S. Appl. No. 17/031,833, dated Jun. 25, 2021, 15 pages.
Notice of Allowance received for U.S. Appl. No. 17/031,833, dated Sep. 20, 2021, 6 pages.
Notice of Allowance received for U.S. Appl. No. 17/103,436, dated Dec. 8, 2021, 12 pages.
Notice of Non-Compliant Amendment received for U.S. Appl. No. 11/522,167 dated May 14, 2008, 4 pages.
Nova,"Tour of the Solar System", Retrieved fro <http://www.pbs.org/wgbh/nova/space/tour-solar-system.html>, May 24, 2013, 14 pages.
Obara Yuuta, "iPhone Application Selection for Univesity Students", Shuwa System Co., Saito Kazukuni, vol. 1, May 16, 2013, 4 pages.
Octoba,"Just Install It—Utilizing Method for Android Application Business", Ascii Media Works Co. Takano Kiyoshi, vol. 1, Apr. 25, 2013, 6 pages.
Office Action and Search Report received for Danish Patent Application No. PA 201670118, dated Jul. 1, 2016, 7 pages.
Office Action received for Australian Patent Application No. 2015101020, dated Oct. 26, 2015, 8 pages.
Office Action received for Danish Patent Application No. PA201570499, dated Nov. 1, 2017, 6 pages.
Office Action received for Danish Patent Application No. PA201770794, dated Dec. 19, 2017., 8 pages.
Office Action received for European Patent Application No. 15711969.4, dated Nov. 17, 2017, 9 pages.
Office Action received for European Patent Application No. 15730924.6, dated Dec. 12, 2017, 8 pages.
Office Action received for Korean Patent Application No. 10-2018-7010872, dated Dec. 21, 2018, 7 pages.
Office Action received for Australian Patent Application No. 2015101019, dated Oct. 14, 2015, 3 pages.
Office Action received for Australian Patent Application No. 2014315234, dated Jul. 12, 2017., 4 pages.
Office Action received for Australian Patent Application No. 2014315234, dated Nov. 2, 2016, 3 pages.
Office Action received for Australian Patent Application No. 2014315319, dated Aug. 3, 2017, 3 pages.
Office Action received for Australian Patent Application No. 2014315319, dated Oct. 17, 2016, 3 pages.
Office Action received for Australian Patent Application No. 2014315324, dated Aug. 8, 2017, 3 pages.
Office Action received for Australian Patent Application No. 2014315324, dated Oct. 21, 2016, 3 pages.
Office Action received for Australian Patent Application No. 2014315325, dated Nov. 3, 2016, 3 pages.
Office Action received for Australian Patent Application No. 2015101019, dated Apr. 7, 2016, 4 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015267671, dated Apr. 5, 2017., 2 pages.
Office Action received for Australian Patent Application No. 2015279544, dated Apr. 18, 2017, 4 pages.
Office Action received for Australian Patent Application No. 2015279544, dated Feb. 13, 2018, 5 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016229407, dated Aug. 15, 2018, 4 pages.
Office Action received for Australian Patent Application No. 2016229407, dated May 27, 2019, 4 pages.
Office Action received for Australian Patent Application No. 2016231598, dated Apr. 7, 2017., 5 pages.
Office Action received for Australian Patent Application No. 2017100667, dated Aug. 3, 2017, 9 pages.
Office Action received for Australian Patent Application No. 2017254897, dated Aug. 29, 2018, 4 pages.
Office Action received for Australian Patent Application No. 2017254897, dated Jun. 28, 2019, 4 pages.
Office Action received for Australian Patent Application No. 2017276285, dated Nov. 26, 2018, 2 pages.
Office Action received for Australian Patent Application No. 2017277971, dated Aug. 12, 2020, 3 pages.
Office Action received for Australian Patent Application No. 2017277971, dated Jun. 3, 2020, 3 pages.
Office Action received for Australian Patent Application No. 2018100158, dated Apr. 23, 2018, 5 pages.
Office Action received for Australian Patent Application No. 2018101855, dated Feb. 22, 2019, 4 pages.
Office Action received for Australian Patent Application No. 2018200289, dated Apr. 9, 2019, 5 pages.
Office Action received for Australian Patent Application No. 2018200289, dated Dec. 4, 2018, 4 pages.
Office Action received for Australian Patent Application No. 2018200998, dated Jan. 30, 2019, 4 pages.
Office Action received for Australian Patent Application No. 2018200998, dated Mar. 9, 2018, 5 pages.
Office Action received for Australian Patent Application No. 2018201089, dated Jul. 23, 2020, 4 pages.
Office Action received for Australian Patent Application No. 2018201089, dated Oct. 11, 2019, 4 pages.
Office Action received for Australian Patent Application No. 2018202751, dated Apr. 2, 2019, 4 pages.
Office Action received for Australian Patent Application No. 2018204286, dated Apr. 17, 2019, 5 pages.
Office Action received for Australian Patent Application No. 2018204286, dated Nov. 12, 2019, 5 pages.
Office Action received for Australian Patent Application No. 2018204286, dated Sep. 5, 2019, 5 pages.
Office Action received for Australian Patent Application No. 2019201628, dated May 13, 2019, 2 pages.
Office Action received for Australian Patent Application No. 2019206101, dated Jul. 14, 2020, 4 pages.
Office Action received for Australian Patent Application No. 2019216614, dated Apr. 1, 2020, 4 pages.
Office Action received for Australian Patent Application No. 2019216614, dated Aug. 13, 2020, 4 pages.

(56) References Cited

OTHER PUBLICATIONS

Office Action received for Australian Patent Application No. 2019216614, dated Aug. 22, 2019, 3 pages.
Office Action received for Australian Patent Application No. 2019257521, dated Apr. 8, 2021, 6 pages.
Office Action received for Australian Patent Application No. 2019257521, dated Aug. 7, 2020, 5 pages.
Office Action received for Australian Patent Application No. 2019257521, dated Jul. 27, 2021, 6 pages.
Office Action received for Australian Patent Application No. 2019257521, dated Oct. 21, 2020, 6 pages.
Office Action received for Australian Patent Application No. 2019272034, dated Sep. 14, 2020, 4 pages.
Office Action received for Australian Patent Application No. 2019337519, dated Mar. 18, 2021, 5 pages.
Office Action received for Australian Patent Application No. 2019337519, dated Oct. 8, 2021, 7 pages.
Office Action received for Australian Patent Application No. 2020203919, dated Dec. 23, 2020, 5 pages.
Office Action received for Australian Patent Application No. 2020203919, dated Jul. 19, 2021, 7 pages.
Office Action received for Australian Patent Application No. 2020203919, dated Mar. 30, 2021, 5 pages.
Office Action received for Australian Patent Application No. 2020203919, dated Oct. 19, 2020, 5 pages.
Office Action received for Australian Patent Application No. 2014315234, dated Apr. 19, 2017, 4 pages.
Office Action received for Australian Patent Application No. 2015101019, dated Feb. 12, 2016, 4 pages.
Office Action received for Australian Patent Application No. 2015279545, dated Apr. 13, 2017, 3 pages.
Office Action received for Chinese Patent Application No. 201520595384.6, dated Mar. 25, 2016, 3 pages.
Office Action received for Chinese Patent Application No. 201080064146.2, dated Dec. 25, 2014, 3 pages.
Office Action received for Chinese Patent Application No. 201080064146.2, dated Jun. 12, 2014, 22 pages.
Office Action received for Chinese Patent Application No. 201480059543.9, dated Feb. 28, 2019, 16 pages.
Office Action received for Chinese Patent Application No. 201480059543.9, dated Jan. 26, 2018, 17 pages.
Office Action received for Chinese Patent Application No. 201480059543.9, dated Sep. 19, 2018, 18 pages.
Office Action received for Chinese Patent Application No. 201480060044.1, dated Jan. 26, 2018, 15 pages.
Office Action received for Chinese Patent Application No. 201480060044.1, dated Sep. 25, 2018, 6 pages.
Office Action received for Chinese Patent Application No. 201480060082.7, dated Jan. 26, 2018, 15 pages.
Office Action received for Chinese Patent Application No. 201480060082.7, dated Sep. 25, 2018, 6 pages.
Office Action received for Chinese Patent Application No. 201480060083.1, dated Aug. 13, 2019, 6 pages.
Office Action received for Chinese Patent Application No. 201480060083.1, dated Dec. 5, 2018, 11 pages.
Office Action received for Chinese Patent Application No. 201510335314.1, dated Jul. 26, 2018, 7 pages.
Office Action received for Chinese Patent Application No. 2015103353141, dated Oct. 9, 2017, 13 pages.
Office Action received for Chinese Patent Application No. 201510479088.4, dated Apr. 22, 2020, 7 pages.
Office Action received for Chinese Patent Application No. 201510479088.4, dated Mar. 12, 2018, 20 pages.
Office Action received for Chinese Patent Application No. 201510479088.4, dated May 7, 2019, 6 pages.
Office Action received for Chinese Patent Application No. 201510481525.6, dated Aug. 29, 2018, 10 pages.
Office Action received for Chinese Patent Application No. 201510481525.6, dated Nov. 29, 2017, 9 pages.
Office Action received for Chinese Patent Application No. 201510483268.X, dated Apr. 16, 2019, 6 pages.
Office Action received for Chinese Patent Application No. 201510483268.X, dated Dec. 1, 2017, 11 pages.
Office Action received for Chinese Patent Application No. 201510483268.X, dated Oct. 19, 2018, 10 pages.
Office action received for Chinese Patent Application No. 201510483305.7, dated Aug. 31, 2018, 10 pages.
Office action received for Chinese Patent Application No. 201510483305.7, dated Dec. 1, 2017, 13 pages.
Office Action received for Chinese Patent Application No. 201510484514.3, dated Apr. 4, 2018, 12 pages.
Office Action received for Chinese Patent Application No. 201510484514.3, dated Dec. 24, 2018, 13 pages.
Office Action received for Chinese Patent Application No. 201510557356.X, dated Aug. 15, 2019, 12 pages.
Office Action received for Chinese Patent Application No. 201510557356.X, dated Dec. 29, 2017, 11 pages.
Office Action received for Chinese Patent Application No. 201510557356.X, dated Nov. 23, 2018, 12 pages.
Office Action received for Chinese Patent Application No. 201520594249.X, dated Mar. 25, 2016, 3 pages.
Office Action received for Chinese Patent Application No. 201520595384.6, dated Dec. 30, 2016, 2 pages.
Office Action received for Chinese Patent Application No. 201520595384.6, dated Jul. 22, 2016, 3 pages.
Office Action received for Chinese Patent Application No. 201520595385.0, dated Dec. 30, 2016, 2 pages.
Office Action received for Chinese Patent Application No. 201520595385.0, dated Jul. 22, 2016, 3 pages.
Office Action received for Chinese Patent Application No. 201520595385.0, dated Mar. 25, 2016, 3 pages.
Office Action Received for Chinese Patent Application No. 201520595408.8, dated Dec. 9, 2015, 4 pages.
Office Action Received for Chinese Patent Application No. 201520595408.8, dated Dec. 30, 2016, 2 pages.
Office Action received for Chinese Patent Application No. 201520595408.8, dated Jul. 25, 2016, 3 pages.
Office Action received for Chinese Patent Application No. 201520595408.8, dated Mar. 25, 2016, 3 pages.
Office Action received for Chinese Patent Application No. 201520595538.1, dated Dec. 30, 2016, 2 pages.
Office Action received for Chinese Patent Application No. 201520595538.1, dated Jul. 22, 2016, 3 pages.
Office Action received for Chinese Patent Application No. 201520595538.1, dated Mar. 25, 2016, 3 pages.
Office Action received for Chinese Patent Application No. 201520679198.0, dated Jun. 24, 2016, 5 pages.
Office Action received for Chinese Patent Application No. 2015206791980, dated Mar. 7, 2016, 6 pages.
Office Action Received for Chinese Patent Application No. 2015206791980, dated Nov. 18, 2015, 4 pages.
Office Action received for Chinese Patent Application No. 201580028505.1, dated Jan. 16, 2019, 15 pages.
Office Action received for Chinese Patent Application No. 201580028505.1, dated Jun. 20, 2019, 7 pages.
Office Action received for Chinese Patent Application No. 201580029054.3, dated Dec. 5, 2018, 12 pages.
Office Action received for Chinese Patent Application No. 201580046339.8, dated Feb. 26, 2019, 18 pages.
Office Action received for Chinese Patent Application No. 201580046339.8, dated Jun. 3, 2020, 19 pages.
Office Action received for Chinese Patent Application No. 201580046339.8, dated Oct. 19, 2020, 12 pages.
Office Action received for Chinese Patent Application No. 201580046339.8, dated Oct. 31, 2019, 9 pages.
Office Action received for Chinese Patent Application No. 201580046788.2, dated Apr. 15, 2019, 13 pages.
Office Action received for Chinese Patent Application No. 201580046788.2, dated Feb. 25, 2020, 14 pages.
Office Action received for Chinese Patent Application No. 201580046788.2, dated Mar. 25, 2021, 9 pages.

(56) References Cited

OTHER PUBLICATIONS

Office Action received for Chinese Patent Application No. 201580046788.2, dated Sep. 22, 2020, 10 pages.
Office Action received for Chinese Patent Application No. 201580077206.7, dated Feb. 3, 2020, 29 pages.
Office Action received for Chinese Patent Application No. 201580077206.7, dated Nov. 11, 2020, 11 pages.
Office Action received for Chinese Patent Application No. 201621208900.6, dated Apr. 26, 2017, 2 pages.
Office Action received for Chinese Patent Application No. 201680012759.9, dated Jun. 19, 2020, 18 pages.
Office Action received for Chinese Patent Application No. 201680012936.3, dated Aug. 18, 2020, 15 pages.
Office Action received for Chinese Patent Application No. 201680012936.3, dated Dec. 1, 2020, 21 pages.
Office Action received for Chinese Patent Application No. 201680012936.3, dated Mar. 3, 2021, 12 pages.
Office Action received for Chinese Patent Application No. 201680012936.3, dated Mar. 20, 2020, 23 pages.
Office Action received for Chinese Patent Application No. 201710439448.7, dated Mar. 27, 2020, 13 pages.
Office Action received for Chinese Patent Application No. 201710439448.7, dated Oct. 10, 2020, 19 pages.
Office Action received for Chinese Patent Application No. 201780034203.4, dated Jul. 14, 2021, 12 pages.
Office Action received for Chinese Patent Application No. 201780034203.4, dated Sep. 24, 2021, 7 pages.
Office Action received for Chinese Patent Application No. 201810074876.9, dated Jul. 31, 2020, 11 pages.
Office Action received for Chinese Patent Application No. 201810411708.4, dated Feb. 26, 2021, 16 pages.
Office Action received for Chinese Patent Application No. 201910164962.3, dated Apr. 8, 2020, 25 pages.
Office Action received for Chinese Patent Application No. 201910164962.3, dated Jan. 12, 2021, 14 pages.
Office Action received for Chinese Patent Application No. 201910164962.3, dated Sep. 18, 2020, 19 pages.
Office Action received for Chinese Patent Application No. 201910454069.4, dated Dec. 20, 2019, 6 pages.
Office Action received for Chinese Patent Application No. 201910454069.4, dated Jul. 24, 2020, 8 pages.
Office Action received for Chinese Patent Application No. 201910454076.4, dated Dec. 18, 2019, 14 pages.
Office Action received for Chinese Patent Application No. 201910454076.4, dated Oct. 16, 2020, 14 pages.
Office Action received for Chinese Patent Application No. 201911127193.6, dated Dec. 17, 2020, 21 pages.
Office Action Received for Chinese Patent Application No. 201520594249.X, dated Dec. 9, 2015, 4 pages.
Office Action Received for Chinese Patent Application No. 201520595384.6, dated Dec. 9, 2015, 4 pages.
Office Action Received for Chinese Patent Application No. 201520595385.0, dated Dec. 9, 2015, 4 pages.
Office Action Received for Chinese Patent Application No. 201520595538.1, dated Dec. 9, 2015, 4 pages.
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570498, dated Oct. 30, 2015, 7 pages.
Office Action received for Danish Patent Application No. PA201570499, dated Feb. 14, 2017, 2 pages.
Office Action received for Danish Patent Application No. PA201570499, dated Jun. 16, 2016., 8 pages.
Office Action received for Danish Patent Application No. PA201570499, dated Jun. 19, 2018, 4 pages.
Office Action received for Danish Patent Application No. PA201570499, dated Nov. 3, 2015, 7 pages.
Office Action received for Danish Patent Application No. PA201570667, dated Apr. 1, 2016, 7 pages.
Office Action received for Danish Patent Application No. PA201570667, dated Sep. 2, 2016, 2 pages.
Office Action received for Danish Patent Application No. PA201570776, dated Aug. 19, 2016, 3 pages.
Office Action received for Danish Patent Application No. PA201570776, dated Jan. 26, 2016, 12 pages.
Office Action received for Danish Patent Application No. PA201570781, dated Aug. 19, 2016, 3 pages.
Office Action received for Danish Patent Application No. PA201670117, dated Jan. 12, 2017, 3 pages.
Office Action received for Danish Patent Application No. PA201670117, dated Jun. 13, 2016, 10 pages.
Office Action received for Danish Patent Application No. PA201670118, dated Feb. 2, 2017, 2 pages.
Office Action received for Danish Patent Application No. PA201670118, dated Oct. 25, 2016., 3 Pages.
Office Action received for Danish Patent Application No. PA201670319, dated Aug. 2, 2016, 6 pages.
Office Action received for Danish Patent Application No. PA201670319, dated Jun. 21, 2017, 6 pages.
Office Action received for Danish Patent Application No. PA201670319, dated Nov. 24, 2016, 7 pages.
Office Action received for Danish Patent Application No. PA201670320, dated Aug. 4, 2016, 9 pages.
Office Action received for Danish Patent Application No. PA201670320, dated Dec. 5, 2016, 4 pages.
Office Action received for Danish Patent Application No. PA201670320, dated Jan. 18, 2018, 2 pages.
Office Action received for Danish Patent Application No. PA201670320, dated Jul. 3, 2017, 4 pages.
Office Action received for Danish Patent Application No. PA201770181, dated Jan. 3, 2018, 2 Pages.
Office Action received for Danish Patent Application No. PA201770181, dated Jun. 13, 2017, 6 pages.
Office Action received for Danish Patent Application No. PA201770423, dated Jun. 12, 2018, 7 pages.
Office Action received for Danish Patent Application No. PA201770423, dated Mar. 29, 2019, 6 pages.
Office Action received for Danish Patent Application No. PA201770794, dated Apr. 5, 2018, 4 pages.
Office Action received for Danish Patent Application No. PA201770794, dated Jun. 13, 2019, 2 pages.
Office Action received for Danish Patent Application No. PA201770794, dated Oct. 30, 2018, 3 pages.
Office Action received for Danish Patent Application No. PA201970259, dated Jan. 15, 2020, 4 pages.
Office Action received for Danish Patent Application No. PA201970259, dated Nov. 23, 2020, 3 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action Received for European Patent Application No. 06846397.5, dated Aug. 15, 2013, 6 pages.

(56) References Cited

OTHER PUBLICATIONS

Office Action received for European Patent Application No. 06846397.5, dated Jan. 28, 2009, 5 pages.
Office Action received for European Patent Application No. 06846397.5, dated Jun. 20, 2016, 7 pages.
Office Action Received for European Patent Application No. 06846397.5, dated Oct. 27, 2015, 6 pages.
Office Action Received for European Patent Application No. 09162953.5, dated Aug. 15, 2013, 5 pages.
Office Action received for European Patent Application No. 09162953.5, dated Jan. 27, 2010, 6 pages.
Office Action received for European Patent Application No. 09162953.5, dated Jun. 20, 2016, 7 pages.
Office Action Received for European Patent Application No. 09162953.5, dated Oct. 27, 2015, 6 pages.
Office Action received for European Patent Application No. 14771688.0, dated Jan. 21, 2019, 8 pages.
Office Action received for European Patent Application No. 14771688.0, dated May 31, 2018, 6 pages.
Office Action received for European Patent Application No. 14771688.0, dated Nov. 30, 2017, 15 pages.
Office Action received for European Patent Application No. 14771688.0, dated Sep. 16, 2019, 7 pages.
Office Action received for European Patent Application No. 14772001.5, dated Feb. 14, 2018, 5 pages.
Office Action received for European Patent Application No. 14772001.5, dated May 30, 2017, 10 pages.
Office Action received for European Patent Application No. 14772002.3, dated Jul. 4, 2017, 8 pages.
Office Action received for European Patent Application No. 14772494.2, dated Jun. 20, 2017, 7 pages.
Office Action received for European Patent Application No. 14772494.2, dated Oct. 2, 2018, 9 pages.
Office Action received for European Patent Application No. 15730925.3, dated Apr. 12, 2018, 8 pages.
Office Action Received for European Patent Application No. 15739109.5, dated Jan. 31, 2018, 7 pages.
Office Action Received for European Patent Application No. 15739110.3, dated Jan. 31, 2018, 8 pages.
Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 15753796.0, dated Aug. 4, 2020, 9 pages.
Office Action received for European Patent Application No. 15759998.6, dated Dec. 19, 2018, 6 pages.
Office Action received for European Patent Application No. 15759998.6, dated Jul. 16, 2018, 6 pages.
Office Action received for European Patent Application No. 15759998.6, dated May 29, 2019, 6 pages.
Office Action received for European Patent Application No. 15760008.1, dated Jul. 16, 2019, 9 pages.
Office Action received for European Patent Application No. 16190252.3, dated Feb. 19, 2018, 7 pages.
Office Action received for European Patent Application No. 16708014.2, dated Apr. 3, 2019, 7 pages.
Office Action received for European Patent Application No. 16708014.2, dated Mar. 4, 2021, 7 pages.
Office Action received for European Patent Application No. 16710372.0, dated Feb. 22, 2019, 7 pages.
Office Action received for European Patent Application No. 17810749.6, dated Aug. 20, 2019, 9 pages.
Office Action received for European Patent Application No. 18157131.6, dated May 8, 2018, 12 pages.
Office Action received for European Patent Application No. 19156614.0, dated Jul. 16, 2021, 10 pages.
Office Action received for European Patent Application No. 19173371.6, dated Mar. 15, 2021, 6 pages.
Office Action received for European Patent Application No. 19173371.6, dated Nov. 12, 2019, 11 pages.
Office Action received for European Patent Application No. 19173886.3, dated Mar. 16, 2021, 6 pages.
Office Action received for European Patent Application No. 19173886.3, dated Nov. 12, 2019, 9 pages.
Office Action received for European Patent Application No. 19199004.3, dated Nov. 22, 2019, 10 pages.
Office Action received for European Patent Application No. 19203942.8, dated Oct. 29, 2021, 6 pages.
Office Action received for European Patent Application No. 19206249.5, dated Jan. 11, 2021, 8 pages.
Office Action received for European Patent Application No. 19206249.5, dated Jan. 20, 2020, 8 pages.
Office Action received for European Patent Application No. 20176616.9, dated Jun. 10, 2021, 4 pages.
Office Action received for European Patent Application No. 20217518.8, dated Apr. 30, 2021, 8 pages.
Office Action received for European Patent Application No. 21165295.3, dated Jul. 1, 2021, 10 pages.
Office Action received for European Patent Application No. 15730925.3, dated Feb. 27, 2019, 5 pages.
Office Action received for German Patent Application No. 112015003083.2, dated Mar. 9, 2018, 12 pages.
Office Action received for Indian Patent Application No. 201617008291, dated Jan. 14, 2020, 7 pages.
Office Action received for Indian Patent Application No. 201617008296, dated Jan. 14, 2020, 7 pages.
Office Action received for Indian Patent Application No. 201617009216, dated Jan. 24, 2020, 6 pages.
Office Action received for Indian Patent Application No. 201617009428, dated Feb. 26, 2020, 7 pages.
Office Action received for Indian Patent Application No. 201818001531, dated Mar. 12, 2021, 6 pages.
Office Action received for Indian Patent Application No. 202018012249, dated Nov. 1, 2021, 6 pages.
Office Action received for Indian Patent Application No. 202018015998, dated Nov. 17, 2021, 6 pages.
Office Action received for Indian Patent Application No. 202018016000, dated Nov. 16, 2021, 6 pages.
Office Action received for Indian Patent Application No. 5933/CHENP/2014, dated Feb. 7, 2020, 7 pages.
Office Action received for Japanese Patent Application No. 2016-537945, dated Apr. 7, 2017, 6 pages.
Office Action received for Japanese Patent Application No. 2016-537945, dated Jan. 9, 2018, 5 pages.
Office Action received for Japanese Patent Application No. 2016-537946, dated Aug. 7, 2017, 8 pages.
Office Action received for Japanese Patent Application No. 2016-537946, dated Jan. 30, 2017, 12 pages.
Office Action received for Japanese Patent Application No. 2016-537947, dated Feb. 24, 2017, 6 pages.
Office Action received for Japanese Patent Application No. 2016-537948, dated Apr. 6, 2018, 5 pages.
Office Action received for Japanese Patent Application No. 2016-537948, dated Jun. 9, 2017., 10 pages.
Office Action received for Japanese Patent Application No. 2016-537948, dated Sep. 3, 2018, 4 pages.
Office Action received for Japanese Patent Application No. 2017-505450, dated Jun. 20, 2017, 8 pages.
Office Action received for Japanese Patent Application No. 2017-505842, dated Feb. 22, 2019, 11 pages.
Office Action received for Japanese Patent Application No. 2017-505842, dated Sep. 9, 2019, 7 pages.
Office Action received for Japanese Patent Application No. 2017-505847, dated Feb. 12, 2019, 13 pages.
Office Action received for Japanese Patent Application No. 2017-510631, dated Mar. 2, 2018, 12 pages.
Office Action received for Japanese Patent Application No. 2017-545561, dated Aug. 6, 2018, 8 pages.
Office Action received for Japanese Patent Application No. 2018-074971, dated Jan. 28, 2019, 6 pages.

(56) References Cited

OTHER PUBLICATIONS

Office Action received for Japanese Patent Application No. 2018-080122, dated Aug. 9, 2019, 5 pages.
Office Action received for Japanese Patent Application No. 2018-080122, dated Jan. 28, 2019, 11 pages.
Office Action received for Japanese Patent Application No. 2018-080122, dated Nov. 27, 2020, 16 pages.
Office Action received for Japanese Patent Application No. 2018-083313, dated Feb. 12, 2019, 4 pages.
Office Action received for Japanese Patent Application No. 2018-090084, dated Feb. 15, 2019, 6 pages.
Office Action received for Japanese Patent Application No. 2018-107114, dated Oct. 9, 2018, 4 pages.
Office Action received for Japanese Patent Application No. 2018-143982, dated Dec. 7, 2018, 10 pages.
Office Action received for Japanese Patent Application No. 2019-088503, dated Apr. 2, 2021, 6 pages.
Office Action received for Japanese Patent Application No. 2019-088503, dated Jul. 31, 2020, 7 pages.
Office Action received for Japanese Patent Application No. 2019-116590, dated Mar. 15, 2021, 6 pages.
Office Action received for Japanese Patent Application No. 2019-116590, dated Oct. 5, 2020, 6 pages.
Office Action received for Japanese Patent Application No. 2019-138053, dated Oct. 2, 2020, 6 pages.
Office Action received for Japanese Patent Application No. 2020-124605, dated Sep. 3, 2021, 5 pages.
Office Action received for Japanese Patent Application No. 2021-510409, dated Oct. 8, 2021, 9 pages.
Office Action received for Korean Patent Application No. 10-2016-7008449, dated Jan. 12, 2017, 15 pages.
Office Action received for Korean Patent Application No. 10-2016-7008449, dated Jan. 16, 2018, 10 pages.
Office Action received for Korean Patent Application No. 10-2016-7008449, dated Nov. 27, 2017, 6 pages.
Office Action received for Korean Patent Application No. 10-2016-7008474, dated Aug. 6, 2018, 10 pages.
Office Action received for Korean Patent Application No. 10-2016-7008474, dated Dec. 30, 2016, 10 pages.
Office Action received for Korean Patent Application No. 10-2016-7008474, dated May 15, 2018, 7 pages.
Office Action received for Korean Patent Application No. 10-2016-7008474, dated Nov. 27, 2017, 6 pages.
Office Action received for Korean Patent Application No. 10-2016-7008488, dated Feb. 8, 2018, 8 pages.
Office Action received for Korean Patent Application No. 10-2016-7008488, dated Jan. 12, 2017, 14 pages.
Office Action received for Korean Patent Application No. 10-2016-7008488, dated Nov. 27, 2017, 6 pages.
Office Action received for Korean Patent Application No. 10-2016-7008682, dated Dec. 30, 2016, 11 pages.
Office Action received for Korean Patent Application No. 10-2016-7008682, dated Feb. 8, 2018., 7 pages.
Office Action received for Korean Patent Application No. 10-2016-7008682, dated Nov. 27, 2017, dated Nov. 27, 2017, 7 pages.
Office Action received for Korean Patent Application No. 10-2017-7005939, dated Jun. 30, 2017, 6 pages.
Office Action received for Korean Patent Application No. 10-2017-7024506, dated Aug. 12, 2019, 6 pages.
Office Action received for Korean Patent Application No. 10-2017-7024506, dated Feb. 19, 2020, 12 pages.
Office Action received for Korean Patent Application No. 10-2017-7024506, dated Jul. 8, 2020, 6 pages.
Office Action received for Korean Patent Application No. 10-2017-7024506, dated Sep. 28, 2018, 11 pages.
Office Action received for Korean Patent Application No. 10-2018-7002695, dated Feb. 27, 2018, 12 pages.
Office Action received for Korean Patent Application No. 10-2018-7002695, dated Jun. 19, 2018, 8 pages.
Office Action received for Korean Patent Application No. 10-2018-7010872, dated May 21, 2018, 10 pages.
Office Action received for Korean Patent Application No. 10-2018-7013265, dated Aug. 10, 2018, 12 pages.
Office Action received for Korean Patent Application No. 10-2018-7013265, dated Jun. 14, 2019, 6 pages.
Office Action received for Korean Patent Application No. 10-2018-7018904, dated Aug. 20, 2019, 8 pages.
Office Action received for Korean Patent Application No. 10-2018-7032106, dated Dec. 26, 2018, 10 pages.
Office Action received for Korean Patent Application No. 10-2018-7033888, dated Jul. 7, 2020, 7 pages.
Office Action received for Korean Patent Application No. 10-2018-7033888, dated Nov. 28, 2019, 10 pages.
Office Action received for Korean Patent Application No. 10-2018-7033888, dated Oct. 19, 2020, 10 pages.
Office Action received for Korean Patent Application No. 10-2018-7035747, dated Apr. 9, 2020, 11 pages.
Office Action received for Korean Patent Application No. 10-2018-7035747, dated Oct. 14, 2020, 6 pages.
Office Action received for Korean Patent Application No. 10-2019-7007748, dated Nov. 15, 2019, 9 pages.
Office Action received for Korean Patent Application No. 10-2019-7028736, dated May 7, 2020, 8 pages.
Office Action received for Korean Patent Application No. 10-2019-7028736, dated Nov. 28, 2019, 8 pages.
Office Action received for Korean Patent Application No. 10-2019-7028736, dated Oct. 22, 2020, 6 pages.
Office Action received for Korean Patent Application No. 10-2020-7019035, dated Aug. 28, 2020, 6 pages.
Office Action received for Korean Patent Application No. 10-2020-7022802, dated Aug. 28, 2020, 7 pages.
Office Action received for Korean Patent Application No. 10-2020-7026036, dated Dec. 7, 2020, 8 pages.
Office Action received for Korean Patent Application No. 10-2021-7001482, dated Apr. 9, 2021, 10 pages.
Office Action received for Korean Patent Application No. 10-2021-7001918, dated May 7, 2021, 5 pages.
Office Action received for Korean Patent Application No. 10-2021-7001918, dated Nov. 16, 2021, 12 pages.
Office Action received for Korean Patent Application No. 10-2021-7005523, dated Mar. 31, 2021, 8 pages.
Office Action received for Korean Patent Application No. 10-2021-7017259, dated Jul. 19, 2021, 10 pages.
Office Action received for Korean Patent Application No. 10-2018-7010872, dated Feb. 13, 2019, 7 pages.
Office Action received for Netherland Patent Application No. 2015245, dated Jan. 24, 2017, 11 pages.
Office Action received for Netherland Patent Application No. 2019753, dated Apr. 12, 2018, 8 pages.
Office Action received for Netherlands Patent Application No. 2015239, dated Oct. 28, 2016, 13 pages.
Office Action received for Taiwan Patent Application No. 103130519, dated Mar. 25, 2016, 14 pages.
Office Action Received for Taiwanese Patent Application No. 104124962, dated Nov. 29, 2016, 6 pages.
Office Action received for Taiwanese Patent Application No. 104124998, dated Nov. 29, 2016, 6 pages.
Office Action received for Taiwanese Patent Application No. 103130517, dated Feb. 6, 2018, 5 pages.
Office Action received for Taiwanese Patent Application No. 103130517, dated Feb. 22, 2016, 7 pages.
Office Action received for Taiwanese Patent Application No. 103130517, dated Jul. 29, 2016, 7 pages.
Office Action received for Taiwanese Patent Application No. 103130518, dated Oct. 15, 2015, 7 pages.
Office Action received for Taiwanese Patent Application No. 103130520, dated Apr. 17, 2017, 8 pages.
Office Action received for Taiwanese Patent Application No. 103130520, dated Jan. 23, 2018, 5 pages.
Office Action received for Taiwanese Patent Application No. 103130520, dated May 23, 2016, 38 pages.

(56) References Cited

OTHER PUBLICATIONS

Office Action received for Taiwanese Patent Application No. 103130520, dated Oct. 1, 2015, 58 pages.
Office Action received for Taiwanese Patent Application No. 103130520, dated Sep. 29, 2016, 39 pages.
Office Action received for Taiwanese Patent Application No. 104107318, dated Dec. 26, 2018, 33 pages.
Office Action received for Taiwanese Patent Application No. 104107318, dated Feb. 18, 2020, 10 pages.
Office Action received for Taiwanese Patent Application No. 104107318, dated Jul. 9, 2021, 5 pages.
Office Action received for Taiwanese Patent Application No. 104107327, dated Sep. 28, 2018, 7 pages.
Office Action received for Taiwanese Patent Application No. 104107329, dated Jul. 24, 2020, 7 pages.
Office Action received for Taiwanese Patent Application No. 104107329, dated Mar. 5, 2020, 22 pages.
Office Action received for Taiwanese Patent Application No. 104107333, dated May 17, 2016, 6 pages.
Office Action received for Taiwanese Patent Application No. 104107334, dated Sep. 19, 2016, 15 pages.
Office Action received for Taiwanese Patent Application No. 104108223, dated Apr. 25, 2016, 10 pages.
Office Action received for Taiwanese Patent Application No. 104123593, dated May 24, 2016, 57 pages.
Office Action received for Taiwanese Patent Application No. 104123593, dated Sep. 13, 2016, 8 pages.
Office Action received for Taiwanese Patent Application No. 104124963, dated Jan. 5, 2017, 11 pages.
Office Action received for Taiwanese Patent Application No. 104124995, dated Dec. 1, 2016, 6 pages.
Office Action received for Taiwanese Patent Application No. 104124997, dated Dec. 8, 2016, 12 pages.
Office Action received for Taiwanese Patent Application No. 104128519, dated Mar. 29, 2017. 16 pages.
Office Action received for Taiwanese Patent Application No. 104128684, dated Nov. 8, 2016, 24 pages.
Office Action received for Taiwanese Patent Application No. 104128701, dated Jul. 22, 2016, 25 pages.
Office Action received for Taiwanese Patent Application No. 104128701, dated Mar. 16, 2017., 8 pages.
Office Action received for Taiwanese Patent Application No. 104128705, dated Aug. 29, 2016, 18 pages.
Office Action received for Taiwanese Patent Application No. 104128705, dated Mar. 16, 2017, 3 pages.
Office Action received for Taiwanese Patent Application No. 104133281, dated Mar. 30, 2017, 10 Pages.
Office Action received for Taiwanese Patent Application No. 104133281, dated Sep. 1, 2016, 10 pages.
Office Action received for Taiwanese Patent Application No. 104120843, dated Jan. 30, 2016, 5 pages.
Office Action Recieved for Australian Patent Application No. 2015101183, dated Nov. 6, 2015, 4 pages.
Omar Romero,"Sony Smartwatch 2 Custom Watchfaces Tutorial", Retrieved From: <https://www.youtube.com/watch?v=8odbxqwSQR8>, May 1, 2014, 2 pages.
Partial European Search Report received for European Patent Application No. 19173371.6, dated Jul. 18, 2019, 17 pages.
Partial European Search Report received for European Patent Application No. 19173886.3, dated Jul. 18, 2019, 15 pages.
Partial Supplementary European Search Report received for European Patent Application No. 17810749.6, dated Apr. 25, 2019, 8 pages.
Pedersen Isabel, "Ready to Wear (or Not) Examining the Rhetorical Impact of Proposed Wearable Devices", 2013 IEEE International Symposium on Technology and Society (ISTAS) Social Implications of Wearable Computing and Augmediated Reality III Everyday Life, Dec. 31, 2013, pp. 201-202.

Pentax K20D Operating Manual, http://www.ricoh-imaging.eu/en/operating-manuals-download.html, Pentax Corporation, 2008, pp. 173-174.
Phonebuff, "Hybrid Stopwatch & Timer Android App Review", Available Online at: https://www.youtube.com/watch?v=B43oCFPiWvY, Apr. 4, 2012, 7 pages.
Potala Software,"My Time!", Available at <http://web.archive.org/web/20060615204517/potalasoftware.com/Products/MyTime/Default.aspx>, Jun. 15, 2006, 2 pages.
Pre-Interview First Office Action received for U.S. Appl. No. 14/815,890, dated May 26, 2016, 4 pages.
Raghunath et al., "User Interfaces for Applications on a Wrist Watch", Personal and Ubiquitous Computing, vol. 6, Springer Verlag, London, Ltd., 2002, pp. 17-30.
Ramos et al., "Zliding: Fluid Zooming and Sliding for High Precision Parameter Manipulation", Proceedings of the 18th annual ACM Symposium on User Interface Software and Technology,, Oct. 23-27, 2005, pp. 143-152.
Razykdreviews,"ln Depth Review of Apple Watch Activity and Workout App", available at <URL: https://www.youtube.com/watch?v=GkKI3qlK0ow>,, Category: X Claims: 1-5 Category: L Reason: Internet citation/video, May 11, 2015, 1 page.
Record of Oral Hearing received for U.S. Appl. No. 14/815,890, mailed on Nov. 20, 2020, 18 pages.
Rehman A, "Install Android 4.2 Gesture-Based Keyboard & Clock App On Jelly Bean 4.1 Or Higher", Excerpts From, Available online at <http://www.addictivetips.com/android/install-android-4-2-keyboard-clock-app-apk-on-jelly-bean-4-1-x/>, Nov. 3, 2012, 4 pages.
Rekimoto Jun, "SmartSkin: An Infrastructure for Freehand Manipulation on Interactive Surfaces", Proceedings of the SIGCHI conference on Human factors in computing systems,vol. 4, No. 1, Apr. 20-25, 2002, pp. 113-120.
Remote Phone Call, Available online at <https://web.archive.org/web/20140625104844/https://www.justremotephone.com/>, Jun. 25, 2014, 22 pages.
Responding to a meeting invitation, Available online at:—https://web.archive.org/web/20121128174157/https://www.zimbra.com/desktop7/help/en_US/Calendar/Responding_to_an_invitation.htm, Nov. 28, 2012, 1 page.
Restriction Requirement received for U.S. Appl. No. 14/815,890, dated Feb. 22, 2016, 5 pages., 5 pages.
Result of Consultation received for European Patent Application No. 15760008.1, mailed on Sep. 9, 2021, 7 pages.
Result of Consultation received for European Patent Application No. 17810749.6, mailed on Dec. 15, 2020, 3 pages.
Result of Consultation received for European Patent Application No. 17810749.6, mailed on Jan. 18, 2021, 3 pages.
Result of Consultation received for European Patent Application No. 17810749.6, mailed on Jan. 21, 2021, 18 pages.
Result of Consultation received for European Patent Application No. 15730925.3, mailed on Nov. 24, 2020, 4 pages.
Rev. Some Culture,"It's super easy for middle-aged and elderly people to learn compute", Jul. 31, 2013, 2 pages.
Rizknows,"Garmin Connect Mobile App—Review #2", https://www.youtube.com/watch?v=7my3wMpeRbE, Category: X Claims: 1-5 Category: L Reason: Internet citation/video, Oct. 22, 2015, 1 page.
Rowinski Dan, "Why The All-In-One Smartwatch Isn't Happening Any Time Soon", Online available at:—https://web.archive.org/web/20140123074218if_/https://readwrite.com/2014/01/20/smartwatch-wearable-fitness-remote-control/, Jan. 20, 2014, 6 pages.
Samsung,"SM-G900F User Manual", English (EU). Rev.1.0, Mar. 2014, 249 pages.
Search Report and Opinion received for Danish Patent Application No. PA201770423, dated Oct. 4, 2017., 10 pages.
Search Report and opinion received for Danish Patent Application No. PA201870631, dated Dec. 6, 2018, 8 pages.
Search Report and Opinion received for Danish Patent Application No. PA201870632, dated Dec. 3, 2018, 8 pages.
Search Report and Opinion received for Danish Patent Application No. PA201970259, dated Jul. 19, 2019, 10 pages.
Search Report and Opinion Received for Netherland Patent Application No. 2015232, dated Jan. 25, 2017, 9 pages.

(56) References Cited

OTHER PUBLICATIONS

Search Report and Opinion received for Netherlands Patent Application No. 2015242, dated Jul. 4, 2017., 20 pages.
Search Report and Opinion received for Netherlands Patent Application No. 2015364, dated Jul. 4, 2017, 12 pages.
Search Report and Opinion received for Netherlands Patent Application No. 2018531, dated Jul. 27, 2017, 14 pages.
Search Report received for Danish Patent Application No. PA201570781, dated Mar. 8, 2016, 10 pages.
Search Report received for European Patent Application No. 18157131.6, dated Apr. 19, 2018, 4 pages.
Search Report received for Netherlands Patent Application No. 2015236, dated Apr. 21, 2021, 19 pages.
Shankland Stephen, "Chrome OS Gets 'OK Google' Voice Search Control", available online at <http://www.cnet.com/news/chrome-os-gets-ok-google-voice-search-control/>, May 21, 2014, 4 pages.
Shiota Shinji, "Windows 7 Dojo", Weekly Ascii, Ascii Mediaworks Inc., vol. 798,, Aug. 31, 2010, 3 pages.
Smartwatch, "App Earth Space HD Live Wall paper APK for SmartWatch", Version 1.7, Android version 2.2, Aug. 27, 2013, 1 page.
Smith Rush, "Sygic. Mobile Contacts V1.0", Available online at: http://www.pocketnow.com/index.php?a=portaldetail&id=467, Sep. 2, 2004, 13 pages.
Solar Walk Free, Vito Technology, Jun. 19, 2014, 9 pages.
Sony Smartwatch 2 update—new feartures and watchface creator!!! New!!!, Online available at:—https://www.youtube.com/watch?v=k3jjBv7QZSk, May 8, 2014, 3 pages.
Sony,"Live View™ micro display", Extended User Guide, Aug. 2010, 27 pages.
Sony,"Sony Smartwatch 3 SWR50", User Guide, Jul. 2014, 31 pages.
Sony,"Sony SmartWatch", User Guide, Dec. 2011, 18 pages.
Stateoftech,"Samsung Galaxy Gear Tips—Installing and Customizing Clock Faces", Online available at:—https://www.youtube.com/watch?v=p2GzpL3xlUo, Dec. 12, 2013, 3 pages.
Stateoftech,"Samsung Galaxy Gear Tips—Change the Clock Face", Retrieved from: https://www.youtube.com/watch?v=GOom7AZUAjY, Dec. 11, 2013, 2 pages.
Summons to Attend Oral proceedings received for European Patent Application No. 06846397.5, mailed on Oct. 25, 2017, 14 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Summons to Attend Oral Proceedings received for European Patent Application No. 15711969.4, mailed on Oct. 22, 2018, 12 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 15760008.1, mailed on Feb. 5, 2021, 11 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Summons to Attend Oral Proceedings received for European Patent Application No. 17810749.6, mailed on Aug. 12, 2020, 11 pages.
Sun Set,"Sun Set solar image clock", Available at <https://web.archive.orgjweb/20140719005410/http://www.sunsetclock.com/>, 2013, 5 pages.
Supplemental Notice of Allowance received for U.S. Appl. No. 14/805,403, dated Oct. 4, 2018, 3 pages.
Supplemental Notice of Allowance received for U.S. Appl. No. 14/815,890, dated Mar. 10, 2021, 2 pages.
Supplemental Notice of Allowance received for U.S. Appl. No. 14/833,014, dated Mar. 12, 2020, 2 pages.
Supplemental Notice of Allowance received for U.S. Appl. No. 14/841,608, dated Jan. 25, 2018, 2 pages.
Supplemental Notice of Allowance received for U.S. Appl. No. 15/616,480, dated Mar. 28, 2019, 2 pages.
Supplemental Notice of Allowance received for U.S. Appl. No. 15/818,500, dated Mar. 5, 2021, 2 pages.
Supplementary European Search Report received for European Patent Application No. 17810749.6, dated Aug. 6, 2019, 6 pages.
Tablet Talk,"Tablet Talk App: Frequently Asked Questions—Tablet Talk.", available at https://web.archive.org/web/20140625102903/http://1www.tablettal app.com/faq, Jun. 25, 2014, pp. 1-6.
Talkandroid,"Android Wear walkthrough", Available online at: https://www youtube.com/watch?v=4xntpZac4sw, Jun. 30, 2014, 1 page.
Techcloud,"How to Create Custom Watch Face for Samsung Galaxy Gear Smartwatch just in Few Seconds", Online available at:—https://www.youtube.com/watch?v=6rO-_SREDjQ, Oct. 9, 2013, 3 pages.
The Complete Idiot's Guide, Microsoft Outlook 2000, Temple, published, 1999, p. 186.
The interview with a key person. IBM and Citizen met and applied Linux to a watch, Ascii Corporation, vol. 25, No. 12., Dec. 12, 2001, pp. 136-143.
The Window Club,"How to Set GIF as Background Windows 7", Online Available at <https://www.youtube.com/watch?v=tUec42Qd7ng>, Dec. 24, 2012, pp. 1-5.
Theunlockr,"How to Change the Watch Face on the Galaxy Gear", Online available at:—https://www.youtube.com/watch?v=Z7EBG5aBiZg, Jan. 3, 2014, 3 pages.
Tong et al., "Discussion About the Influence of Wearable Device on Mobile Operators'Service", Telecom science, Oct. 31, 2014, pp. 134-142.
UIKit User Interface Catalog: Page Controls, Available online at https://web.archive.org/web/20140703123442/https://developer.apple.com/library/ios/documentation/userexperience/conceptual/UIKitUICatalog/UIPageControl.html, Dec. 16, 2013, 4 pages.
Vanhemert Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.
Viticci Frederico, "Checking Time Zones with Living Earth—MacStories", Available at <https://www.macstories.net/reviews/checking-time-zones-with-living-earth/>, Dec. 11, 2013, pp. 1-5.
Watchophilia,"Mickey Mouse Watches", Online Available at: https://web.archive.org/web/20130929065422/https://www.watchophilia.com/photogallery/mickey-mouse/, Sep. 29, 2013, 16 pages.
WatchPad 1.5, Online Available at http://web.archive.org/web/20011205071448/http://www.trl.ibm.com:80/projects/ngm/index_e.htm, Dec. 5, 2001, 2 pages.
Watchpad 1.5.mpeg, YouTube.com, Online Available at <https://www.youtube.com/watch?v=7xjvVbeUn80>, Uploaded on Jun. 20 2010, 2 pages.
Watchuseek,"The watch every father needs: M-I-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.
Wikipedia,"Rotary encoder", Online Available at <https://en.wikipedia.org/wiki/Rotary_encoder>, Retrieved on May 17, 2017, 17 pages.
WZ Science Alliance,"Very simple geriatrics computer and Internet bestselling upgrade", Sep. 30, 2013, 3 pages.
Zelgadis,"Reuse Animations—Synfig Animation Studio", Available online at: https://wiki.synfig.org/index.php?title=Doc:Reuse_Animations&oldid=18173, May 20, 2013, 5 pages.
Zukerman Erez, "6 Beautiful, Interesting & Versatile Timer Apps [Android]", available at:http://www.makeuseof.com/tag/beautiful-interesting-versatile-timer-apps-android/, May 18, 2012, 5 pages.
Applicant-Initiated Interview Summary received for U.S. Appl. No. 17/516,537, dated Jul. 5, 2022, 4 pages.

(56) References Cited

OTHER PUBLICATIONS

Extended European Search Report received for European Patent Application No. 22157106.0, dated Jun. 27, 2022, 8 pages.
Final Office Action received for U.S. Appl. No. 16/871,995, dated Jul. 5, 2022, 17 pages.
Notice of Acceptance received for Australian Patent Application No. 2021201748, dated Jun. 23, 2022, 3 pages.
Notice of Allowance received for Chinese Patent Application No. 201910447678.7, dated Jun. 20, 2022, 2 pages (1 page of English Translation and 1 page of Official Copy).
Applicant Initiated Interview Summary received for U.S. Appl. No. 16/806,981, dated Jan. 28, 2022, 4 pages.
Applicant Initiated Interview Summary received for U.S. Appl. No. 16/871,995, dated Dec. 6, 2021, 4 pages.
Applicant-Initiated Interview Summary received for U.S. Appl. No. 15/818,500, dated Jan. 24, 2022, 4 pages.
Applicant-Initiated Interview Summary received for U.S. Appl. No. 16/147,523, dated Dec. 10, 2021, 4 pages.
Applicant-Initiated Interview Summary received for U.S. Appl. No. 16/734,173, dated Jan. 25, 2022, 4 pages.
Applicant-Initiated Interview Summary received for U.S. Appl. No. 16/775,528, dated Jan. 13, 2022, 4 pages.
Applicant-Initiated Interview Summary received for U.S. Appl. No. 17/212,850, dated Jan. 13, 2022, 5 pages.
Board Opinion received for Chinese Patent Application No. 201580046788.2, mailed on Dec. 29, 2021, 10 pages (4 pages of English Translation and 6 pages of Official Copy).
Decision to Grant received for European Patent Application No. 15730925.3, dated Dec. 9, 2021, 2 pages.
Examiner-Initiated Interview Summary received for U.S. Appl. No. 16/806,981, dated Jan. 13, 2022, 4 pages.
Final Office Action received for U.S. Appl. No. 16/935,002, dated Jan. 5, 2022, 25 pages.
Final Office Action received for U.S. Appl. No. 16/943,737, dated Feb. 4, 2022, 24 pages.
Non-Final Office Action received for U.S. Appl. No. 16/703,486, dated Jan. 27, 2022, 13 pages.
Non-Final Office Action received for U.S. Appl. No. 16/871,995, dated Feb. 1, 2022, 18 pages.
Non-Final Office Action received for U.S. Appl. No. 16/926,512, dated Jan. 21, 2022, 20 pages.
Non-Final Office Action received for U.S. Appl. No. 17/013,778, dated Dec. 9, 2021, 11 pages.
Notice of Acceptance received for Australian Patent Application No. 2019337519, dated Dec. 15, 2021, 3 pages.
Notice of Allowance received for Chinese Patent Application No. 201780034203.4, dated Jan. 17, 2022, 2 pages (1 page of English Translation and 1 page of Official Copy).
Notice of Allowance received for Korean Patent Application No. 10-2021-7034748, dated Jan. 27, 2022, 6 pages (2 pages of English Translation and 4 pages of Official Copy).
Office Action received for Australian Patent Application No. 2020250323, dated Dec. 14, 2021, 2 pages.
Office Action received for Chinese Patent Application No. 201810411708.4, dated Nov. 12, 2021, 12 pages (6 pages of English Translation and 6 pages of Official Copy).
Office Action received for Chinese Patent Application No. 201910447678.7, dated Nov. 29, 2021, 17 pages (7 pages of English Translation and 10 pages of Official Copy).
Office Action received for Chinese Patent Application No. 202110396782.5, dated Nov. 11, 2021, 10 pages (4 pages of English Translation and 6 pages of Official Copy).
Office Action received for European Patent Application No. 19217240.1, dated Dec. 17, 2021, 8 pages.
Office Action received for Japanese Patent Application No. 2020-124605, dated Dec. 17, 2021, 2 pages (1 page of English Translation and 1 page of Official Copy).
Office Action received for Korean Patent Application No. 10-2021-7001482, dated Jan. 24, 2022, 9 pages (4 pages of English Translation and 5 pages of Official Copy).
Office Action received for Korean Patent Application No. 10-2021-7017259, dated Jan. 10, 2022, 6 pages (3 pages of English Translation and 3 pages of Official Copy).
Summons to Attend Oral Proceedings received for European Patent Application No. 20176616.9, mailed on Dec. 17, 2021, 7 pages.
Advisory Action received for U.S. Appl. No. 16/935,002, dated May 6, 2022, 3 Pages.
Applicant-Initiated Interview Summary received for U.S. Appl. No. 16/703,486, dated May 12, 2022, 4 pages.
Decision to Grant received for German Patent Application No. 112006004220.3, dated May 3, 2022, 9 pages (1 page of English Translation and 8 pages of Official Copy).
Intention to Grant received for European Patent Application No. 16708014.2, dated May 10, 2022, 8 pages.
Non-Final Office Action received for U.S. Appl. No. 17/181,089, dated May 13, 2022, 12 pages.
Non-Final Office Action received for U.S. Appl. No. 17/516,537, dated May 5, 2022, 8 pages.
Notice of Allowance received for U.S. Appl. No. 16/926,512, dated May 18, 2022, 9 pages.
Office Action received for Indian Patent Application No. 202048033593, dated May 6, 2022, 8 pages.
Office Action received for Korean Patent Application No. 10-2021-7001918, dated Apr. 28, 2022, 7 pages (3 pages of English Translation and 4 pages of Official Copy).
Advisory Action received for U.S. Appl. No. 15/405,122, dated Apr. 18, 2022, 5 pages.
Advisory Action received for U.S. Appl. No. 15/818,500, dated Feb. 18, 2022, 4 pages.
Advisory Action received for U.S. Appl. No. 16/734,173, dated Apr. 4, 2022, 5 pages.
Applicant-Initiated Interview Summary received for U.S. Appl. No. 15/405,122, dated Mar. 1, 2022, 4 pages.
Applicant-Initiated Interview Summary received for U.S. Appl. No. 16/734,173, dated Mar. 21, 2022, 3 pages.
Applicant-Initiated Interview Summary received for U.S. Appl. No. 16/871,995, dated Apr. 5, 2022, 5 pages.
Applicant-Initiated Interview Summary received for U.S. Appl. No. 17/013,778, dated Feb. 28, 2022, 2 pages.
Corrected Notice of Allowance received for U.S. Appl. No. 16/775,528, dated Mar. 25, 2022, 2 pages.
Decision to Grant received for European Patent Application No. 19185318.3, dated Mar. 31, 2022, 3 pages.
Examiner's Answer to Appeal Brief received for U.S. Appl. No. 15/655,253, dated Mar. 10, 2022, 16 pages.
Final Office Action received for U.S. Appl. No. 16/734,173, dated Feb. 22, 2022, 16 pages.
Final Office Action received for U.S. Appl. No. 16/806,981, dated Mar. 1, 2022, 33 pages.
Final Office Action received for U.S. Appl. No. 17/013,778, dated Apr. 1, 2022, 11 pages.
Intention to Grant received for European Patent Application No. 15760008.1, dated Apr. 6, 2022, 11 pages.
Notice of Acceptance received for Australian Patent Application No. 2020250323, dated Feb. 28, 2022, 3 pages.
Notice of Allowance received for Chinese Patent Application No. 202110396782.5, dated Mar. 30, 2022, 5 pages (1 page of English Translation and 4 pages of Official Copy).
Notice of Allowance received for Japanese Patent Application No. 2019-088503, dated Feb. 18, 2022, 4 pages (1 page of English Translation and 3 pages of Official Copy).
Notice of Allowance received for U.S. Appl. No. 17/378,451, dated Apr. 4, 2022, 8 pages.
Notice of Allowance received for U.S. Appl. No. 16/775,528, dated Feb. 24, 2022, 18 pages.
Office Action received for Australian Patent Application No. 2021201748, dated Mar. 18, 2022, 6 pages.
Office Action received for Australian Patent Application No. 2021201780, dated Mar. 22, 2022, 3 pages.
Office Action received for Australian Patent Application No. 2021203636, dated Mar. 23, 2022, 3 pages.
Office Action received for Australian Patent Application No. 2022202044, dated Apr. 6, 2022, 3 pages.

(56) References Cited

OTHER PUBLICATIONS

Office Action received for Chinese Patent Application No. 201810411708.4, dated Feb. 24, 2022, 10 pages (5 pages of English Translation and 5 pages of Official Copy).
Office Action received for Chinese Patent Application No. 201910438645.6, dated Mar. 2, 2022, 11 pages (5 pages of English Translation and 6 pages of Official Copy).
Office Action received for Chinese Patent Application No. 201910446753.8, dated Mar. 2, 2022, 11 pages (5 pages of English Translation and 6 pages of Official Copy).
Office Action received for German Patent Application No. 1120060042203, dated Apr. 1, 2022, 6 pages (2 pages of English Translation and 4 pages of Official Copy).
Office Action received for Indian Patent Application No. 202018011347, dated Mar. 2, 2022, 6 pages.
Office Action received for Indian Patent Application No. 202018014953, dated Mar. 7, 2022, 7 pages.
Office Action received for Japanese Patent Application No. 2019-116590, dated Feb. 4, 2022, 17 pages (8 pages of English Translation and 9 pages of Official Copy).
Office Action received for Japanese Patent Application No. 2021-510409, dated Apr. 8, 2022, 5 pages (2 pages of English Translation and 3 pages of Official Copy).
Office Action received for Korean Patent Application No. 10-2021-7017259, dated Mar. 3, 2022, 8 pages (4 pages of English Translation and 4 pages of Official Copy).
Result of Consultation received for European Patent Application No. 20185974.1, mailed on Apr. 4, 2022, 4 pages.
Decision on Appeal received for Korean Patent Application No. 10-2021-7001482, dated Jul. 20, 2022, 27 pages (1 page of English Translation and 26 pages of Official Copy).
Extended European Search Report received for European Patent Application No. 22169639.6, dated Jul. 19, 2022, 14 pages.
Non-Final Office Action received for U.S. Appl. No. 15/818,500, dated Jul. 27, 2022, 15 pages.
Notice of Allowance received for Japanese Patent Application No. 2019-116590, dated Jul. 25, 2022, 15 pages (1 page of English Translation and 14 pages of Official Copy).
Office Action received for Australian Patent Application No. 2021212114, dated Jul. 29, 2022, 7 pages.
Applicant-Initiated Interview Summary received for U.S. Appl. No. 16/147,523, dated Jun. 13, 2022, 4 pages.
Board Decision received for Chinese Patent Application No. 201580046788.2, mailed on Jun. 6, 2022, 17 pages (1 page of English Translation and 16 pages of Official Copy).
Brief Communication Regarding Oral Proceedings received for European Patent Application No. 20176616.9, dated Jun. 9, 2022, 1 page.
Notice of Allowance received for U.S. Appl. No. 16/775,528, dated Jun. 15, 2022, 6 pages.
Office Action received for European Patent Application No. 15753796.0, dated Jun. 2, 2022, 2 pages.
Office Action received for Korean Patent Application No. 10-2021-7039120, dated May 30, 2022, 7 pages (3 pages of English Translation and 4 pages of Official Copy).
Applicant-Initiated Interview Summary received for U.S. Appl. No. 14/913,349, dated Oct. 12, 2022, 2 pages.
Applicant-Initiated Interview Summary received for U.S. Appl. No. 17/181,089, dated Oct. 7, 2022, 4 pages.
Corrected Notice of Allowance received for U.S. Appl. No. 14/913,349, dated Oct. 3, 2022, 3 pages.
Final Office Action received for U.S. Appl. No. 17/516,537, dated Oct. 11, 2022, 9 pages.
Notice of Allowance received for Korean Patent Application No. 10-2021-7039120, dated Sep. 22, 2022, 7 pages (2 pages of English Translation and 5 pages of Official Copy).
Notice of Allowance received for U.S. Appl. No. 16/147,523, dated Oct. 4, 2022, 8 pages.
Record of Oral Hearing received for U.S. Appl. No. 14/913,349 mailed on Sep. 23, 2022, 12 pages.
Record of Oral Hearing received for U.S. Appl. No. 15/655,253, mailed on Sep. 26, 2022, 14 pages.
Applicant-Initiated Interview Summary received for U.S. Appl. No. 16/871,995, dated Oct. 18, 2022, 4 pages.
Applicant-Initiated Interview Summary received for U.S. Appl. No. 15/818,500, dated Oct. 21, 2022, 4 pages.
Extended European Search Report received for European Patent Application No. 22179347.4, dated Oct. 13, 2022, 7 pages.
Final Office Action received for U.S. Appl. No. 17/181,089, dated Oct. 21, 2022, 15 pages.
Notice of Allowance received for U.S. Appl. No. 15/655,253, dated Oct. 19, 2022, 9 pages.
Office Action received for Australian Patent Application No. 2021277718, dated Oct. 17, 2022, 4 pages.
Summons to Attend Oral Proceedings received for European Patent Application No. 16708014.2, mailed on Oct. 10, 2022, 5 pages.
Decision on Appeal received for U.S. Appl. No. 15/655,253, dated Sep. 22, 2022, 12 pages.
Non-Final Office Action received for U.S. Appl. No. 16/734,173, dated Sep. 23, 2022, 17 pages.
Non-Final Office Action received for U.S. Appl. No. 17/212,850, dated Sep. 21, 2022, 13 pages.
Notice of Allowance received for Japanese Patent Application No. 2021-510409, dated Sep. 12, 2022, 4 pages (1 page of English Translation and 3 pages of Official Copy).
Notice of Hearing received for Indian Patent Application No. 201617008296, mailed on Sep. 11, 2022, 3 pages.
Office Action received for European Patent Application No. 19173371.6, dated Sep. 13, 2022, 16 pages.
Office Action received for European Patent Application No. 19173886.3, dated Sep. 13, 2022, 13 pages.
Office Action received for European Patent Application No. 20190670.8, dated Sep. 14, 2022, 6 pages.
Advisory Action received for U.S. Appl. No. 16/703,486, dated Nov. 15, 2022, 5 pages.
Applicant-Initiated Interview Summary received for U.S. Appl. No. 16/703,486, dated Oct. 28, 2022, 5 pages.
Applicant-Initiated Interview Summary received for U.S. Appl. No. 17/212,850, dated Nov. 2, 2022, 5 pages.
Corrected Notice of Allowance received for U.S. Appl. No. 14/913,349, dated Nov. 3, 2022, 2 pages.
Non-Final Office Action received for U.S. Appl. No. 17/827,004, dated Nov. 9, 2022, 27 pages.
Office Action received for Australian Patent Application No. 2021212114, dated Oct. 28, 2022, 3 pages.
Extended European Search Report received for European Patent Application No. 22197186.4, dated Jan. 19, 2023, 9 pages.
Siewiorek et al., "SenSay: A context-aware mobile phone", 2003, 10 pages.
Advisory Action received for U.S. Appl. No. 17/181,089, dated Dec. 20, 2022, 4 pages.
Corrected Notice of Allowance received for U.S. Appl. No. 17/902,191, dated Jan. 10, 2023, 2 pages.
Examiner's Answer to Appeal Brief received for U.S. Appl. No. 15/405,122, dated Jan. 11, 2023, 16 pages.
Examiner's Answer to Appeal Brief received for U.S. Appl. No. 17/013,778, dated Dec. 20, 2022, 9 pages.
Final Office Action received for U.S. Appl. No. 16/734,173, dated Jan. 5, 2023, 15 pages.
Non-Final Office Action received for U.S. Appl. No. 16/871,995, dated Jan. 31, 2023, 19 pages.
Non-Final Office Action received for U.S. Appl. No. 17/951,875, dated Jan. 23, 2023, 12 pages.
Notice of Allowance received for Chinese Patent Application No. 201910438645.6, dated Dec. 28, 2022, 7 pages (3 pages of English Translation and 4 pages of Official Copy).
Notice of Allowance received for Japanese Patent Application No. 2020-124605, dated Dec. 5, 2022, 4 pages (1 page of English Translation and 3 pages of Official Copy).
Notice of Allowance received for Japanese Patent Application No. 2021-126843, dated Jan. 6, 2023, 4 pages (1 page of English Translation and 3 pages of Official Copy).

(56) References Cited

OTHER PUBLICATIONS

Notice of Allowance received for Korean Patent Application No. 10-2022-7014529, dated Dec. 13, 2022, 8 pages (2 pages of English Translation and 6 pages of Official Copy).
Notice of Allowance received for U.S. Appl. No. 15/818,500, dated Jan. 17, 2023, 17 pages.
Notice of Allowance received for U.S. Appl. No. 17/516,537, dated Dec. 27, 2022, 7 pages.
Notice of Allowance received for U.S. Appl. No. 17/902,191, dated Jan. 3, 2023, 8 pages.
Office Action received for Australian Patent Application No. 2021277718, dated Jan. 23, 2023, 4 pages.
Office Action received for Chinese Patent Application No. 201910875660.7, dated Dec. 26, 2022, 7 pages (3 pages of English Translation and 4 pages of Official Copy).
Restriction Requirement received for U.S. Appl. No. 17/505,252, dated Dec. 13, 2022, 5 pages.
Craciunoiu Marius, "Hide header on scroll down, show on scroll up", https://medium.com/@mariusc23/hide-header-on-scroll-down-show-on-scroll-up-67bbaae9a78c, Nov. 27, 2013, 5 pages.
Advisory Action received for U.S. Appl. No. 16/734,173, dated Mar. 13, 2023, 6 pages.
Applicant-Initiated Interview Summary received for U.S. Appl. No. 16/734,173, dated Mar. 3, 2023, 4 pages.
Corrected Notice of Allowance received for U.S. Appl. No. 17/013,778, dated Mar. 7, 2023, 5 pages.
Extended European Search Report received for European Patent Application No. 22188724.3, dated Mar. 2, 2023, 14 pages.
Notice of Acceptance received for Australian Patent Application No. 2021277718, dated Mar. 3, 2023, 3 pages.
Office Action received for Chinese Patent Application No. 201911022448.2, dated Jan. 28, 2023, 16 pages (7 pages of English Translation and 9 pages of Official Copy).
Office Action received for Indian Patent Application No. 202018015999, dated Feb. 21, 2023, 8 pages.
Office Action received for Australian Patent Application No. 2021277718, dated Dec. 5, 2022, 3 pages.
Applicant-Initiated Interview Summary received for U.S. Appl. No. 16/734,173, dated Nov. 22, 2022, 4 pages.
Applicant-Initiated Interview Summary received for U.S. Appl. No. 17/181,089, dated Nov. 22, 2022, 3 pages.
Applicant-Initiated Interview Summary received for U.S. Appl. No. 17/516,537, dated Nov. 22, 2022, 2 pages.
Notice of Allowance received for U.S. Appl. No. 16/147,523, dated Nov. 28, 2022, 8 pages.
Office Action received for Chinese Patent Application No. 201911023176.8, dated Oct. 25, 2022, 12 pages (6 pages of English Translation and 6 pages of Official Copy).
Applicant-Initiated Interview Summary received for U.S. Appl. No. 17/951,875, dated Feb. 28, 2023, 2 pages.
Corrected Notice of Allowance received for U.S. Appl. No. 16/935,002, dated Mar. 2, 2023, 2 pages.
Non-Final Office Action received for U.S. Appl. No. 17/181,089, dated Feb. 17, 2023, 14 pages.
Notice of Allowance received for U.S. Appl. No. 16/935,002, dated Feb. 15, 2023, 15 pages.
Notice of Allowance received for U.S. Appl. No. 17/013,778, dated Feb. 23, 2023, 8 pages.
Office Action received for Australian Patent Application No. 2021212114, dated Feb. 14, 2023, 4 pages.
Office Action received for Japanese Patent Application No. 2021-111630, dated Feb. 10, 2023, 9 pages (4 pages of English Translation and 5 pages of Official Copy).

\* cited by examiner

Year Screen

| 2018 | | | 612 |
|---|---|---|---|
| JAN | FEB | MAR | |
| 1 2 3 4<br>5 6 7 8 9 10 11<br>12 13 14 15 16 17 18<br>19 20 21 22 23 24 25<br>26 27 28 29 30 31 | 1<br>2 3 4 5 6 7 8<br>9 10 11 12 13 14 15<br>16 17 18 19 20 21 22<br>23 24 25 26 27 28 | 1<br>2 3 4 5 6 7 8<br>9 10 11 12 13 14 15<br>16 17 18 19 20 21 22<br>23 24 25 26 27 28 29<br>30 31 | |
| APR | MAY | JUN | |
| 1 2 3 4 5<br>6 7 8 9 10 11 12<br>11 12 13 14 15 16 17<br>18 19 20 21 22 23 24<br>25 26 27 28 29 30 | 1 ②  3<br>4 5 6 7 8 9 10<br>10 11 12 13 14 15 16<br>17 18 19 20 21 22 23<br>24 25 26 27 28 29 30 | 1 2 3 4 5 6 7<br>8 9 10 11 12 13 14<br>15 16 17 18 19 20 21<br>22 23 24 25 26 27 28<br>29 30 | |

Year Screen – Center Bias

| 2018 | | |
|---|---|---|
| 5 6 7 8 9 10 11<br>12 13 14 15 16 17 18<br>19 20 21 22 23 24 25<br>26 27 28 29 30 31 | 2 3 4 5 6 7 8<br>9 10 11 12 13 14 15<br>16 17 18 19 20 21 22<br>23 24 25 26 27 28 | 2 3 4 5 6 7 8<br>9 10 11 12 13 14 15<br>16 17 18 19 20 21 22<br>23 24 25 26 27 28 29<br>30 31 |
| APR | MAY | JUN |
| 1 2 3 4 5<br>6 7 8 9 10 11 12<br>11 12 13 14 15 16 17<br>18 19 20 21 22 23 24<br>25 26 27 28 29 30 | 1 ② 3<br>4 5 6 7 8 9 10<br>10 11 12 13 14 15 16<br>17 18 19 20 21 22 23<br>24 25 26 27 28 29 30 | 1 2 3 4 5 6 7<br>8 9 10 11 12 13 14<br>15 16 17 18 19 20 21<br>22 23 24 25 26 27 28<br>29 30 |
| JUL | AUG | SEP |
| 1 | 1 2 3 4 5 6 7 | 1 2 3 4 5 |

Options (Continued)

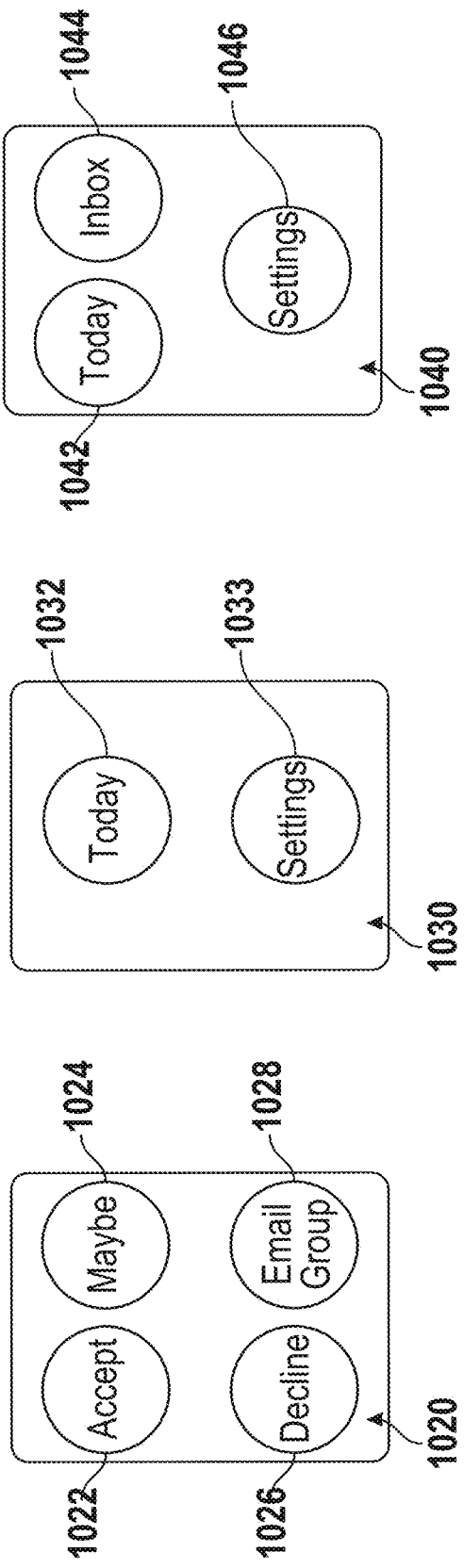

REDUCED SIZE USER INTERFACE

CROSS-REFERENCE TO RELATED APPLICATIONS

This application is a continuation of U.S. application Ser. No. 17/103,436, "REDUCED SIZE USER INTERFACE," filed Nov. 24, 2020, which is a continuation of U.S. application Ser. No. 16/265,938, now U.S. Pat. No. 10,872,318, "REDUCED SIZE USER INTERFACE," filed Feb. 1, 2019, which is a continuation of U.S. application Ser. No. 14/752,776, "REDUCED SIZE USER INTERFACE," filed Jun. 26, 2015, which claims the benefit of priority of U.S. Provisional Application Ser. No. 62/129,848, "Reduced Size User Interface," filed Mar. 8, 2015; U.S. Provisional Application Ser. No. 62/047,611, "Reduced Size User Interface," filed Sep. 8, 2014; and U.S. Provisional Application Ser. No. 62/018,529, "Reduced Size User Interface," filed Jun. 27, 2014. The content of these applications is hereby incorporated by reference in its entirety for all purposes.

This application relates to the following applications: International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/069483, entitled "Device, Method, and Graphical User Interface for Transitioning Between Touch Input to Display Output Relationships," filed Nov. 11, 2013; and U.S. Patent Application No. 62/005,958, "Canned Answers in Messages," filed May 30, 2014. The content of these applications is hereby incorporated by reference in its entirety for all purposes.

FIELD

The disclosed embodiments relate generally to user interfaces of portable electronic devices, and specifically to user interfaces for managing calendar information.

BACKGROUND

Consumers often store their calendars electronically. Those who own more than one electronic device may wish to access their electronic calendars from any device. Access to calendar information from portable electronic devices is particularly desirable for mobile users. As portable electronic devices become more portable—which will increase the desire for electronic information access—suitable user interfaces for managing calendar information will also become increasingly desirable.

SUMMARY

In some embodiments, techniques for presenting calendar information comprises, at an electronic device with a touch-sensitive display: displaying, on the touch-sensitive display, an icon representing a calendar application; detecting user input; in response to a determination that the detected user input represents a touch on the displayed icon: launching the calendar application and transitioning from the display of the icon, through at least one intermediate user interface screen, to displaying a landing screen of the calendar application; and in response to a determination that the detected user input represents movement of the rotatable input mechanism: launching the calendar application and transitioning from the display of the icon directly to displaying the landing screen of the calendar application.

In some embodiments, techniques for presenting calendar information comprises, at an electronic device with a touch-sensitive display: displaying, on the touch-sensitive display, an affordance representing a calendar application; detecting user input; in response to detecting the user input: (a) in accordance with a determination that the detected user input is a touch on the displayed affordance: displaying a first text indicating at least two months in a year, then, replacing the display of the first text with a display of a second text indicating at least some days in one and only one month of the year, and then, replacing the display of the second text with a display of at least one affordance representing at least one calendar entry; (b) in accordance with a determination that the detected user input is a movement of the rotatable input mechanism: displaying at least one affordance representing at least one calendar entry.

In some embodiments, techniques for presenting calendar information comprises, at an electronic device with a touch-sensitive display: displaying, on the touch-sensitive display, an affordance representing a calendar application; detecting user input; in response to detecting the user input: (a) in accordance with a determination that the detected user input is a touch on the displayed affordance: displaying a first text indicating at least two months in a year, then, replacing the display of the first text with a display of a second text indicating at least some days in one and only one month of the year, and then, replacing the display of the second text with a display of at least one affordance representing at least one calendar entry; (b) in accordance with a determination that the detected user input is a movement of the rotatable input mechanism: displaying the first text indicating at least two months in a year.

In some embodiments, techniques for presenting calendar information comprises, at an electronic device with a touch-sensitive display: displaying an affordance representing a calendar entry in a calendar application; detecting a touch on the display, the touch having a characteristic intensity, the touch located at the displayed user interface object representing the calendar entry; determining whether the characteristic intensity of the touch is below a threshold intensity; in response to a determination that the characteristic intensity of the touch is below the threshold intensity, displaying a time and a location associated with the calendar entry; in response to a determination that the characteristic intensity of the touch is not below the threshold intensity, displaying, on the touch-sensitive display, a plurality of affordances representing functions of the calendar application.

In some embodiments, techniques for presenting calendar information comprises, at an electronic device with a touch-sensitive display: displaying, on the touch-sensitive display, a plurality of calendar entries, the plurality of calendar entries including a first calendar entry and a second calendar entry, the first calendar entry displayed above the second calendar entry; receiving user input representing user acceptance of the first calendar entry; and in response to receiving the user input, displaying the first calendar entry below the second calendar entry.

In some embodiments, techniques for presenting calendar information comprises, at an electronic device with a touch-sensitive display: displaying, on the touch-sensitive display, a first user interface screen having a plurality of calendar entries; receiving first data representing user acceptance of a first calendar entry of the plurality of calendar entries; in response to receiving the first data, removing the accepted first calendar entry from the first user interface screen; receiving second data representing a user input; and in response to receiving the second data, replacing the display of the first user interface screen with a display of a second user interface screen having a plurality of accepted calendar entries.

In some embodiments, techniques for presenting calendar information comprises, at an electronic device with a touch-sensitive display: displaying a user interface screen on the touch-sensitive display, wherein the displayed user interface screen includes a plurality of texts indicating a plurality of months in a year, wherein the texts of the plurality of texts are organized according to a layout having at least two rows and at least two columns, wherein the plurality of texts have an initial visual characteristic; detecting a user selection of a first text of the plurality of texts, the first text indicating a first month of the plurality of months; and in response to detecting the user selection, changing the visual characteristic of the plurality of texts except the first text indicating the first month.

In some embodiments, techniques for presenting calendar information comprises, at an electronic device with a touch-sensitive display: displaying a row of numerals, the numerals indicating days in a month; detecting user input; and in response to detecting the user input, translating all but one of the displayed numerals from its respective position in the row into a new position, wherein the displayed numerals, in their new positions, form a column of numerals.

In some embodiments, techniques for presenting calendar information comprises, at an electronic device with a touch-sensitive display: at an electronic device with a touch-sensitive display: displaying on the touch-sensitive display: text indicating hours in a day, at least one region representing a calendar entry scheduled during the indicated hours, and text inside the at least one region indicating a name of the calendar entry; detecting user input representing a zoom-in or zoom-out command; in accordance with a determination that the user input represents a zoom-in command: enlarging the at least one region, and displaying additional text inside the at least one region indicating details of the calendar entry.

In some embodiments, techniques for presenting calendar information comprises, at an electronic device with a touch-sensitive display: displaying, on the touch-sensitive display, an application affordance representing a calendar application; detecting a user selection of the application affordance; in response to detecting the user selection of the application affordance: launching the calendar application; displaying a first event affordance representing a first calendar entry, and displaying a second event affordance representing a second calendar entry, wherein the second calendar entry is longer in duration than the first calendar entry, but the size of the first event affordance is larger than the size of the second event affordance.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 6B illustrates an exemplary calendar application user interface according to some embodiments.

FIG. 6C illustrates an exemplary calendar application user interface according to some embodiments.

FIG. 10C illustrates an exemplary calendar application user interface according to some embodiments.

FIG. 10D illustrates an exemplary calendar application user interface according to some embodiments.

FIG. 10E illustrates an exemplary calendar application user interface according to some embodiments.

DESCRIPTION OF EMBODIMENTS

Figure 1A:
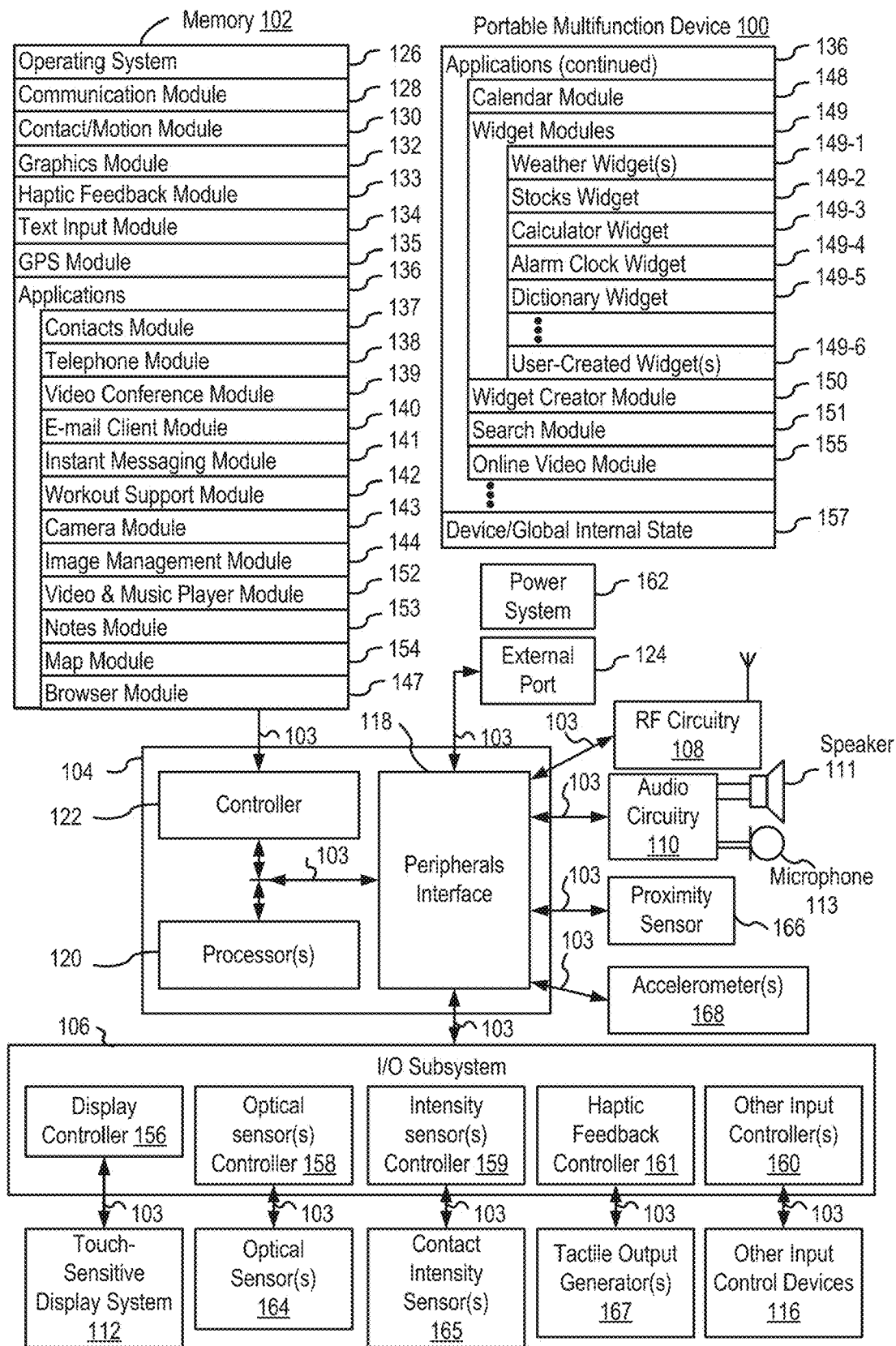
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

User interfaces for efficient presentation and management of calendar information, particularly on portable electronic devices, are described. Below, FIGS. 1, 3, 5, and 34 provide a description of exemplary devices for managing calendar information on such devices. FIGS. 6A-6E, 7A-7D, 8A-8E, 9A-9E, 10A-10E, 11, 12A-12B, 13-19, 20A-20B, and 21-23 illustrate exemplary user interfaces. The user interfaces are also used to illustrate the processes described below, including those in FIGS. 24-33.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323, 846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
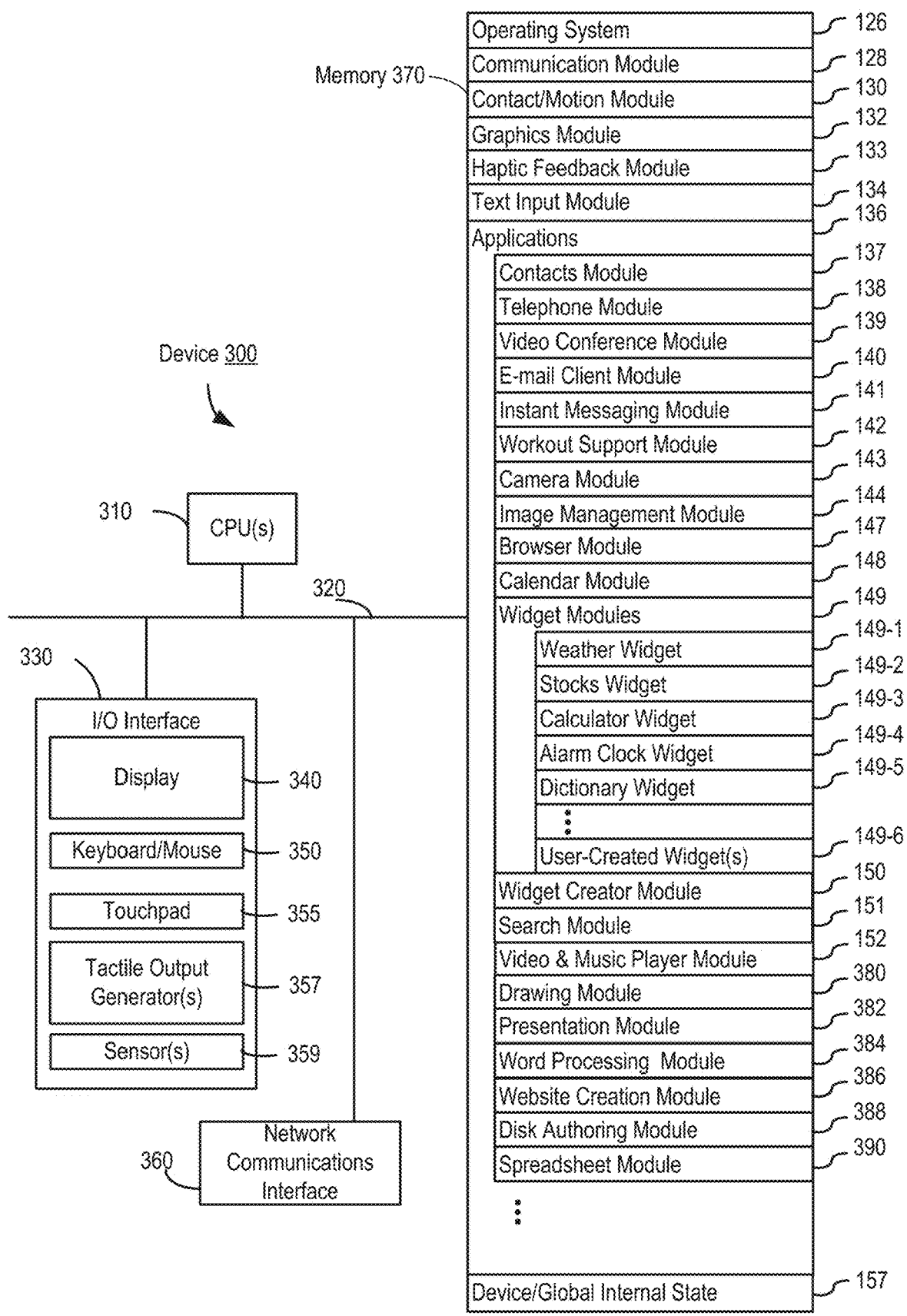
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts).

Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
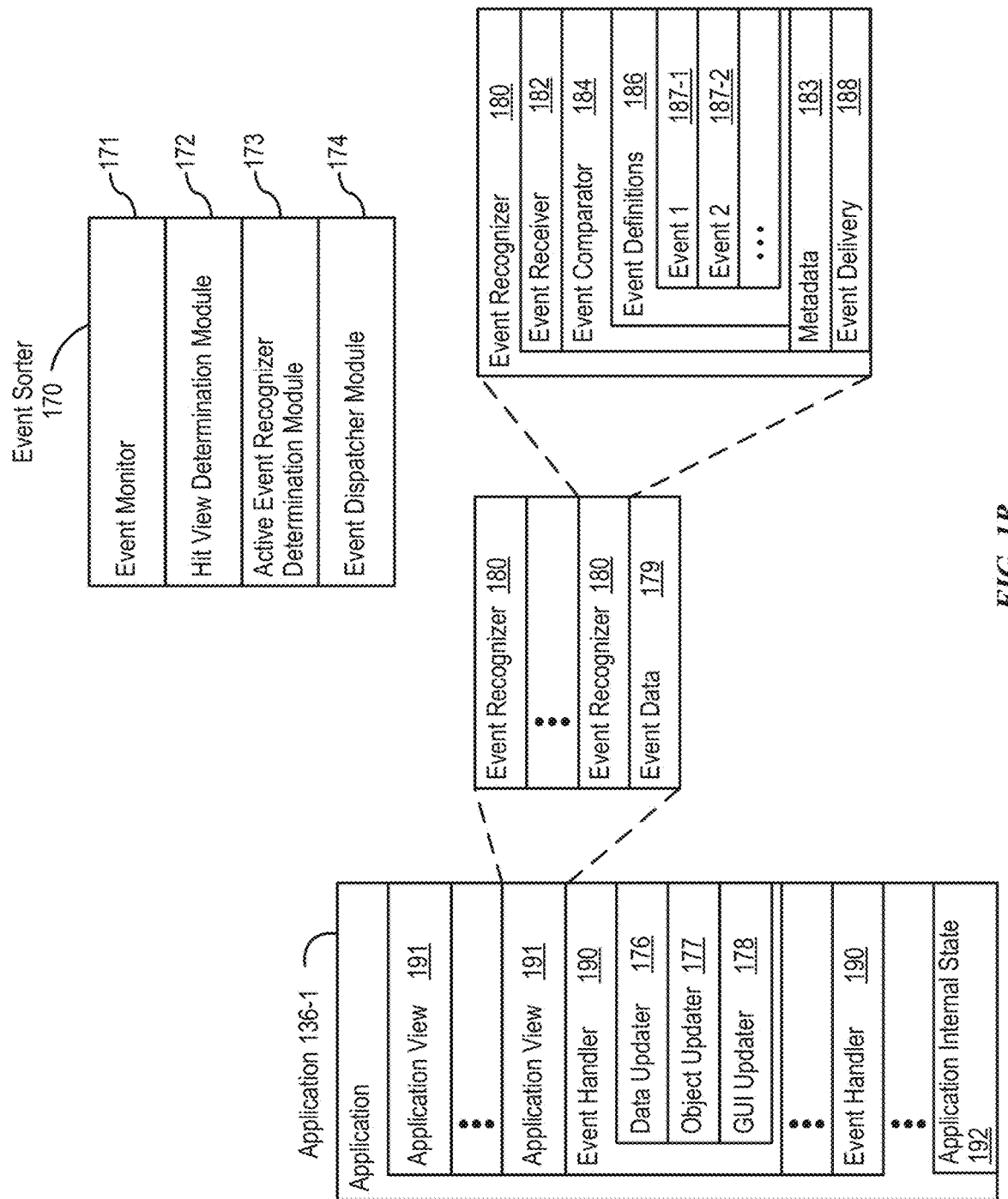
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
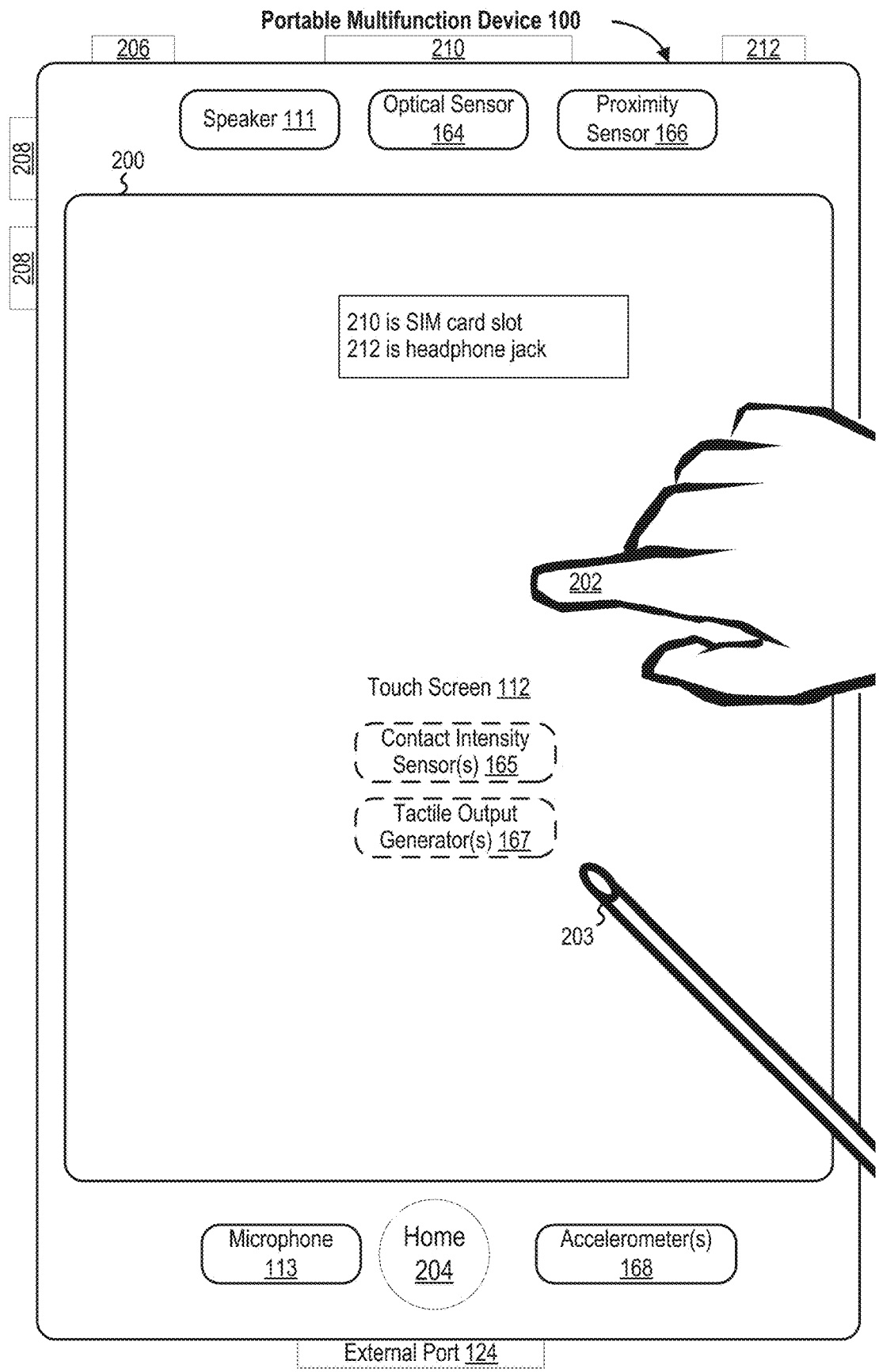
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
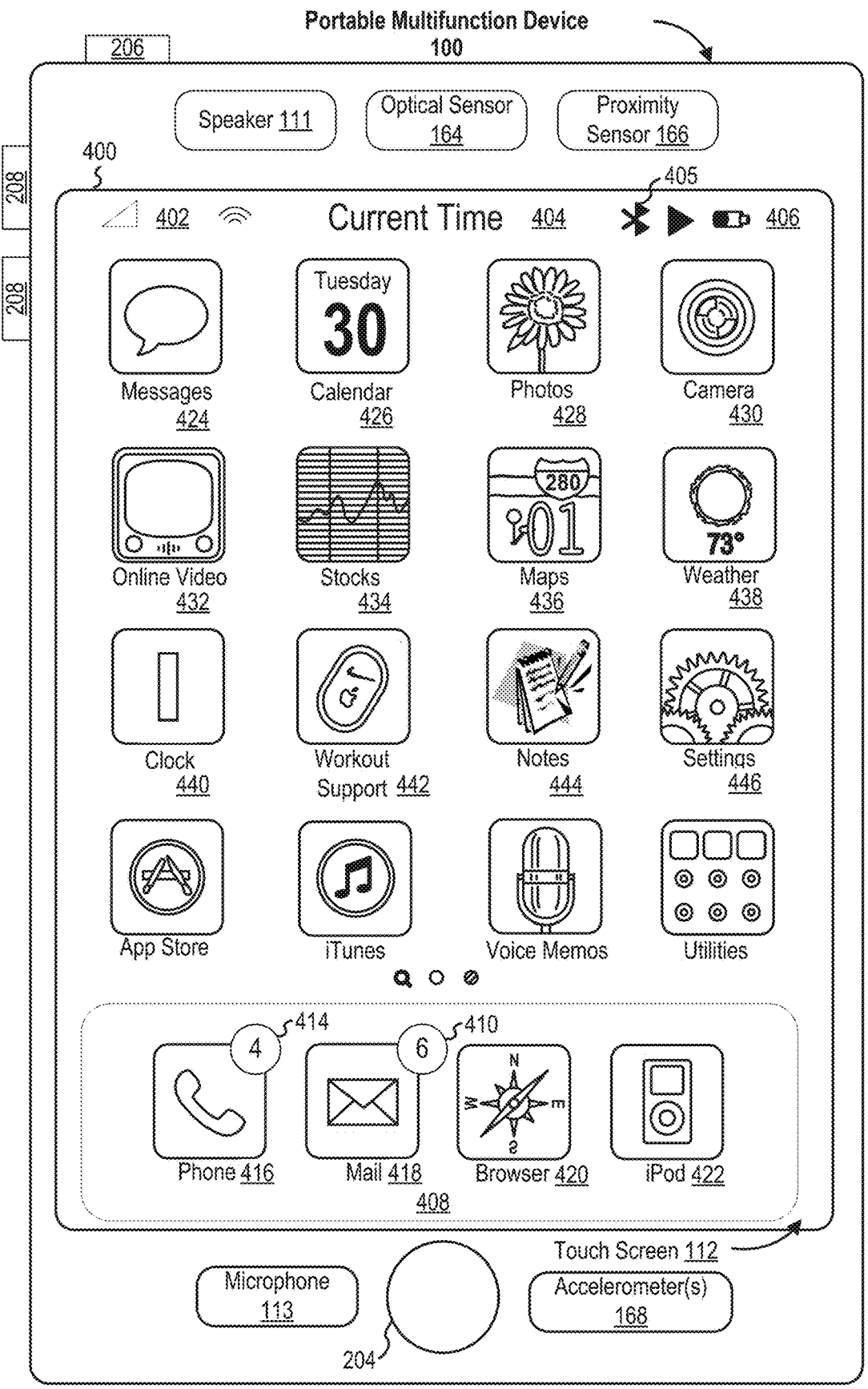
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
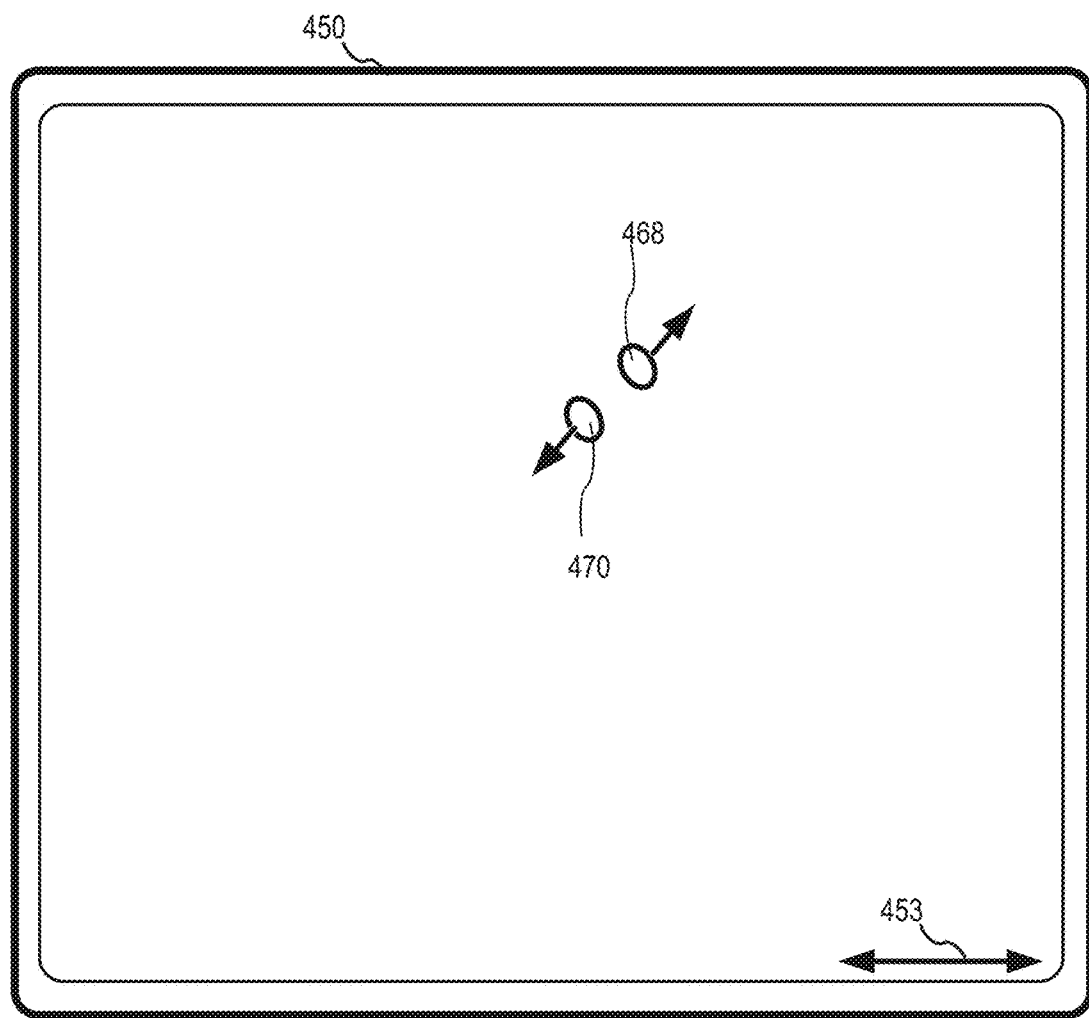
FIG. 4B illustrates an exemplary user interface for a multifunction device with a touch-sensitive surface that is separate from the display in accordance with some embodiments.
Figure 4B:
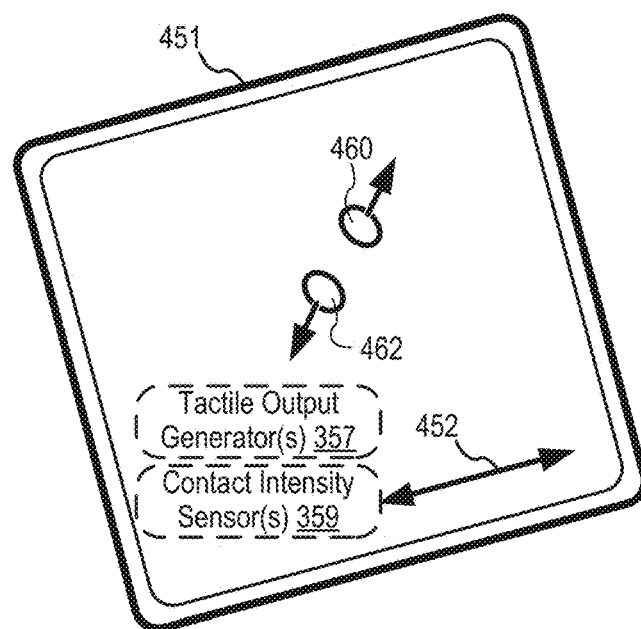

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
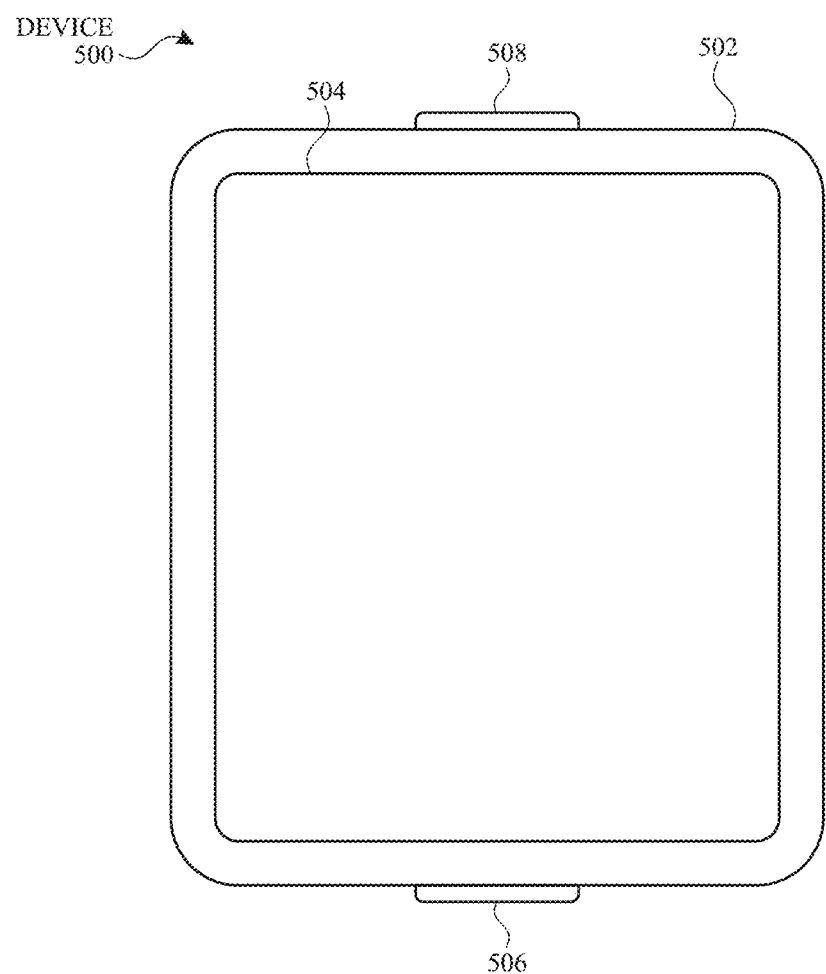
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
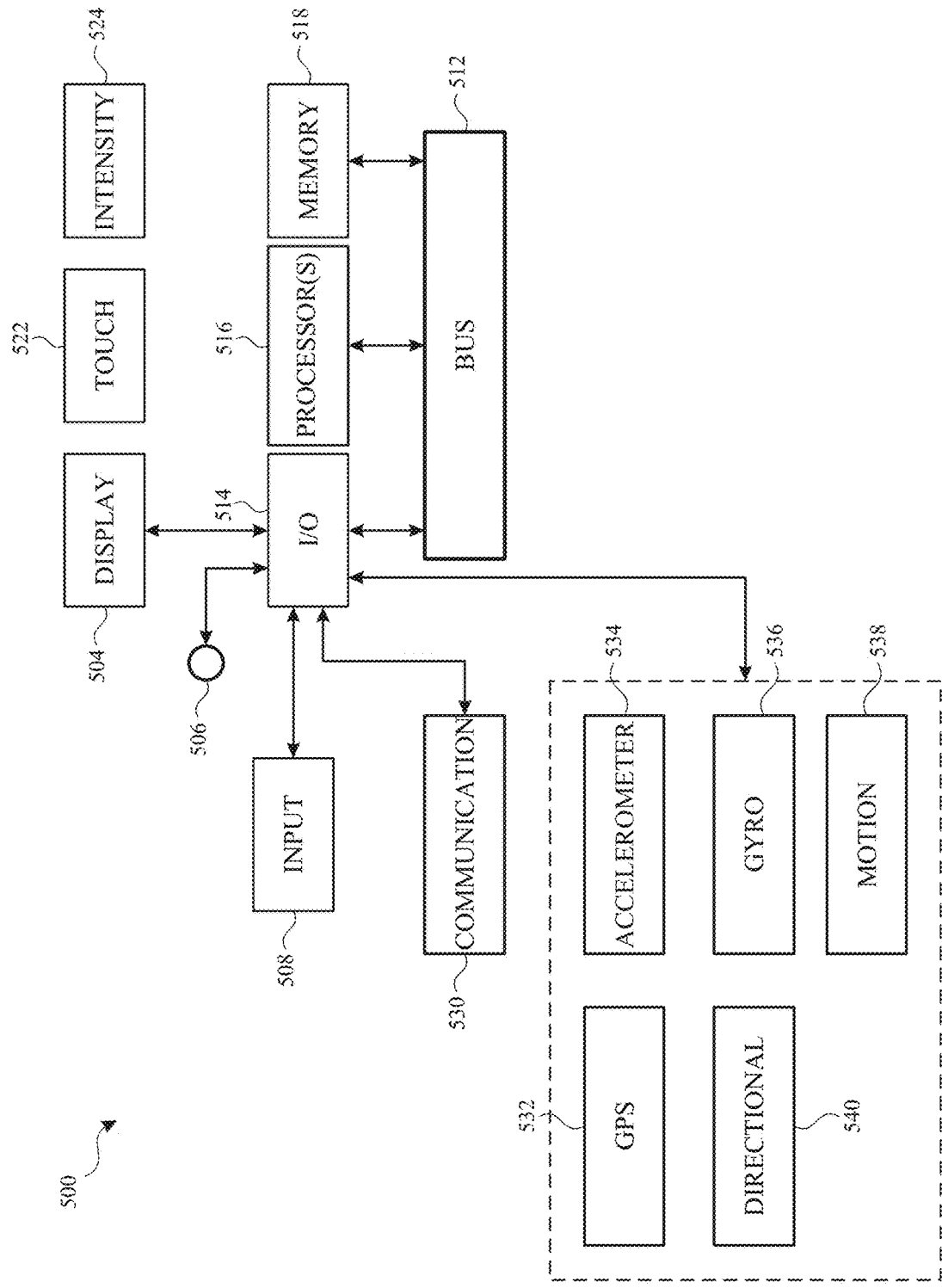
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 2400-3300 (FIGS. 24-33). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

1. Calendar User Interface Screens

Attention is now directed to user interface screens that support a calendar application that is operable on portable electronic devices. In the discussion that follow, device 500 (FIG. 5) is used repeatedly as an example of a portable electronic device that supports calendar functionality, for sake of consistency and brevity. It is noted that the described embodiments are not limited to device 500, and may be implemented onto other portable electronic devices, for example devices 100 and 300 (FIGS. 1 and 3).

Figure 6A:
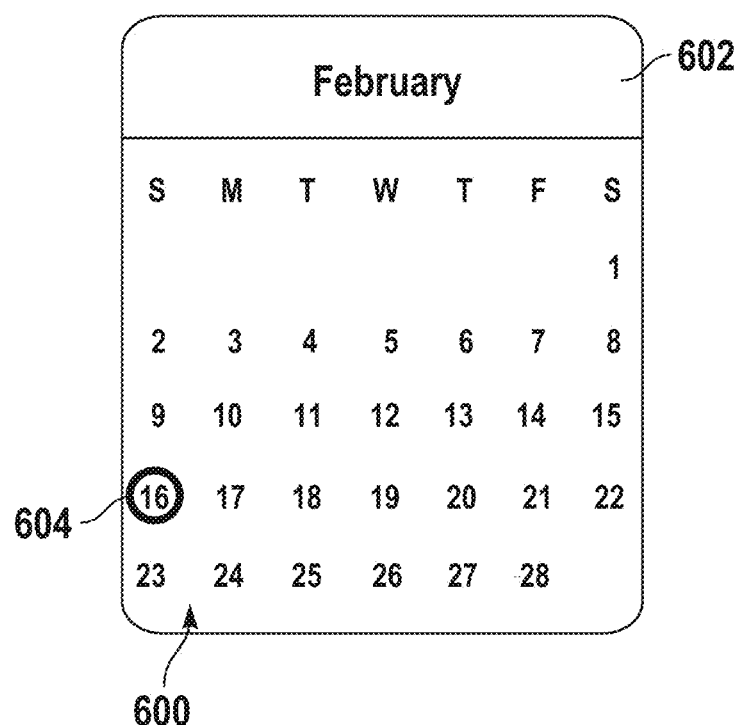
FIG. 6A illustrates an exemplary calendar application user interface according to some embodiments.

Exemplary calendar user interface screens are now discussed with reference to FIGS. 6A-6E. FIG. 6A illustrates exemplary user interface screen 600 which may be referred to as the "month screen". The month screen illustrates one or more days of a month. As shown, month 602 (i.e., February) has twenty-eight days as indicated by the numbers "1" through "28." Month screen 600 may visually emphasize the current day. In some embodiments, the current day is emphasized using an affordance such as affordance 604. In the illustrated example, affordance 604 has a circular shape and encircles the text (i.e., "16") representing the current day. Affordance 604 may, however, take on other shapes. In some embodiments, the current day is emphasized by altering the text representing the current day. For example (not shown), the text may be bolded, brighten, flash, and/or become more opaque.

Month screen 600 is interactive. For example, month screen 600 may be scrollable to reveal days that are not already displayed, if any. As another example, month screen 600 may zoom. A user may initiate these interactions through different input modalities. In some embodiments, scrolling may be invoked via a touch gesture (e.g., swipe or flick). In some embodiments, scrolling may be invoked via a physical input mechanism (e.g., rotation of a rotatable mechanism). In some embodiments, zooming may be invoked via one or more of these mechanisms.

FIG. 6B illustrates exemplary calendar screen 610 which may be referred to as the "year screen". Year screen 610 illustrates one or more months of a given year. As shown, the months of January to June of year 612 (i.e., 2018) are at least partially displayed in year screen 610. In some embodiments, the current day is emphasized using an affordance such as affordance 614. In the illustrated example, affordance 614 has a circular shape and encircles the text (i.e., "2") representing the current day. Affordance 614 may, however, take on other shapes. In some embodiments, the current day is emphasized by altering the text representing the current day. For example (not shown), the text may be bolded, brighten, flash, and/or become more opaque. Year screen 610 may be interactive in that it may be, for example, scrollable and zoom-able.

FIG. 6C illustrates another exemplary year screen 620. In contrast to year screen 610 (FIG. 6B), year screen 620 (FIG. 6C) has a center bias, meaning that the current day is displayed, by default, on or near the vertical center of touchscreen 504. Restated, when device 600 displays year screen 620, the current day is initially displayed in the center-most row of calendar days being displayed. As shown, the current day (i.e., May 2) is marked by affordance 622. Year screen 620 may be interactive in that it may be, for example, scrollable and zoom-able.

Figure 6D:
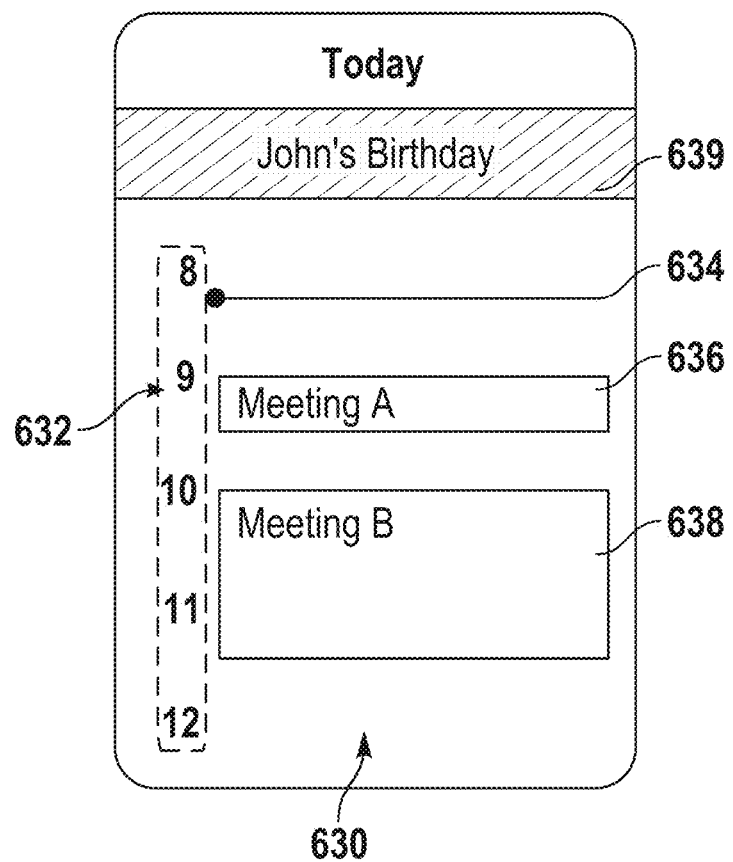
FIG. 6D illustrates an exemplary calendar application user interface according to some embodiments.

FIG. 6D illustrates exemplary calendar screen 630 which may be referred to as the "day screen". Day screen 630 illustrates calendar entries representing events that have been scheduled for a given day. Day screen 630 may have hour markers 632 indicating one or more hours in the day. Day screen 630 may have affordance 634 indicating the current time of day. As shown, affordance 634 has a horizontal line residing at approximately a quarter of the distance between the eight and nine o'clock hour markers. Affordance 634 thereby indicates current time as approximately quarter-past eight o'clock.

Day screen 630 may indicate calendar entries of the day using regions 636 and 638. Calendar entries may be stored on electronic device 500, a companion device (e.g., a cellular phone), at a network-accessible location (e.g., in the "cloud"), or in some combination thereof. These regions are contiguous regions that are visually distinguishable from the background of day screen 630. In some examples, these regions may take on a geometric shape. As shown, region 636 and 638 are rectangular boxes. The edges of region 636 and 638 may indicate the start and end times of corresponding calendar entries. For example, region 636 represents an event scheduled from nine o'clock to half-past nine because its top edge is aligned with the hour marker indicating 9 o'clock. As another example, region 638 represents an event scheduled from ten o'clock to half-past eleven. Due to the correspondence between the edges of regions 636 and 638 with the start/end times of their corresponding calendar entries, the vertical heights of the regions are proportional to the durations of the respective calendar entries. This presentation of calendar entries imparts a grid-like appearance to day screen 230. Accordingly, day screen 630 may be referred to as the "grid" version of the day screen.

Day screen 630 also may have all-day entry indicator 639 indicating a calendared event that spans the day. In some examples, all-day entry indicator 639 is displayed above all other partial-day calendar entries to promote its visibility. Note that, to reduce its on-screen footprint, the vertical height of all-day entry indicator 639 may be shorter compared to regions 636 and 638, even though its (all-day) duration is longer than that of the events represented by regions 636 and 638.

Figure 6E:
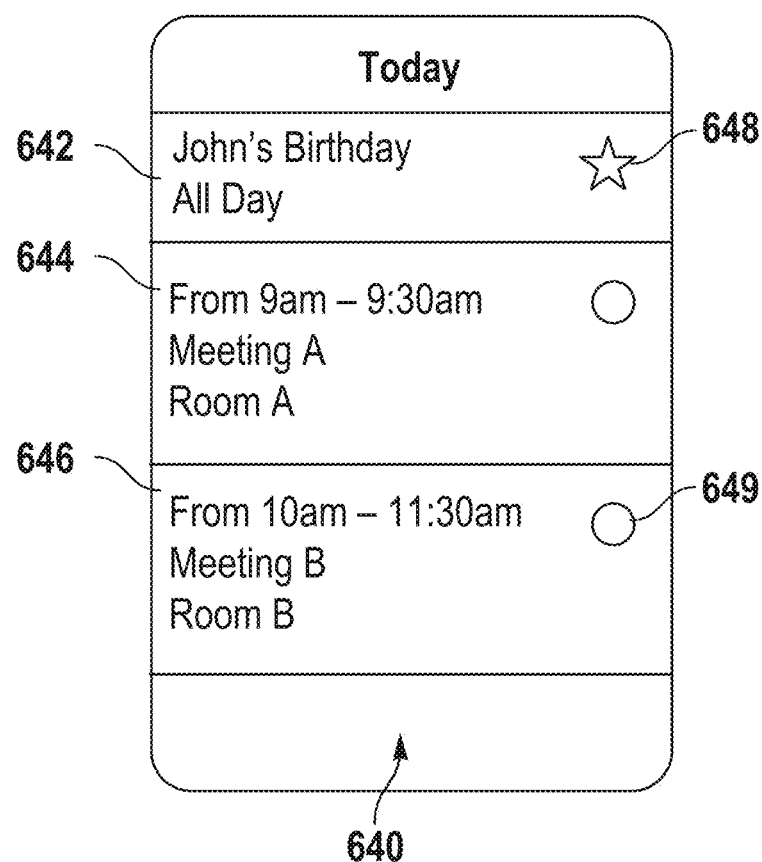
FIG. 6E illustrates an exemplary calendar application user interface according to some embodiments.

FIG. 6E illustrates another exemplary day screen 640. In contrast to day screen 630, day screen 640 displays calendar entries in a list-like layout. Day screen 640 may have region 642 indicating an all-day event that is scheduled for the day. Day screen 640 also may have regions 644 and 646 indicating additional (partial-day) calendar entries scheduled for the day. As shown, regions 642, 644, and 646 may abut one another in succession. The presentation of calendar entries sequentially abutting one another imparts a list-like appearance to day screen 640. Accordingly, day screen 240 may be referred to as the "list" version of the day screen.

Day screen 640 also may have affordances 648 and 649 indicating the source of the represented calendar entries. (As discussed above, it is possible for device 500 to have access to more than one calendar.) Calendar indicator 648 may indicate that "John's Birthday" resides in a first calendar such as a personal calendar, while calendar indicator 649 may indicate that "Meeting B" resides in a second calendar such as work calendar.

Figure 6F:
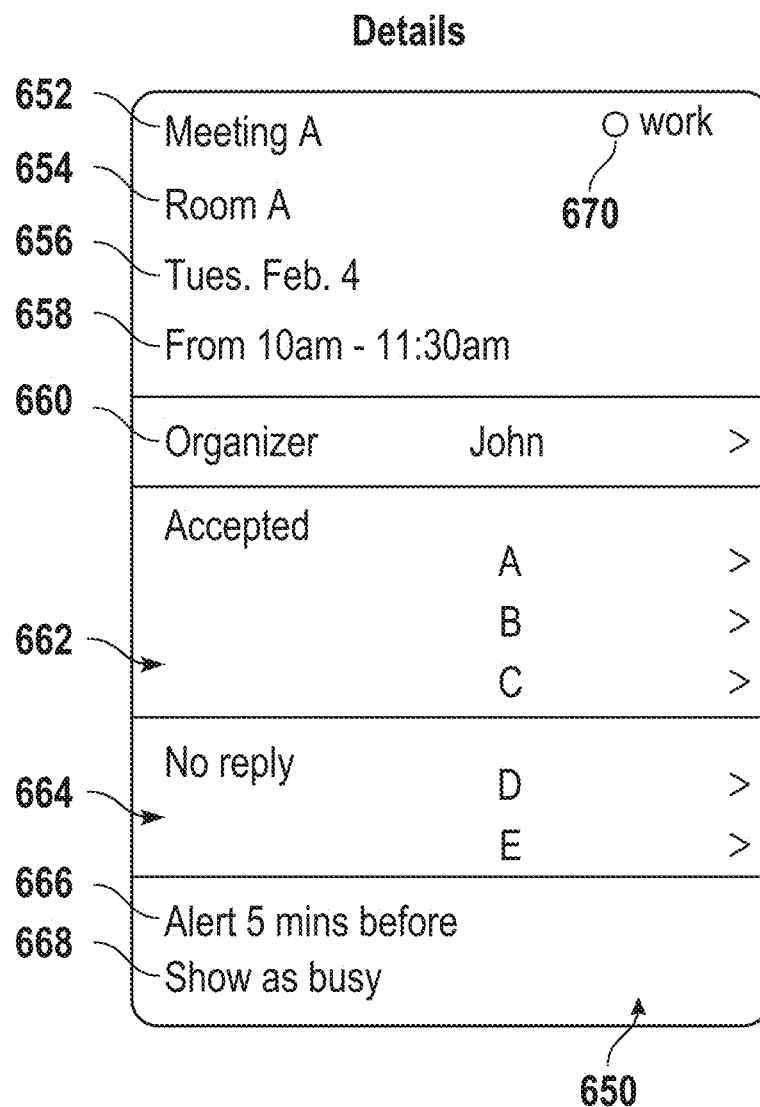
FIG. 6F illustrates an exemplary calendar application user interface according to some embodiments.

FIG. 6F illustrates exemplary calendar entry details screen 650, which may indicate detailed information regarding a calendar entry. As shown, entry details screen 650 may include event name 652, event location 654, event date 656, event time 658, and/or event organizer 660. Entry details screen 650 may also include participant information, such as indications of participants indicating planned attendance 662, indications of participants indicating planned absence (not shown), and/or indication of participants who have not replied to event organizer 664. Calendar entry details screen 650 may include reminder option 666, which permits a user to elect a reminder alert. In some examples, the reminder alert alerts a user a fixed amount of time prior to an event. In other examples, the reminder alert alerts an amount of time prior to an event corresponding to an amount of time required for the user to reach the event. Calendar entry details screen 650 also include option 668 for adjusting the user's presence information, meaning that option 668 controls whether the calendar application mark the meeting time as busy (or free) on the user's calendar. Calendar entry details screen 650 may include calendar indicator 670 identifying on which the subject calendar entry is stored, such as a work calendar.

2. Transitions Between Calendar Screens

Attention is now directed to ways in which embodiments of the calendar application may, in response to user interaction, transition between the displays of the calendar screens described with respect to FIGS. 6A-6F. These transitions are discussed with reference to FIGS. 7A-7D.

Figure 7A:
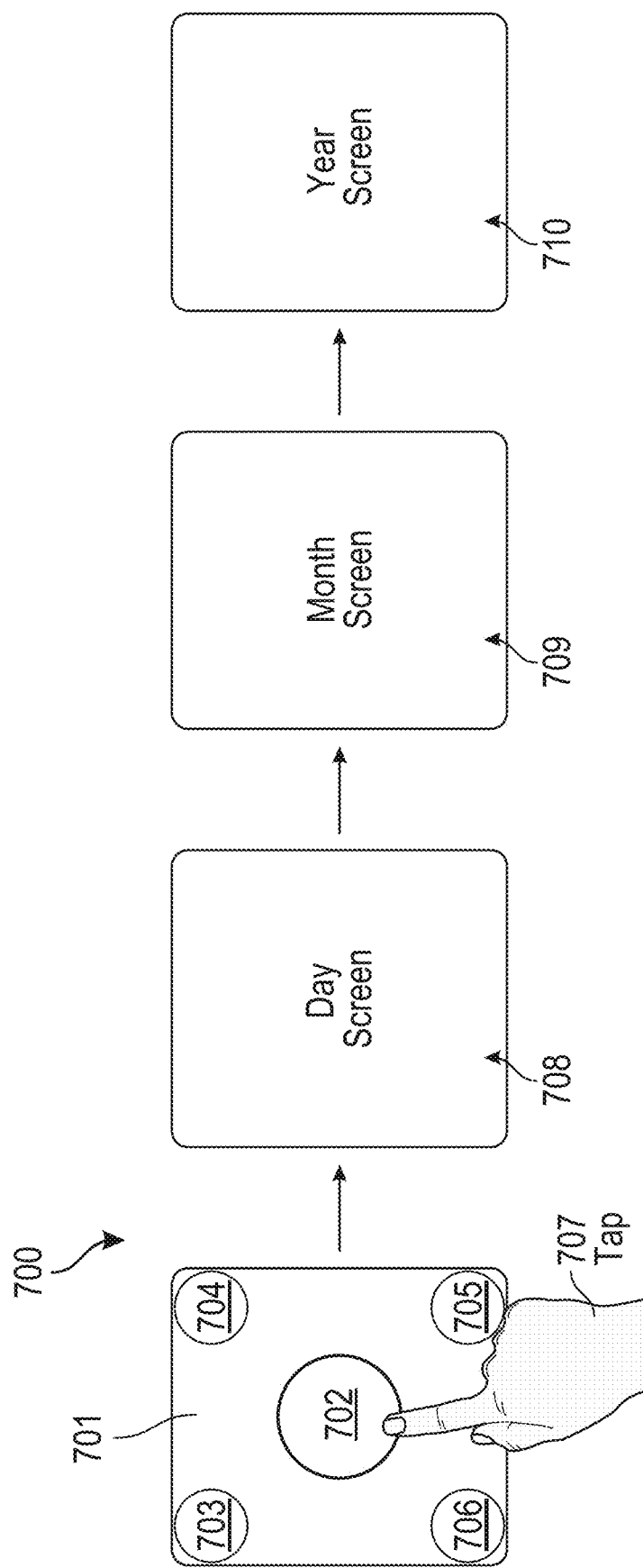
FIG. 7A illustrates an exemplary calendar application user interface according to some embodiments.

FIG. 7A illustrates an exemplary screen flow 700. As shown, device 500 may display user interface screen 701 having icons 702-706. Icons 702-706 may correspond to applications executable on device 500, meaning device 500 may launch a corresponding applications in response to a user's selection of an icon. In the illustrated example, icon 702 corresponds to a calendar application. Thus, in response to a selection of icon 702, device 500 may launch the calendar application. In some embodiments, user selection of icon 702 may occur via a touch gesture (e.g., tap, touch and hold, swipe, flick). In some embodiments, the selection may occur via a physical input mechanism (e.g., rotation of a rotatable mechanism).

As shown in FIG. 7A, a user may contact (e.g., touch) displayed icon 702. In response, device 500 may launch the corresponding calendar application. Upon launching, the calendar application causes device 500 to display the follow user interface screens in sequence: day screen 708, to month screen 709, and to year screen 710. The display of screens 708-710 is sequential and automatic in that device 500 displays the screens in order, one after the other, without requiring further user input beyond touch contact 707. Screens 708 and 709 may each be displayed for a predetermined amount of time before the next screen is displayed.

In flow 700, year screen 710 is the landing screen for the calendar application, meaning that, if user invoked the calendar application using touch contact 707, the calendar application would launch and settle into the display of year screen 710. Flow 700 presents calendar information to a user in a decreasing level of granularity, as the user is initially presented calendar information for the day, followed by the month, and followed by the year.

Figure 7B:
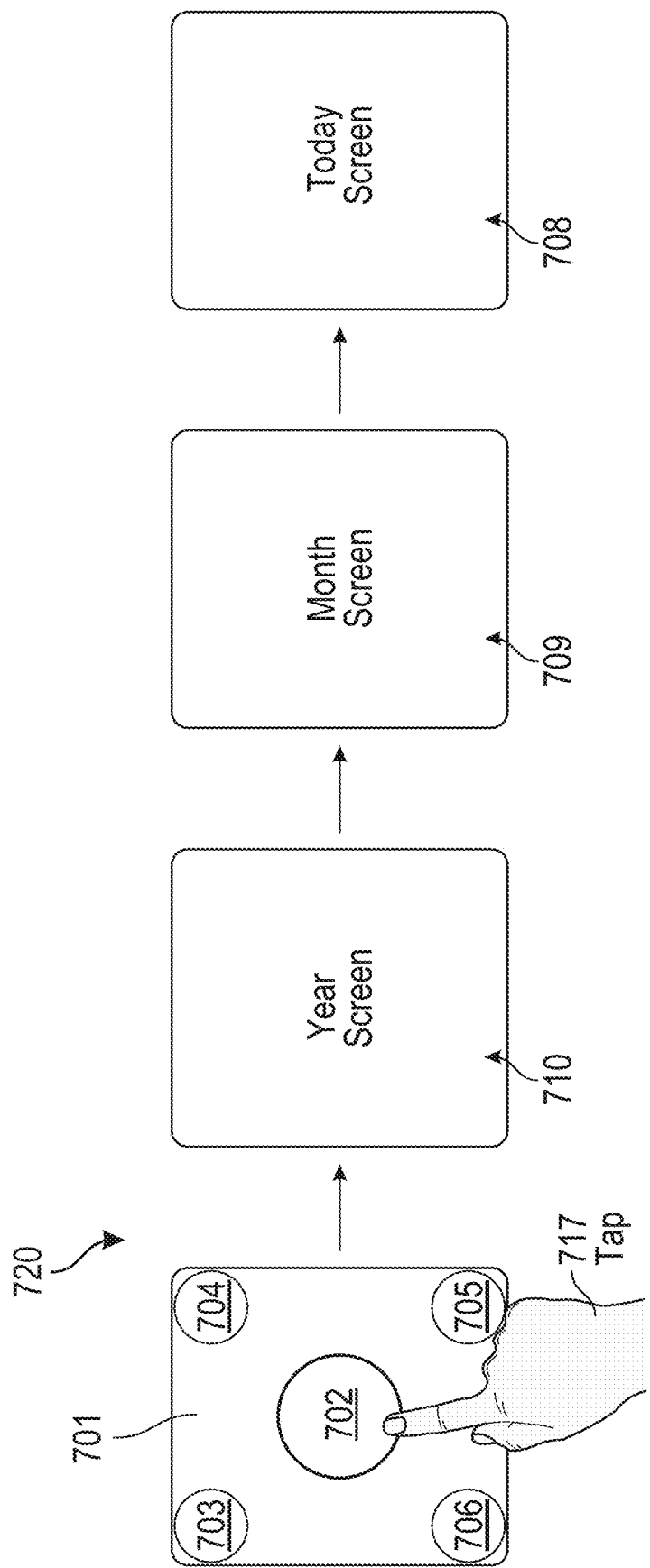
FIG. 7B illustrates an exemplary calendar application user interface according to some embodiments.

FIG. 7B illustrates another exemplary screen flow 720. As shown, device 500 may display user interface screen 701 having icons 702-706. A user may touch displayed icon 702. In response to a user selection of icon 702, device 500 may launch the calendar application. Upon launching, the calendar application may cause device 500 to display the follow screens in sequence: year screen 710, to month screen 709, and to day screen 708. In flow 720, day screen 708 is the landing screen for the calendar application. In this way, flow 720 presents calendar information to a user in an increasing level of granularity.

Figure 7C:
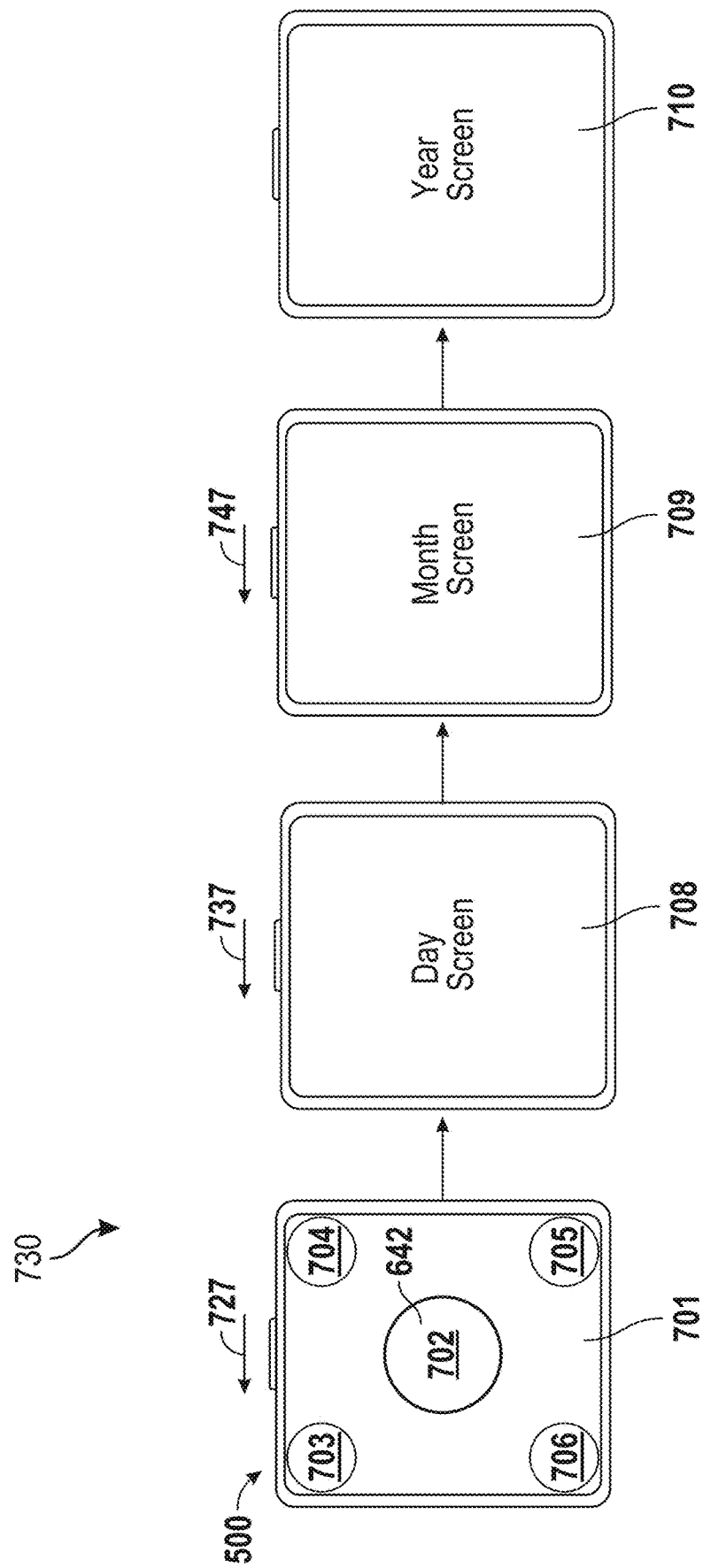
FIG. 7C illustrates an exemplary calendar application user interface according to some embodiments.

FIG. 7C illustrates another exemplary screen flow 730. As shown, device 500 may display user interface screen 701 having icons 702-706. The center-most displayed icon, icon 702, may correspond to the calendar application. A user may move rotatable input mechanism 508 of device 500 while icon 702 is the center-most displayed icon or perform a gesture (e.g., a tap, touch and hold, or flick) on the icon. In response, device 500 may launch the calendar application corresponding to icon 702. Upon launching, the calendar application may cause device 500 to display day screen 708. Thus, day screen 708 is the landing screen in flow 730. While day screen 708 is displayed, the user may move rotatable input mechanism 508 again. In response to further movement 737 of the rotatable input mechanism, device 500 may replace the display of day screen 708 with month screen 709. While month screen 709 is displayed, the user may move rotatable input mechanism 508 again. In response to further movement 747 of the rotatable input mechanism, device 500 may replace the display of month screen 709 with year screen 310. As shown, movements 727, 737, and 747 are in the same direction of rotation. In this way, flow 720 presents calendar information to the user in a decreasing level of granularity while emphasizing the lower-level day screen initially (as the landing screen).

Figure 7D:
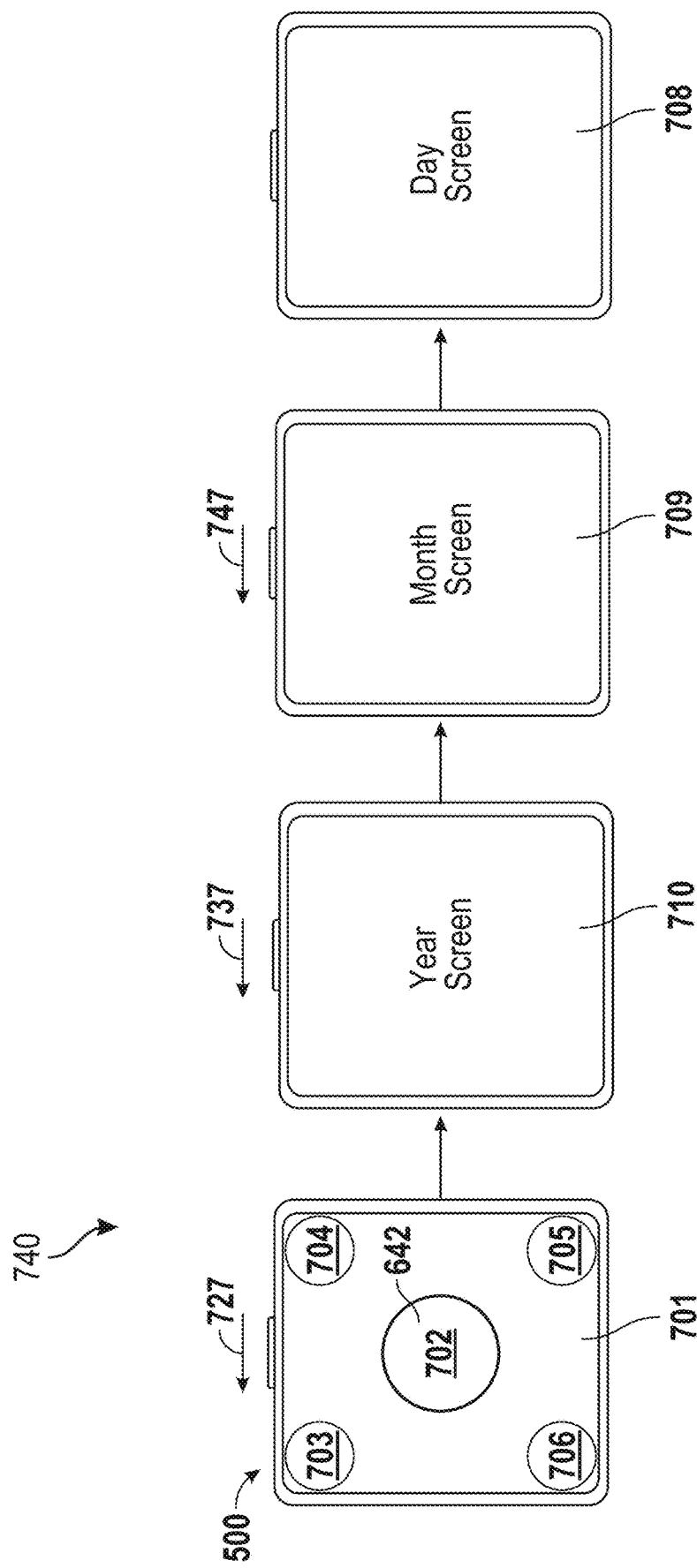
FIG. 7D illustrates an exemplary calendar application user interface according to some embodiments.

FIG. 7D illustrates another exemplary screen flow 740. As shown, device 500 may display user interface screen 301 having icons 702-706. The center-most displayed icon, icon 702, may correspond to the calendar application. A user may move rotatable input mechanism 508 of device 500 while icon 702 is the center-most displayed icon or perform a gesture (e.g., a tap, touch and hold, or flick) on the icon. In response, device 500 may launch the calendar application corresponding to icon 702. Upon launching, the calendar application causes device 500 to display year screen 710.

Thus, year screen 710 is the landing screen in flow 740. While year screen 710 is displayed, the user may move rotatable input mechanism 508 again. In response to further movement 737 of the rotatable input mechanism, device 500 may replace the display of year screen 710 with month screen 709. While month screen 709 is displayed, the user may move rotatable input mechanism 508 again. In response to further movement 747 of rotatable input mechanism 508, device 500 replaces the display of month screen 709 with day screen 708. As shown, movements 727, 737, and 747 are in the same rotation direction. In this way, flow 740 presents calendar information to the user in an increasing level of granularity while emphasizing the higher-level year screen initially (as the landing screen).

Attention is now directed to the defaulting behaviors of day screen 708, month screen 709, and year screen 710. In some embodiments, the display of day screen 708 in the above-described flows (FIGS. 7A-7D) involves displaying calendar entries for the current day, by default. That is, when day screen 708 is initially presented in these flows, calendar entries for the current day (if any) are displayed. In some embodiments, the displays of month screen 709 in the above-described flows involve displaying the days of the current month, by default. In some embodiments, the displays of year screen 710 (FIGS. 7A-7D) in the above-described flows involve displaying the months of the current year, by default.

In some embodiments, the displays of day view 708 (FIGS. 7A-7D) in the above-described flows involve displaying calendar entries for the most recently viewed day, by default. In some embodiments, the display of month view 709 (FIGS. 7A-7D) in the above-described flows involve displaying days of the most recently viewed month, by default. In some embodiments, the display of year view 710 (FIGS. 7A-7D) in the above-described flows involve displaying the months (and/or days) of the most recently viewed year, by default.

In some embodiments, device 500 supports both flows 700 and 740 such that it responds differently to input in the form of a selection (e.g., 707) of icon 702 versus input in the form of a rotational movement (e.g., 717), when screen 701 is displayed. Other combinations are possible. In some embodiments, device 500 supports flows 700 and 730 when screen 701 is displayed. In some embodiments, device supports flows 720 and 740 when screen 701 is displayed. In some embodiments, device 500 supports flows 720 and 730 when screen 701 is displayed. Other combinations are permutations in different embodiments. In some embodiments, device 500 permits user-designation of preferred flow(s).

Among other things, the above-described user interface flows beneficially improve the efficiency of man-machine interface between a user and device 500. For example, in the described embodiments, device 500 may present a user with multiple ways of winnowing and accessing specific calendar entries out of a greater set of calendar information. Consider flow 720 (FIG. 7B), in which device 500 presents a user with a visual transition from year, to month, to day: This flow may help the user focus onto the information that is ultimately presented (e.g., information for today), yet it does not require the user to manually navigate (e.g., find and invoke navigational icons) from screen to screen. This transition may be particularly helpful when a user does not yet know what day the calendar application is presently focused on (e.g., what day's calendar entries will the application display). At the same time, device 500 may allow a user—who is already aware of the day that is being focused on—to access the calendar information directly by a single input. Consider flow 730 (FIG. 7C), in which device 500 allows a user to invoke the day screen directly. The availability of these flows in a device such as device 500 permits a user to invoke the most efficient interfaces for particular usage scenarios, thereby improving the quality and efficiency of the resulting man-machine interactions.

In addition, the availability of a rotatable input mechanism on device 500 further improves the speed of these man-machine interactions. For example, after seeing device 500 transition between different calendar screens (e.g., year, month, day) in flow 720 (FIG. 7B), a user may rotate the input mechanism to quickly "flip" back to the desired screen that he may have identified as being useful during the transition. In this way, device 500 may reduce (and in some instances eliminate) intermediate touch gestures involving navigational icons to retrieve the desired user interface screen. Importantly, this combination of the available software user interface and hardware input mechanism permit efficient navigation between calendar screens and entries.

Figure 8A:
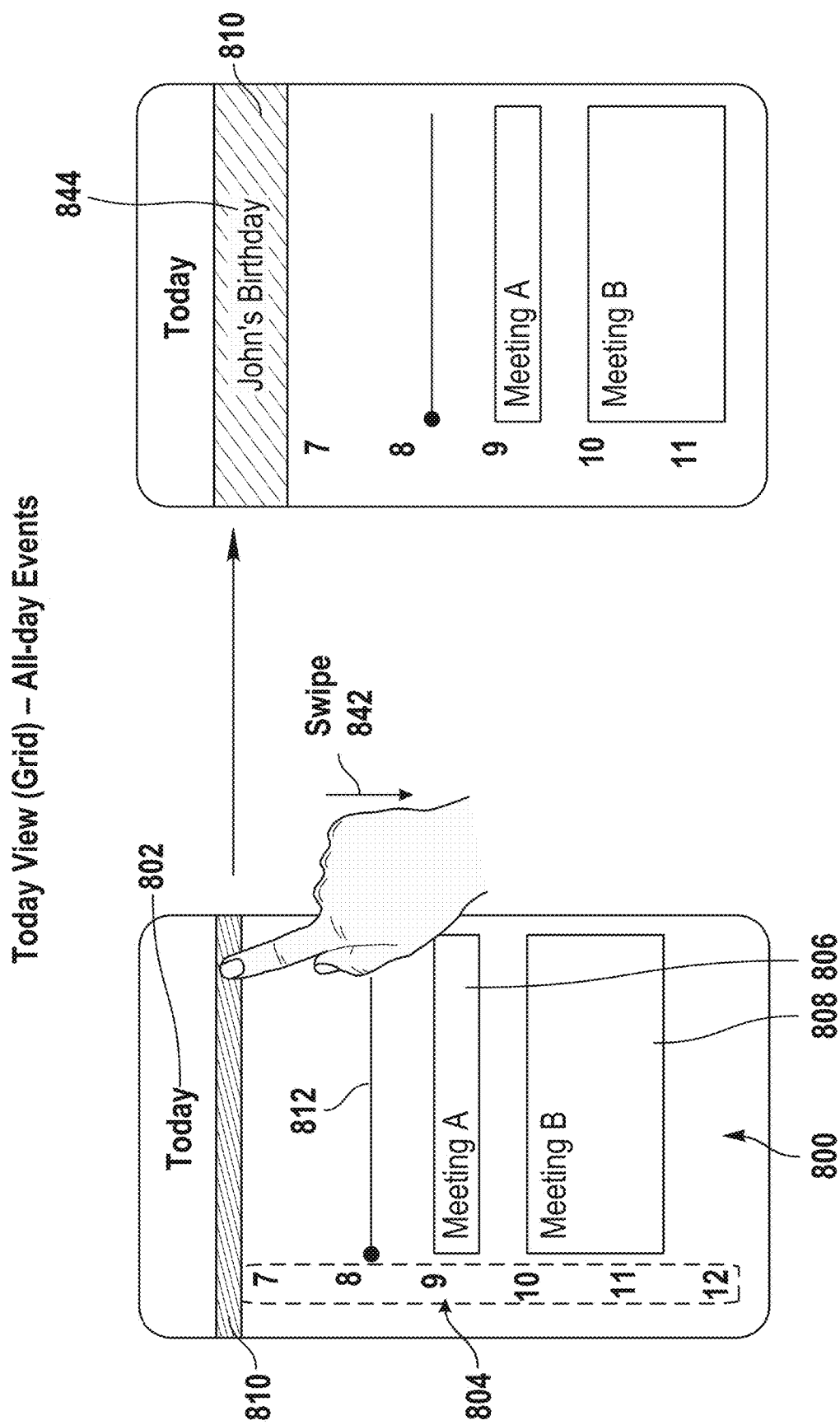
FIG. 8A illustrates an exemplary calendar application user interface according to some embodiments.

Attention is now directed to additional exemplary user interactions with the calendar application executing on device 500. These aspects are described with reference to FIGS. 8A-8E. FIG. 8A illustrates exemplary day screen 800. Day screen 800 may be day screen 708 (FIG. 7A) in some embodiments. Day screen 800 includes text 802 indicating the day for which calendar entries are being displayed. As shown, day screen 800 indicates calendar entries scheduled for the current day. Day screen 800 also includes text 804 representing hours in the displayed day. Regions 806 and 808 represent calendar entries scheduled for the current day. Day screen 800 also includes indicator 810 indicating an all-day calendar entry scheduled for the current day. Note that the vertical length of all-day entry indicator 810 is shorter than that of regions 806 and 808, even though an all-day event has a longer duration than the events represented by regions 808 and 810. In this way, the calendar application is able to reduce the usage of on-screen space necessary for displaying all-day calendar entries. Day screen 800 also includes affordance 812 indicating the current time. As shown, affordance 812 is a horizontal line, though it may take on another shape.

All-day calendar entry indicator 810 is responsive to user interaction. In some embodiments, having seen indicator 810, the user may select the indicator to reveal more information about the all-day event. In some embodiments, the selection is made with touch gesture such as a tap or a swipe (e.g., downward swipe 842) involving indicator 810. In response to the user selection, the calendar application may enlarge all-day event indicator 810 to reveal that today is "John's Birthday," as indicated by text 844.

As used here, a swipe need not be perfectly aligned with one direction in order for the swipe to be considered as a swipe in that direction. That is, a downward swipe need not be perfectly straight nor vertical in the down direction. Instead, a swipe that is substantially in one direction may be considered to be a swipe in that direction. In some examples, a swipe that is within less than 45 degrees from an axis is may be considered to be substantially along that axis. In some examples, particularly those in which a screen is scrollable only along one axis, a swipe that has any detectable motion along that axis may be considered a swipe substantially along that axis.

Figure 8B:
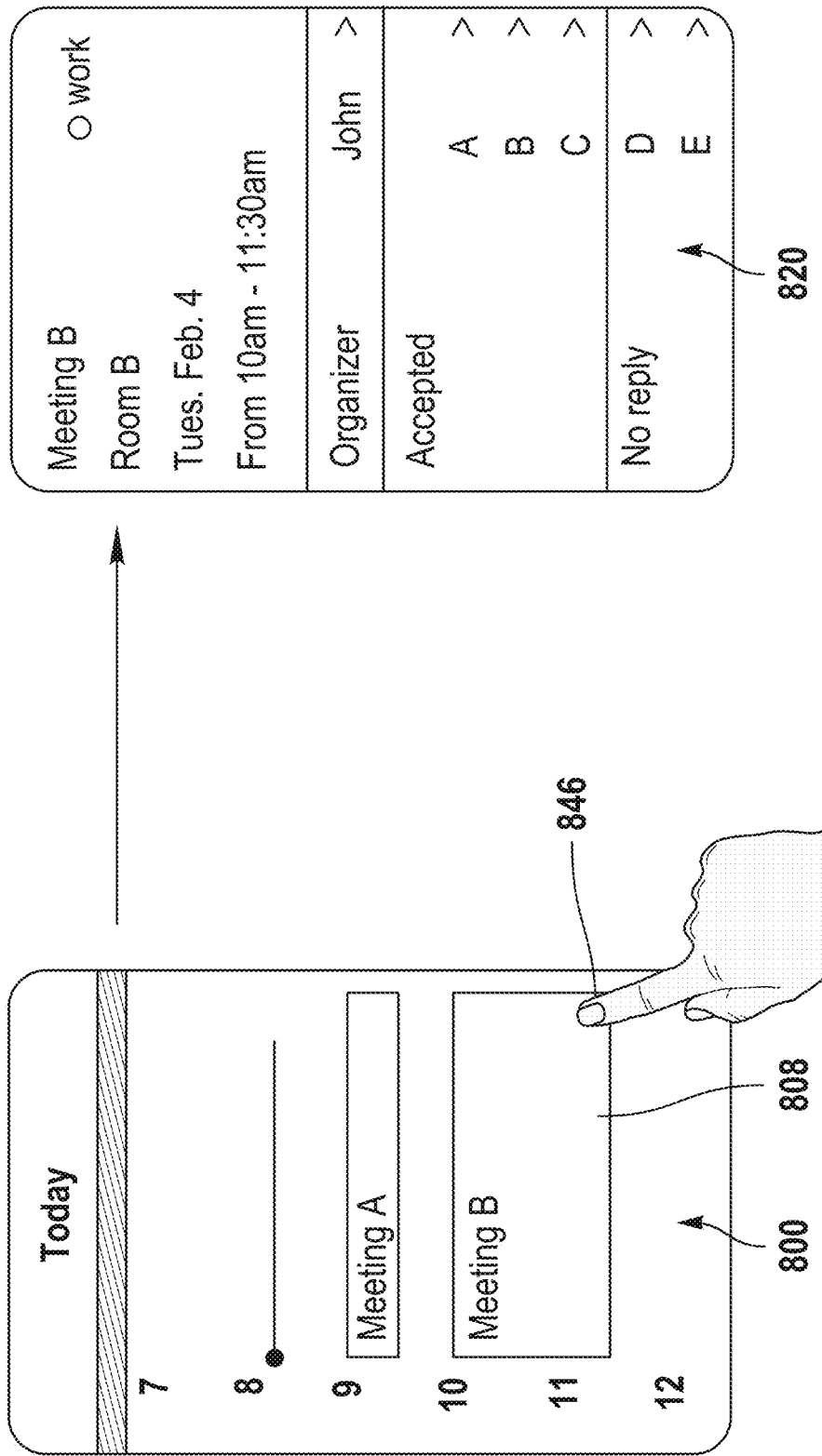
FIG. 8B illustrates an exemplary calendar application user interface according to some embodiments.

FIG. 8B illustrates additional exemplary user interactions with day screen 800. Day screen 800 includes region 808 representing a calendar entry for the displayed day. As shown, a user contacts (e.g., as indicated by tap 846) the touch-sensitive display of device 500 at the display position of region 808. In response, device 500 may display calendar entry details screen 820. Calendar entry details screen 820 may be calendar entry details screen 650 (FIG. 6F) in some embodiments.

Figure 8C:
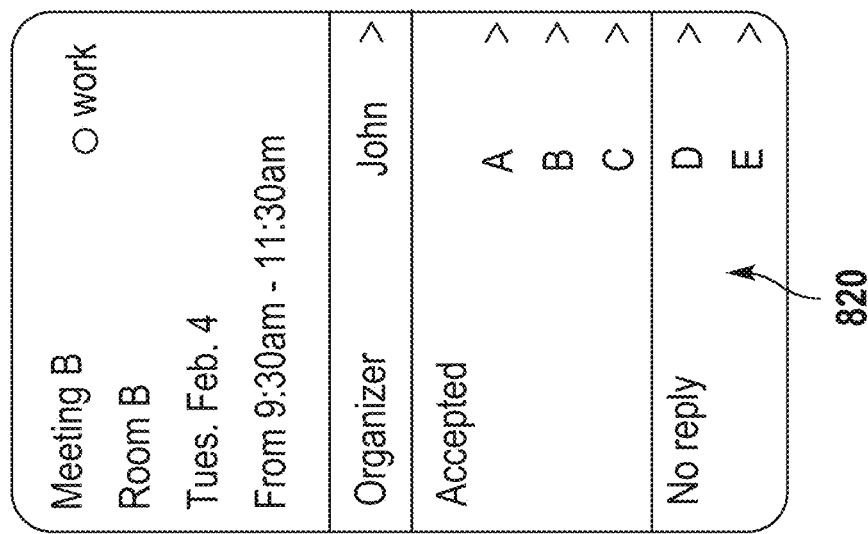
FIG. 8C illustrates an exemplary calendar application user interface according to some embodiments.
Figure 8C:
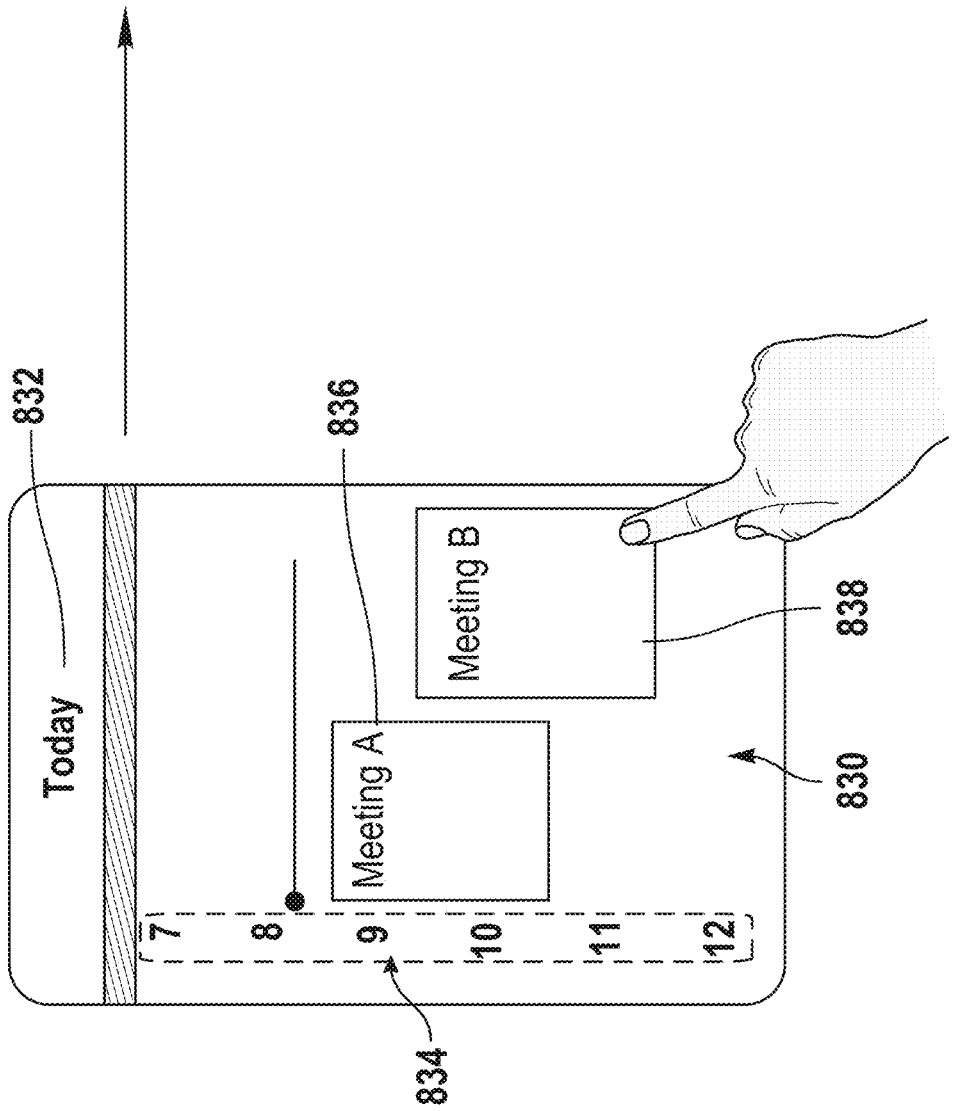

FIG. 8C illustrates exemplary day screen 830 that is used to provide daily calendar information in some embodiments. Day screen 830 is day screen 708 (FIG. 7A) in some embodiments. Day screen 830 includes text 832 indicating the day for which calendar entries are being displayed. Day screen 830 also includes text 834 representing hours in the displayed day, in this case, the current day. Regions 836 and 838 represent calendar entries scheduled for the current day. Note that the represented calendar entries are partially concurrent in that the scheduled meeting times overlap. To accommodate for the display of concurrent calendar entries, regions 836 and 838 are reduced in their widths so that the events can be represented on day screen 830. A user may select (e.g., touch) one of the displayed regions 836 and 838 to display additional details regarding the represented calendar entries. The additional details are displayed via calendar entry details screen 650 (FIG. 6F) in some embodiments.

Figure 8D:
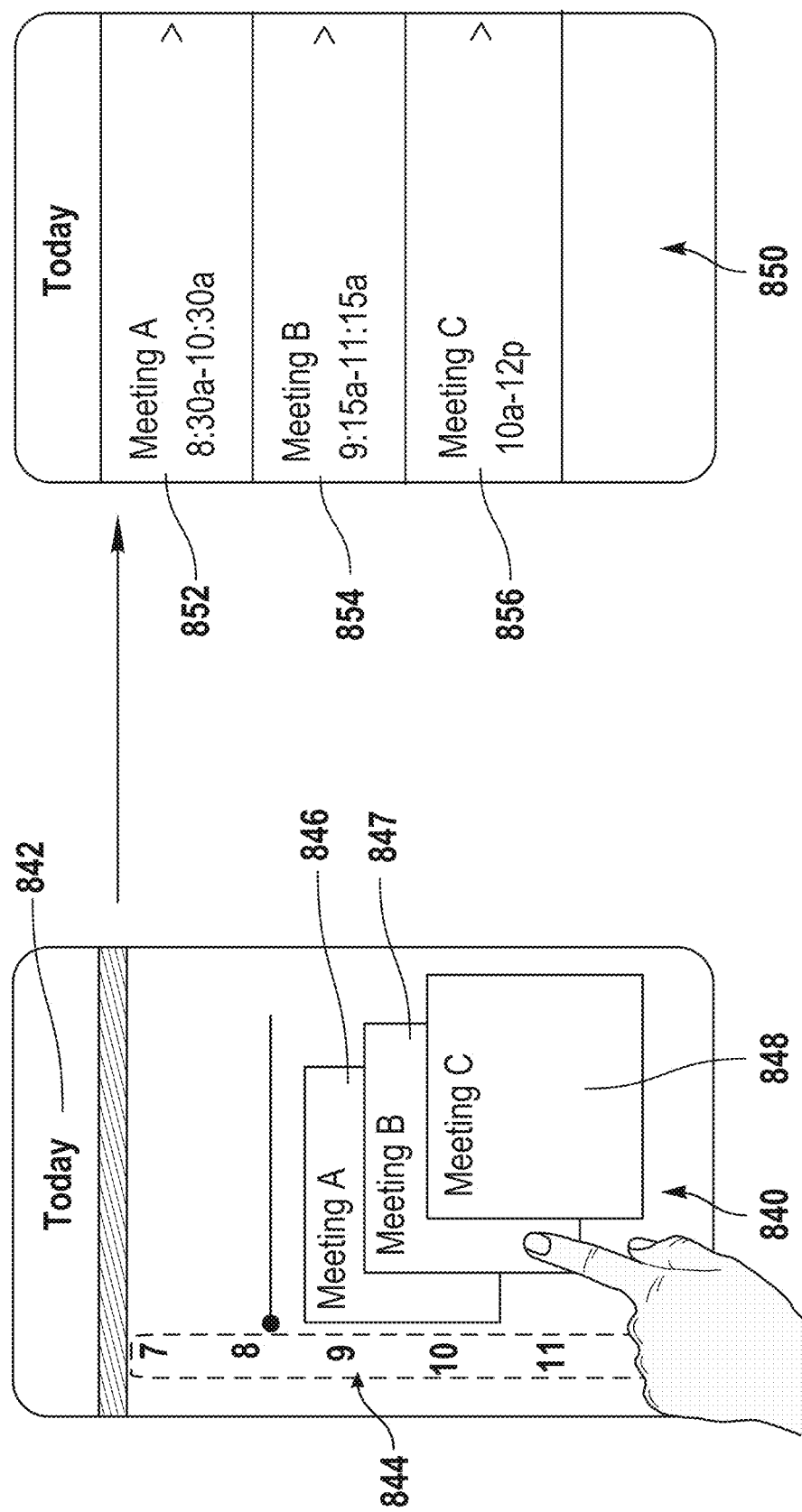
FIG. 8D illustrates an exemplary calendar application user interface according to some embodiments.

FIG. 8D illustrates exemplary day screen 840 that is used to provide daily calendar information in some embodiments. Day screen 840 is day screen 308 (FIG. 3A) in some embodiments. Day screen 840 includes text 842 indicating the day for which calendar entries are being displayed. Day screen 840 also includes text 844 representing hours in the displayed day, in this case, the current day. Regions 846, 847, and 848 represent calendar entries scheduled for the current day. Note that the regions are displayed in an overlapping manner because they represent calendar entries that are (at least partially) concurrent. In this way, concurrent events are represented on-screen simultaneously. The display of overlapping calendar entries in this manner may be referred to as "stacking" the display of calendar entries.

A user may select (e.g., touch) the displayed regions 846-848 to display additional event details for the represented calendar entries. In some embodiments, a selection of any one of the regions 846-848 causes calendar entries screen 850 to be displayed. Calendar entries screen 850 has non-overlapping regions 852, 854, and 856 corresponding to regions 846, 847, and 848, respectively. Regions 852, 854, 856 are presented in a non-overlapping manner on screen 850 to facilitate user selection. A user may select any one of regions 852, 854, 856 to access detailed information for the represented calendar entry. The additional details may be displayed via calendar entry details screen 650 (FIG. 6F).

In some embodiments (not illustrated), it is possible for a user to bypass calendar entries screen 850 by precisely selecting one of regions 846-848 in day screen 840. For example, if device 500 detects user selection at a position that falls within a single displayed region (e.g., 847) and not another overlapping region (e.g., 846 or 848), device 500 displays details for the calendar entry represented by the single region (e.g., 847). The additional details may be displayed via calendar entry details screen 650 (FIG. 6F).

Figure 8E:
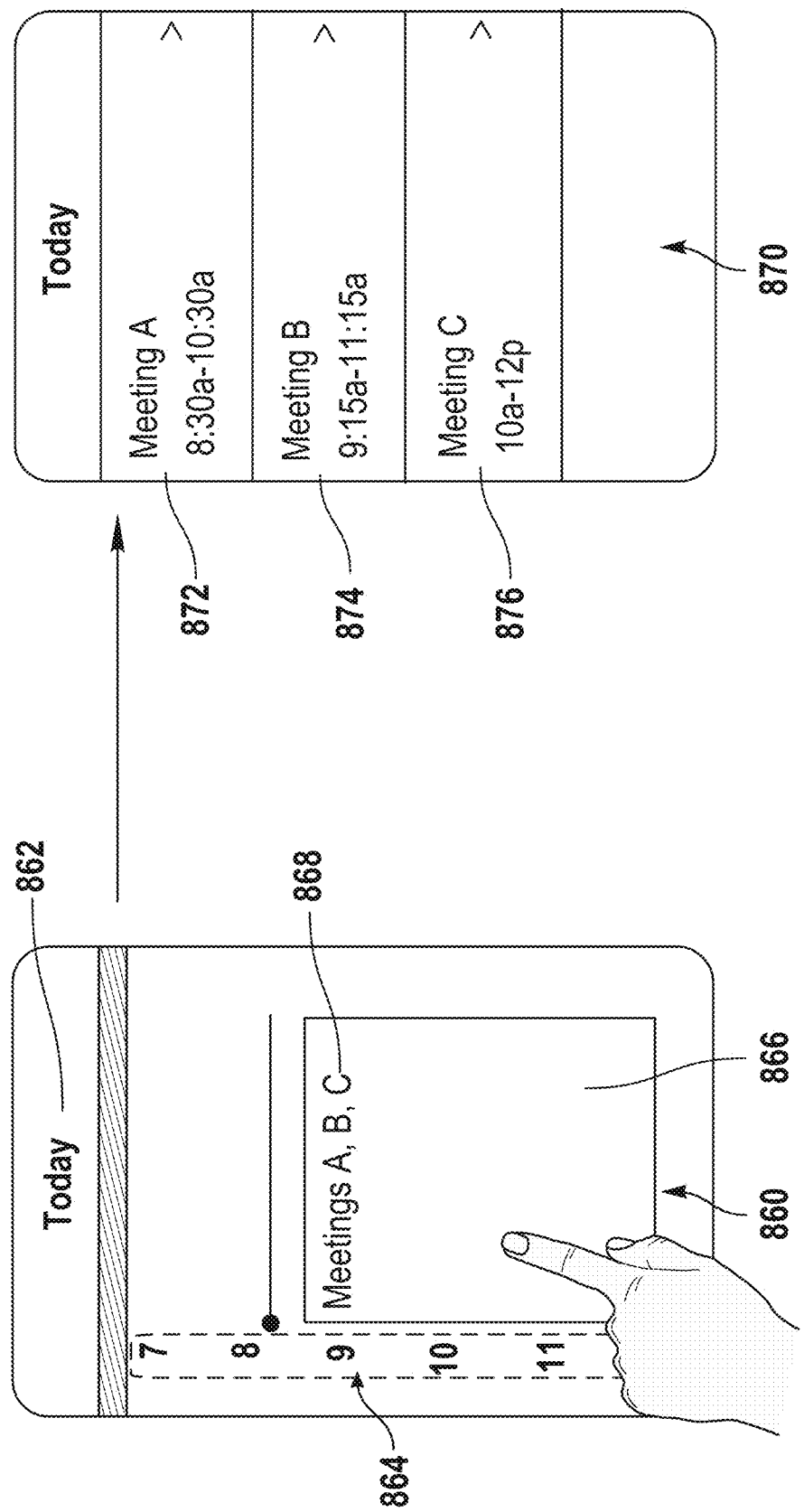
FIG. 8E illustrates an exemplary calendar application user interface according to some embodiments.

FIG. 8E illustrates exemplary day screen 860 that is used to provide daily calendar information in some embodiments. Day screen 860 is day screen 708 (FIG. 7A) in some embodiments. Day screen 860 includes text 862 indicating the day for which calendar entries are being displayed. Day screen 860 also includes text 864 representing hours in the displayed in day, in this case, the current day. Region 866 represents multiple calendar entries scheduled for the current day between the hours of 9:30 am to noon. Region 866 includes text 868 indicating its representation of multiple calendar entries. Day screen 860 stands in contrast to day screen 830 (FIG. 8C) in that concurrent calendar entries are not displayed side-by-side. Day screen 860 stands in contrast to day screen 840 (FIG. 8D) in that concurrent calendar entries are not displayed in a partially overlapping manner. Rather, day screen 860 merges multiple calendar entries into the display of region 866. In some embodiments, the placement of the top of region 866 within screen 860 corresponds to the start time of the earliest represented calendar entry (as defined by hour markers 864). In some embodiments, the bottom of region 866 corresponds to the end time of the latest represented calendar entry. The display of merged calendar representations in this manner may be referred to as "coalescing" the display of calendar entries.

A user may select (e.g., touch) region 866 to display calendar entries screen 870. Calendar entries screen 870 has regions 872, 874, and 876 representing the multiple (in this case, three) calendar entries that had been coalesced into and were represented by region 866. From screen 870, a user may select any one of regions 872, 874, and 876 to access detailed information for the represented calendar entry. The additional details may be displayed via calendar entry details screen 650 (FIG. 6F).

3. Contextual Features

Attention is now directed to techniques for accessing contextual user interfaces in embodiments of the calendar application. Device 500 may have a small form factor. Due to its size, device 500 may not lend itself to displaying large numbers of graphical user interface elements, as the inclusion of many elements could reduce the display area available for calendar content.

Figure 9A:
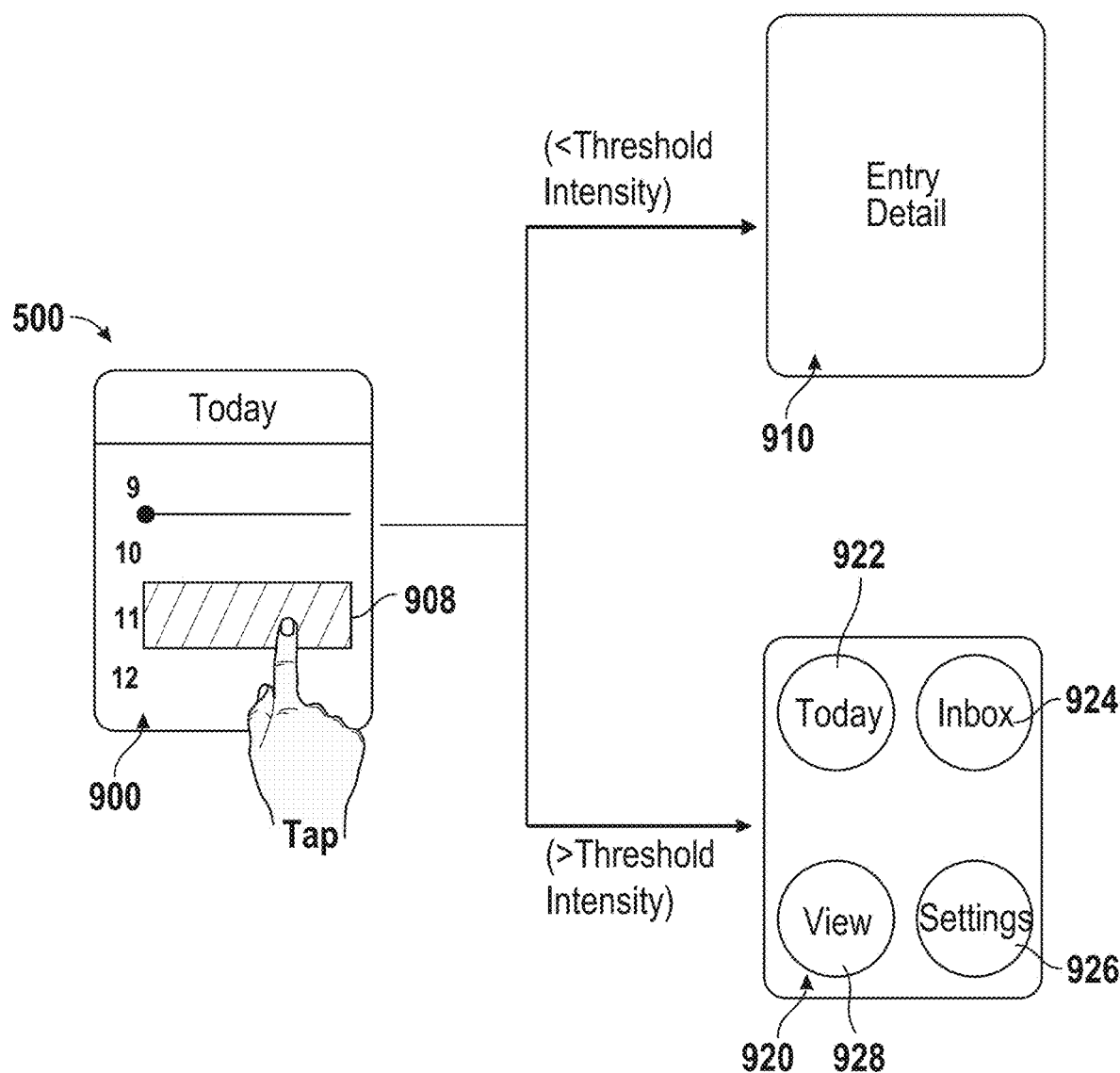
FIG. 9A illustrates an exemplary calendar application user interface according to some embodiments.

In some embodiments, the calendar application of device 500 may invoke different features based on the touch intensity of user input. This aspect is described with reference to FIGS. 9A-9E. As shown in FIG. 9A, device 500 may display day screen 500 which may be day screen 800 (FIG. 8) in some embodiments. A user may select (e.g., touch) region 908, which represents a calendar entry. Device 500 may determine a measurement of the intensity of the selection (e.g., touch) and provide different responses based on the intensity. For example, if the intensity is below a threshold, the calendar application may display calendar entry details screen 910. Calendar entry details screen 910 may be calendar entry details screen 650 (FIG. 6F) in some embodiments. If the intensity is above the threshold, device 500 may display options screen 920 instead of event details screen 910, even though the contact occurred at a position of affordance 908 corresponding to a calendar entry.

Options screen 920 may include affordances for invoking various options (or features) of the calendar application. For example, options screen 920 may include affordance 922 for displaying a day screen for the current day. Options screen 920 may include affordance 924 displaying a "calendar inbox" screen. (Exemplary calendar inbox screens are described below with reference to FIGS. 9C-9D.) Options screen 920 may include affordance 926 for displaying configuration settings related to day screen 900 and/or the calendar application. (Exemplary configuration screens are described below with reference to FIG. 9E.) Options screen 920 may include affordance 928 for toggling between a display of the list and grid versions of the day screen.

Figure 9B:
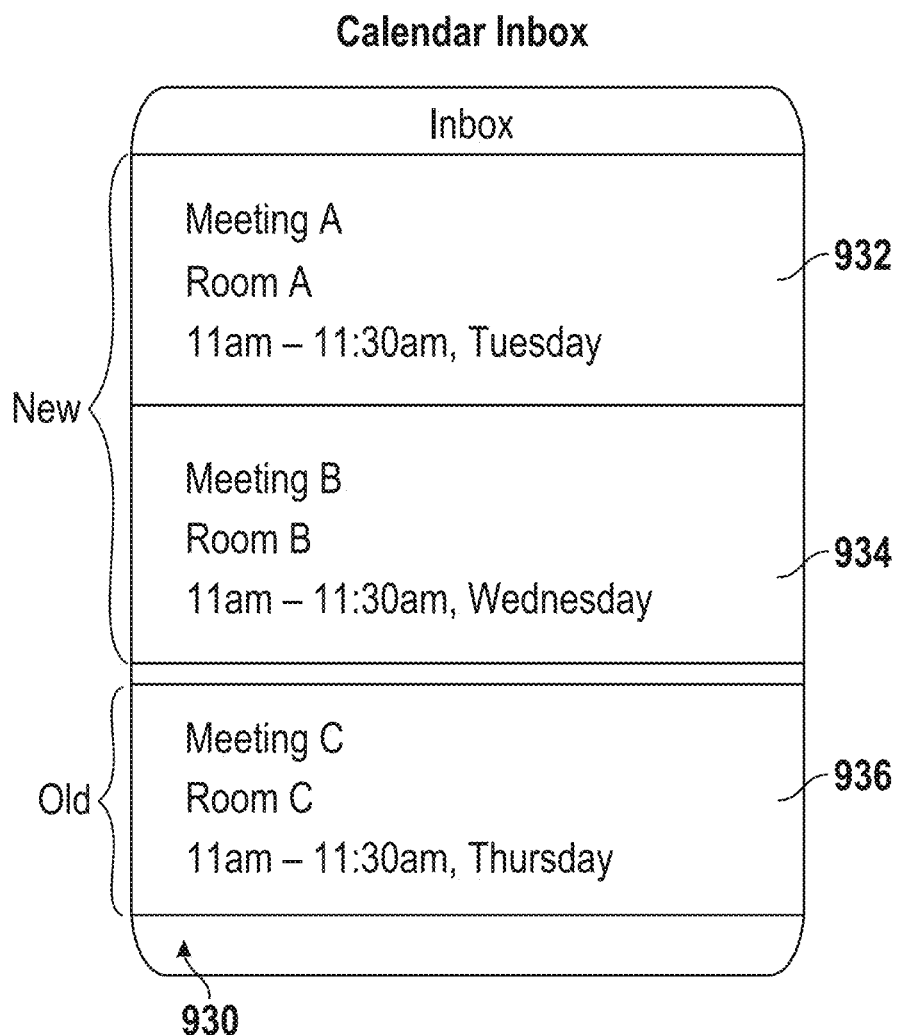
FIG. 9B illustrates an exemplary calendar application user interface according to some embodiments.
Figure 9C:
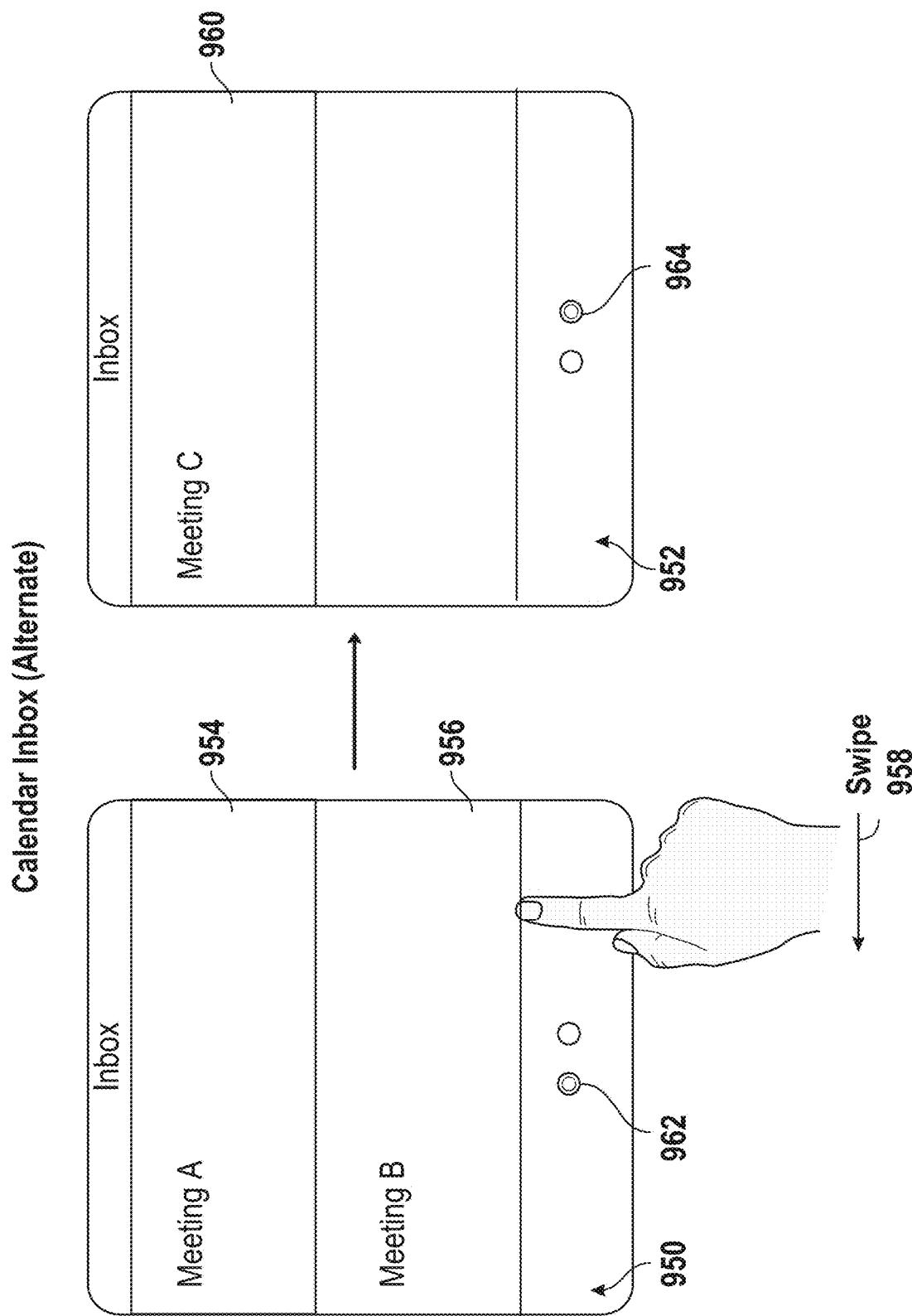
FIG. 9C illustrates an exemplary calendar application user interface according to some embodiments.

Attention is now directed to calendar inbox screens that may be invoked using affordance 924 on options screen 920 (FIG. 9A). FIGS. 9B and 9C illustrate exemplary calendar inbox screens. FIG. 9B illustrates exemplary calendar inbox screen 930 having regions 932, 934, and 936 corresponding to incoming calendar entry invitations. Calendar inbox screen 930 may prioritize the display of new (e.g., unread or recent) invitations. In some embodiments, unread invitations are displayed near the top of calendar inbox screen 930 while invitations that have been read are displayed, if displayed at all, towards the bottom of calendar inbox screen 930. In some embodiments, invitations are sorted by time received, meaning that more recent received invitations are displayed closer to the top of calendar inbox screen 930. In this way, incoming invitations may still be displayed to the user even when a large number of invitations are being managed through the calendar inbox. Calendar inbox screen 930 may be scrollable to reveal additional calendar entry invitations.

FIG. 9C illustrate exemplary calendar inbox screens 950 and 952. Calendar inbox screen 950 may display new calendar entries received by device 500. As shown, regions 954 and 956 represent new calendar entries (e.g., invitations). For example, region 954 may represent the most recently received entry while region 956 may represent an entry that has been received for a while but remains unread. Device 500 may receive user input representing swipe 958 while calendar inbox screen 950 is displayed. In response to the swipe input, device 500 may display calendar inbox screen 952. Calendar inbox screen 952 may display older invitations. For example, region 960 may represent an invitation that the user has answered.

Calendar inbox screens 950 and 952 may each include affordances 962 and 964 indicating the position of each screen among a plurality of screens. Affordances 962 and 964 may enlarge, darken, or otherwise change in visual appearance when the corresponding calendar inbox screen is displayed. An exemplary implementation of affordances 962 and 964 is paging dots.

Figure 9D:
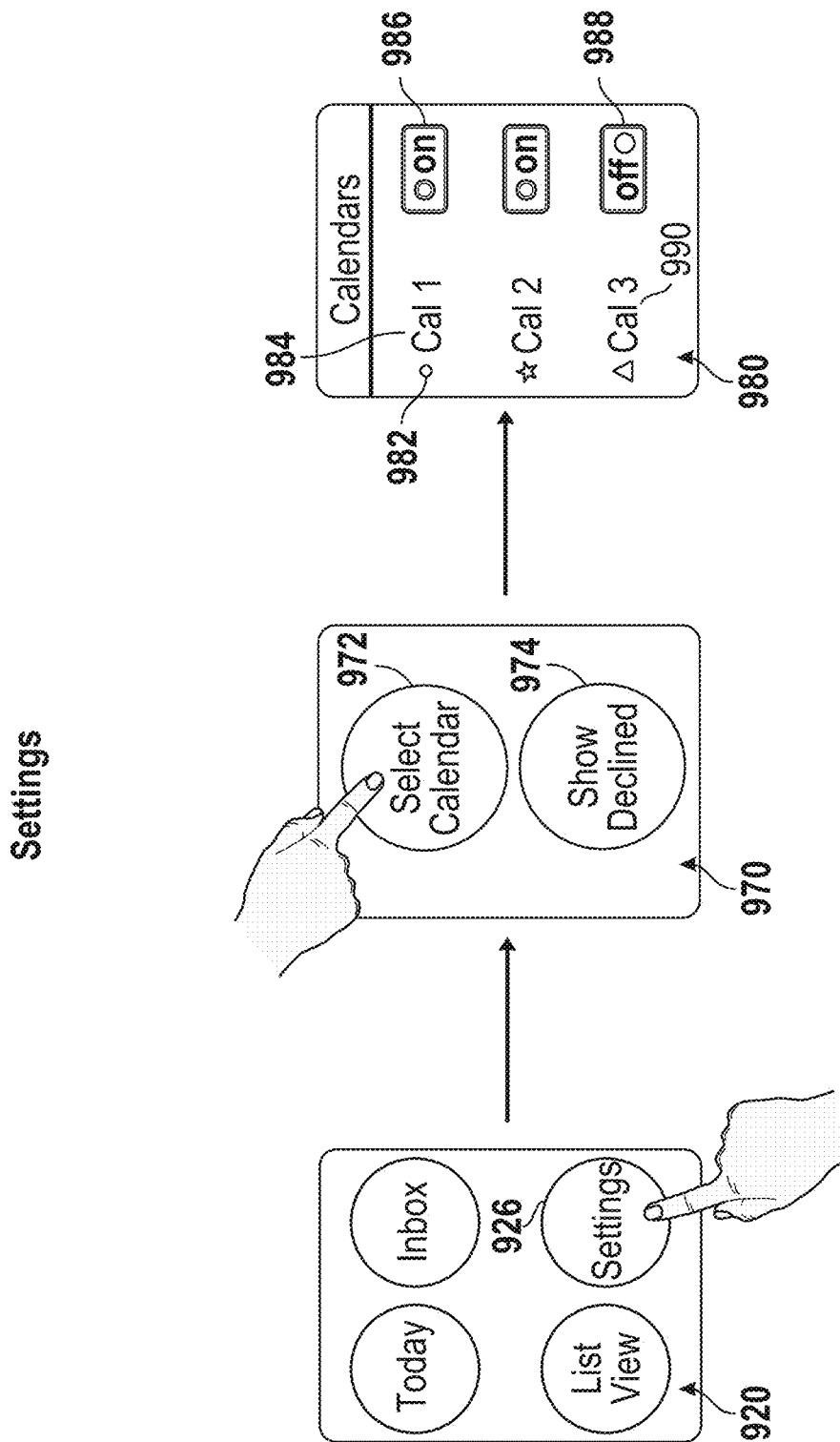
FIG. 9D illustrates an exemplary calendar application user interface according to some embodiments.

Attention is now directed to configuration settings screens that may be invoked using affordance 926 on options screen 920 (FIG. 9A). FIG. 9D illustrates exemplary settings screen 970 for configuring calendar application settings. Configuration screen 970 may include affordances for configuring the calendar application. For example, configuration screen 970 may include affordance 972 for selecting one or more calendars to display in the calendar application. As another example, configuration screen 970 may include affordance 974 for specifying whether the calendar application displays calendar entries previously declined by the user.

In some embodiments, device 500 may display calendar selection screen 980 in response to a touch on affordance 972. Calendar selection screen 980 may include a legend identifying visual representations used to represent different calendars, such as the use of circle 982 to represent calendar 984. Circle 982 may be affordance 670 (FIG. 6F) in some embodiments. Settings screen 980 may also include switches for controlling whether the events of certain calendars are to be shown in the calendar application. For example, switch 986 may be used to indicate that the calendar application should display events of calendar 984 (e.g., personal) while switch 988 may be used to indicate that the calendar application should omit events of calendar 990 (e.g., work).

Figure 9E:
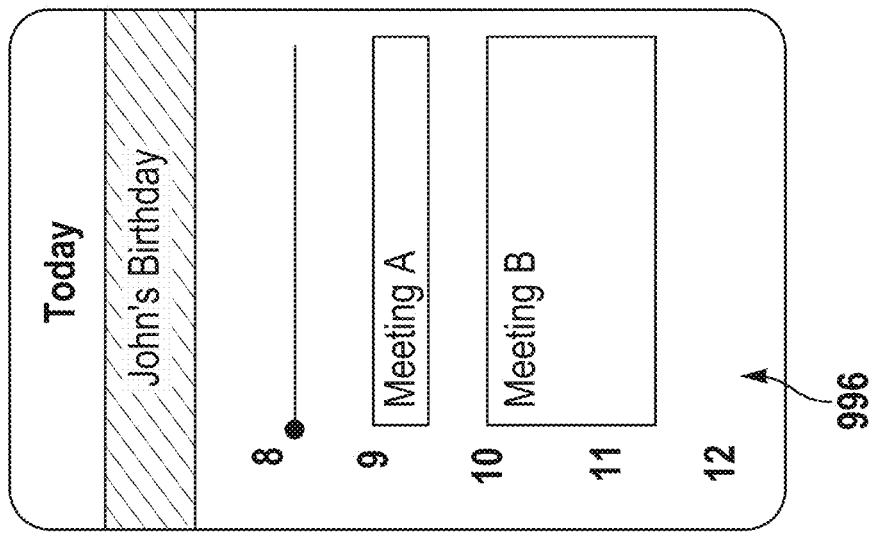
FIG. 9E illustrates an exemplary calendar application user interface according to some embodiments.
Figure 9E:
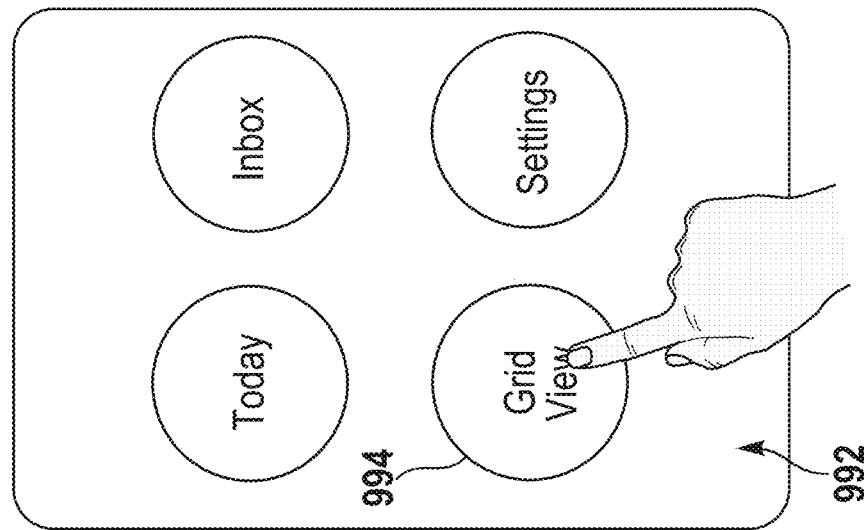
Figure 9E:
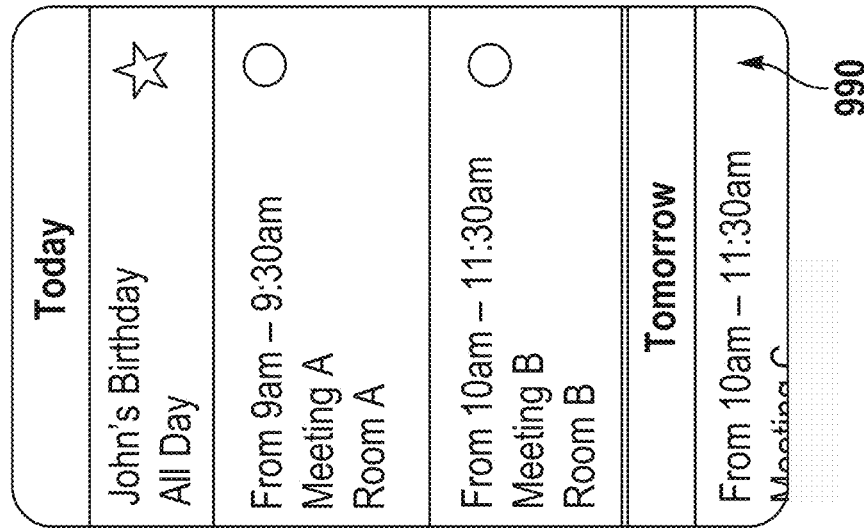

Attention is now directed to the toggling of different on-screen presentations of calendar entries that may be invoked by affordance 928 on options screen 920 (FIG. 9A). In some embodiments, a user may select affordance 928 to toggle between displaying calendar entries in a list format (e.g., day screen 640 in FIG. 6E) or in a grid format (e.g., day screen 630 in FIG. 6D). As shown in FIG. 9E, while the day screen 990 is displayed in list format, a user may invoke options screen 992 and select affordance 994 to redisplay day screen 996 in grid format. Options screen 992 may be options screen 920 in some embodiments. It is also possible to return to the display of day screen 990 in list format in the same manner.

The calendar application may display options screens other than options screen 920 (FIG. 9A) in response to a touch contact that exceeds the threshold intensity. In some embodiments, the displayed options may vary depending on which user interface screen of the calendar application is displayed at the time of the high-intensity touch contact. That is, option screens may be context-sensitive. Examples of additional options screens that may be invoked in this way are described with reference to FIGS. 10A-10

Figure 10B:
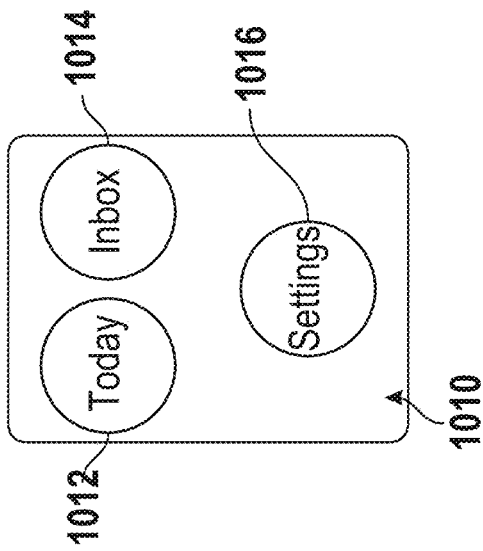
FIG. 10B illustrates an exemplary calendar application user interface according to some embodiments.
Figure 10A:
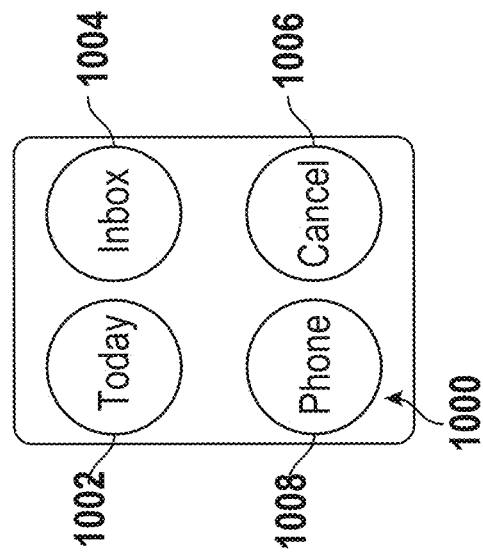
FIG. 10A illustrates an exemplary calendar application user interface according to some embodiments.

FIG. 10A illustrates exemplary options screen 1000. In some examples, device 500 displays options screen 1000 if it receives a touch contact exceeding a threshold while it is displaying a day screen, such as day screen 1030 (FIG. 10D) and/or day screen 1040 (FIG. 10E). Options screen 1000 may include affordance 1002 for causing device 500 to display the day screen for the current day. Option screen 1000 also may include affordance 1004 for causing device 500 to display calendar inbox 940 (FIG. 9C). Options screen 1000 also may include affordance 1006 for causing device to return to the day screen. Options screen 1000 also may include affordance 1008 for causing device 500 to launch a calendar application on another computing device, such as a cellular phone, that is within communications range of device 500. In some embodiments, when affordance 1008 is selected, device 500 may instruct the companion device to display the day screen for the same day that was most recently displayed on device 500.

FIG. 6B illustrates exemplary options screen 1010. In some examples, device 500 displays options screen 1010 if it receives a touch contact exceeding a threshold value while it is displaying month screen 600 (FIG. 6A) or year screen 610 (FIG. 6B). Options screen 1010 may include affordance 1012 for causing device 500 to display the day screen for the current day. Options screen 1010 also may include affordance 1014 for causing device 500 to display calendar inbox 930, 950, or 952 (FIGS. 9B and 9C). Options screen 1010 also may include affordance 1016 for causing device to display a settings screen such as settings screen 970 (FIG. 9D).

FIG. 10C illustrates exemplary options screen 1020. In some examples, device 500 displays options screen 1020 if it receives a touch contact exceeding a threshold value while it is displaying calendar entry details screen 650 (FIG. 6F). Options screen 1020 may include affordance 1022 for causing device 500 to accept an invitation to the event that is displayed on the calendar entry details screen. Options screen 1020 also may include affordance 1024 to indicate possible attendance. Options screen 1020 also may include affordance 1026 to decline attendance. Options screen 1020 also may include affordance 1028 for initiating an email to the events' participants.

FIG. 10D illustrates exemplary options screen 1030. In some examples, device 500 displays options screen 1030 if it receives a touch contact exceeding a threshold value while it is displaying calendar selection screen 1080 (FIG. 10E). Options screen 1040 may include affordance 1042 for causing device 500 to display the day view for the current day. Options screen 1040 also may include affordance 1046 for displaying a settings screen such as settings screen 970 (FIG. 9E).

FIG. 10E illustrates exemplary options screen 1040. In some examples, device 500 displays options screen 1040 if it receives a touch contact exceeding a threshold value while it is displaying calendar inbox 930, 950, or 952 (FIGS. 9B and 9C). Options screen 1040 may include affordance 1042 for causing device 500 to display a day screen for the current day. Options screen 1040 may include affordance 1044 for returning to the calendar inbox screen. Options screen 1040 also may include affordance 1046 for displaying settings screen 970 (FIG. 9E). Note that, although the affordances for invoking various display screens as discussed with respect to FIGS. 10A-10E are illustrated as being circular, they can take on other shapes. The affordances may be rectangular, instead, for example.

4. Responding to Calendar Entries

Figure 11:
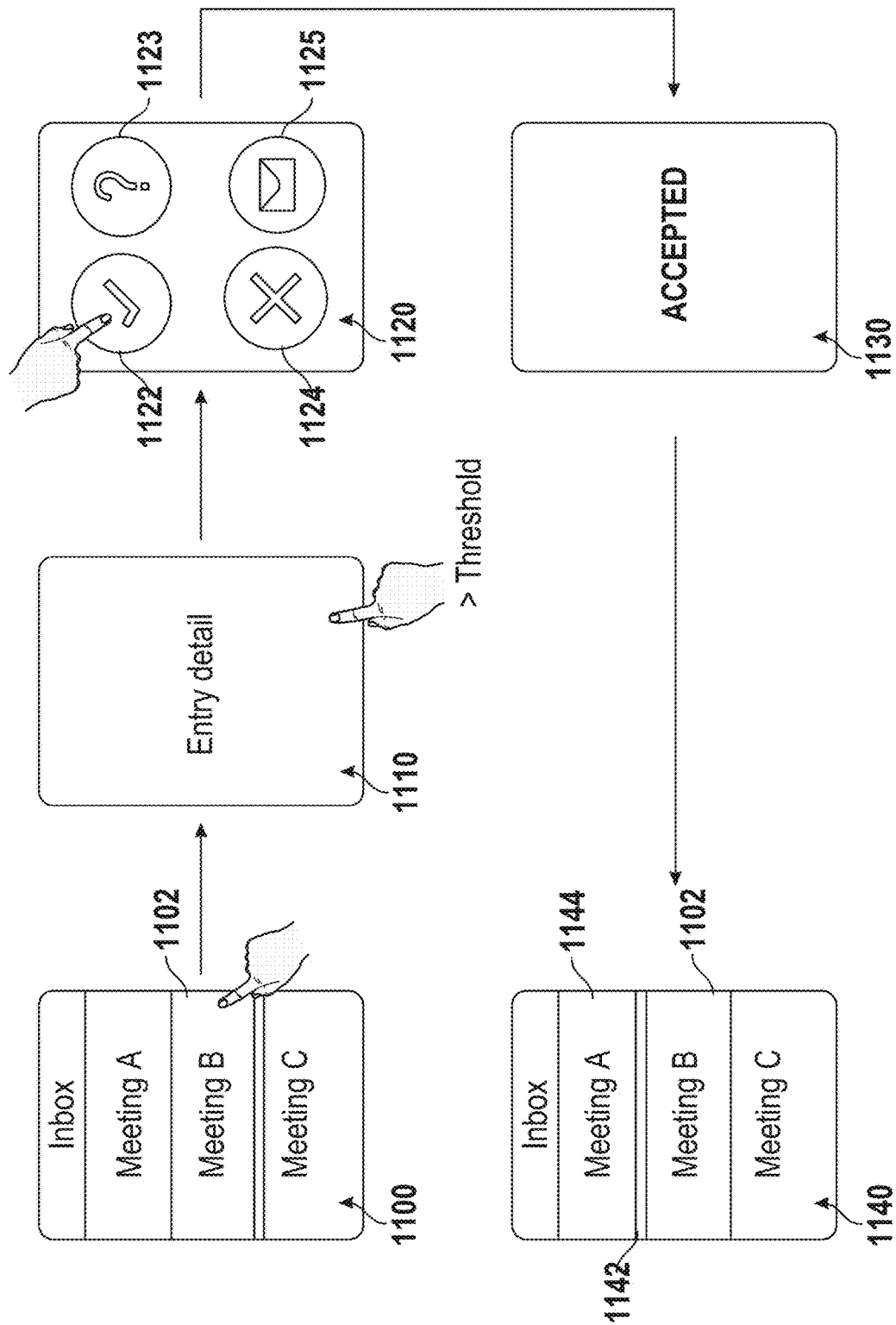
FIG. 11 illustrates an exemplary calendar application user interface according to some embodiments.

Attention is now directed to how the calendar application permits a user to respond (e.g., accept or decline) to an incoming calendar entry (e.g., an invitation). With reference to FIG. 11, device 500 may display calendar inbox screen 1100, which may be screen 930 (FIG. 9B) in some embodiments. Calendar inbox screen 1100 may include region 1102 representing a calendar invitation to "Meeting B." If a user selects (e.g., touches) region 1102, the calendar application may cause device 500 to display event details screen 1110. Screen 1110 may be screen 1050 (FIG. 10F) in some embodiments. While event details screen 1110 is displayed, if a user makes contact with the touch-sensitive display of device 500—and the contact has a maximum intensity exceeding a threshold—the calendar application may display options screen 1120. Options screen 1120 may be screen 920 (FIG. 9A) in some embodiments. Options screen 1120 may include: affordance 1122 for accepting the invitation; affordance 1124 for declining the invitation; affordance 1126 for indicating tentative attendance; and affordance 1128 for initiating communication (e.g., e-mail or message) with a member of the invitation, such as the event's organizer. If a user makes contact with affordance 1122, the calendar application displays acceptance screen 1130. Acceptance screen 1130 may show an indication confirming that the calendar entry has been accepted. The calendar application also may transmit a message to the event organizer indicating the user's acceptance of the calendar entry.

In some embodiments, device 500 may display acceptance screen 1130 momentarily (e.g., for a predetermined time interval), and subsequently display calendar inbox screen 1140. In some embodiments, device 500 may display acceptance screen 1130 until a user input is received (e.g., a touch or swipe), at which time device 500 transitions to the display of calendar inbox screen 1140. While calendar inbox screens 1100 and 1140 are similar, note that region 1102 is displayed below divider 1142 in screen 1140. This positioning indicates that the user has responded to the incoming calendar entry represented by affordance 1102. In this way, other invitations (e.g., the invitation represented by region 1144) may be more prominently displayed to encourage user response.

5. Creating New Calendar Entries

Figure 12A:
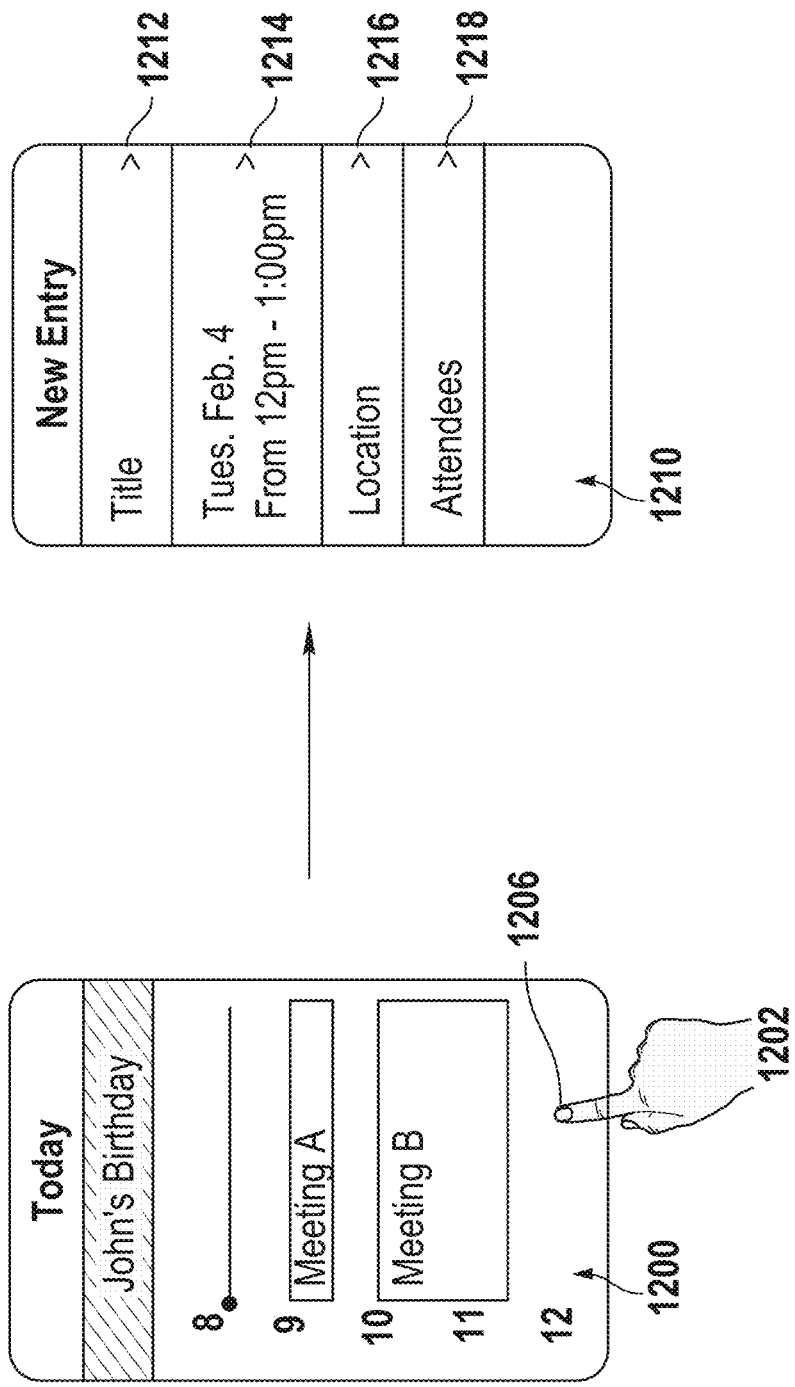
FIG. 12A illustrates an exemplary calendar application user interface according to some embodiments.

Attention is now directed to the creation of new calendar entries using the calendar application. This aspect is described with respect to FIGS. 12A and 12B. FIG. 12A illustrates exemplary user interface screens for creating a new calendar entry according to some embodiments. As shown, device 500 may display day screen 1200, which may be screen 630 (FIG. 6D) in some examples. While day screen 1200 is displayed, if a user selects position 1206, the calendar application may display new entry screen 1210. New entry screen 1210 may include input areas for entering information regarding the new calendar entry. For example, new entry screen 1210 may include text input area 1212 for a name of the corresponding event. Screen 1210 may also include affordance 1214 for invoking a time (and optionally, day) picker for an event time. Screen 1210 may also include affordance 1216 for entering location information. Screen 1210 also may include affordance 1218 for invoking a selector for selecting meeting attendees. In some examples, affordance 1214 may default to a meeting date of day 1204, which is the day displayed on day screen 1200. In some embodiments, affordance 1214 may default to a time corresponding to position 1206, which is the location of user selection 1202. In some embodiments, affordance 1214 may default to the top of the next hour or to the next half hour.

Figure 12B:
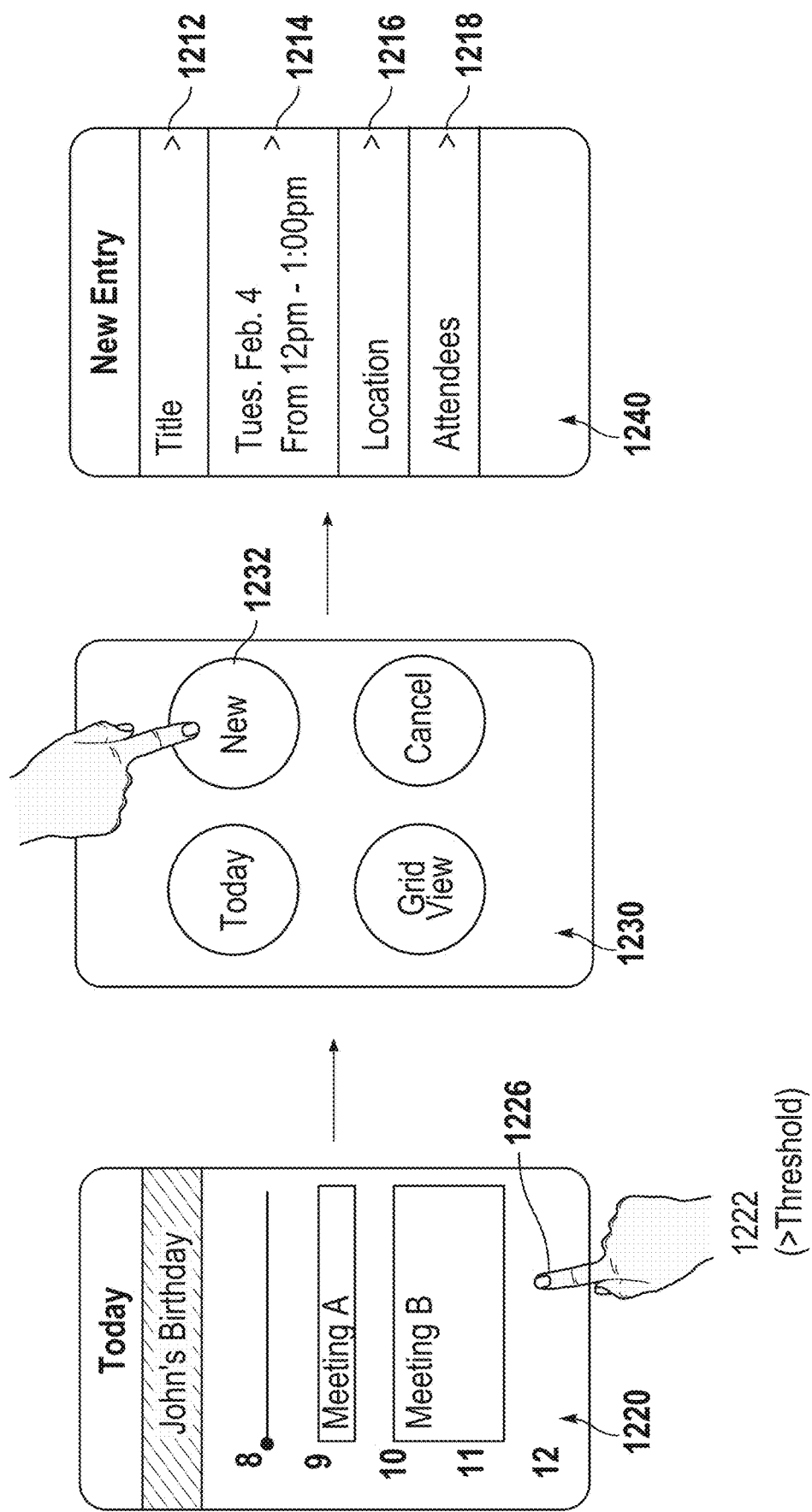
FIG. 12B illustrates an exemplary calendar application user interface according to some embodiments.

FIG. 12B illustrates exemplary user interface screens for creating a new calendar entry according to some embodiments. As shown, device 500 may display day screen 1220, which may be screen 630 (FIG. 6D) in some embodiments. While day screen 1220 is displayed, if a user makes contact 1222 with the touch-sensitive display of device 500, and a characteristic intensity of the contact exceeds a threshold value, the calendar application may display options screen 1230. Options screen 1230 may include affordance 1232 for creating a new calendar entry. While options screen 1230 is displayed, if a user selects affordance 1232, the calendar application may display new calendar entry screen 1240. Screen 1240 may be new calendar entry screen 1210 in some embodiments.

6. Exemplary Flow: Contacting Organizer

Figure 13:
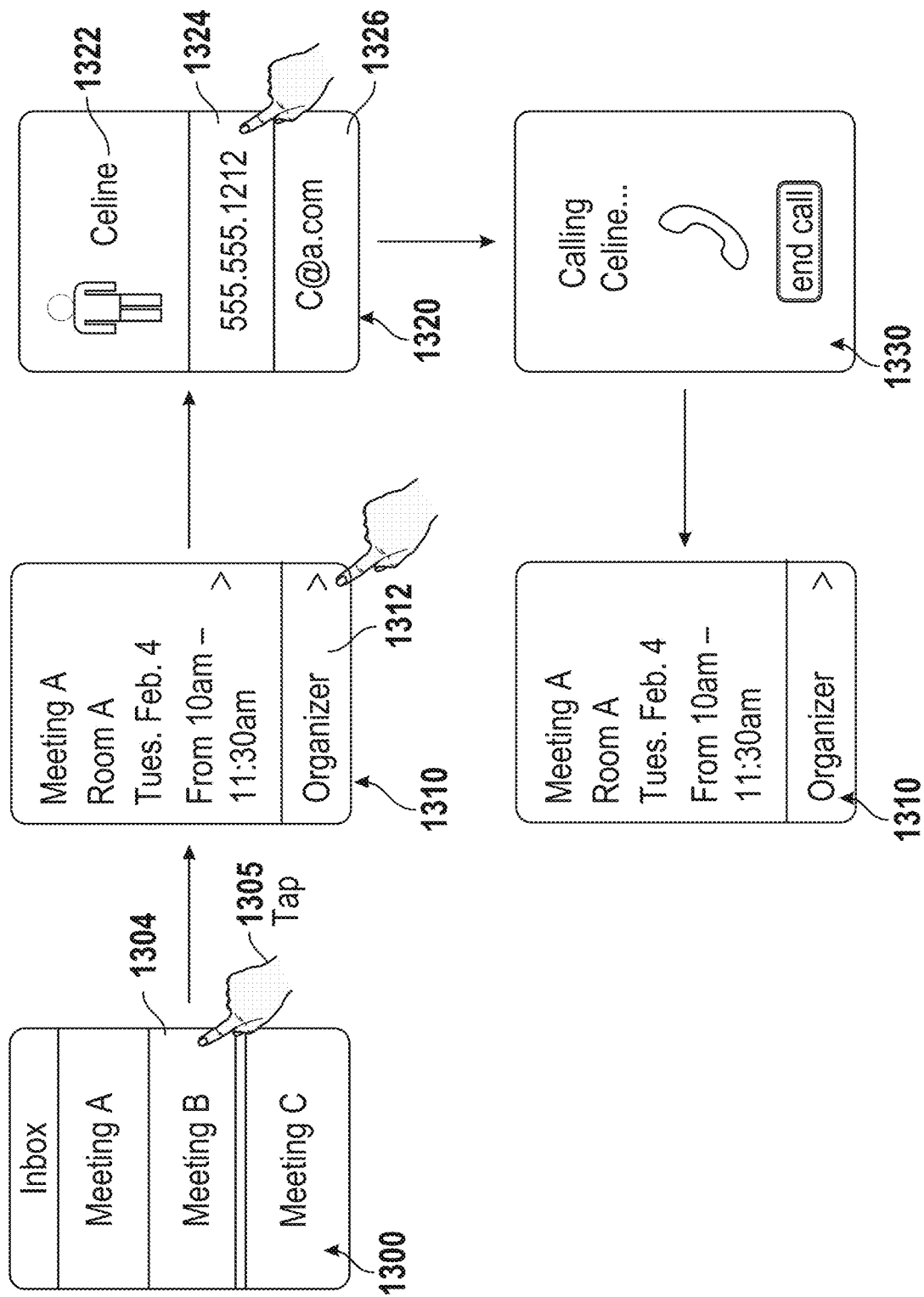
FIG. 13 illustrates an exemplary calendar application user interface according to some embodiments.

Attention is now directed to features for contacting one or more persons associated with calendar entry, such as an event organizer. This aspect is described with respect to FIGS. 13 and 14. As shown in FIG. 13, device 500 may display calendar inbox screen 1300. Calendar inbox screen 1300 may be screen 930 (FIG. 9C) in some embodiments. Calendar inbox screen 1300 may include region 1304 representing a calendar entry. When a user selects region 1304, the calendar application may display calendar entry details screen 1310. Calendar entry details screen 1310 may be screen 1050 (FIG. 10F) in some embodiments. Calendar entry details screen 1310 may have affordance 1312 identifying an event organizer. When a user selects affordance 1312, the calendar application may display contact card screen 1320.

Contact card screen 1320 also may include name 1322, phone number 1324, and e-mail 1326 for the event organizer. When a user selects phone number 1324, the calendar application may initiate a phone call to the indicated number. In some embodiments, the phone call may be initiated using a cellular communication unit of device 500. In some embodiments, the phone call may be initiated using a network communication unit of device 500, such as a voice-over-IP unit. In some embodiments, device 500 instructs a companion device, such as a cellular phone, to initiate the phone call using the companion device's cellular communication unit. In some embodiments, device 500 instructs a companion device, such as a networkable laptop computer, to initiate the phone call using the companion device's network communication unit. Upon initiating the phone call, device 500 displays call progress screen 1330. At the conclusion of the phone call, device 500 returns to event details screen 1310.

Figure 14A:
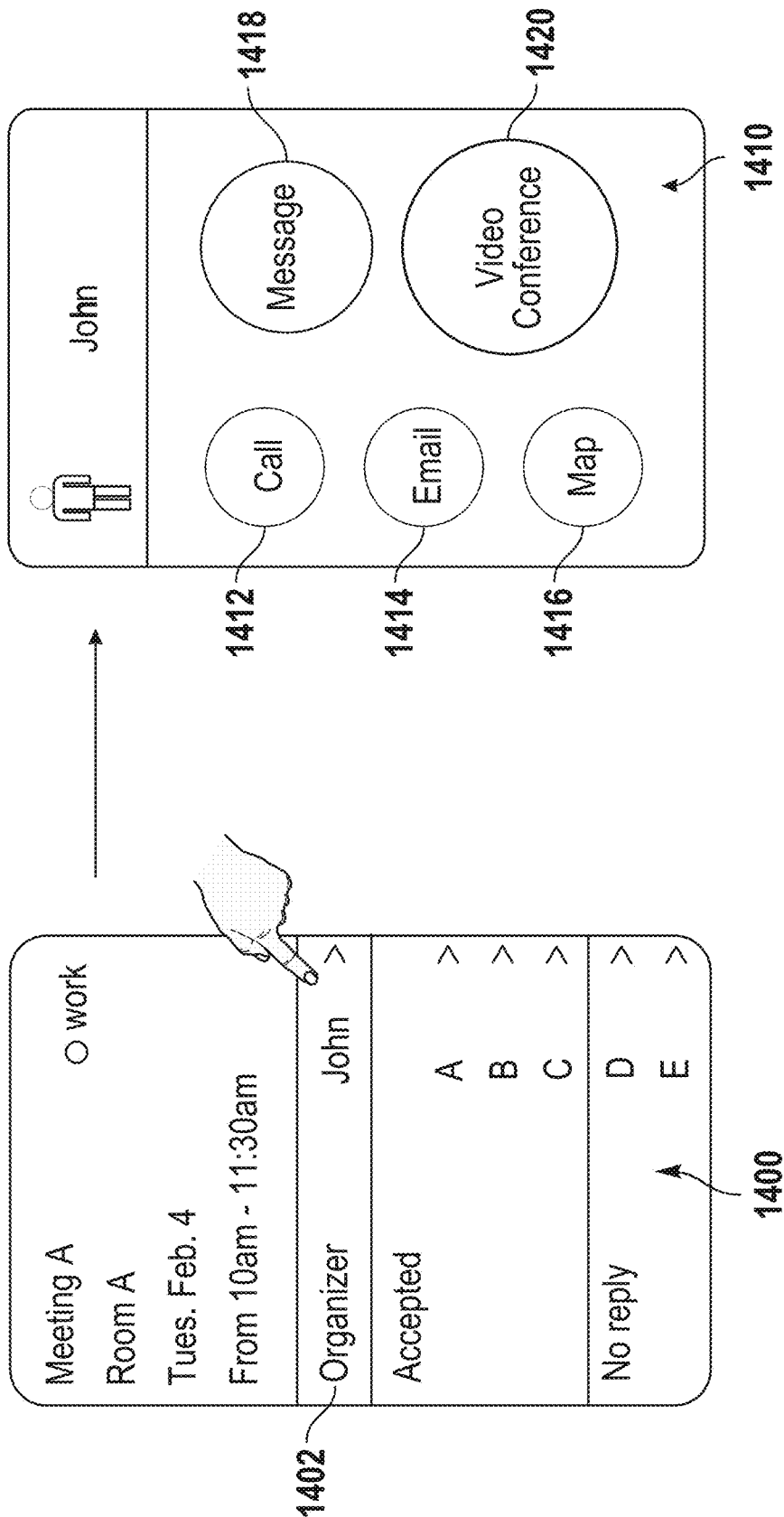
FIG. 14A illustrates an exemplary calendar application user interface according to some embodiments.

FIG. 14A shows additional exemplary user interface screens for contacting one or more persons associated with a calendar entry. As shown, device 500 may display calendar entry details screen 1400. Calendar entry details screen 1400 may be screen 1050 (FIG. 6F) in some embodiments. Calendar entry details screen 1400 may include affordance 1402 identifying the event's organizer. If a user selects event organizer affordance 1402, the calendar application may display contact card screen 1410.

Contact card screen 1410 may include affordance 1412 for initiating a phone call to the event organizer. If a user selects affordance 1412, device 500 may display screen 1330 (FIG. 13) and initiate a call to the organizer. Contact card screen 1410 also may include affordance 1420 for initiating a video conference with the event organizer. If a user selects affordance 1412, device 500 may launch a video conferencing application.

Contact card screen 1410 also may include affordance 1414 for initiating an e-mail to the event organizer. If a user selects affordance 1414, device 500 may permit a user to create an e-mail message using various modalities. In some embodiments, device 500 may display a soft keyboard for entering an e-mail message. In some embodiments, device 500 may permit a user to aurally dictate a message which is then included in a draft e-mail as text. In some embodiments, device 500 may permit a user to record a voice memo, which is then included in a draft e-mail as an audio attachment. In some embodiments, device 500 may permit a user to send emoji characters. In some embodiments, device 500 may present, for the user's selection, a list of predicted text that device 500 has determined to be possible and/or likely responses.

These predicted texts may include those described in U.S. Provisional Patent Application No. 62/005,958, "Canned Answers in Messages," filed May 30, 2014, (the "Canned Answers Specification") the content of which is hereby incorporated by reference. For instance, the Canned Answers Specification describes predicting a user's likely response to an incoming message and presenting those predicted responses as options for user selection. In some embodiments the predictions are based the content of an incoming message and/or the sender's identity. In some examples, responsive to an incoming message that contains a question mark, the system predicts and presents the canned answers "yes" and "no." In some examples, responsive to an incoming message that contains two phrases separated by the word "or," the system presents the word appearing before "or" and the word appearing after "or" as canned answers. In some examples, responsive to an incoming message from a sender identified as the user's wife (e.g., through the user's contact list), the system predicts and presents the phrase "I love you" as a canned response.

Contact card screen 1410 may also include affordance 1418 for sending a message to the event organizer. Device 500 may permit a user to create a message (e.g., SMS message) using one or more of the above-described input modalities.

Contact card screen 1410 also may include affordance 1416 for launching a map application that maps an address of the event organizer. If a user selects affordance 1416, device 500 may launch a maps application mapping the address of the event organizer. In some embodiments, the address is static, such as a work address from the organizer's business card. In some embodiments, the address is dynamic, such as updated locational information reported by a GPS-equipped device of the organizer's.

Figure 14B:
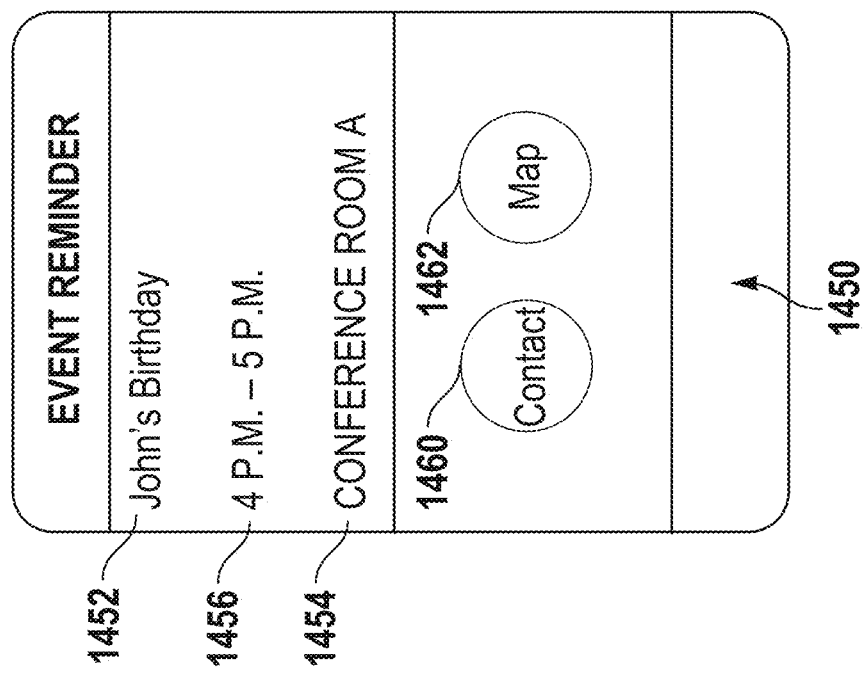
FIG. 14B illustrates an exemplary calendar application user interface according to some embodiments.

FIG. 14B shows additional exemplary user interface screens for an event reminder. As shown, device 500 may display event reminder screen 1450, for instance, alerting the user of an upcoming event. As previously described, in some examples, the device 500 may alert the user an amount of time prior to an event, and the amount of time may either be fixed or based on an amount of time required for the user to travel to the event. Event reminder screen 1450 may include affordance 1452 identifying the event, affordance 1454 identifying the location of the event, affordance 1456 identifying the time of the event, and affordance 1458 identifying the location of the event. In some examples, any of affordances 1452-1458 may be combined or separated further into sub-affordances. The event reminder screen 1450 may further include affordances 1460 and 1462. If a user selects affordance 1460, the calendar application may display a contact card screen, such as the contact card screen 1410 (FIG. 14A), allowing the user to contact the organizer as described. The user may, for instance, indicate to the organizer a time at which the user will arrive at the event. If a user selects affordance 1462, the calendar application may launch a map application that maps an address of the event (or event organizer). As described, in some examples, the address may be static or dynamic.

7. Additional Details—Calendar Screens

Figure 15:
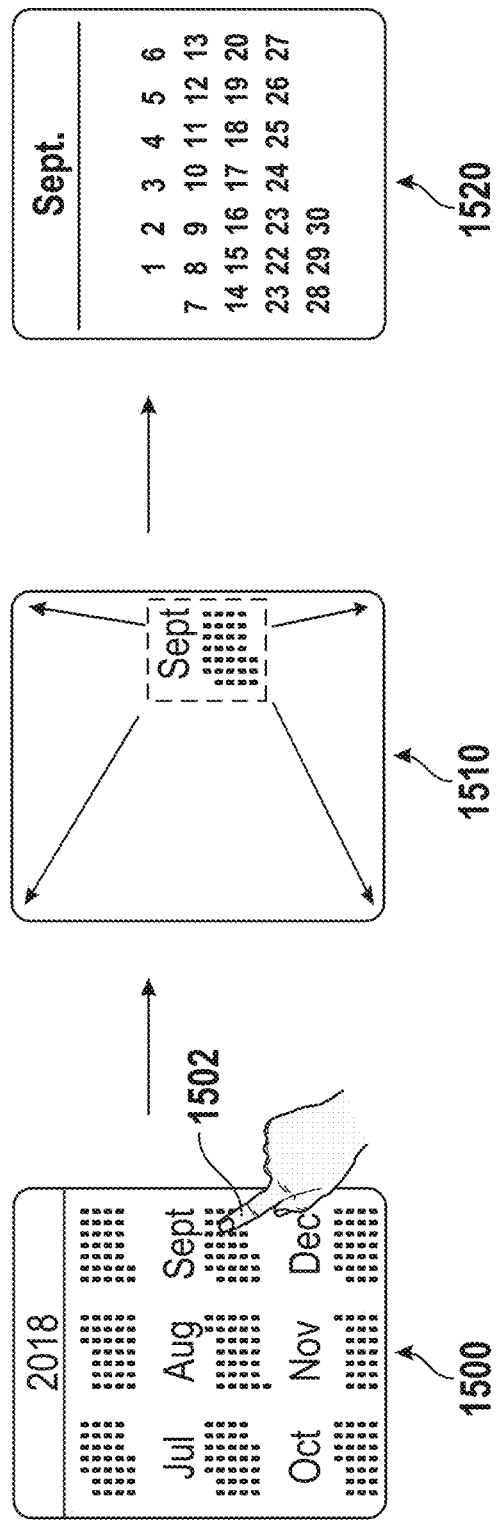
FIG. 15 illustrates an exemplary calendar application user interface according to some embodiments.

Attention is now directed to additional user interface transitions that may be displayed by the calendar application in response to user interaction. FIG. 15 illustrates an exemplary transition between the year and month screens in some embodiments of the calendar application. As shown, device 500 may display year screen 1500 showing certain months of the year. Year screen 1500 may be screen 610 (FIG. 6B) in some embodiments. A user may select one of the displayed months. For example, a user may contact the touchscreen at position 1502 corresponding to the month of September. In response to the user selection, the calendar application transitions to month screen 1510 showing the touched month (i.e., September). Month screen 1510 may be month screen 600 (FIG. 6A) in some embodiments. As shown, the transition may include enlarging (at least parts of) the selected month (i.e., September) from screen 1500 into screen 1520. In some embodiments, the transition includes translating the non-selected months—displayed in screen 1500—off-screen as the selected month enlarges.

Figure 16:
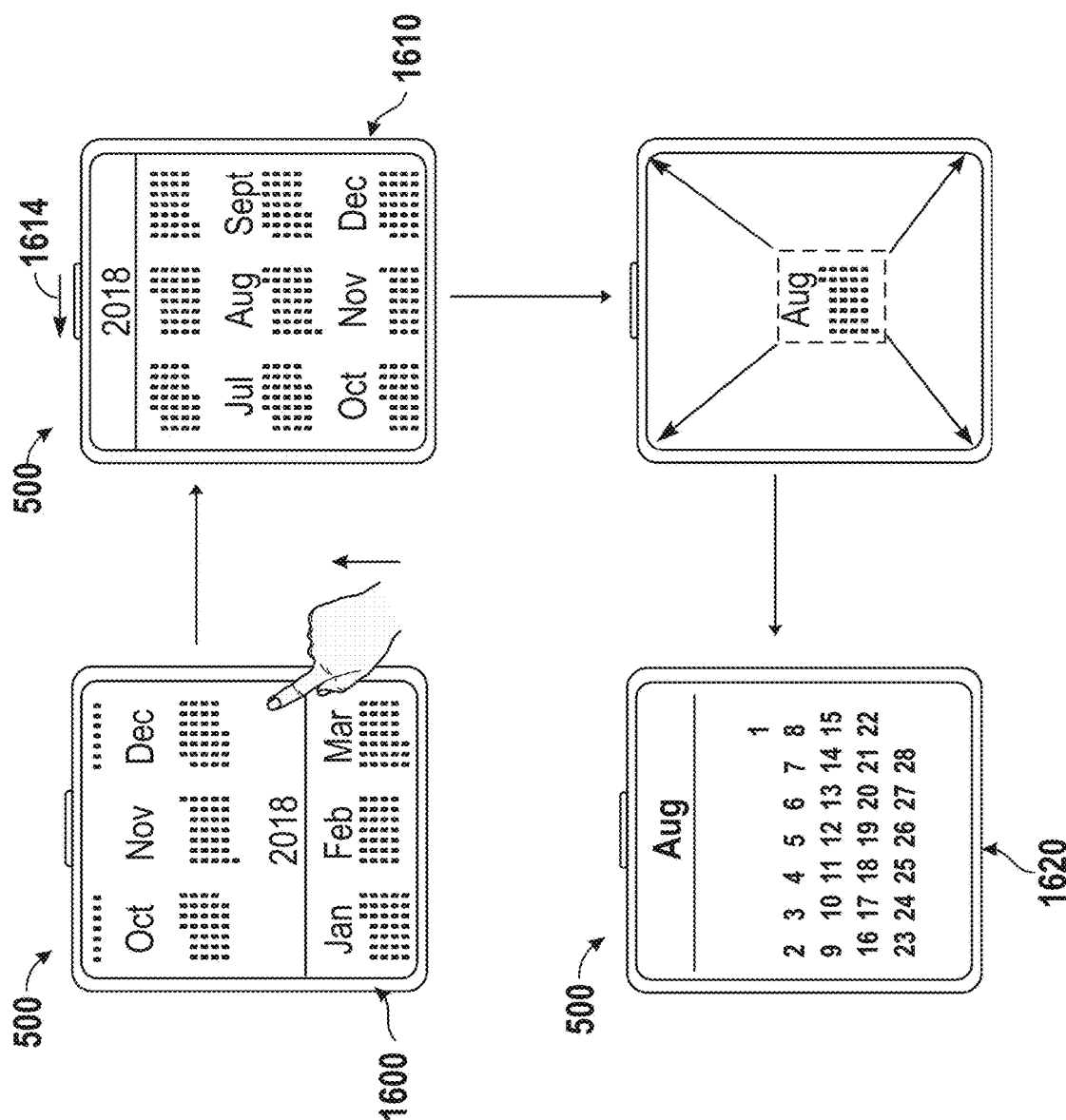
FIG. 16 illustrates an exemplary calendar application user interface according to some embodiments.

FIG. 16 illustrates another exemplary transition between the year and month screens in some embodiments of the calendar application. As shown, device 500 may display year screen 1600 showing certain months of the years 2017 and 2018. Year screen 1600 may be screen 610 (FIG. 6B) in some examples. While year screen 1600 is displayed, a user may swipe upwards on the touch-sensitive display of device 500, which may cause the calendar application to scroll the year screen 1600 in a corresponding direction to reveal additional months in year 2018. Year screen 1610 illustrates the display of additional months of the year 2018. In year screen 1610, the month of August is the center-most of the displayed months. A user may rotate the rotatable input mechanism of device 500 while year screen 1610 is displayed with August being the center-most month. In response to rotation 1614, the calendar application may transition to month screen 1620 displaying details of the center-most month—August. In some embodiments, the transition includes enlarging (at least parts of) the display of the center-most month. In some embodiments, the transition includes translating the other displayed months off-screen as the center-most month expands.

Figure 17:
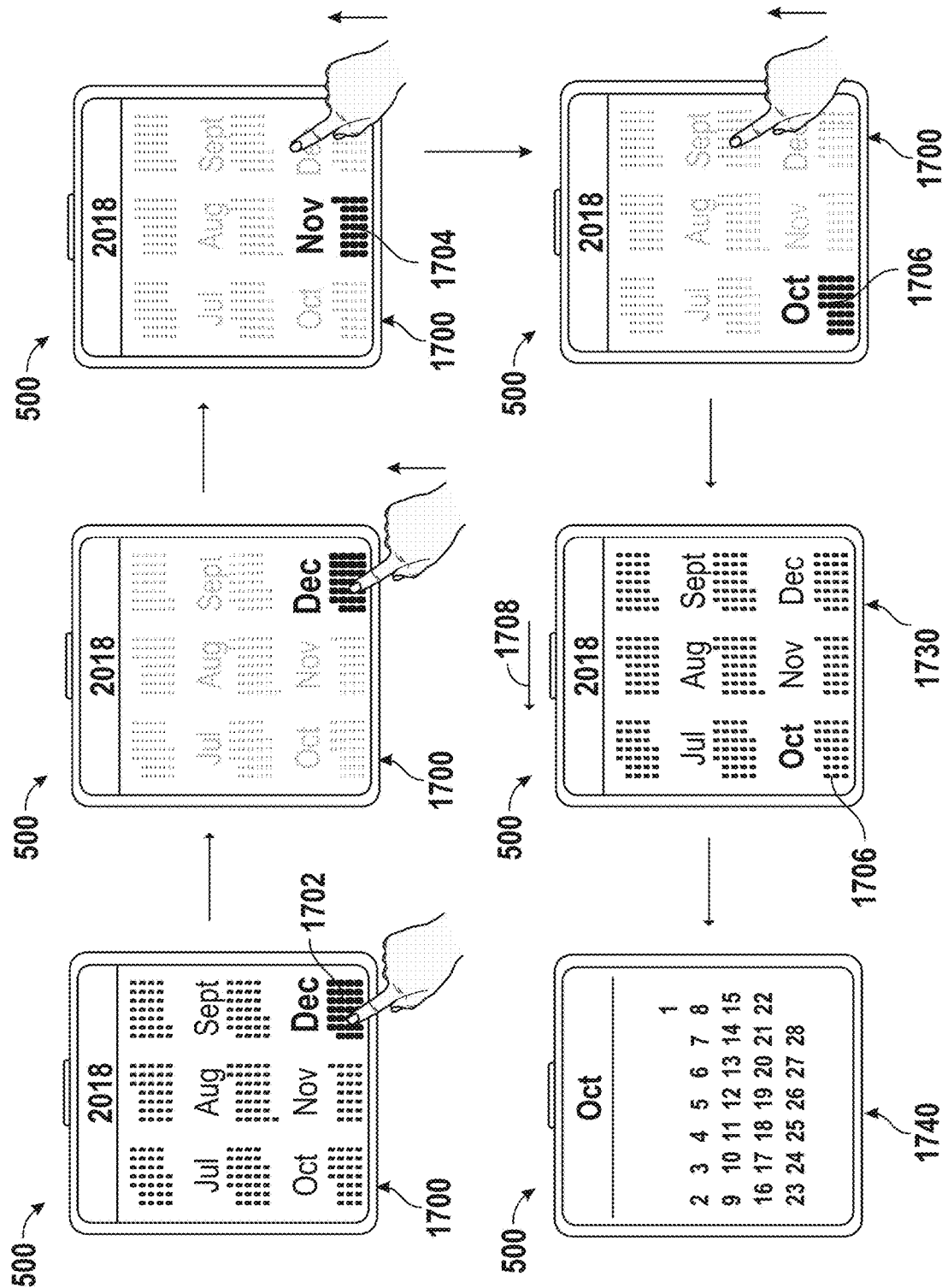
FIG. 17 illustrates an exemplary calendar application user interface according to some embodiments.

FIG. 17 illustrates another exemplary transition between the year and month screens in some embodiments of the calendar application. As shown, device 500 may display year screen 1700. Year screen 1700 may be year screen 610 (FIG. 6B) in some embodiments. When year screen 1700 is displayed, a user may select one of the displayed months. For example, a user may touch the touch-sensitive display of device 500 at a position where month 1702 (i.e., December)

is displayed. In some embodiments, in response to the user selection, the selected month (1702) is visually emphasized. For example, the selected month may brighten, flash, become boldfaced, and/or become more opaque. In some embodiments, in response to the user selection, the non-selected months are visually de-emphasized. For example, they may dim, fade, and/or become translucent. In some embodiments, the selected month remains unchanged visually while the non-selected months are visually de-emphasized. In some embodiments, the selected month is visually emphasized while the non-selected months remain unchanged visually.

While still selecting (e.g., touching) the touch-sensitive display of device 500, the user may drag (e.g., slide) his finger in a particular direction, for example, upwards. As shown, in response to the upward sliding finger, month 1704 (November)—which precedes month 1702 (December)—becomes visually emphasized, and month 1702 becomes visually de-emphasized. As the user continues to slide his finger upwards, month 1706 (October)—which precedes month 1704 (November)—becomes visually emphasized, and month 1702 becomes visually de-emphasized. When the user releases his selection (e.g., touch), all of the displayed months may return to their normal visual appearance, except month 1706 (October), which now has focus. In this way, a user can place focus on a particular month of the displayed year. While month 1706 has focus, a user may rotate the rotatable input mechanism of device 500 (as indicated by arrow 1708) to transition from year screen 1730 to month screen 1740, which shows the days of month 1706.

Figure 18:
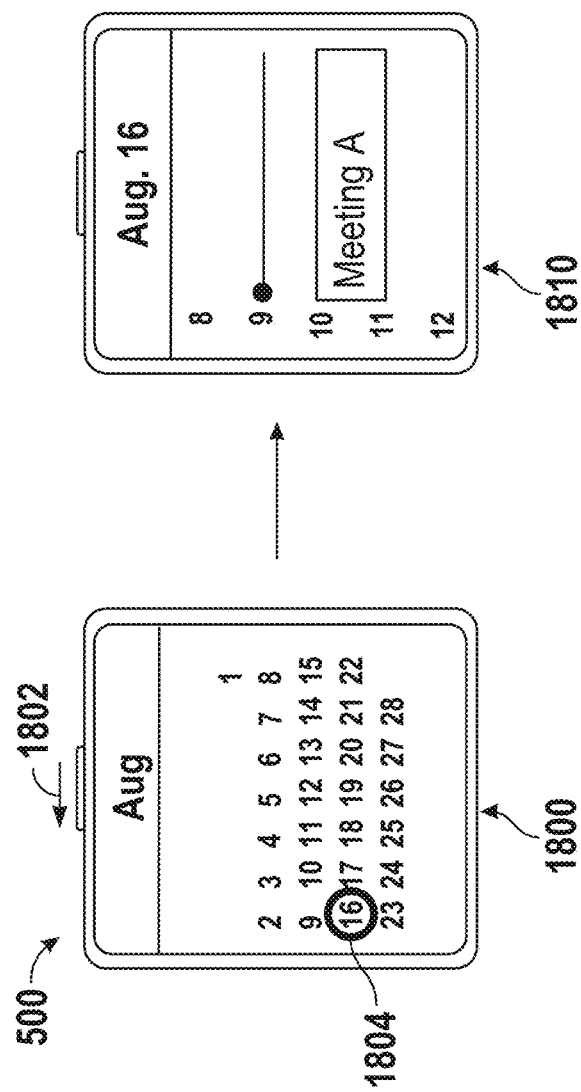
FIG. 18 illustrates an exemplary calendar application user interface according to some embodiments.

FIG. 18 illustrates an exemplary transition between the month and day screens of the calendar application. As shown, device 500 may display month screen 1800. Month screen 1800 may be screen 600 (FIG. 6A) in some examples. Month screen includes affordance 1802 indicating a currently selected day. While month screen 1800 is displayed, a user may rotate the rotatable input mechanism of device 500, as indicated by arrow 1802. In response to rotation 1802, the calendar application may transition to the display of day view 1810. Day view 1810 may display calendar entries scheduled for the day marked by affordance 1804.

Figure 19:
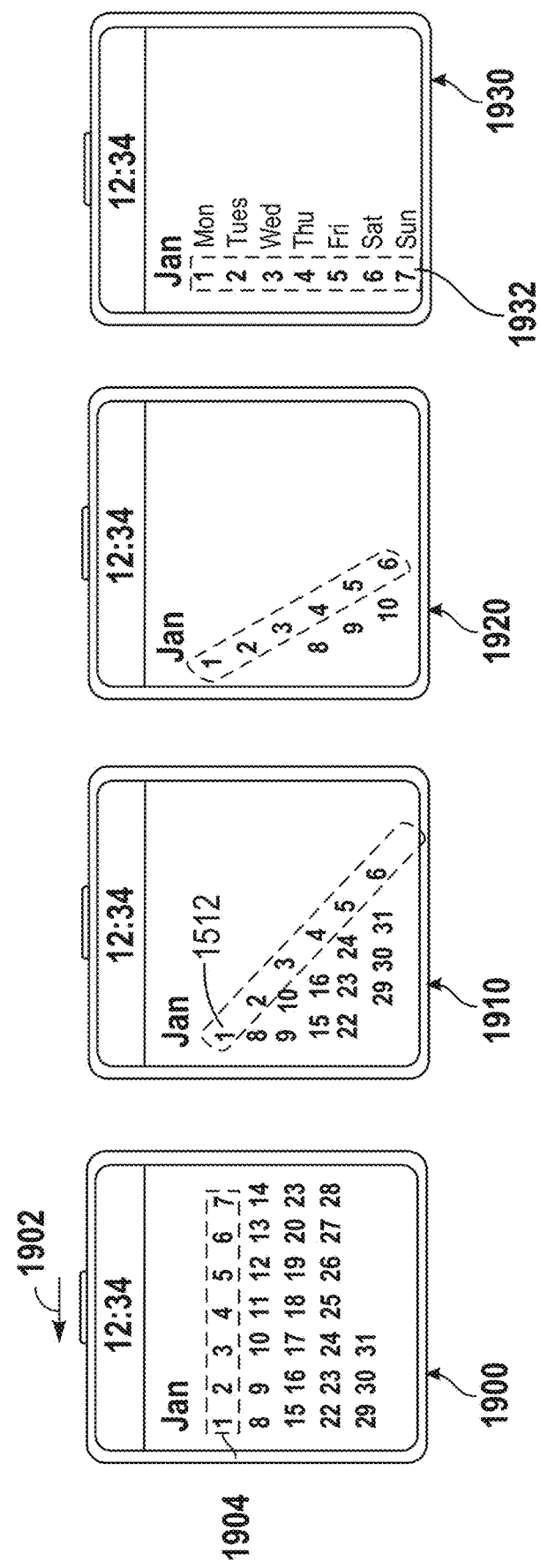
FIG. 19 illustrates an exemplary calendar application user interface according to some embodiments.

FIG. 19 illustrates an exemplary transition between the month and week screens of the calendar application. The week screen displays the days in a particular week. As shown, device 500 may display month screen 1900. Month screen 1900 may be screen 600 (FIG. 6A) in some embodiments. Month screen 1900 may indicate the days of a month across multiple rows. These rows include, for example, row 1904, which indicates the days of a particular week in the displayed month. While month screen 1900 is displayed, a user may rotate the rotatable input mechanism of device 500 as indicated by arrow 1902. In response to rotation 1902, device 500 may transition from displaying month screen 1900 to displaying week screen 1930. In week screen 1930, numerals representing the days of a week are displayed vertically. In addition, weekday identifiers (e.g., Mon, Tues, so forth) are displayed adjacent the numerals.

The translation between screen 1900 and screen 1930 involves on-screen translation of numerals (representing days) from their positions in row 1904 to their new positions in column 1932. This transition is illustrated by exemplary screens 1910 and 1920. In screen 1910, row 1904 is shown pivoting from its horizontal (row) orientation towards a vertical (column) orientation roughly about position 1912. While row 1904 pivots, numerals in other rows are translated off-screen. Screen 1920 illustrates further progression of this translation. As can be seen, in this stage of the transition, many numerals have been translated off-screen, leaving primarily the numerals of row 1904. As the transition of row 1904 into column 1932 completes, weekday identifiers are added adjacent the displayed numerals, as shown on week screen 1930.

Figure 20A:
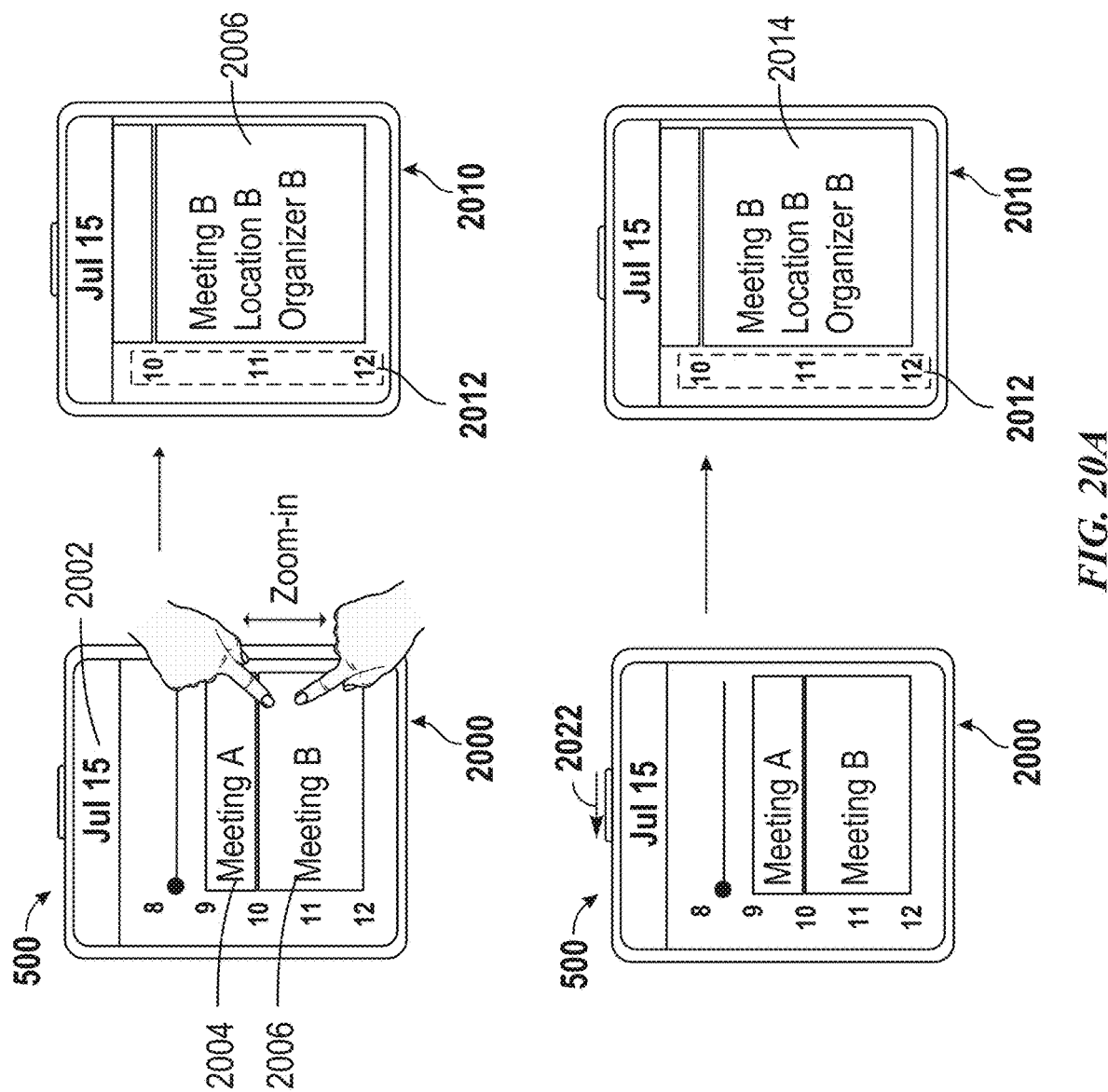
FIG. 20A illustrates an exemplary calendar application user interface according to some embodiments.
Figure 20B:
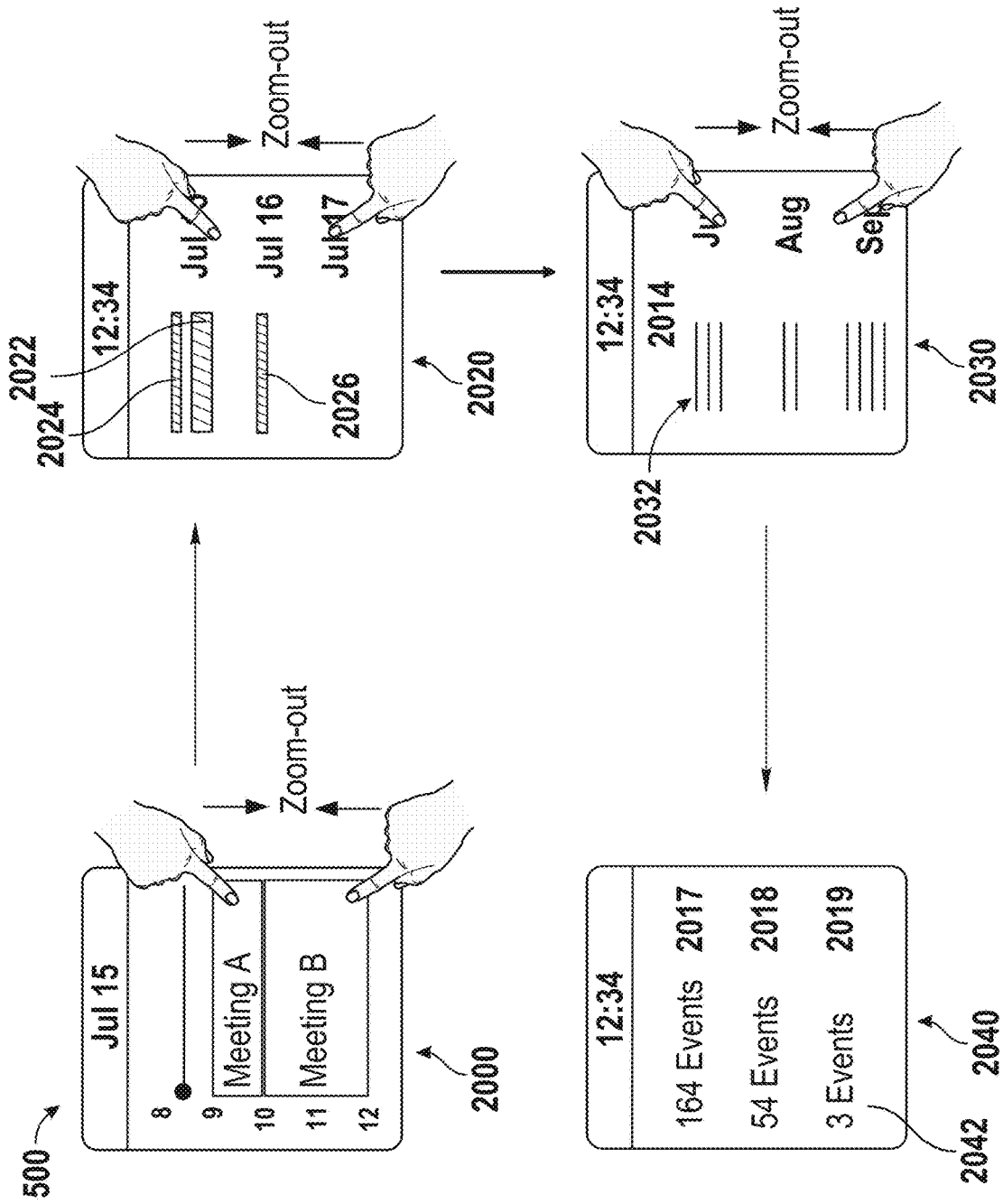
FIG. 20B illustrates an exemplary calendar application user interface according to some embodiments.

FIGS. 20A and 20B illustrate a feature of the calendar application that may be referred to as progressive disclosure. Progressive disclosure refers to the ability of the application to vary—as a user zooms in or out—the content of displayed information. Progressive disclosure may occur together with changes in the size of the displayed information, as a user invokes zooming functionality. In some embodiments, device 500 may display more detailed information regarding displayed events when fewer events are displayed (e.g., when a calendar screen is zoomed in). Conversely, device 500 may display less information regarding specific events when more events are displayed (e.g., when a calendar application is zoomed out). In this way, the calendar application may display the most appropriate level of detail based on the granularity of the zoom. It is noted that progressive disclosure, which may display more information when zoomed-in, stands in contrast to conventional zoom functionalities, which tend to display less information, at a larger size, when zoomed-in.

Exemplary user interface screens illustrating progressive disclosure are now described. As shown in FIG. 20A, device 500 may display day screen 2000. Day screen 2000 may be screen 630 (FIG. 6D) in some embodiments. Day screen 2000 includes calendar entries scheduled for day 2002. Device 500 may respond to user input representing request(s) to zoom. In some embodiments, a user may pinch and/or de-pinch day screen 2000 to zoom out and zoom in, respectively. In some embodiments, a user may rotate the rotational input mechanism of device 500 to zoom (as shown by rotational input 2022).

As illustrated in FIG. 20A, if a user provides input representing a request to zoom-in while day screen 2000 is displayed, device may display day screen 2010 which shows fewer hours of day 2002 but shows more information about calendar entries scheduled during the displayed hours (e.g., entry 2006). The request to zoom-in may be provided using a touch gesture (e.g., de-pinching) in some embodiments. The request to zoom-in may be provided using a rotation (2022) of a rotatable input mechanism of device 500 in some embodiments.

Turning to FIG. 20B, a user also may provide input representing a request to zoom-out while day screen 2000 is displayed. When this occurs, device 500 may transition to an intermediate, multi-day screen 2020 which displays calendar entries for multiple days. As shown, screen 2020 includes regions 2022, 2024, and 2026 representing calendar entries on for different days. The size (e.g., height) of regions 2022, 2024, and 2026 are proportional to the length of the corresponding calendar entries. While multi-day screen 2020 is displayed, a user may further zoom out to multi-month screen 2030, where calendar entries across multiple months are displayed using affordances, in this example, lines. In screen 2030, lines 2032 indicate the presence of scheduled events in the displayed months, but the size of lines 2032 may not represent durations. While multi-month screen 2030 is displayed, a user may further zoom out to multi-year screen 2040, where numbers of scheduled calendar entries per year are tallied. For example, as shown by text 2042, three calendar entries are scheduled in the year of 2019. Note, although not shown, it is possible to transition from screen 2000 to screens 2020, 2030, and 2040 through one or more rotations of a rotatable input mechanism of device 500.

Figure 21:
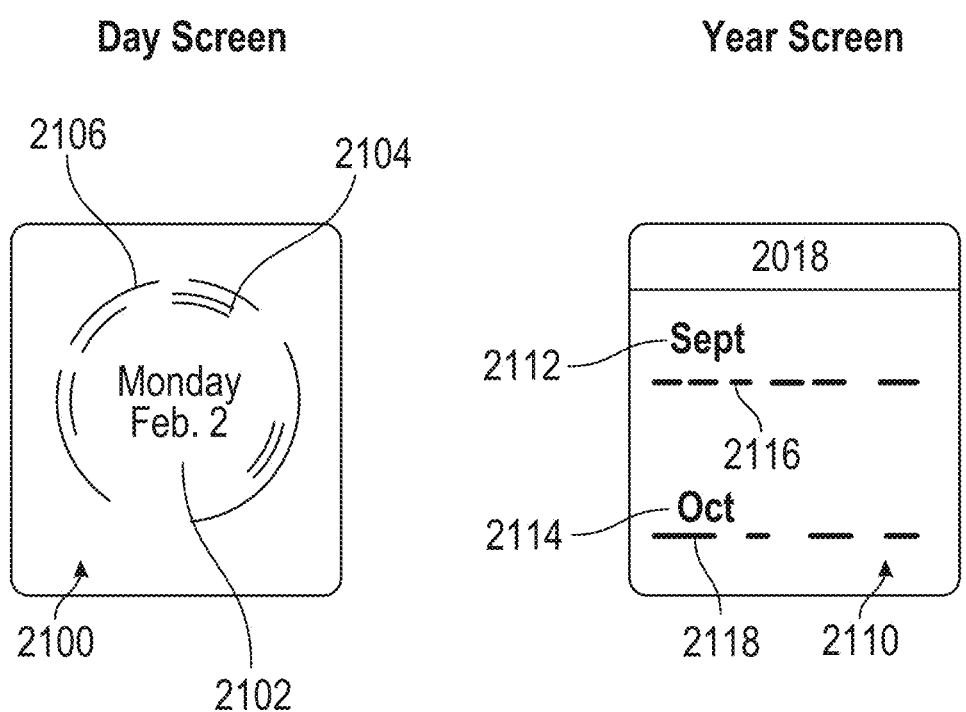
FIG. 21 illustrates an exemplary calendar application user interface according to some embodiments.

Attention is now directed to other exemplary user interface screens for displaying calendar information for a particular day and a particular year. FIG. 21 illustrates exemplary day screen 2100, which may be used in some embodiments to indicate calendar entries scheduled for a particular day. Day screen 2100 includes day-date indicator 2102. Day screen 2100 also includes one or more arc-shaped affordances (e.g., 2104 and 2106) indicating calendar entries scheduled for the day. The end points of the arc-shaped affordances may indicate start and end times of corresponding calendar entries. For example, the left end of affordance 2104 may indicate the start of a calendar entry and the right end of affordance 2104 may indicate the end of the event. The affordances may be aligned based on the traditional layout of time markers on a circular watch face. That is, affordance 2104 corresponds to an event scheduled from noon to one o'clock. Also, as a result of this circular alignment, arc-shaped affordances 2104 and 2106 may be arranged circumferentially around day-date indicator 2102.

In addition, FIG. 21 illustrates exemplary year screen 2110, which may be used in some embodiments to indicate calendar entries for a particular year. Year screen 2110 includes month indicators 2112 and 2114. Year screen 2110 also includes line segments (e.g., 2116, 2118) indicating the presence of calendar entries during the month. The length of a line segment may indicate the length of the corresponding calendar entry. For example, the length of line 2116 (which is relatively shorter) may indicate a day-long event during month 2112 while the length of line 2118 (which is relatively longer) may indicate a week-long event during month 2114.

Figure 22:
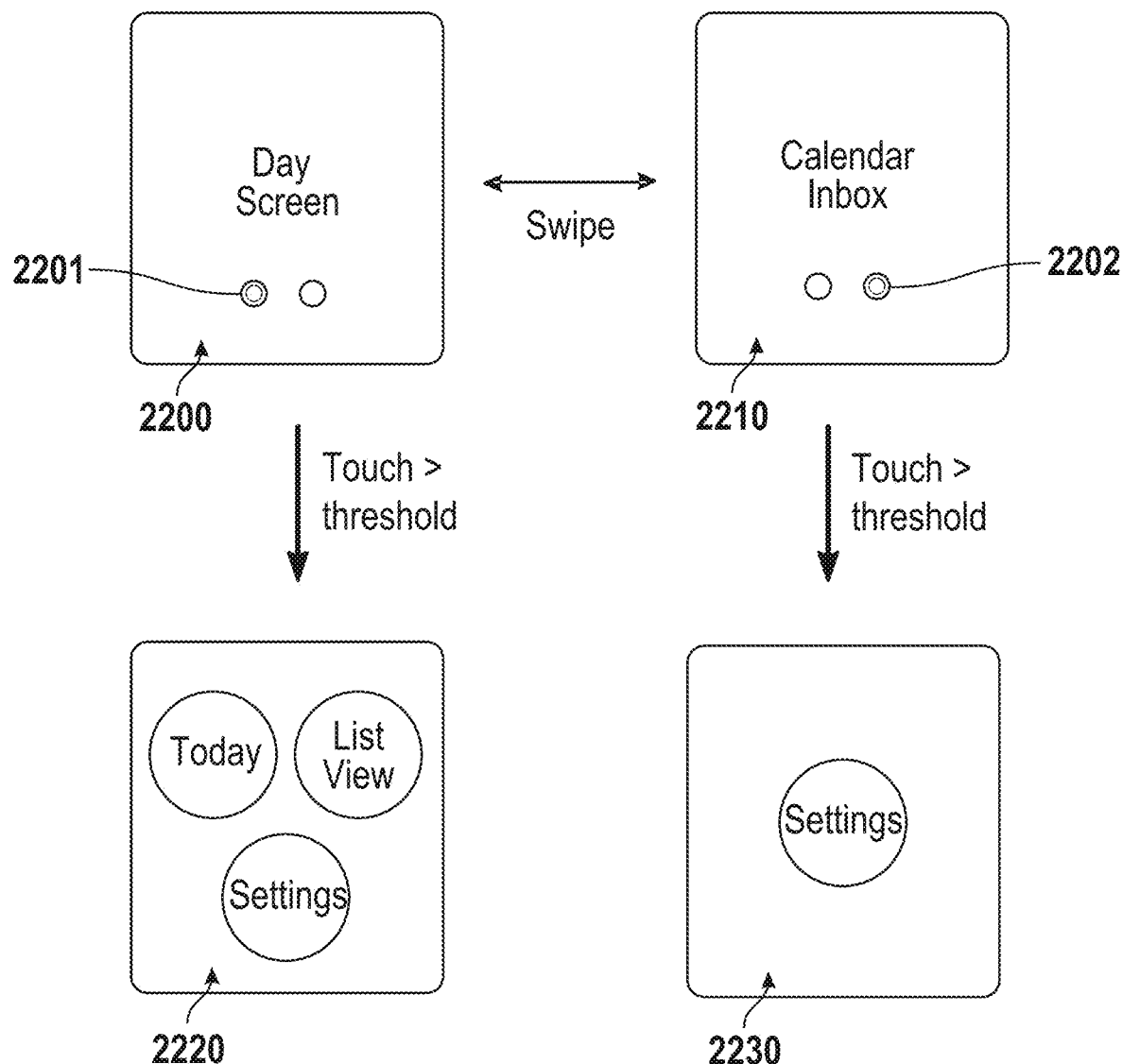
FIG. 22 illustrates an exemplary calendar application user interface according to some embodiments.

Attention is now directed to an exemplary transition between the day screen and the inbox screen of the calendar application in some embodiments. As shown in FIG. 22, device 10 may display day screen 2200. Day screen 2200 may be day screen 630 (FIG. 6D) or day screen 640 (FIG. 6E) in some embodiments. A user may drag (e.g., by way of a touch gesture such as a swipe) day screen 2200 to reveal calendar inbox screen 2210. Calendar inbox screen 2210 may be screen 930 (FIG. 9C) in some embodiments. Alternatively, a user may rotate the rotatable input mechanism of device 500 to transition between day screen 2200 and calendar inbox screen 2210. Day screen 2200 and calendar inbox screen 2210 may each include affordances 2201 and 2202 indicating the position of each screen among a plurality of screens. An exemplary implementation of affordances 2201 and 2202 is paging dots. Affordances 2201 and 2202 may enlarge, darken, or otherwise change in visual appearance when the corresponding calendar inbox screen is displayed.

While day screen 2200 is displayed, a user may contact (e.g., touch) the touch-sensitive display of device 500. Device 500 may determine or otherwise obtain a measurement of the intensity of the contact. If the intensity is above the threshold, the calendar application may cause device 500 to display options screen 2220. Options screen 2220 may be screens 992 (FIG. 9F), 1000 (FIG. 10A), 1010 (FIG. 10B), 1020 (FIG. 10C), 1030 (FIG. 10D), or 1040 (FIG. 10E) in some embodiments. If the intensity is below a threshold, the calendar application may cause device 500 to display, for example, the details of an event that is shown on screen 2200.

While calendar inbox screen 2210 is displayed, a user may contact (e.g., touch) the touch-sensitive display of device 500. Device 500 may determine or otherwise obtain a measurement of the intensity of the contact. If the intensity is above the threshold, the calendar application may cause device 500 to display options screen 2230. Options screen 2220 may be screens 992 (FIG. 9F), 1000 (FIG. 10A), 1010 (FIG. 10B), 1020 (FIG. 10C), 1030 (FIG. 10D), or 1040 (FIG. 10E) in some embodiments. If the intensity is below a threshold, the calendar application may cause device 500 to display, for example, the details of an event that is shown on screen 2210.

Figure 23:
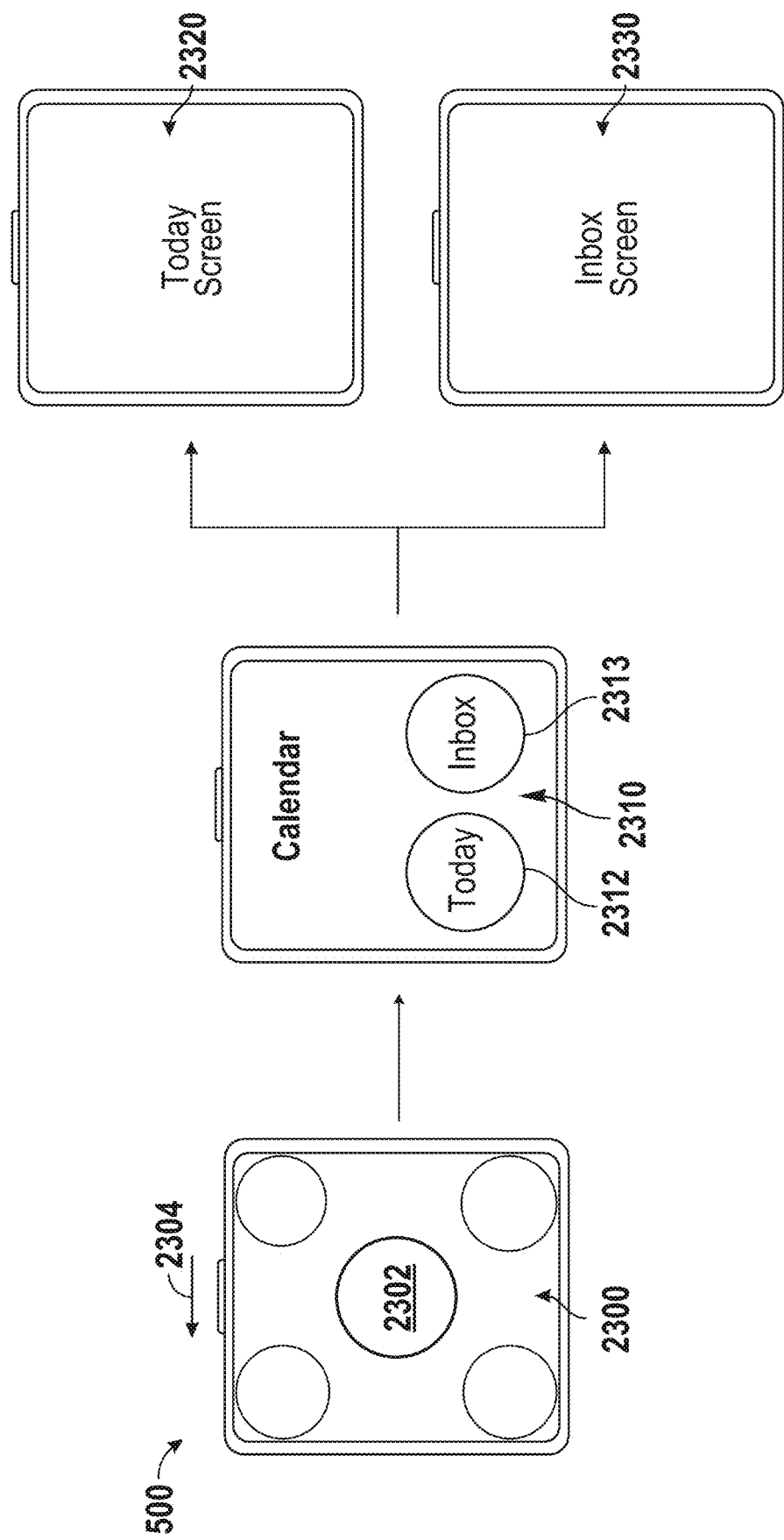
FIG. 23 illustrates an exemplary calendar application user interface according to some embodiments.

Attention is now directed to another exemplary landing screen 2310 for the calendar application, an example of which is shown in FIG. 23. As shown, device 500 may display user interface screen 2300 having icon 2302. Icon 2302 may correspond to the calendar application. In response to a selection of icon 2302, device 500 may launch the calendar application, meaning that the calendar application is brought to the foreground of the touch-sensitive display of device 500. In some embodiments, the selection may be performed via a touch gesture (e.g., tap, touch and hold, swipe, flick) on icon 2302. In some embodiments, the selection may be performed via rotation 2304 of a rotatable input mechanism of device 500. Upon launching, calendar application causes device 500 to display landing screen 2310. Exemplary landing screen 2310 includes affordance 2312 for invoking a day screen showing calendar entries for the current day. Day screen may be screen 1030 (FIG. 10D) or 1040 (FIG. 10E) in some embodiments. Exemplary landing screen 2310 also includes affordance 2313 for invoking a calendar inbox screen 2330. Calendar inbox screen 2330 may be screen 930 (FIG. 9B) or screens 950 and 952 (FIG. 9C) in some embodiments.

8. Exemplary Processes

Figure 24:
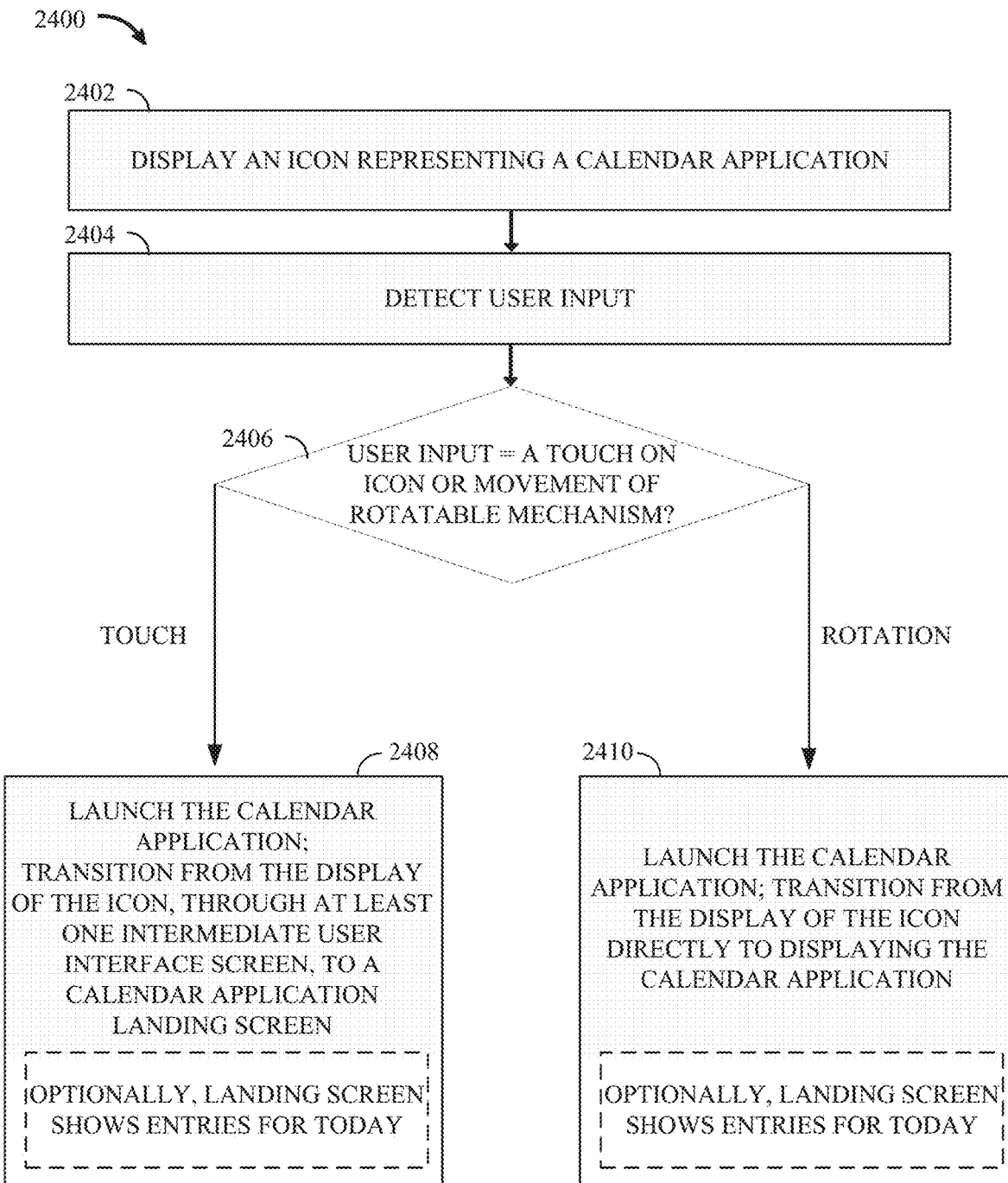
FIG. 24 is a flow diagram illustrating a process for displaying user interface screens for a calendar application.

Attention is now directed to exemplary processes for carrying out the user interface techniques described above. FIG. 24 depicts process 2400 for displaying some of the above-described user interfaces. Process 2400 may be performed at an electronic device with a touch-sensitive display and a rotatable input mechanism, like device 500 (FIG. 5). At block 2402, the device may display, on its touch-sensitive display, an icon representing a calendar application. At block 2404, the device may detect user input. At block 2406, the device may determine whether the detected user input represents a touch on the displayed icon or a movement of the rotatable input mechanism. At block 2408, in response to a determination that the detected user input represents a touch on the displayed icon, the device may launch the calendar application and transition from the display of the icon, through at least one intermediate user interface screen, to displaying a landing screen of the calendar application. Optionally, the transition from the intermediate user interaction screen to the landing screen may occur after the intermediate user interaction screen has been displayed for a predetermined amount of time. At block 2410, in response to a determination that the detected user input represents movement of the rotatable input mechanism, the device may launch the calendar application and transitioning from the display of the icon directly to displaying the landing screen of the calendar application.

In some embodiments, the transition at block 2408 involves the display of a year screen (e.g., screen 610; FIG. 6B) and a month screen (e.g., screen 600; FIG. 6A) before landing on a day screen (e.g., screen 630; FIG. 6D). In some embodiments, the transition at block 2410 involves replacing the display of the icon directly with the display of a day screen (e.g., screen 630; FIG. 6D) without the display of additional intermediate screens. The device may thus provide the user with more context if the user interacts with the device in one way (e.g., touch on the application icon), and the device may provide the user with quicker access to the day screen if the user interacts with the device in another way (e.g., rotation of an input mechanism).

When displaying the day screen, device 500 may display one or more affordances representing calendar entries scheduled for the day. The affordances may have the visual appearance of a geometric shape, such as a rectangle. More generally speaking, the affordances may be regions of the display that are distinguishable from the background of the calendar application. Optionally, when the landing screen is the day screen, device 500 may display calendar entries for the current day. Optionally, when the month screen is displayed, device 500 may display an indicator (e.g., numeral) indicating the current day towards the vertical center of the display.

Figure 25:
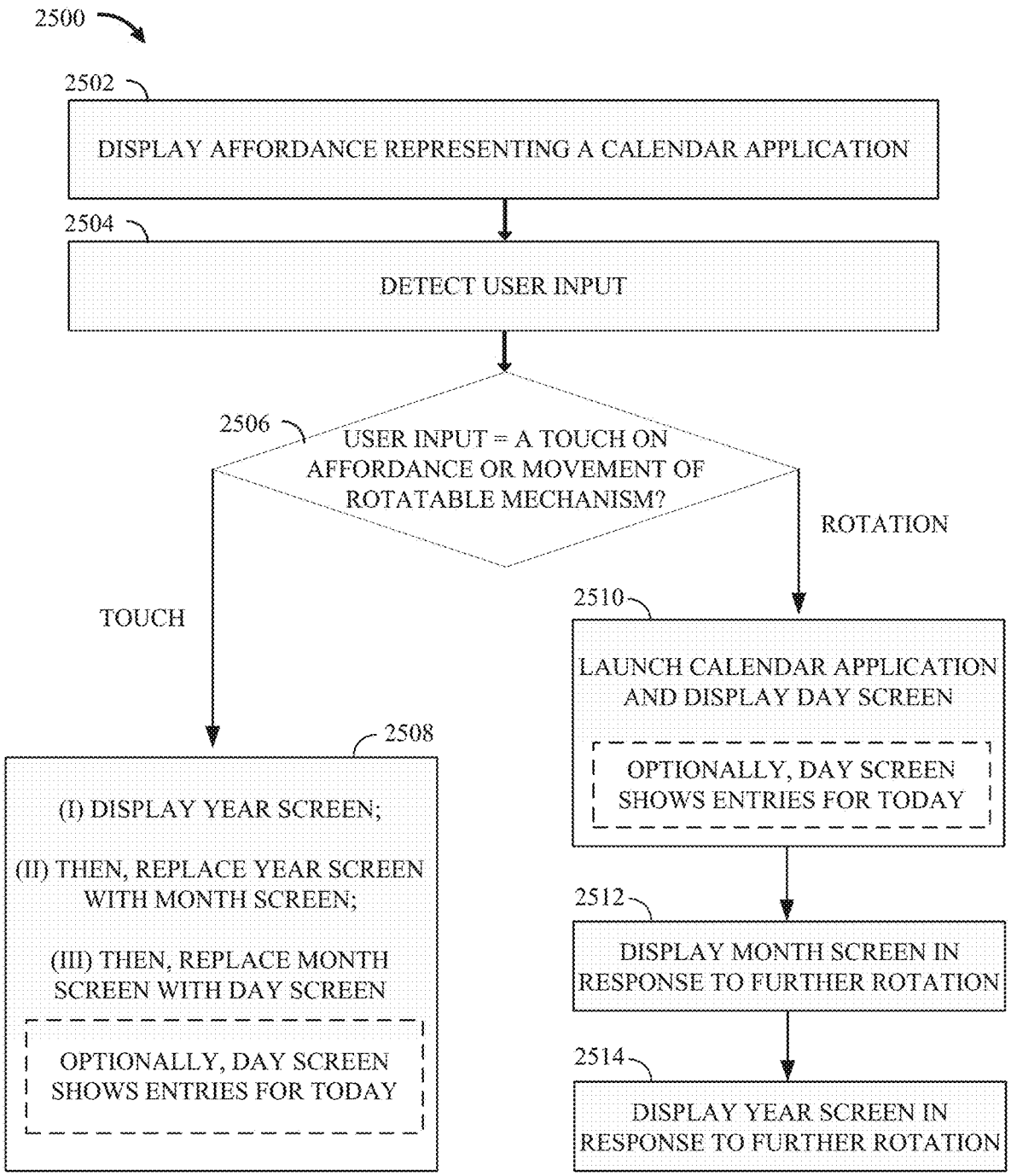
FIG. 25 is a flow diagram illustrating a process for displaying user interface screens for a calendar application.

FIG. 25 depicts process 2500 for displaying some of the above-described user interfaces. Process 2500 may be performed at an electronic device with a touch-sensitive display and a rotatable input mechanism, like device 500 (FIG. 5). At block 2502, the device may display, on its touch-sensitive display, an affordance representing a calendar application. At block 2504, the device may detect user input. At block 2506, the device may determine whether the user input is a touch on the displayed affordance or a movement of the rotatable input mechanism. At block 2508, in accordance with a determination that the detected user input is a touch on the displayed affordance, the device may: (i) display a first text indicating at least two months in a year (e.g., year screen); (ii) then, replace the display of the first text with a display of a second text indicating at least some days in one and only one month of the year (e.g., month screen); and (iii) then, replace the display of the second text with a display of at least one affordance representing at least one calendar entry (e.g., day screen). At block 2510, in accordance with a determination that the detected user input is a movement of the rotatable input mechanism, the device may display at least one affordance representing at least one calendar entry (e.g., day screen). At block 2512, in response to an additional rotation of the rotatable mechanism, the device may replace the display of the at least one calendar entry with a display of a second text indicating at least some days in one and only one month of the year (e.g., month screen). At block 2514, in response to an additional rotation of the rotatable mechanism, the device may replace the display of the second text with the first text indicating at least two months in a year (e.g., year screen).

Figure 26:
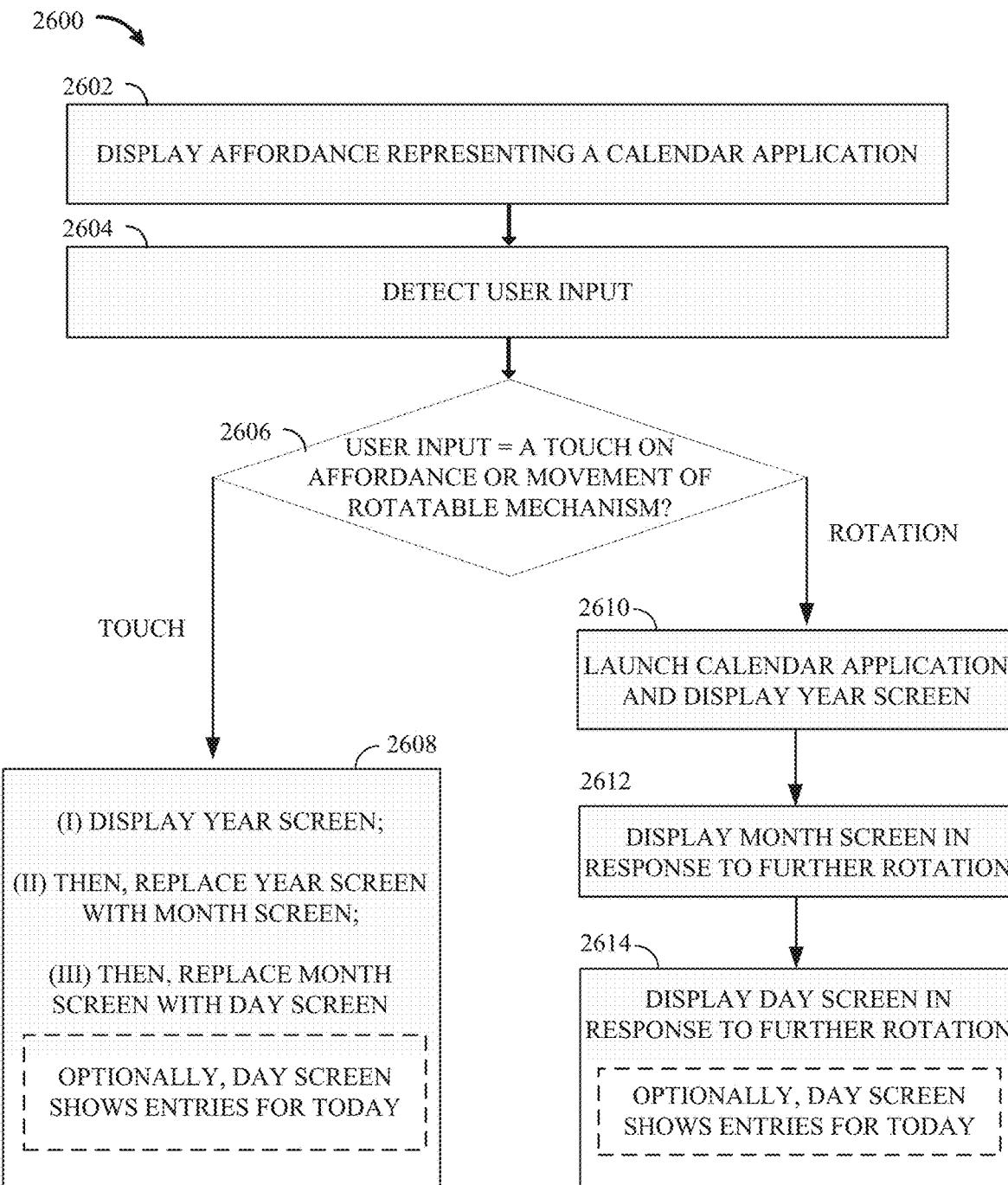
FIG. 26 is a flow diagram illustrating a process for displaying user interface screens for a calendar application.

FIG. 26 depicts process 2600 for displaying some of the above-described user interfaces. Process 2600 may be performed at an electronic device with a touch-sensitive display and a rotatable input mechanism, like device 500 (FIG. 5). At block 2602, the device may display, on its touch-sensitive display, an affordance representing a calendar application. At block 2604, the device may detect user input. At block 2606, the device may determine whether the user input is a touch on the displayed affordance or a rotation of the rotatable input mechanism. At block 2608, in accordance with a determination that the detected user input is a touch on the displayed affordance, the device may: (i) display a first text indicating at least two months in a year (e.g., year screen); (ii) then, replace the display of the first text with a display of a second text indicating at least some days in one and only one month of the year (e.g., month screen); and (iii) then replace the display of the second text with a display of at least one affordance representing at least one calendar entry (e.g., day screen). At block 2610, in accordance with a determination that the detected user input is a movement of the rotatable input mechanism, the device may display the first text indicating at least two months in a year (e.g., year screen). At block 2612, in response to an additional rotation of the rotatable mechanism, the device may replace the display of the first text with a display of the second text indicating at least some days in one and only one month of the year (e.g., month screen). At block 2614, in response to an additional rotation of the rotatable mechanism, the device may replace the display of the second text with a display of at least one affordance representing at least one calendar entry (e.g., day screen).

The ability of the device to provide multiple navigational paths is beneficial in that it permits a user to invoke the most suitable device behavior for particular usage cases. The ability is also beneficial in battery operated devices in that short-cutting through intermediate user interface screens can reduce processor drain thereby conserving battery life.

Figure 27:
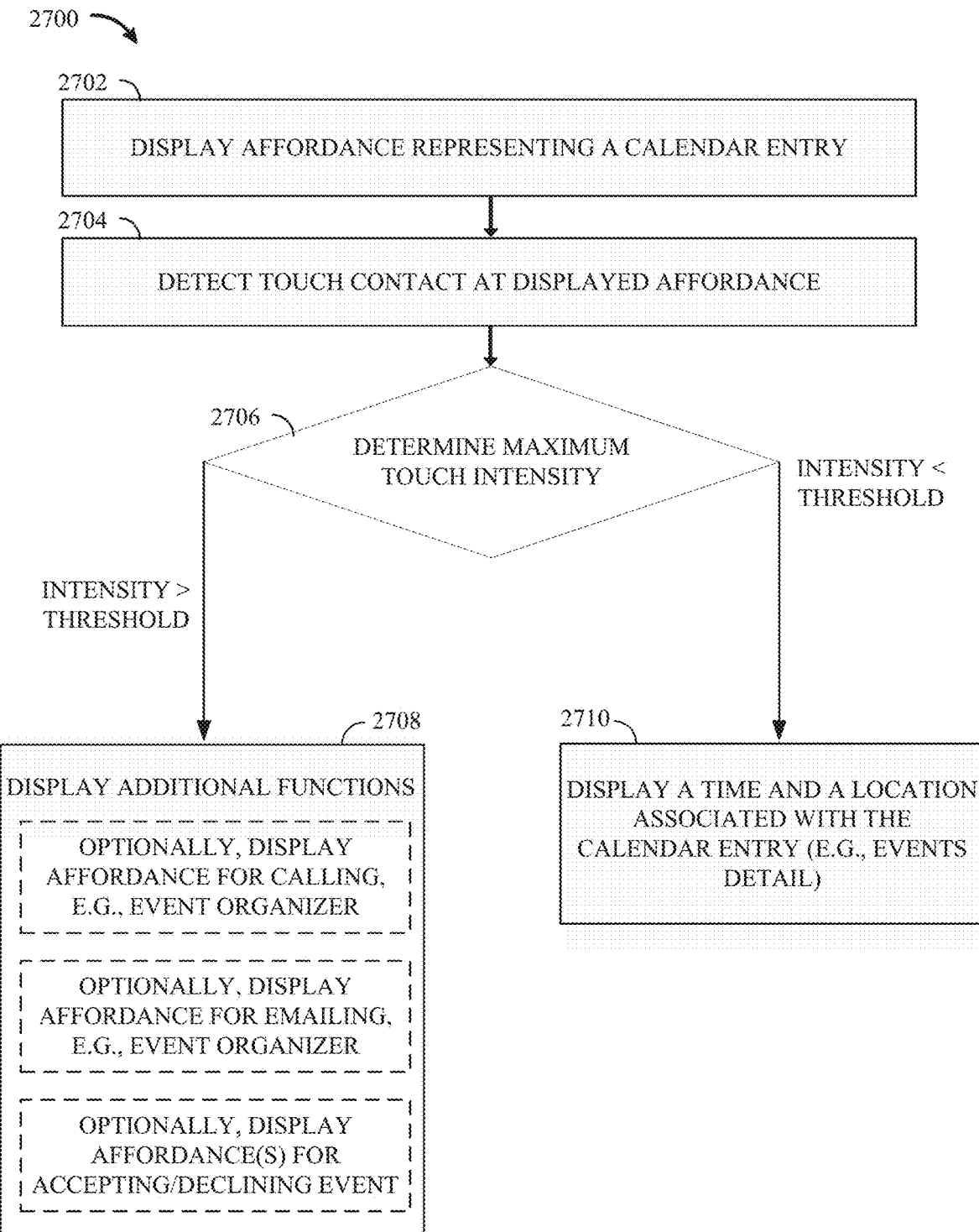
FIG. 27 is a flow diagram illustrating a process for displaying user interface screens for a calendar application.

FIG. 27 depicts process 2700 for displaying additional calendar application features. Process 2700 may be performed at an electronic device with a touch-sensitive display, where the touch-sensitive display comprises one or more sensors to detect the intensity of contacts with the touch-sensitive display. At block 2702, the device may display an affordance representing a calendar entry in a calendar application. At block 2704, the device may detect a touch on the display, the touch having a characteristic intensity, the touch located at the displayed user interface object representing the calendar entry. At block 2706, the device may determine whether the characteristic intensity of the touch is below a threshold intensity. At block 2708, in response to a determination that the characteristic intensity of the touch is below the threshold intensity, the device may display a time and a location associated with the calendar entry. At block 2710, in response to a determination that the characteristic intensity of the touch is not below the threshold intensity, the device may display, on the touch-sensitive display, a plurality of affordances representing functions of the calendar application.

Optionally, the displayed affordances may include an affordance for initiating a phone call to a contact that is associated with the calendar entry, such as an event organizer. Optionally, the displayed affordances may include an affordance for initiating an e-mail draft to the contact. The phone call and the e-mail draft may be initiated on device 500, or device 500 may instruct a companion device, such as a cellular phone or a laptop computer, to initiate the phone call and/or the e-mail draft.

Figure 28:
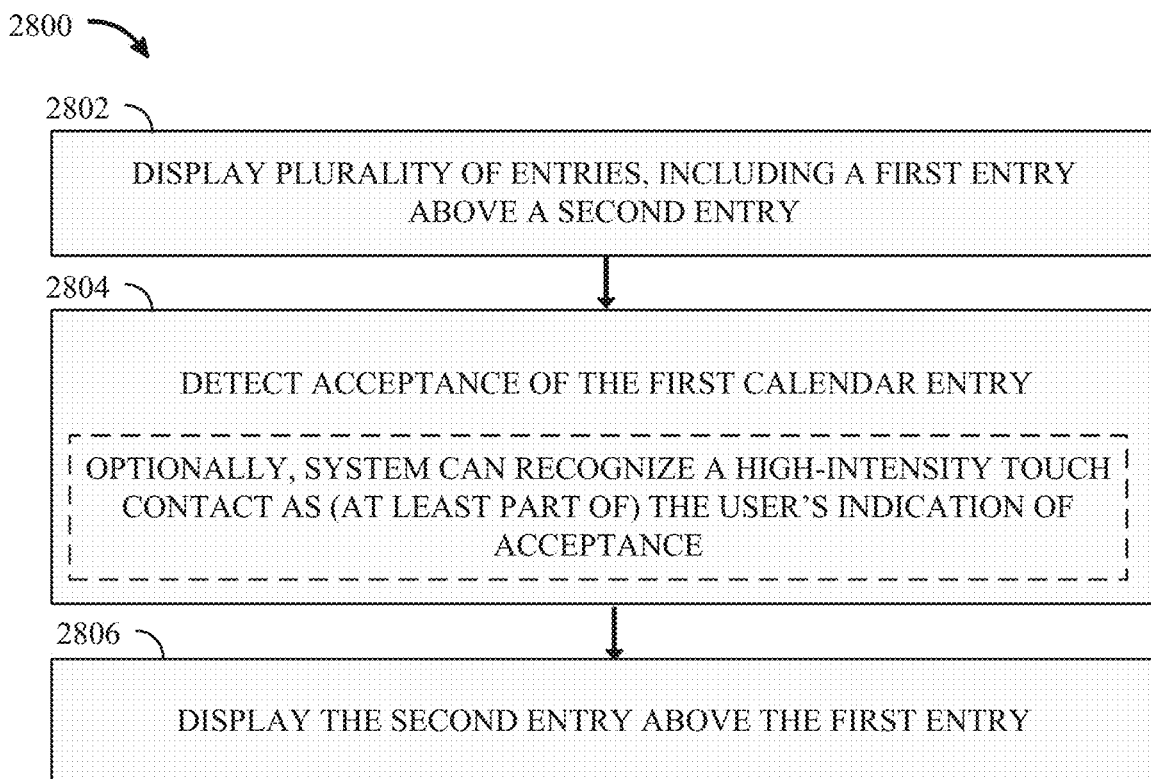
FIG. 28 is a flow diagram illustrating a process for displaying user interface screens for a calendar application.

FIG. 28 depicts process 2800 for displaying additional calendar application features. Process 2800 may be performed at an electronic device with a touch-sensitive display. At block 2802, the device may display, on its touch-sensitive display, a plurality of calendar entries. The plurality of calendar entries may include a first calendar entry and a second calendar entry. The first calendar entry may be displayed above the second calendar entry. At block 2804, the device may receive user input representing user acceptance of the first calendar entry. At block 2806, in response to receiving the user input, the device may display the first calendar entry below the second calendar entry.

Optionally, at block 2804, the device may detect a touch on the touch-sensitive display having a characteristic intensity, where the touch has a characteristic intensity. The device may determine whether the characteristic intensity is above a threshold intensity. The device may, in response to a determination that the characteristic intensity is above the threshold intensity, display an accept affordance for accepting the calendar entry and a decline affordance for declining the calendar entry. The device may detect a user selection of the accept affordance.

Optionally, at block 2804, the device may detect a user selection of the first calendar entry. In response to detecting the user selection of the first calendar entry, the device may: (i) display a time and location of the calendar entry; and (ii) display an accept affordance for accepting the calendar entry. Further, the device may detect a user selection of the accept affordance.

Figure 29:
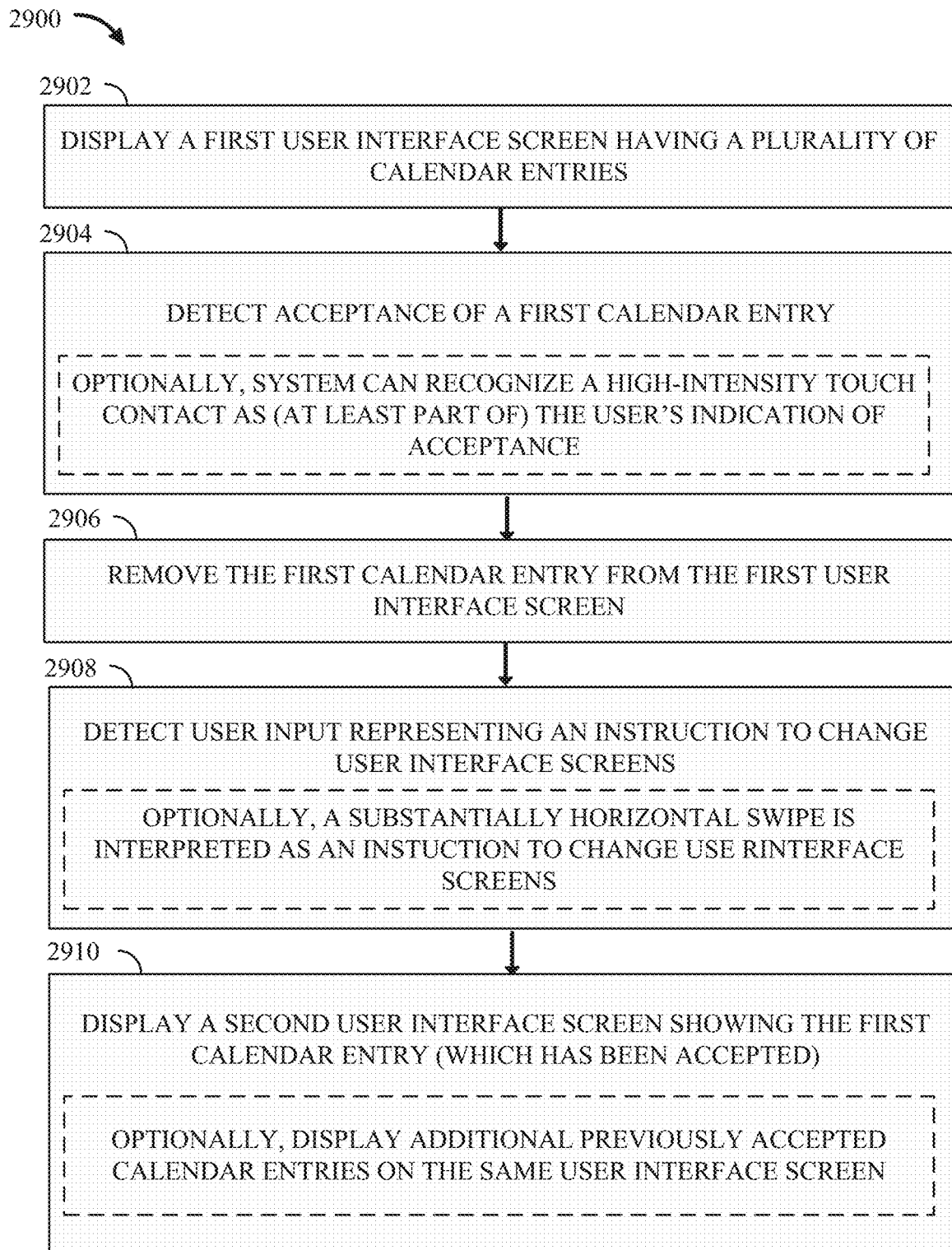
FIG. 29 is a flow diagram illustrating a process for displaying user interface screens for a calendar application.

FIG. 29 depicts process 2900 for displaying additional calendar application features. Process 2900 may be performed at an electronic device with a touch-sensitive display. At block 2902, the device may display, on the touch-sensitive display, a first user interface screen having a plurality of calendar entries. At block 2904, the device may receive first data representing user acceptance of a first calendar entry of the plurality of calendar entries. At block 2906, the device may, in response to receiving the first data, remove the accepted first calendar entry from the first user interface screen. At block 2908, the device may receive second data representing a user input. The input may be a swipe on the touch-sensitive display in some examples. The user input may be a movement of a rotatable input mechanism of the device in some examples. At block 2910, the device may, in response to receiving the second data, replace the display of the first user interface screen with a display of a second user interface screen having a plurality of accepted calendar entries.

Figure 30:
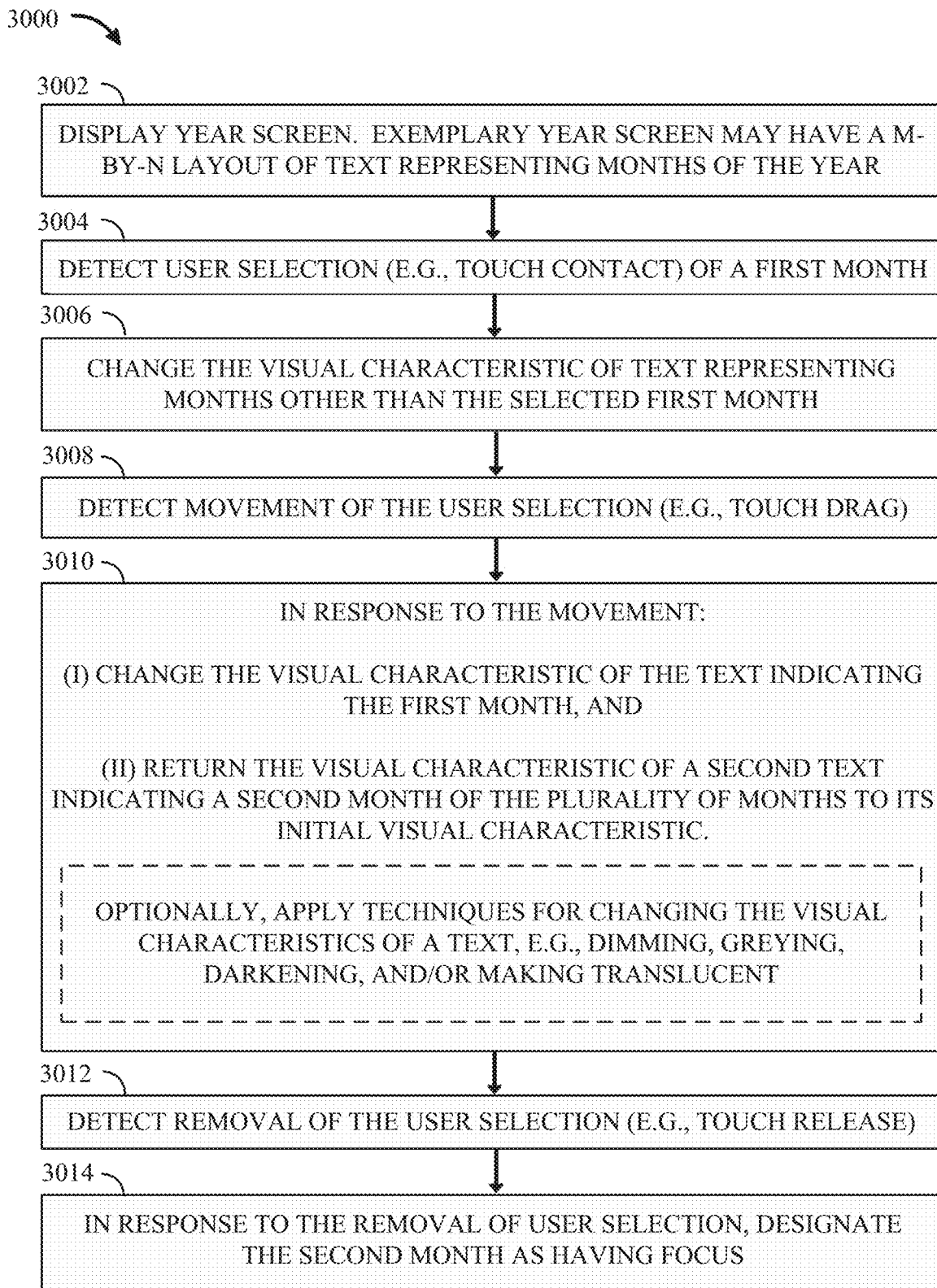
FIG. 30 is a flow diagram illustrating a process for displaying user interface screens for a calendar application.

FIG. 30 depicts process 3000 for selecting a month to focus onto when a number of months are being displayed (e.g., in a year screen). Process 3000 may be performed at an electronic device with a touch-sensitive display. At block 3002, the device may display a user interface screen on the touch-sensitive display. The displayed user interface screen may include a plurality of texts indicating a plurality of months in a year. The texts of the plurality of texts may be organized according to a layout having at least two rows and at least two columns. The plurality of texts may have an initial visual characteristic. At block 3004, the device detects a user selection of a first text of the plurality of texts, the first text indicating a first month of the plurality of months. In some embodiments, the user selection may be a touch contact at a display position of the first month. At block 3006, in response to detecting the user selection, the device may change the visual characteristic of the plurality of texts except the first text indicating the first month. At block 3008, the device may detect a movement of the user selection of the first text. At block 3010, in response to detecting the movement, the device may: (i) change the visual characteristic of the first text indicating the first month, and (ii) return the visual characteristic of a second text indicating a second month of the plurality of months to its initial visual characteristic. In some embodiments, the movement may be a drag of the touch contact. Further, in some examples, changing the visual characteristic may involve dimming, greying, darkening, making translucent, or another technique for visually de-emphasizing information. At block 3012, the device may detect a removal of the user selection. In some embodiments, the removal may be a touch lift-off (also called touch release). At block 3014, in response to the removal of the user selection, designate the second month as having focus.

Figure 31:
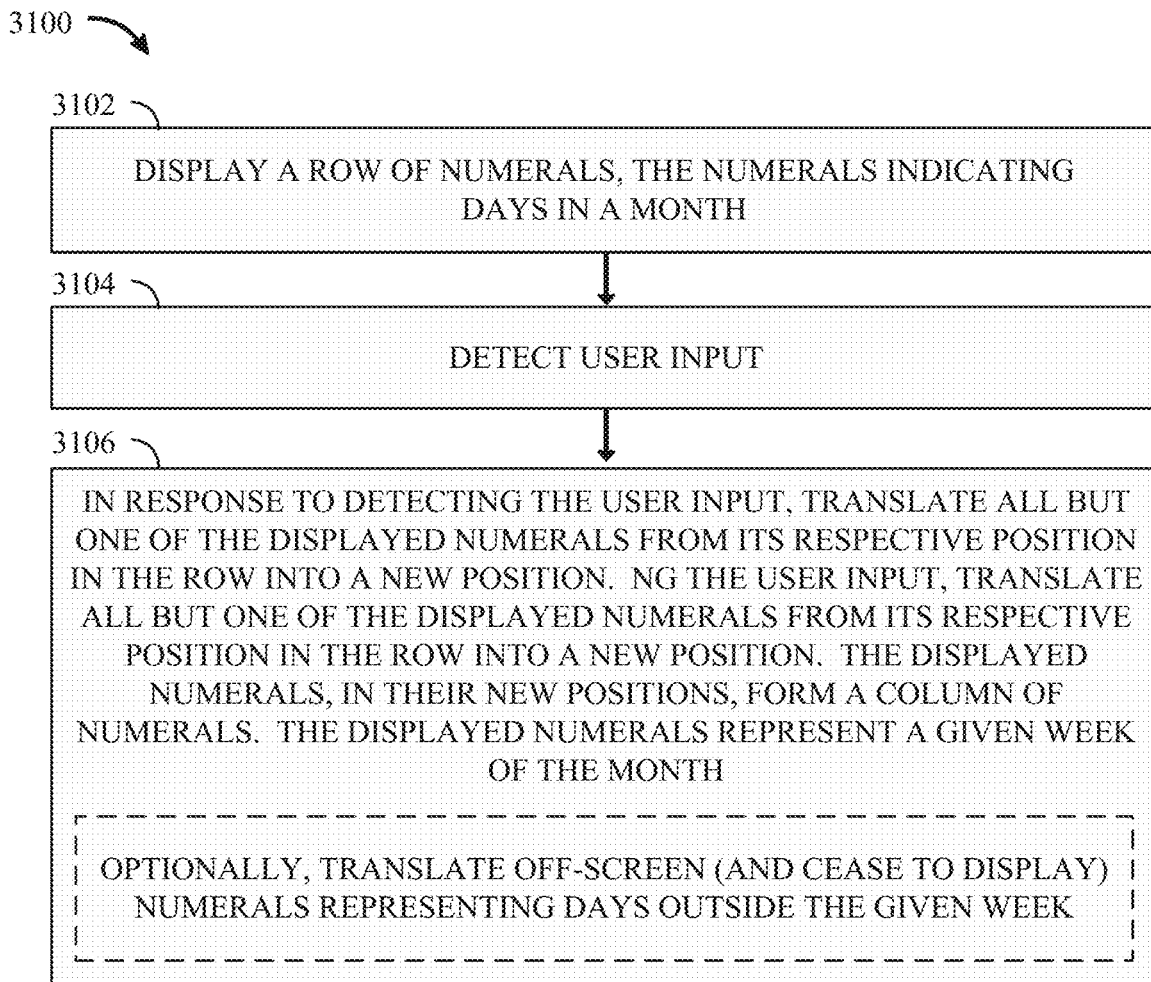
FIG. 31 is a flow diagram illustrating a process for displaying user interface screens for a calendar application.

FIG. 31 depicts process 3100 for transitioning between a month screen and a week screen. Process 3100 may be performed at an electronic device with a touch-sensitive display. At block 3102, the device may display a row of numerals, the numerals indicating days in a month. At block 3104, the device may detect user input. At block 3106, the device may, in response to detecting the user input, translate all but one of the displayed numerals from its respective position in the row into a new position. The displayed numerals, in their new positions, may form a column of numerals. The displayed numerals may represent a given week of the month. As part of the translation at block 3106, the device may translate off-screen (and cease to display) numerals representing days outside the given week.

Figure 32:
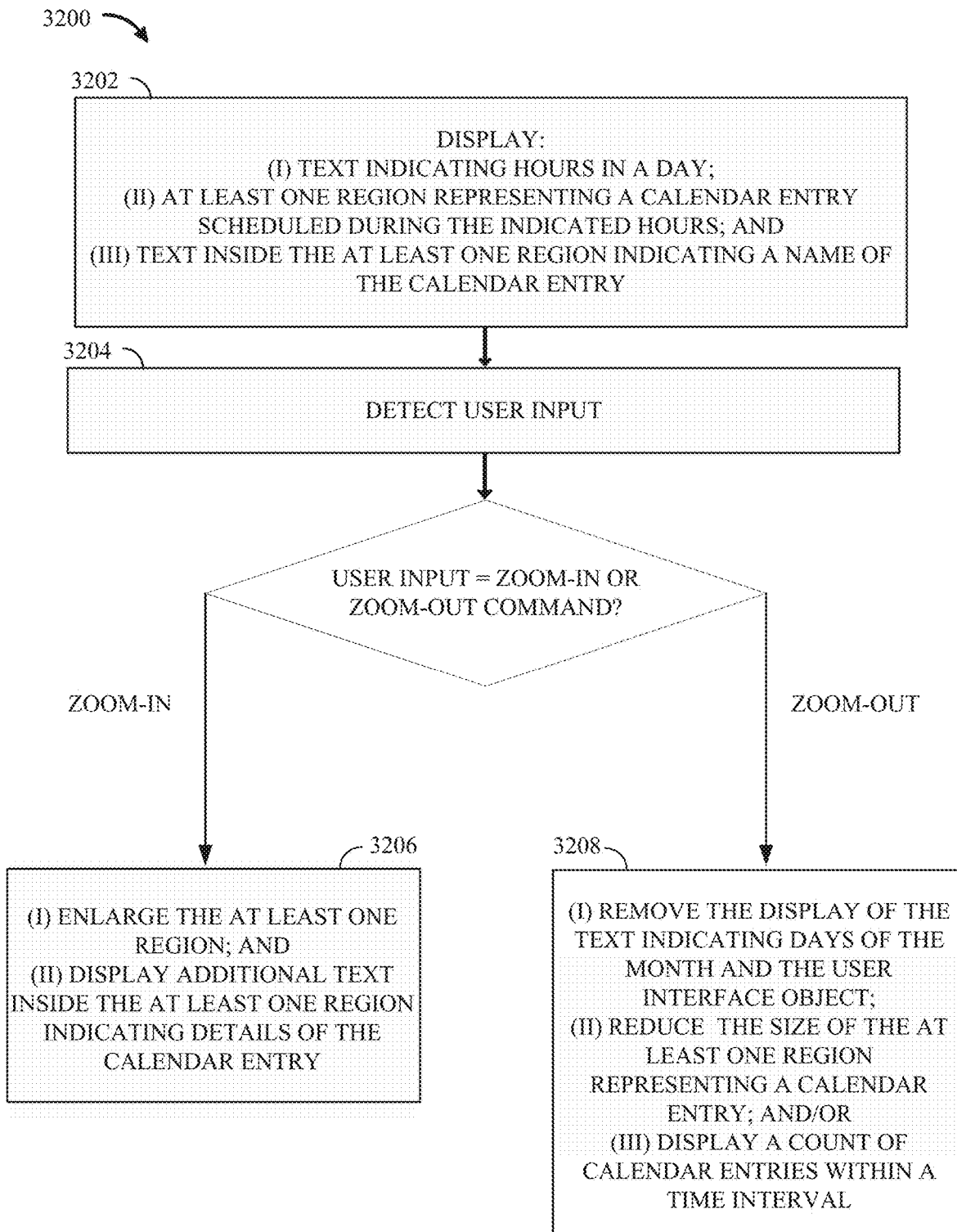
FIG. 32 is a flow diagram illustrating a process for displaying user interface screens for a calendar application.

FIG. 32 depicts process 3200 for transitioning between a month screen and a week screen. Process 3200 may be performed at an electronic device with a touch-sensitive display. At block 3202, the device may display on its touch-sensitive display: (i) text indicating hours in a day; (ii) at least one region representing a calendar entry scheduled during the indicated hours; and (iii) text inside the at least one region indicating a name of the calendar entry. At block 3204, the device may detect user input representing a zoom-in or zoom-out command. At block 3206, in accordance with a determination that the user input represents a zoom-in command, the device may: (i) enlarge the at least one region; and (ii) display additional text inside the at least one region indicating details of the calendar entry. The user input may be a de-pinching gesture in some examples. The user input may be a rotation of a rotatable input mechanism of the device in some examples. At block 3208, in accordance with a determination that the user input represents a zoom-out command, the device may: (i) remove the display of the text indicating days of the month and the user interface object; (ii) reduce the size of the at least one region representing a calendar entry; and/or (iii) displaying a count of calendar entries within a time interval.

Figure 33:
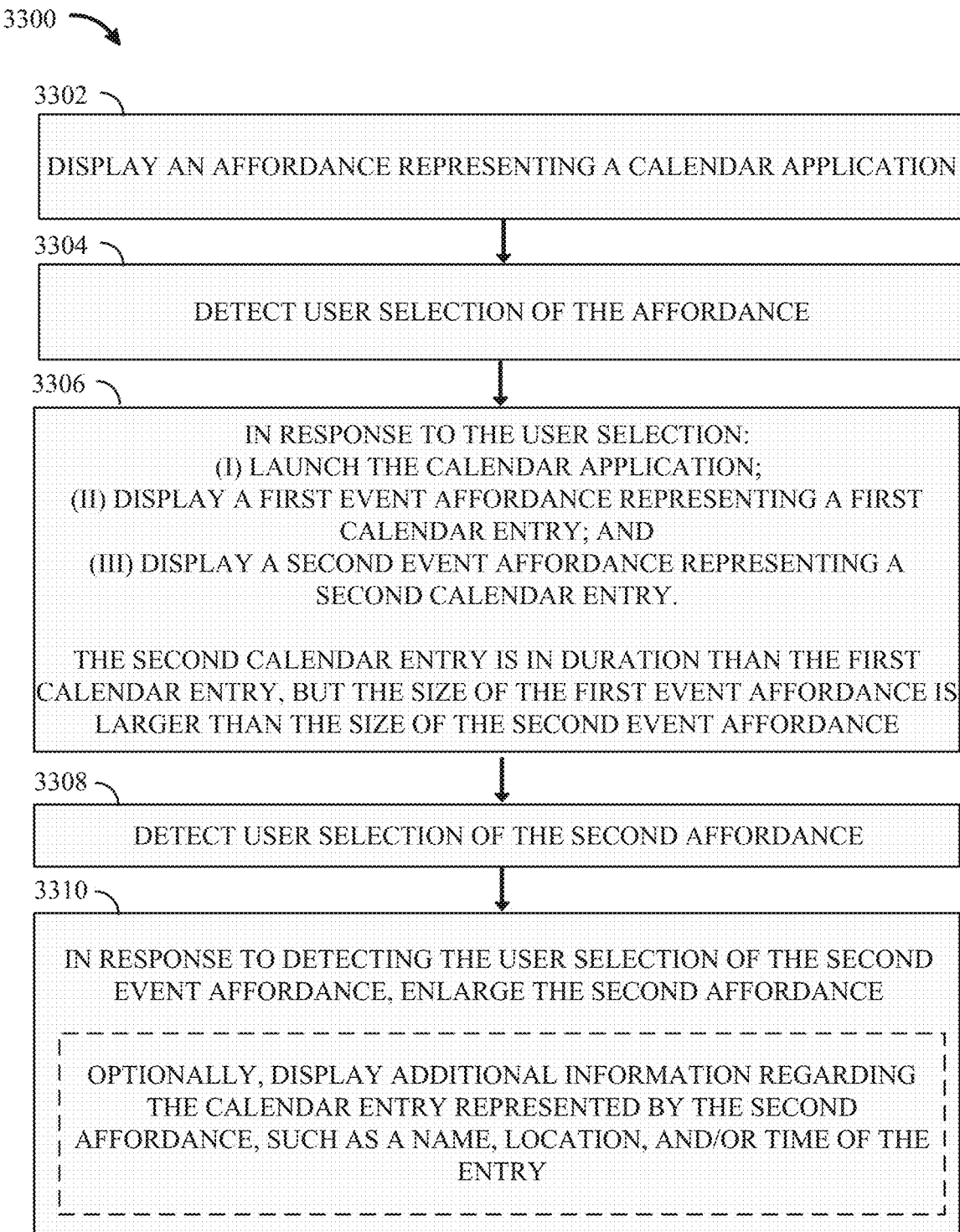
FIG. 33 is a flow diagram illustrating a process for displaying user interface screens for a calendar application.

FIG. 33 depicts process 3300 for transitioning between a month screen and a week screen. Process 3300 may be performed at an electronic device with a touch-sensitive display. At block 3302, the device may display on its touch-sensitive display, an application affordance representing a calendar application. At block 3304, the device may detect a user selection of the application affordance. At block 3306, in response to detecting the user selection of the application affordance, the device may: (i) launch the calendar application; (ii) display a first event affordance representing a first calendar entry; and (iii) display a second event affordance representing a second calendar entry. The second calendar entry may be longer in duration than the first calendar entry even if the size of the first event affordance is larger than the size of the second event affordance. In this way, device 500 may display an all-day calendar entry is as the second calendar entry. At block 3308, the device may detect user selection of the second event affordance. At block 3310, in response to detecting the user selection of the second event affordance, the device may enlarge the second affordance. Optionally, at block 3310, the device may display additional information regarding the calendar entry represented by the second affordance. The additional information may include, for example, a name and location associated with the all-day calendar entry.

Figure 34:
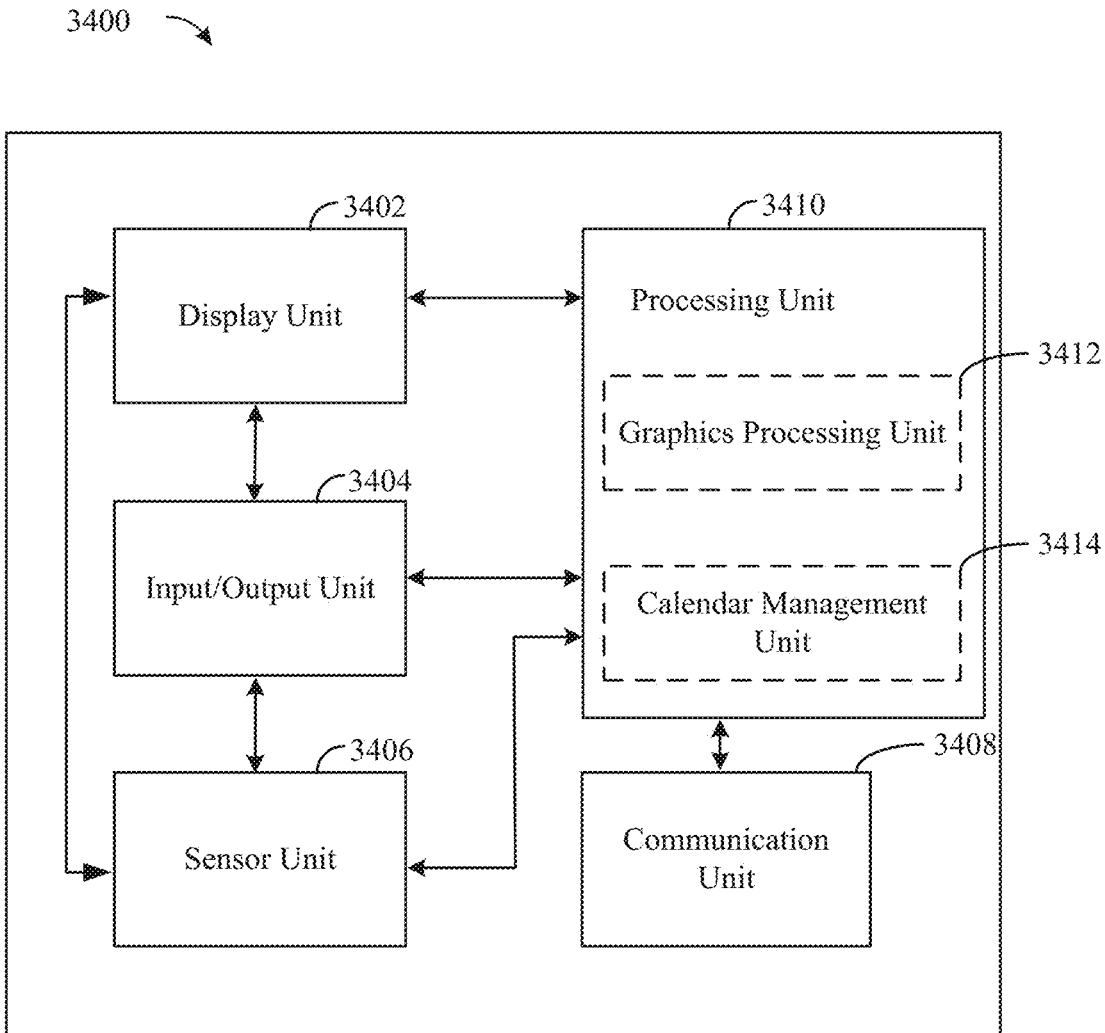
FIG. 34 illustrates an exemplary computing system.

FIG. 34 shows exemplary functional blocks of an electronic device 3400 that, in some embodiments, perform the features described above. As shown in FIG. 34, an electronic device 3400 includes a display unit 3402 configured to display graphical objects; a input/output (I/O) unit 3404 configured to receive user gestures; one or more sensor units 3406 configured to detect intensity of contacts with the touch-sensitive surface unit; communications unit 3408 and a processing unit 3410 coupled to the display unit 3402, the I/O unit 3404, the sensor units 3406, and communication unit 3408. The processing unit may include a graphics processing unit 3412 and a calendar management unit 3414.

The functional blocks of the device 3400 are, optionally, implemented by hardware, software, or a combination of hardware and software to carry out the principles of the various described examples. It is understood by persons of skill in the art that the functional blocks described in FIG. 34 are, optionally, combined or separated into sub-blocks to implement the principles of the various described examples. Therefore, the description herein optionally supports any possible combination or separation or further definition of the functional blocks described herein.

In some embodiments, processing unit 3408 is configured to detect a user input (e.g., detecting a touch gesture or other button input with the detecting unit 3410) on a graphical user interface object, and display relevant calendar information in accordance with the calendar instruction.

For example, in some embodiments, in response to a touch on a calendar, application icon, graphics processing unit 3412 will cause display unit 3402 to display a sequence of user interface screens (e.g., year screen, to month screen, to day screen). As another example, in some embodiments, in response to a movement of a rotatable input mechanism, graphics processing unit 3412 will cause display unit 3402 to displaying cycle through the display of individual user interface screens (e.g., year screen, month screen, day screen). Calendar management unit 3414 may identify relevant information to be displayed on each screen. In some embodiments, calendar management unit 3414 may progressively present an increasing amount of information to a user as the user focuses on a particular day's activities.

As yet another example, in some embodiments, input/output unit 3404 may be able to determine the intensities of touch contacts. In response to a high-intensity contact, graphics processing unit 3412 may cause display unit 3402 to present additional user interface features. For instance, a user may able to invoke graphical user interface affordances for accepting or declining calendar invitations using a high-intensity contact(s). A user may also be able to invoke graphical user interface affordances for contacting (e.g., e-mailing and/or calling) other members of a calendar entry, such as an event organizer associated with the calendar entry.

As still yet another example, in some embodiments, calendar management unit 3414 may maintain a list of calendar entries that a user has responded to and those that the user has not responded to. Calendar management unit 3414, in conjunction with graphics processing unit 3412, may cause display unit 3402 to present calendar entries that still require a user's response in one region of the user interface screen, and to present calendar entries that the user has already dealt with in another region.

As still yet another example, in some embodiments, graphics processing unit 3412 will cause display unit 3402 to visually emphasize and de-emphasized displayed days, months, and/or years. Calendar management unit 3414 may recognize a visually emphasized day/month/year as being information that is relevant to the user. For instance, a user may use one input modality (e.g., touch) to emphasize a particular month among displayed months, and use another input modality (e.g., movement of a rotatable input mechanism) to retrieve more information about the particular month.

Figure 35:
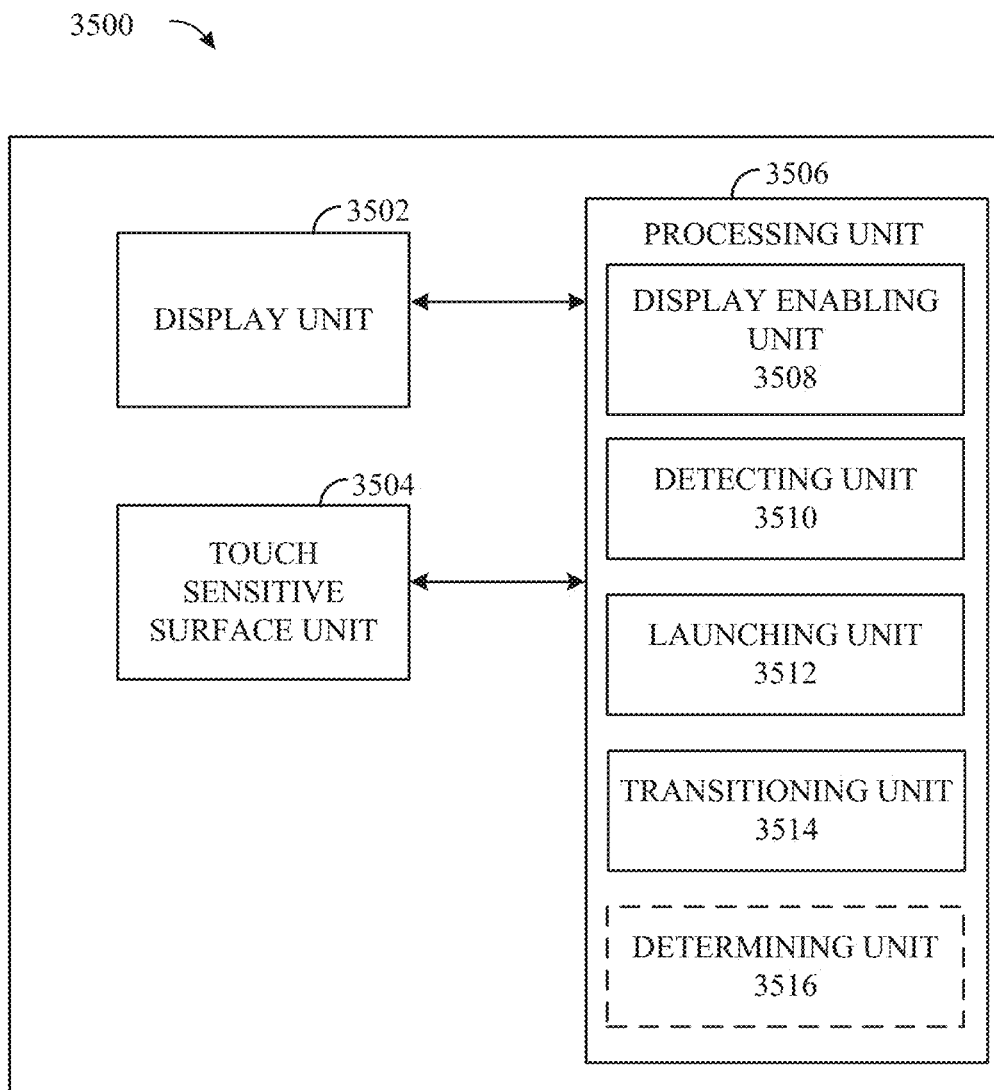
FIG. 35 is a functional block diagram of an electronic device in accordance with some embodiments.

In accordance with some embodiments, FIG. 35 shows a functional block diagram of an electronic device 3500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 35 are, optionally, combined or separated into sub-blocks to implement the principles of the various described embodiments. Therefore, the description herein optionally supports any possible combination or separation or further definition of the functional blocks described herein.

As shown in FIG. 35, an electronic device 3500 includes a display unit 3502 configured to display a graphic user interface, a touch sensitive surface unit 3504 configured to receive contacts, and a processing unit 3506 coupled to the display unit 3502 and the touch-sensitive surface unit 3504. In some embodiments, the processing unit 3506 includes a display enabling unit 3508, a detecting unit 3510, a launching unit 3512, a transitioning unit 3514, and, optionally, a determining unit 3516.

The processing unit 3506 is configured to enable display (e.g., with the display enabling unit 3508) of, on the display unit 3502, an icon representing a calendar application; detect (e.g., with the detecting unit 3510) user input; in response to a determination that the detected user input represents a touch on the displayed icon, launch (e.g., with the launching unit 3512) the calendar application and transition (e.g., with the transitioning unit 3514) from the display of the icon, through at least one intermediate user interface screen, to enable display of a landing screen of the calendar application; and in response to a determination that the detected user input represents movement of a rotatable input mechanism, launch (e.g., with the launching unit 3512) the calendar application and transitioning from the display of the icon directly to enable display of the landing screen of the calendar application.

In some embodiments, enabling display of the landing screen of the calendar application comprises enabling display of at least one calendar entry scheduled for the current day.

In some embodiments, transitioning through the at least one intermediate user interface screen comprises enabling display of an intermediate user interface screen having text representing at least some days of the current month.

In some embodiments, the user input is a first user input representing a first movement of the rotatable input mechanism, and the processing unit 3506 is further configured to detect (e.g., with the detecting unit 3510) a second user input representing a second movement of the rotatable movement mechanism; and in response to detecting the second user input, enable display (e.g., with the display enabling unit 3508) of text representing at least some days of the current month.

In some embodiments, the processing unit 3506 is further configured to enable display (e.g., with the display enabling unit 3508) of an indicator indicating the current day in the current month.

In some embodiments, enabling display of the icon representing the calendar application comprises enabling display of a plurality of other icons representing other software applications and enabling display of the icon representing the calendar application as the center-most icon on-screen among the displayed icons.

In some embodiments, enabling display of the text that represents the current day in the current month comprises enabling display of the text substantially centered on-screen in the vertical direction.

In some embodiments, the processing unit 3506 is further configured to detect (e.g., with the detecting unit 3510) user selection of a calendar entry of the at least one calendar entry scheduled for the current day, and in response to detecting user selection of the calendar entry, enable display (e.g., with the display enabling unit 3508) of a time and location of the selected calendar entry.

In some embodiments, the processing unit 3506 is further configured to detect (e.g., with the detecting unit 3510) a touch on the touch-sensitive surface unit 3504 while enabling display of the time and location of the selected calendar entry, the touch having a characteristic intensity; determine (e.g., with the determining unit 3516) whether the characteristic intensity of the touch is above a threshold intensity; and in response to a determination that the characteristic intensity of the touch is above the threshold intensity, enable display (e.g., with the display enabling unit 3508) of, on the display unit 3502, an affordance for accepting the calendar entry.

In some embodiments, the processing unit 3506 is further configured to, in response to a determination that the characteristic intensity of the touch is not above the threshold intensity, enable display (e.g., with the display enabling unit 3508) of additional information regarding the selected calendar entry.

In some embodiments, enabling display of at least one calendar entry scheduled for the current day comprises enabling display of at least one affordance representing the at least one calendar entries scheduled for the current day; detecting user input representing a zoom-in command; and in response to detecting the user input representing the zoom-in command, enlarging the at least one affordance, and enabling display of additional text inside the at least one affordance indicating details of at least one represented calendar entry.

In some embodiments, enabling display of at least one calendar entry scheduled for the current day comprises enabling display of an affordance representing at least two calendar entries scheduled for the current day; detecting user input on the displayed affordance; and in response to detecting the user input on the displayed affordance, enabling display of at least two affordances representing the at least two calendar entries.

In some embodiments, enabling display of additional text comprises enabling display of calendar entry information selected from the group consisting of calendar entry time, location, and organizer.

In some embodiments, the affordance representing the calendar application is a contiguous region visually distinguishable from a background of the calendar application.

The operations described above with reference to FIG. 24 are, optionally, implemented by components depicted in FIGS. 1A-1B or FIG. 35. For example, displaying operation 2402, detecting operation 2404, determining operation 2406, and launching operations 2408 and 2410 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 36:
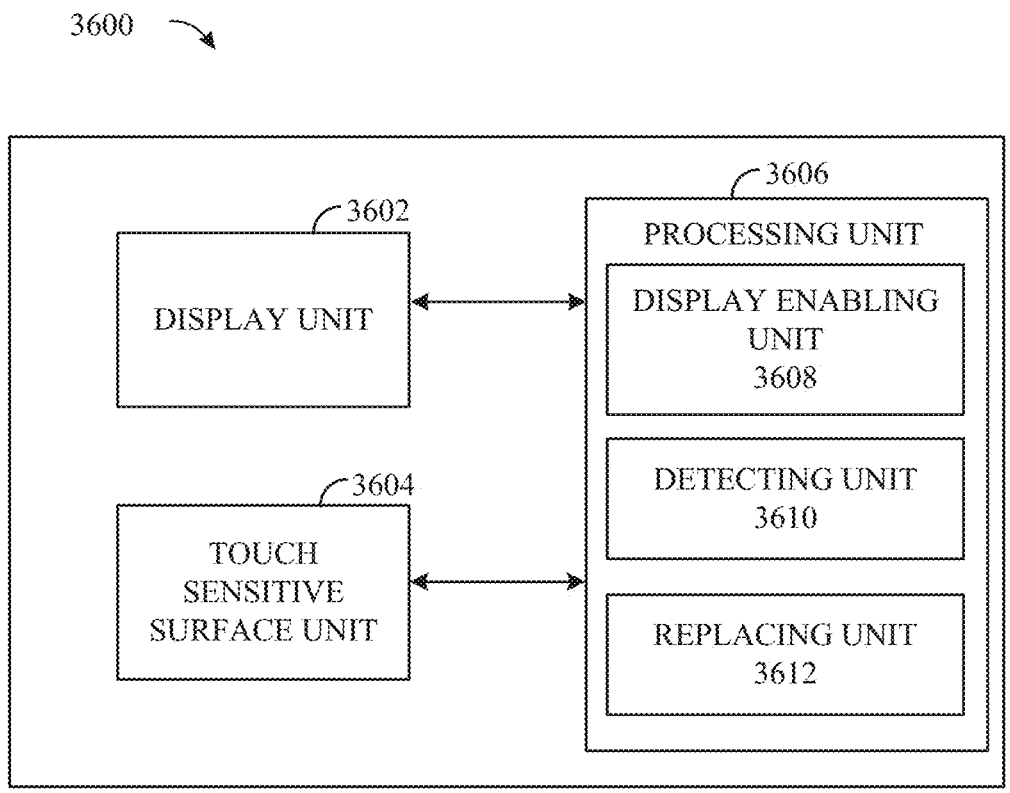
FIG. 36 is a functional block diagram of an electronic device in accordance with some embodiments.

In accordance with some embodiments, FIG. 36 shows a functional block diagram of an electronic device 3600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 36 are, optionally, combined or separated into sub-blocks to implement the principles of the various described embodiments. Therefore, the description herein optionally supports any possible combination or separation or further definition of the functional blocks described herein.

As shown in FIG. 36, an electronic device 3600 includes a display unit 3602 configured to display a graphic user interface, a touch sensitive surface unit 3604 configured to receive contacts, and a processing unit 3606 coupled to the display unit 3602 and the touch-sensitive surface unit 3604. In some embodiments, the processing unit 3606 includes a display enabling unit 3608, a detecting unit 3610 and a replacing unit 3612.

The processing unit 3606 is configured to enable display (e.g., with the display enabling unit 3608) of, on the display unit 3602, an affordance representing a calendar application; detect (e.g., with the detecting unit 3610) user input; in response to detecting the user input, (a) in accordance with a determination that the detected user input is a touch on the displayed affordance: enable display (e.g., with the display enabling unit 3608) of a first text indicating at least two months in a year, then, replace (e.g., with the replacing unit 3612) the display of the first text with a display of a second text indicating at least some days in one and only one month of the year, and then, replace (e.g., with the replacing unit 3612) the display of the second text with a display of at least one affordance representing at least one calendar entry; and (b) in accordance with a determination that the detected user input is a movement of a rotatable input mechanism: enable display (e.g., with the display enabling unit 3608) of at least one affordance representing at least one calendar entry.

In some embodiments, the movement of the rotatable input mechanism is a first movement of the rotatable input mechanism, the processing unit 3606 further configured to detect (e.g., with the detecting unit 3610) a second movement of the rotatable input mechanism; and in response to detecting the second movement, replace (e.g., with the replacing unit 3612) the display of the at least one affordance representing the at least one calendar entry with a display of the second text indicating the at least some days in the one and only one month of the year.

In some embodiments, the processing unit 3606 is further configured to detect (e.g., with the detecting unit 3610) a third movement of the rotatable input mechanism; and in response to detecting the third movement, replace (e.g., with the replacing unit 3612) the display of the second text with a display of the first text indicating the at least two months in the year.

In some embodiments, replacing the display of the first text with the second text occurs automatically after the first text is displayed for a predetermined amount of time.

In some embodiments, replacing the display of the second text with the at least one affordance representing at least one calendar entry occurs automatically after the second text is displayed for the predetermined amount of time.

In some embodiments, the at least one calendar entry is scheduled for the current day.

In some embodiments, the first text indicating the at least two months comprises text indicating the names of the at least two months including the current month and a plurality of numerals indicating at least some days of the current month, where the text and the plurality of numerals associated with the current month are displayed such that, as a unit, they span the vertical center of the display unit 3602.

In some embodiments, the second text indicating the at least some days in the one and only month comprises a plurality of numerals indicating at least some days of the current month, including the current day, where the display of the numeral indicating the current day spans the vertical center of the display unit 3602.

In some embodiments, the at least one affordance representing the at least one calendar entry is a contiguous region visually distinguishable from a background of the calendar application.

In some embodiments, (a) and (b) are both performed.

The operations described above with reference to FIG. 25 are, optionally, implemented by components depicted in FIGS. 1A-1B or FIG. 36. For example, displaying operations 2502, 2508, 2512 and 2514; detecting operation 2504; determining operation 2506; and launching operation 2510 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 37:
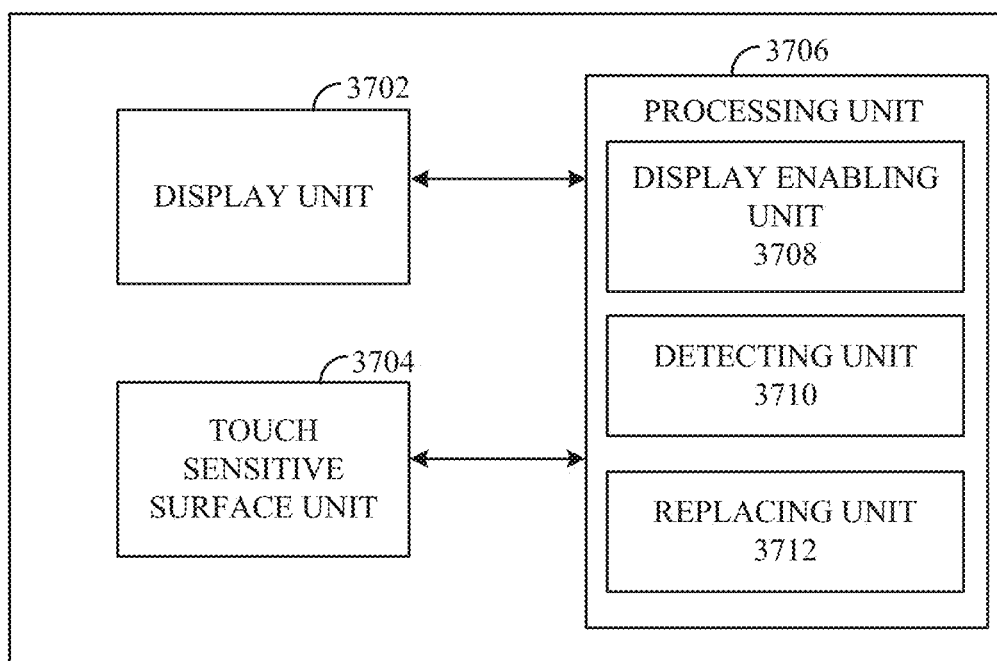
FIG. 37 is a functional block diagram of an electronic device in accordance with some embodiments.

In accordance with some embodiments, FIG. 37 shows a functional block diagram of an electronic device 3700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 37 are, optionally, combined or separated into sub-blocks to implement the principles of the various described embodiments. Therefore, the description herein optionally supports any possible combination or separation or further definition of the functional blocks described herein.

As shown in FIG. 37, an electronic device 3700 includes a display unit 3702 configured to display a graphic user interface, a touch sensitive surface unit 3704 configured to receive contacts, and a processing unit 3706 coupled to the display unit 3702 and the touch-sensitive surface unit 3704. In some embodiments, the processing unit 3706 includes a display enabling unit 3708, a detecting unit 3710, and a replacing unit 3712.

The processing unit 3706 is configured to enable display (e.g., with the display enabling unit 3708) of, on the display unit 3702, an affordance representing a calendar application; detect (e.g., with the detecting unit 3710) user input; in response to detecting the user input, (a) in accordance with a determination that the detected user input is a touch on the displayed affordance: enable display (e.g., with the display enabling unit 3708) of a first text indicating at least two months in a year, then, replace (e.g., with the replacing unit 3712) the display of the first text with a display of a second text indicating at least some days in one and only one month of the year, and then, replace (e.g., with the replacing unit 3712) the display of the second text with a display of at least one affordance representing at least one calendar entry; and (b) in accordance with a determination that the detected user input is a movement of a rotatable input mechanism, enable display (e.g., with the display enabling unit 3708) of the first text indicating at least two months in a year.

In some embodiments, the movement of the rotatable input mechanism is a first movement of the rotatable input mechanism, the processing unit 3706 further configured to detect (e.g., with the detecting unit 3710) a second movement of the rotatable input mechanism; and in response to detecting the second movement, replace (e.g., with the replacing unit 3712) the display of the first text with a display of the second text indicating the at least some days in the one and only one month of the year.

In some embodiments, the processing unit 3706 is further configured to detect (e.g., with the detecting unit 3710) a third movement of the rotatable input mechanism; and in response to detecting the third movement, replace (e.g., with the replacing unit 3712) the display of the second text with a display of the at least one user interface object representing the at least one calendar entry.

In some embodiments, replacing the display of the first text with the second text occurs automatically after the first text is displayed for a predetermined amount of time.

In some embodiments, replacing the display of the second text with the at least one user interface object representing at least one calendar entry occurs automatically after the second text is displayed for the predetermined amount of time.

In some embodiments, the at least one calendar entry is scheduled for the current day.

In some embodiments, the first text indicating the at least two months comprises text indicating the names of the at least two months including the current month, and a plurality of numerals indicating at least some days of the current month, where the text and the plurality of numerals associated with the current month are displayed such that, as a unit, they span the vertical center of the display unit 3702.

In some embodiments, the second text indicating the at least some days in the one and only month comprises a plurality of numerals indicating at least some days of the current month, including the current day, where the display of the numeral indicating the current day spans the vertical center of the display unit 3702.

In some embodiments, the at least one affordance representing the at least one calendar entry is a contiguous region visually distinguishable from a background of the calendar application.

In some embodiments, (a) and (b) are both performed.

The operations described above with reference to FIG. 26 are, optionally, implemented by components depicted in FIGS. 1A-1B or FIG. 37. For example, displaying operations 2602, 2608, 2612 and 2614; detecting operation 2604; determining operation 2606; and launching operation 2610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 38:
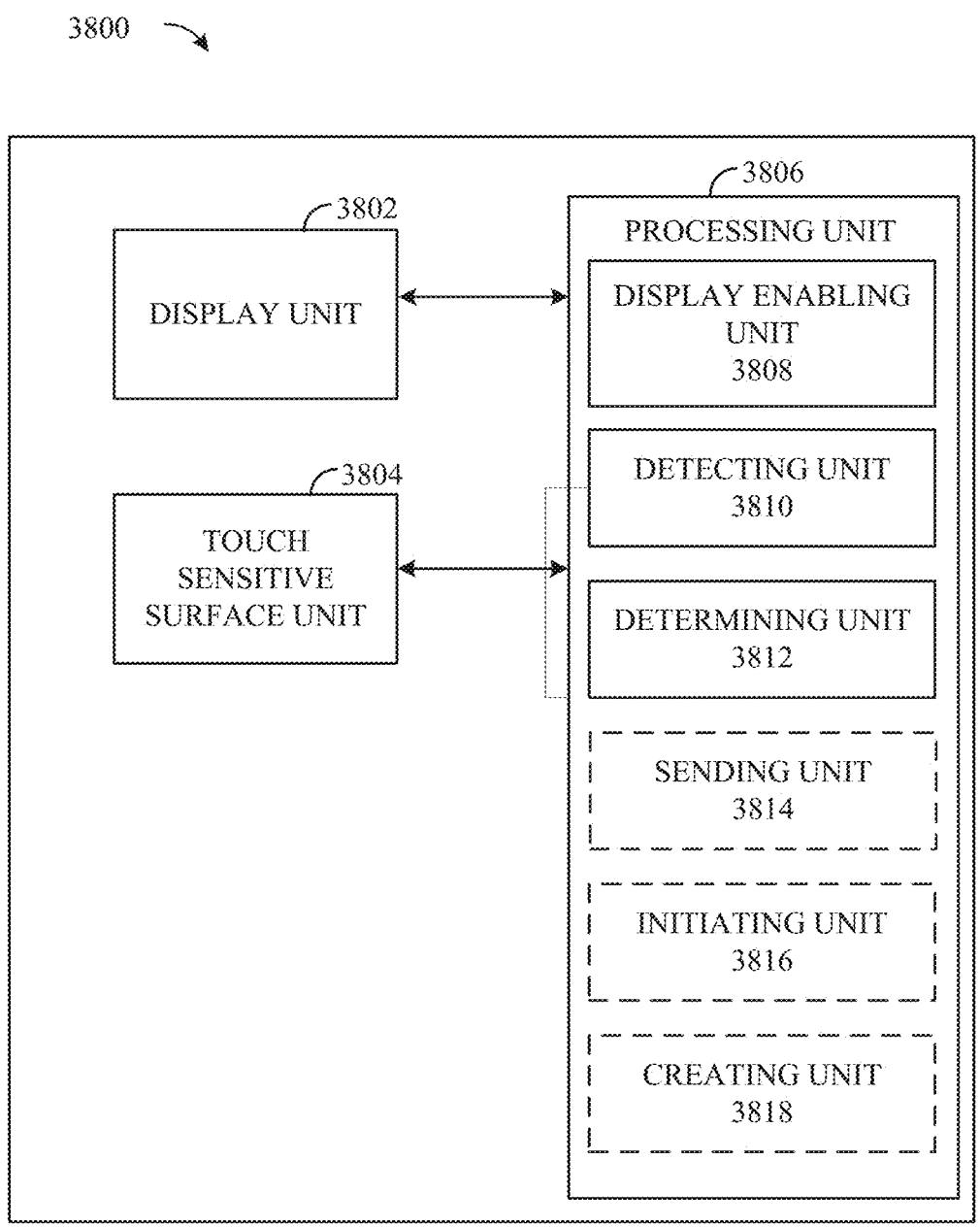
FIG. 38 is a functional block diagram of an electronic device in accordance with some embodiments.

In accordance with some embodiments, FIG. 38 shows a functional block diagram of an electronic device 3800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 38 are, optionally, combined or separated into sub-blocks to implement the principles of the various described embodiments. Therefore, the description herein optionally supports any possible combination or separation or further definition of the functional blocks described herein.

As shown in FIG. 38, an electronic device 3800 includes a display unit 3802 configured to display a graphic user interface, a touch sensitive surface unit 3804 configured to receive contacts, and a processing unit 3806 coupled to the display unit 3802 and the touch-sensitive surface unit 3804. In some embodiments, the processing unit 3806 includes a display enabling unit 3808, a detecting unit 3810, a determining unit 3812, and, optionally, a sending unit 3814, an initiating unit 3816, and a creating unit 3818.

The processing unit 3806 is configured to enable display (e.g., with the display enabling unit 3808) of an affordance representing a calendar entry in a calendar application; detect (e.g., with the detecting unit 3810) a touch on the display, the touch having a characteristic intensity, the touch located at the displayed user interface object representing the calendar entry; determine (e.g., with the determining unit 3812) whether the characteristic intensity of the touch is below a threshold intensity; in response to a determination that the characteristic intensity of the touch is below the threshold intensity, enable display (e.g., with the display enabling unit 3808) of a time and a location associated with the calendar entry; and in response to a determination that the characteristic intensity of the touch is not below the threshold intensity, enable display (e.g., with the display enabling unit 3808) of, on the display unit 3802, a plurality of affordances representing functions of the calendar application.

In some embodiments, the processing unit 3806 is further configured to, in response to a determination that the characteristic intensity of the first touch is not below the threshold intensity, enable display (e.g., with the display enabling unit 3808) of, on the display unit 3802, an affordance for creating a calendar entry.

In some embodiments, enabling display of the plurality of affordances representing functions of the calendar application comprises enabling display of an affordance that, when selected, sends an instruction to another electronic device instructing the other electronic device to display a calendar entry.

In some embodiments, enabling display of the plurality of affordances representing functions of the calendar application comprises displaying an affordance that, when selected, displays a phone number associated with a calendar entry.

In some embodiments, the processing unit 3806 is further configured to detect (e.g., with the detecting unit 3810) user selection of the affordance for enable display of the phone number; and in response to detecting the user selection, send (e.g., with the sending unit 3814) an instruction to another electronic device instructing the other electronic device to initiate a phone call to the phone number.

In some embodiments, the processing unit 3806 is further configured to detect (e.g., with the detecting unit 3810) user selection of the affordance for enable display of the phone number, and, in response to detecting the user selection, initiate (e.g., with the initiating unit 3816) a phone call to the phone number.

In some embodiments, the phone number is associated with an organizer of the calendar entry.

In some embodiments, enabling display of the plurality of affordances representing functions of the calendar application comprises enabling display of an affordance that, when selected, displays an e-mail address associated with a calendar entry.

In some embodiments, the processing unit 3806 is further configured to detect (e.g., with the detecting unit 3810) user selection of the affordance for enable display of the e-mail address and in response to detecting the user selection, send (e.g., with the sending unit 3814) an instruction to another electronic device instructing the other electronic device to create an e-mail draft, the e-mail draft listing the displayed email address as a recipient.

In some embodiments, the processing unit 3806 is further configured to detect (e.g., with the detecting unit 3810) user selection of the affordance for enable display of the e-mail address and, in response to detecting the user selection, create (e.g., with the creating unit 3818) an e-mail draft, the e-mail draft listing the displayed email address as a recipient.

In some embodiments, the e-mail address is associated with an organizer of the calendar entry.

In some embodiments, the other device is a cellular phone.

The operations described above with reference to FIG. 27 are, optionally, implemented by components depicted in FIGS. 1A-1B or FIG. 38. For example, displaying operations 2702, 2708, and 2710; detecting operation 2704; and determining operation 2706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 39:
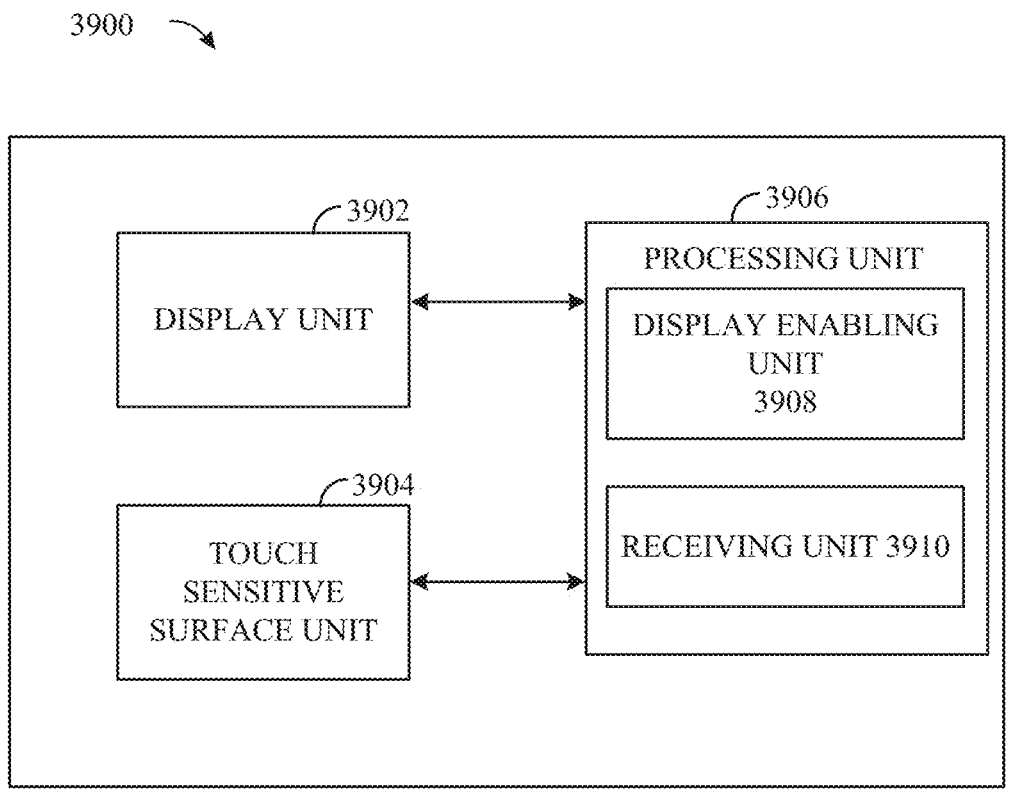
FIG. 39 is a functional block diagram of an electronic device in accordance with some embodiments.

In accordance with some embodiments, FIG. 39 shows a functional block diagram of an electronic device 3800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 39 are, optionally, combined or separated into sub-blocks to implement the principles of the various described embodiments. Therefore, the description herein optionally supports any possible combination or separation or further definition of the functional blocks described herein.

As shown in FIG. 39, an electronic device 3900 includes a display unit 3902 configured to display a graphic user interface, a touch sensitive surface unit 3904 configured to receive contacts, and a processing unit 3906 coupled to the display unit 3902 and the touch-sensitive surface unit 3904. In some embodiments, the processing unit 3906 includes a display enabling unit 3908 and a receiving unit 3910.

The processing unit 3906 is configured to enable display (e.g., with the display enabling unit 3908) of, on the display unit 3902, a plurality of calendar entries, the plurality of calendar entries including a first calendar entry and a second calendar entry, the first calendar entry displayed above the second calendar entry; receive (e.g., with the receiving unit 3910) user input representing user acceptance of the first calendar entry; and in response to receiving the user input, enable display (e.g., with the display enabling unit 3908) of the first calendar entry below the second calendar entry.

In some embodiments, receiving user input representing user acceptance of the first calendar entry comprises detecting a touch on the touch-sensitive surface unit 3904 having a characteristic intensity, the touch having a characteristic intensity; determining whether the characteristic intensity is above a threshold intensity; and in response to a determination that the characteristic intensity is above the threshold intensity, enabling display of an accept affordance for accepting the calendar entry and an decline affordance for declining the calendar entry; and detecting a user selection of the accept affordance.

In some embodiments, the processing unit 3906 is further configured to, in response to a determination that the characteristic intensity is not above the threshold intensity, enable display (e.g., with the display enabling unit 3908) of a time and location of the calendar entry.

In some embodiments, receiving user input representing user acceptance of the first calendar entry comprises detecting a user selection of the first calendar entry; in response to detecting the user selection of the first calendar entry, enabling display of a time and location of the calendar entry and enabling display of an accept affordance for accepting the calendar entry; and detecting a user selection of the accept affordance.

In some embodiments, the processing unit 3906 is further configured to in response to detecting the user selection of the accept affordance, enable display (e.g., with the display enabling unit 3908) of a visual indication indicating acceptance of the calendar entry.

In some embodiments, the visual indication comprises a message confirming acceptance of the calendar entry.

In some embodiments, enabling display of the plurality of calendar entries comprises enable display of calendar entries scheduled for different days.

The operations described above with reference to FIG. 28 are, optionally, implemented by components depicted in FIGS. 1A-1B or FIG. 39. For example, displaying operations 2802 and 2806 and detecting operation 2804 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 40:
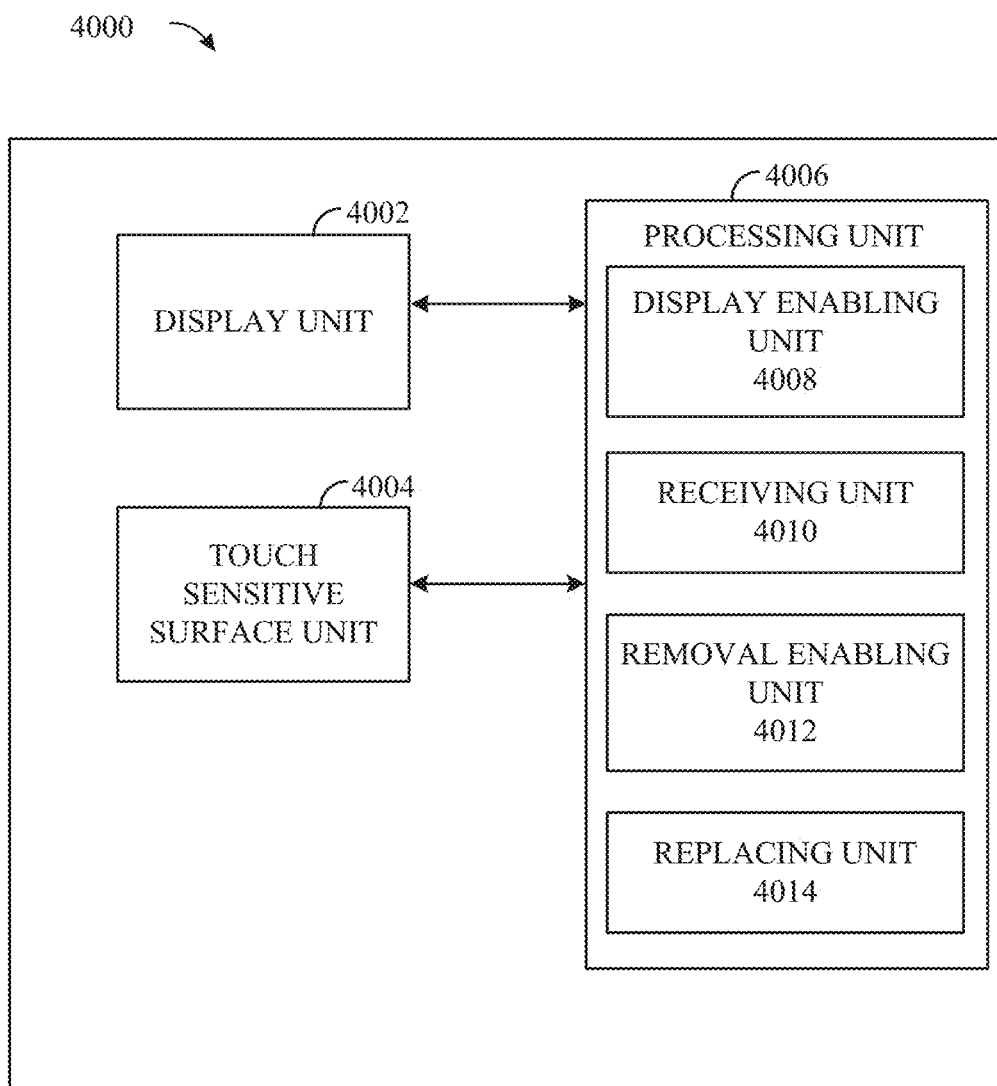
FIG. 40 is a functional block diagram of an electronic device in accordance with some embodiments.

In accordance with some embodiments, FIG. 40 shows a functional block diagram of an electronic device 4000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 40 are, optionally, combined or separated into sub-blocks to implement the principles of the various described embodiments. Therefore, the description herein optionally supports any possible combination or separation or further definition of the functional blocks described herein.

As shown in FIG. 40, an electronic device 4000 includes a display unit 4002 configured to display a graphic user interface, a touch sensitive surface unit 4004 configured to receive contacts, and a processing unit 4006 coupled to the display unit 4002 and the touch-sensitive surface unit 4004. In some embodiments, the processing unit 4006 includes a display enabling unit 4008, a receiving unit 4010, a removal enabling unit 4012, and a replacing unit 4014.

The processing unit 4006 is configured to enable display (e.g., with the display enabling unit 4008) of, on the display unit 4002, a first user interface screen having a plurality of calendar entries; receive (e.g., with the receiving unit 4010)

first data representing user acceptance of a first calendar entry of the plurality of calendar entries; in response to receiving the first data, enable removal (e.g., with the removal enabling unit 4012) of the accepted first calendar entry from the first user interface screen; receive (e.g., with the receiving unit 4010) second data representing a user input; and in response to receiving the second data, replace (e.g., with the replacing unit 4014) the display of the first user interface screen with a display of a second user interface screen having a plurality of accepted calendar entries.

In some embodiments, the user input is a movement of a rotatable input mechanism of the electronic device.

In some embodiments, the user input is a swipe on the touch-sensitive surface unit 4004 in a substantially horizontal direction.

In some embodiments, receiving first data representing user acceptance of the first calendar entry comprises detecting a touch on the touch-sensitive surface unit 4004, the touch having a characteristic intensity; determining whether the characteristic intensity is above a threshold intensity; in response to a determination that the characteristic intensity is above the threshold intensity, enabling display of an accept affordance for accepting the calendar entry and an decline affordance for declining the calendar entry; and detecting a user selection of the accept affordance.

In some embodiments, the processing unit 4006 is further configured to, in response to a determination that the characteristic intensity is not above the threshold intensity, enable display (e.g., with the display enabling unit 4008) of a time and location of the calendar entry.

In some embodiments, receiving first data representing user acceptance of the first calendar entry comprises detecting a user selection of the first calendar entry; in response to detecting the user selection, enabling display of a time and location of the calendar entry and an accept affordance for accepting the calendar entry; and receiving a user selection of the accept affordance.

In some embodiments, the first and second user interface screens each include an affordance indicating the currently displayed user interface screen and a position of the displayed user interface screen within a sequence of the user interface screens.

The operations described above with reference to FIG. 29 are, optionally, implemented by components depicted in FIGS. 1A-1B or FIG. 40. For example, displaying operations 2902 and 2910, detecting operations 2904 and 2908, and removing operation 2906 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 41:
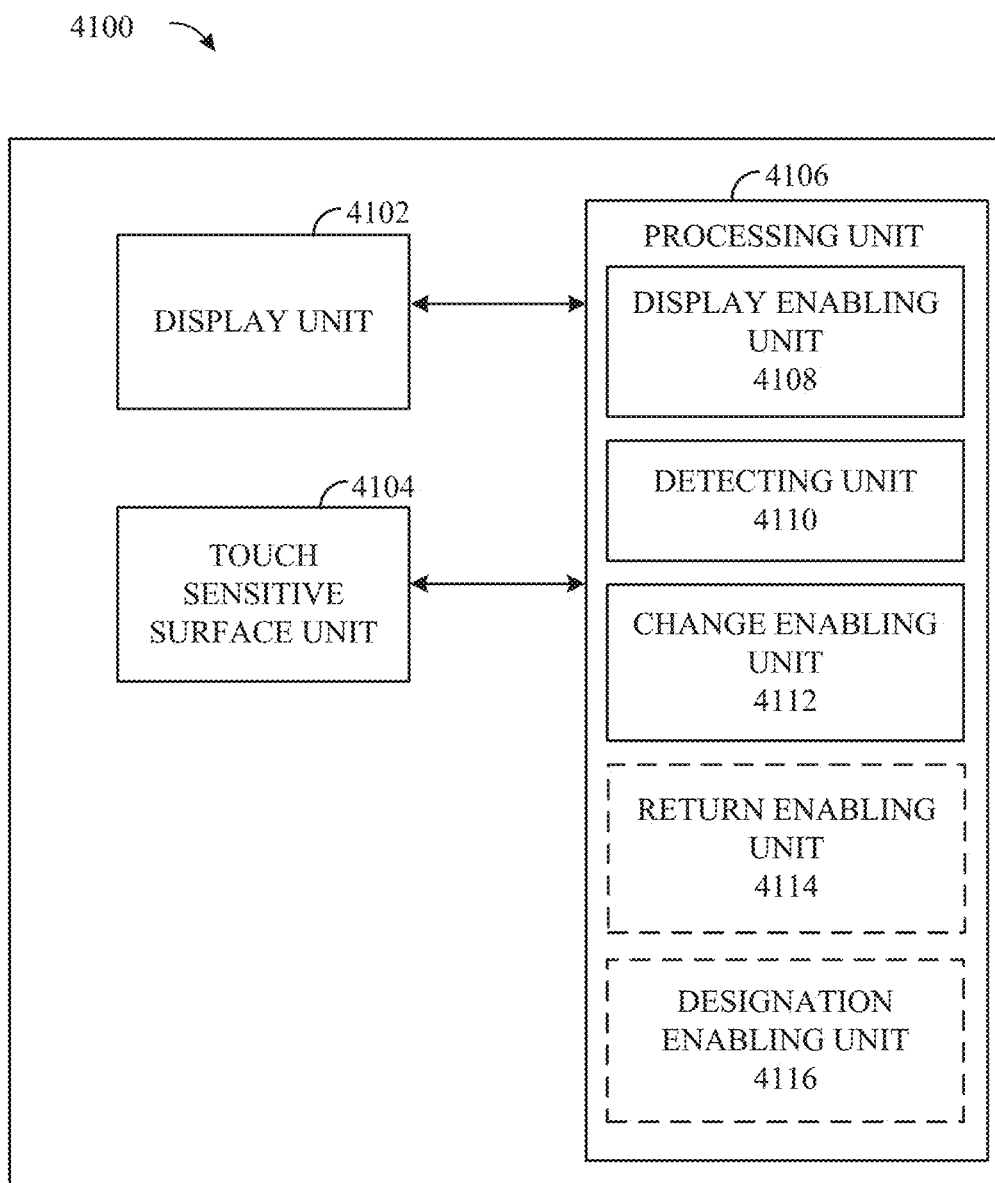
FIG. 41 is a functional block diagram of an electronic device in accordance with some embodiments.

In accordance with some embodiments, FIG. 41 shows a functional block diagram of an electronic device 3500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 41 are, optionally, combined or separated into sub-blocks to implement the principles of the various described embodiments. Therefore, the description herein optionally supports any possible combination or separation or further definition of the functional blocks described herein.

As shown in FIG. 41, an electronic device 4100 includes a display unit 4102 configured to display a graphic user interface, a touch sensitive surface unit 4104 configured to receive contacts, and a processing unit 4106 coupled to the display unit 4102 and the touch-sensitive surface unit 4104. In some embodiments, the processing unit 4106 includes a display enabling unit 4108, a detecting unit 4110, a change enabling unit 4112 and, optionally, a return enabling unit 4114 and a designation unit 4116.

The processing unit 4106 is configured to enable display (e.g., with the display enabling unit 4108) of a user interface screen on the display unit 4102, where the displayed user interface screen includes a plurality of texts indicating a plurality of months in a year, the texts of the plurality of texts are organized according to a layout having at least two rows and at least two columns, and the plurality of texts have an initial visual characteristic; detect (e.g., with the detecting unit 4110) a user selection of a first text of the plurality of texts, the first text indicating a first month of the plurality of months; and in response to detecting the user selection, enable change (e.g., with the change enabling unit 4112) of the visual characteristic of the plurality of texts except the first text indicating the first month.

In some embodiments, the processing unit 4106 is further configured to detect (e.g., with the detecting unit 4110) a movement of the user selection of the first text, and in response to detecting the movement: enable change (e.g., with the change enabling unit 4112) of the visual characteristic of the first text indicating the first month and enable return (e.g., with the return enabling unit 4114) of the visual characteristic of a second text indicating a second month of the plurality of months to its initial visual characteristic.

In some embodiments, the first text and the second text represent consecutive months in the year.

In some embodiments, the user selection is a touch on the touch-sensitive surface unit 4104 at a position of the displayed first text.

In some embodiments, the movement is a swipe of the touch.

In some embodiments, the movement is a substantially vertical movement.

In some embodiments, the processing unit 4106 is further configured to detect (e.g., with the detecting unit 4110) a release of the user selection of the first text and in response to detecting the release, enable designation (e.g., with the designation enabling unit 4116) the second text indicating the second month as having focus.

In some embodiments, the processing unit 4106 is further configured to, in response to detecting the release, enable return (e.g., with the return enabling unit 4114) of the visual characteristic of the plurality of texts to the initial visual characteristic, except the second text.

In some embodiments, the change in visual characteristic comprises the visual effect of dimming.

In some embodiments, the change in visual characteristic comprises the visual effect of greying.

In some embodiments, the change in visual characteristic comprises increasing translucency.

In some embodiments, the change in visual characteristic comprises the visual effect of darkening.

The operations described above with reference to FIG. 30 are, optionally, implemented by components depicted in FIGS. 1A-1B or FIG. 41. For example, displaying operation 3002; detecting operations 3004, 3008, and 3012; changing operations 3006 and 3010, and designating operation 3014 are optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective pre-defined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 42:
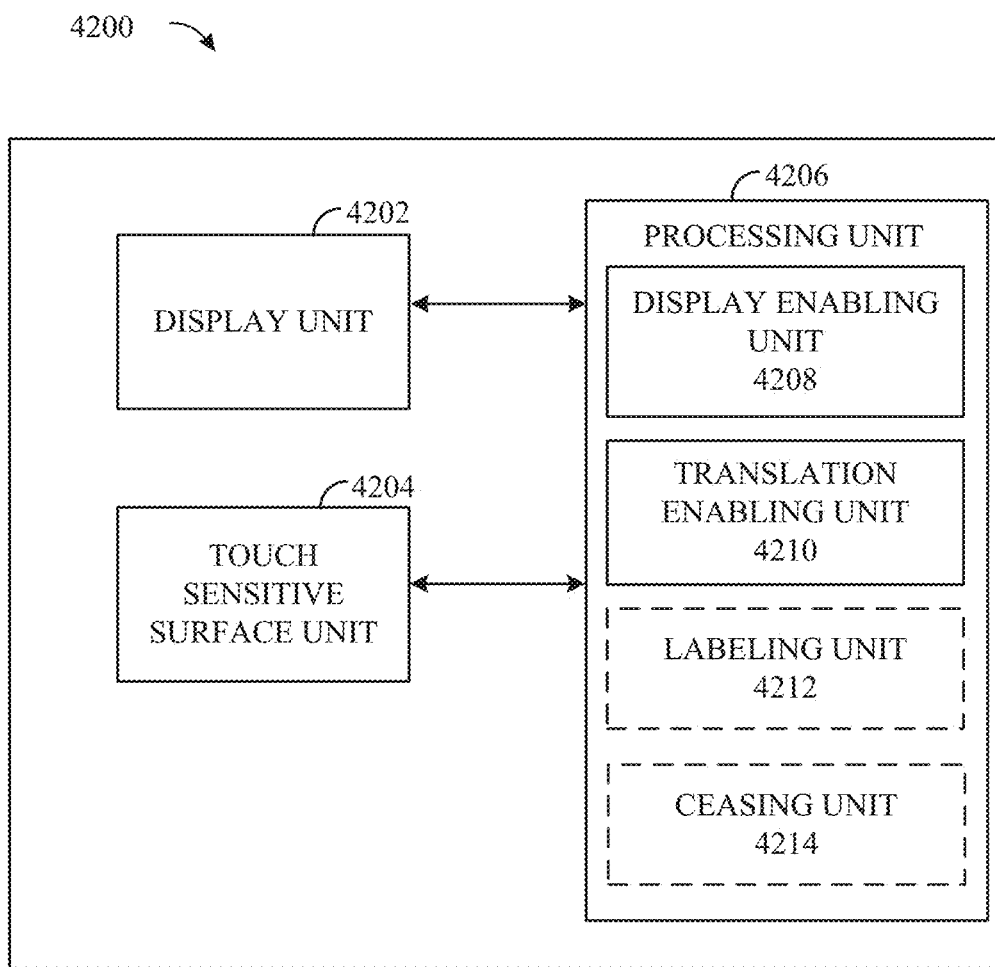
FIG. 42 is a functional block diagram of an electronic device in accordance with some embodiments.

In accordance with some embodiments, FIG. 42 shows a functional block diagram of an electronic device 4200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 42 are, optionally, combined or separated into sub-blocks to implement the principles of the various described embodiments. Therefore, the description herein optionally supports any possible combination or separation or further definition of the functional blocks described herein.

As shown in FIG. 42, an electronic device 4200 includes a display unit 4202 configured to display a graphic user interface, a touch sensitive surface unit 4204 configured to receive contacts, and a processing unit 4206 coupled to the display unit 4202 and the touch-sensitive surface unit 4204. In some embodiments, the processing unit 4206 includes a display enabling unit 4208, a translation enabling unit 4210 and, optionally, a labeling unit 4212 and a ceasing unit 4214.

The processing unit 4206 is configured to enable display (e.g., with the display enabling unit 4208) of a row of numerals, the numerals indicating days in a month; detect user input; and in response to detecting the user input, enable translation (e.g., with the translation enabling unit 4210) of all but one of the displayed numerals from its respective position in the row into a new position, where the displayed numerals, in their new positions, form a column of numerals.

In some embodiments, the numerals displayed in the new position represent days in one week of the month.

In some embodiments, a numeral of the numerals is associated with a day of a week, the processing unit 4206 further configured to, after the translating, label (e.g., with the labeling unit 4212) the numeral with text identifying a day of the week.

In some embodiments, the processing unit 4206 is further configured to enable translation (e.g., with the translation enabling unit 4210) of the one remaining numeral from its position in the row of numerals to a position in the column of numerals.

In some embodiments, the user input is a movement of a rotatable input mechanism of the electronic device.

In some embodiments, enabling translation comprises enabling translation at least one displayed numeral visibly on the display unit 4202.

In some embodiments, the row of numerals is a first row of numerals, the processing unit 4306 further configured to enable display (e.g., with the display enabling unit 4208) of a second row of numerals representing additional days in the month; in response to detecting the user input, enable translation of (e.g., with the translation enabling unit 4210) the second row of numerals towards one or more edges of the display unit 4202; and cease (e.g., with the ceasing unit 4214) to enable display of the second row of numerals.

The operations described above with reference to FIG. 31 are, optionally, implemented by components depicted in FIGS. 1A-1B or FIG. 42. For example, displaying operation 3102, detecting operation 3104, and translating operation 3106 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective pre-defined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 43:
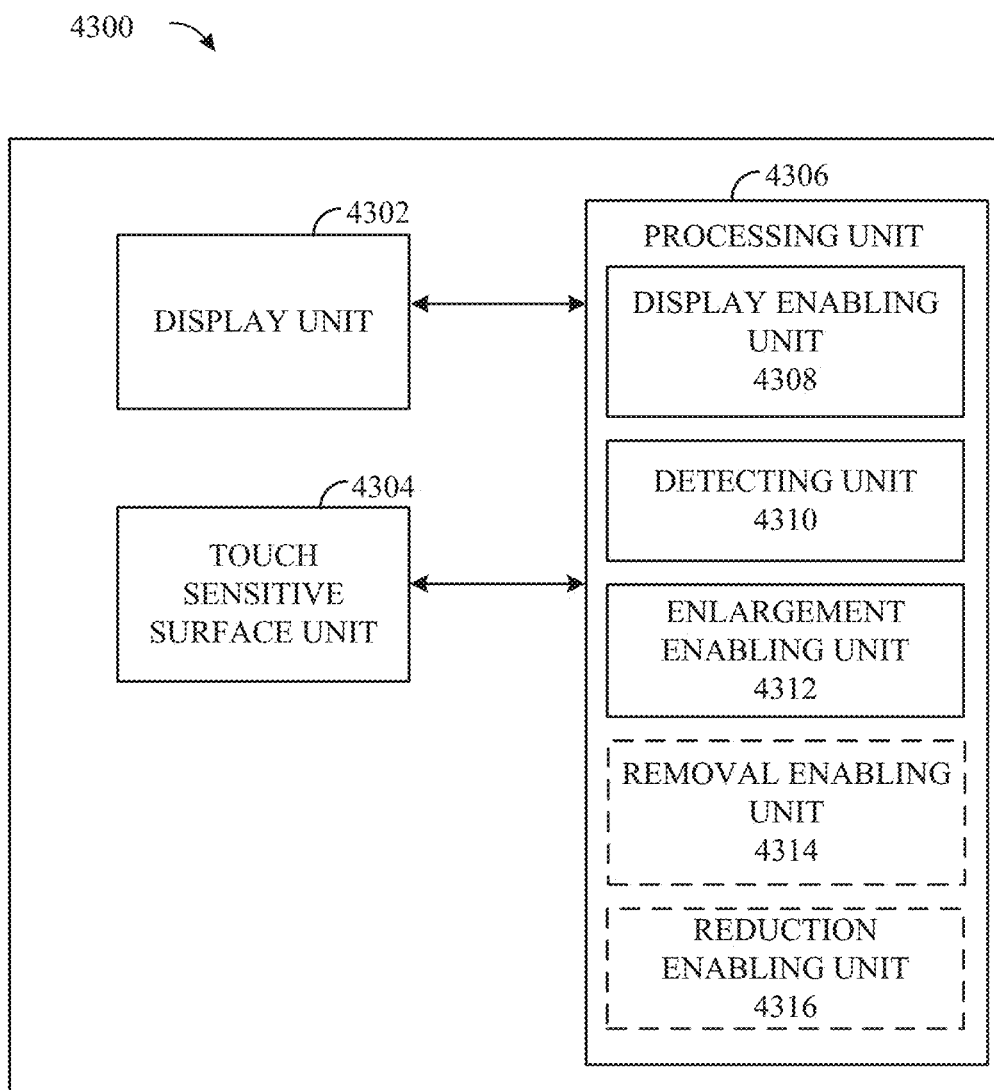
FIG. 43 is a functional block diagram of an electronic device in accordance with some embodiments.

In accordance with some embodiments, FIG. 43 shows a functional block diagram of an electronic device 4300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 43 are, optionally, combined or separated into sub-blocks to implement the principles of the various described embodiments. Therefore, the description herein optionally supports any possible combination or separation or further definition of the functional blocks described herein.

As shown in FIG. 43, an electronic device 4300 includes a display unit 4302 configured to display a graphic user interface, a touch sensitive surface unit 4304 configured to receive contacts, and a processing unit 4306 coupled to the display unit 4302 and the touch-sensitive surface unit 4304. In some embodiments, the processing unit 4306 includes a display enabling unit 4308, a detecting unit 4310, an enlargement enabling unit 4312 and, optionally, a removal enabling unit 4314 and a reduction enabling unit 4316.

The processing unit 4306 is configured to enable display (e.g., with the display enabling unit 4308) of on the display unit 4302: text indicating hours in a day, at least one region representing a calendar entry scheduled during the indicated hours, and text inside the at least one region indicating a name of the calendar entry; detect (e.g., with the detecting unit 4310) user input representing a zoom-in or zoom-out command; in accordance with a determination that the user input represents a zoom-in command: enable enlargement of (e.g., with the enlargement enabling unit 4312) the at least one region, and enable display (e.g., with the display enabling unit 4308) of additional text inside the at least one region indicating details of the calendar entry.

In some embodiments, enabling display of additional text comprises enabling display of one or more calendar entry information selected from the group consisting of calendar entry time, location, and organizer.

In some embodiments, the size of the enlarged at least one region is proportional to the duration of the calendar entry In some embodiments, detecting user input comprises receiving data representing movement of a rotatable input mechanism of the electronic device.

In some embodiments, detecting user input comprises receiving data representing a de-pinching or pinching gesture on the touch-sensitive surface unit 4304.

In some embodiments, the processing unit 4306 is further configured to, in accordance with a determination that the user input represents a zoom-out command, enable removal (e.g., with the removal enabling unit 4314) of the display of the text indicating days of the month and the user interface object.

In some embodiments, the processing unit 4306 is further configured to, in accordance with a determination that the user input represents a zoom-out command: enable reduction (e.g., with the reduction enabling unit 4316) of the size of the at least one region representing a calendar entry.

In some embodiments, the processing unit 4306 is further configured to, in accordance with a determination that the user input represents a zoom-out command, enable display (e.g., with the display enabling unit 4308) of a count of calendar entries within a time interval.

In some embodiments, the time interval is a month or a year.

The operations described above with reference to FIG. 32 are, optionally, implemented by components depicted in FIGS. 1A-1B or FIG. 43. For example, displaying operation 3202, detecting operation 3204 and 1608, enlarging operation 3206, and removing operation 3208 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 44:
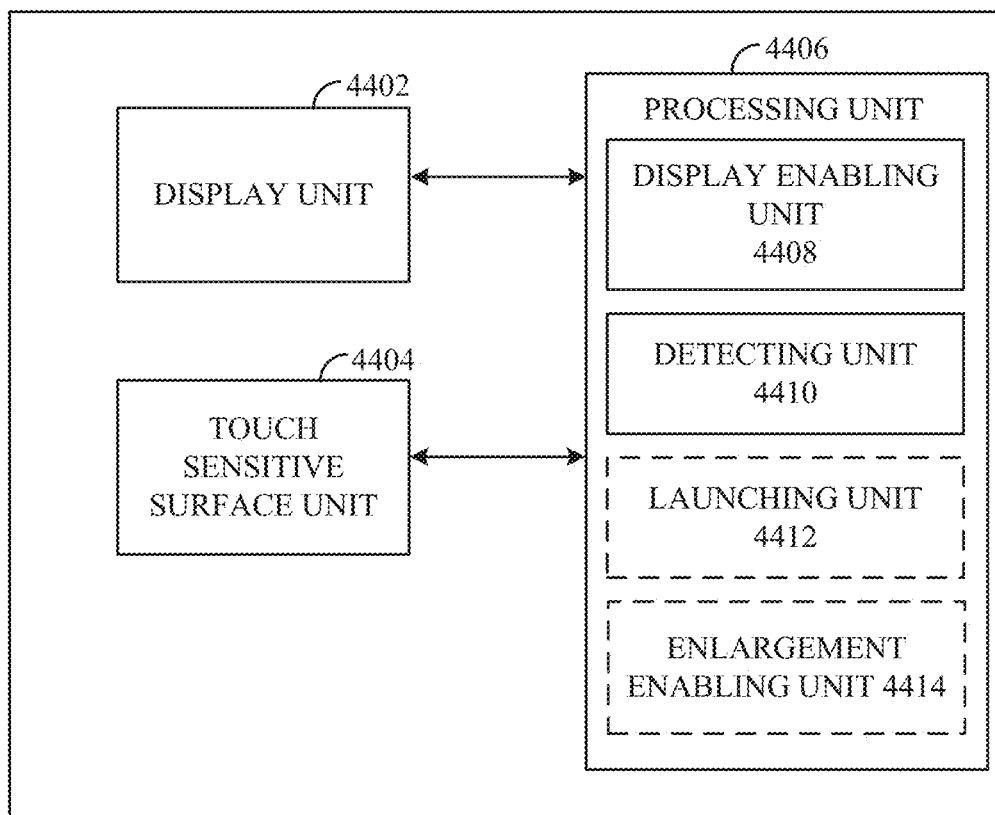
FIG. 44 is a functional block diagram of an electronic device in accordance with some embodiments.

In accordance with some embodiments, FIG. 44 shows a functional block diagram of an electronic device 4400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 44 are, optionally, combined or separated into sub-blocks to implement the principles of the various described embodiments. Therefore, the description herein optionally supports any possible combination or separation or further definition of the functional blocks described herein.

As shown in FIG. 44, an electronic device 4400 includes a display unit 4402 configured to display a graphic user interface, a touch sensitive surface unit 4404 configured to receive contacts, and a processing unit 4406 coupled to the display unit 4402 and the touch-sensitive surface unit 4404. In some embodiments, the processing unit 4406 includes a display enabling unit 4408, a detecting unit 4410, a launching unit 4412 and, optionally, an enlargement enabling unit 4414.

The processing unit 4406 is configured to enable display (e.g., with the display enabling unit 4408) of, on the display unit 4402, an application affordance representing a calendar application; detect (e.g., with the detecting unit 4410) a user selection of the application affordance; and in response to detecting the user selection of the application affordance: launch (e.g., with the launching unit 4412) the calendar application, enable display (e.g., with the display enabling unit 4408) of a first event affordance representing a first calendar entry, and enable display (e.g., with the display enabling unit 4408) of a second event affordance representing a second calendar entry, where the second calendar entry is longer in duration than the first calendar entry, but the size of the first event affordance is larger than the size of the second event affordance.

In some embodiments, the second calendar entry is an all-day calendar entry.

In some embodiments, the processing unit 4406 is further configured to detect (e.g., with the detecting unit 4410) user selection of the second event affordance and, in response to detecting the user selection of the second event affordance, enable enlargement (e.g., with the enlargement enabling unit 4414) of the second affordance.

In some embodiments, the enlarged second affordance includes text representing the name of the second calendar entry.

In some embodiments, only one of the first affordance and the second affordance includes text representing a name of the first calendar entry.

In some embodiments, the second event affordance representing the all-day calendar entry is displayed on top of all other displayed affordances representing calendar entries.

In some embodiments, detecting user selection of the second event affordance comprises detecting a touch on the touch-sensitive surface unit 4404 at a position of the displayed second event affordance.

In some embodiments, wherein detecting user selection of the second event affordance comprises detecting a touch on the touch-sensitive surface unit 4404 at a position of the displayed second event affordance and a movement of the touch.

In some embodiments, detecting user selection of the second event affordance comprises detecting a touch on the touch-sensitive surface unit 4404 at a position of the displayed second event affordance and a movement of the touch above a threshold distance.

The operations described above with reference to FIG. 33 are, optionally, implemented by components depicted in FIGS. 1A-1B or FIG. 44. For example, displaying operation 3302, detecting operations 3304 and 3308, launching operation 3306, and enlarging operation 3310 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device, comprising:
   a touch-sensitive display;
   a rotatable input mechanism;
   one or more processors;
   a memory; and
   one or more programs, wherein the one or more programs are stored in the memory and configured to be executed by the one or more processors, the one or more programs including instructions for:
   displaying, on the touch-sensitive display:
      text indicating hours in a day,
      at least one region representing a calendar entry scheduled during the indicated hours, and
      text inside the at least one region indicating a name of the calendar entry;
   detecting user input representing a zoom-in or zoom-out command, wherein the user input representing a zoom-in or zoom-out command includes a rotation of the rotatable input mechanism; and
   in response to detecting the user input representing the zoom-in or zoom-out command:
      in accordance with a determination that the user input represents a zoom-in command:
         enlarging the at least one region, and
         displaying additional text inside the at least one region indicating details of the calendar entry; and
      in accordance with a determination that the user input represents a zoom-out command:
         decreasing a size of the at least one region, and
         ceasing to display additional text inside the at least one region.

2. The electronic device of claim 1, wherein displaying additional text comprises displaying one or more calendar entry information selected from the group consisting of calendar entry time, location, and organizer.

3. The electronic device of claim 1, wherein a size of the enlarged at least one region is proportional to a duration of the calendar entry.

4. The electronic device of claim 1, the one or more programs further including instructions for:
   in accordance with a determination that the user input represents a zoom-out command:
      removing the display of the text indicating hours in a day.

5. The electronic device of claim 1, the one or more programs further including instructions for:
   in accordance with a determination that the user input represents a zoom-out command:
      displaying a count of calendar entries within a time interval.

6. The electronic device of claim 5, wherein the time interval is a month or a year.

7. A method, comprising:
   at an electronic device with a touch-sensitive display and a rotatable input mechanism:
      displaying on the touch-sensitive display:
         text indicating hours in a day,
         at least one region representing a calendar entry scheduled during the indicated hours, and
         text inside the at least one region indicating a name of the calendar entry;
      detecting user input representing a zoom-in or zoom-out command, wherein the user input representing a zoom-in or zoom-out command includes a rotation of the rotatable input mechanism; and
      in response to detecting the user input representing the zoom-in or zoom-out command:
         in accordance with a determination that the user input represents a zoom-in command:
            enlarging the at least one region, and
            displaying additional text inside the at least one region indicating details of the calendar entry; and in accordance with a determination that the user input represents a zoom-out command:
decreasing a size of the at least one region, and ceasing to display additional text inside the at least one region.

8. The method of claim 7, wherein displaying additional text comprises displaying one or more calendar entry information selected from the group consisting of calendar entry time, location, and organizer.

9. The method of claim 7, wherein a size of the enlarged at least one region is proportional to a duration of the calendar entry.

10. The method of claim 7, the method further comprising:
in accordance with a determination that the user input represents a zoom-out command:
removing the display of the text indicating hours in a day.

11. The method of claim 7, the method further comprising:
in accordance with a determination that the user input represents a zoom-out command:
displaying a count of calendar entries within a time interval.

12. A non-transitory computer-readable storage medium storing one or more programs configured to be executed by one or more processors of an electronic device with a touch-sensitive display and a rotatable input mechanism, the one or more programs including instructions for:
displaying on the touch-sensitive display:
text indicating hours in a day,
at least one region representing a calendar entry scheduled during the indicated hours, and
text inside the at least one region indicating a name of the calendar entry;
detecting user input representing a zoom-in or zoom-out command, wherein the user input representing a zoom-in or zoom-out command includes a rotation of the rotatable input mechanism; and
in response to detecting the user input representing the zoom-in or zoom-out command:
in accordance with a determination that the user input represents a zoom-in command:
enlarging the at least one region, and
displaying additional text inside the at least one region indicating details of the calendar entry; and
in accordance with a determination that the user input represents a zoom-out command:
decreasing a size of the at least one region, and
ceasing to display additional text inside the at least one region.

13. The method of claim 11, wherein the time interval is a month or a year.

14. The non-transitory computer-readable storage medium of claim 12, wherein displaying additional text comprises displaying one or more calendar entry information selected from the group consisting of calendar entry time, location, and organizer.

15. The non-transitory computer-readable storage medium of claim 12, wherein a size of the enlarged at least one region is proportional to a duration of the calendar entry.

16. The non-transitory computer-readable storage medium of claim 12, the one or more programs further including instructions for:
in accordance with a determination that the user input represents a zoom-out command:
removing the display of the text indicating hours in a day.

17. The non-transitory computer-readable storage medium of claim 12, the one or more programs further including instructions for:
in accordance with a determination that the user input represents a zoom-out command:
displaying a count of calendar entries within a time interval.

18. The non-transitory computer-readable storage medium of claim 17, wherein the time interval is a month or a year.

* * * * *